(12) United States Patent
Yoshioka et al.

(10) Patent No.: US 10,336,938 B2
(45) Date of Patent: Jul. 2, 2019

(54) LIQUID CRYSTAL COMPOSITION

(71) Applicant: Sumitomo Chemical Company, Limited, Chuo-ku, Tokyo (JP)

(72) Inventors: Shinnosuke Yoshioka, Osaka (JP); Haruki Okawa, Niihama (JP); Daichi Fujimoto, Osaka (JP); Tatsuaki Kasai, Osaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 15/469,916

(22) Filed: Mar. 27, 2017

(65) Prior Publication Data

US 2017/0283700 A1 Oct. 5, 2017

(30) Foreign Application Priority Data

Mar. 29, 2016 (JP) ................................ 2016-066398

(51) Int. Cl.

| G02F 1/1333 | (2006.01) |
|---|---|
| C09K 19/38 | (2006.01) |
| C08F 122/10 | (2006.01) |
| C08K 5/47 | (2006.01) |
| C09K 19/56 | (2006.01) |
| G02B 5/30 | (2006.01) |
| C09K 19/04 | (2006.01) |

(52) U.S. Cl.
CPC ...... C09K 19/3823 (2013.01); C08F 122/105 (2013.01); C08K 5/47 (2013.01); C09K 19/56 (2013.01); G02B 5/3016 (2013.01); C09K 2019/0448 (2013.01)

(58) Field of Classification Search
CPC ............... C09K 19/3823; C09K 19/56; C09K 2019/0448; G02F 1/1333; C08F 122/105; C08K 5/47; G02B 5/3016
USPC ..................................................... 252/299.01
See application file for complete search history.

(56) References Cited

U.S. PATENT DOCUMENTS

| 9,529,130 | B2 * | 12/2016 | Hatanaka | G02B 5/305 |
|---|---|---|---|---|
| 9,726,798 | B2 * | 8/2017 | Takasago | G02B 5/3016 |
| 9,784,894 | B2 * | 10/2017 | Kobayashi | B32B 38/10 |
| 2017/0145312 | A1 * | 5/2017 | Hida | C08F 222/24 |
| 2017/0306234 | A1 * | 10/2017 | Fujimoto | C08F 222/24 |
| 2017/0335191 | A1 * | 11/2017 | Fujimoto | C09K 19/3809 |

FOREIGN PATENT DOCUMENTS

| JP | 2010-31223 A | 2/2010 |
|---|---|---|
| JP | 2011-207765 A | 10/2011 |
| JP | 2013-33248 A | 2/2013 |

* cited by examiner

*Primary Examiner* — Geraldina Visconti
(74) *Attorney, Agent, or Firm* — Panitch Schwarze Belisario & Nadel LLP

(57) ABSTRACT

A liquid crystal composition containing a polymerizable liquid crystal compound (A) having 5 or more ring structures in its main chain and a polymer (B) of the polymerizable liquid crystal compound (A) having 5 or more ring structures in its main chain, which inhibits occurrence of an orientation defect of a liquid crystal compound and exhibits excellent storage stability when dissolved in a solvent is provided.

11 Claims, No Drawings

LIQUID CRYSTAL COMPOSITION

BACKGROUND OF THE INVENTION

Field of the Invention

The present invention relates to a liquid crystal composition, and a retardation film, a polarizing plate, and an optical display that contain the liquid crystal composition.

Description of the Related Art

As an optical film such as a retardation film used in a flat panel display device (FPD), for example, an optical film obtained by applying to a supporting substrate a coating solution that has been prepared by dissolving a polymerizable liquid crystal compound in a solvent, followed by polymerization, may be used. Conventionally, for example, a nematic liquid crystal compound having a rod-like structure in which 2 to 4 six-membered rings are linked with one another is known as the polymerizable liquid crystal compound (e.g., Non Patent Literature 1).

On the other hand, as one of the characteristics of the retardation film, it is desired that the retardation film allows polarized light to convert over the whole wavelength region. It is known that uniform conversion of polarized light is in theory possible over the wavelength band where a value $(Re(\lambda)/Re(550))$ obtained by dividing a retardation value $Re(\lambda)$ at a wavelength $\lambda$ by a retardation value $Re(550)$ at 550 nm is near 1 or over the wavelength band which exhibits a reverse wavelength dispersion characteristic satisfying the following relations: $[Re(450)/Re(550)]<1$ and $[Re(650)/Re(550)]>1$. As the polymerizable compound that may compose such retardation film, the compound disclosed in Patent Literature 1 is known.

PRIOR ART DOCUMENTS

Patent Literature

Patent Literature 1: JP-A-2011-207765

Non Patent Literature

Non Patent Literature 1: Liquid crystal Handbook, liquid crystal Handbook Editorial Committee ed., 2000, p. 312

SUMMARY OF THE INVENTION

Problems to be Solved

The polymerizable liquid crystal compound needs to have high solubility in a solvent in producing a coating type optical film as described above. The polymerizable liquid crystal compound, however, often has poor solubility in various solvents because of its chemical structure, and may be crystallized to precipitate during storage of the coating solution. The precipitated crystals cause a defect in the optical film. Further, in order to generally enhance the solubility in a solvent, a technique of introducing a long-chain alkyl group is used for compounds having many ring structures. As for the polymerizable liquid crystal compound, however, when a long chain alkyl group is introduced as a substituent, the introduced substituent disturbs the molecular orientation of the liquid crystal compound, causing an orientation defect in the optical film.

Therefore, it is an object of the present invention to provide a liquid crystal composition that inhibits occurrence of an orientation defect of a liquid crystal compound and exhibits excellent storage stability when dissolved in a solvent, preferably containing a polymerizable liquid crystal compound that is suitable to compose a retardation film favorably capable of converting circularly polarized light.

Means for Solving the Problem

The present invention provides the following preferred embodiments [1] to [14].

[1] A liquid crystal composition containing a polymerizable liquid crystal compound (A) having 5 or more ring structures in its main chain and a polymer (B) of the polymerizable liquid crystal compound (A) having 5 or more ring structures in its main chain.

[2] The liquid crystal composition according to [1], in which the polymer (B) has an area percentage value determined by gel permeation chromatography (GPC) of 0.01% or more and 40% or less.

[3] The liquid crystal composition according to [1] or [2], in which the polymer (B) has a weight average molecular weight (Mw) determined by gel permeation chromatography (GPC) of 4,000 to 200,000.

[4] The liquid crystal composition according to any of [1] to [3], further containing an organic solvent.

[5] The liquid crystal composition according to any of [1] to [4], in which the polymerizable liquid crystal compound (A) is a polymerizable liquid crystal compound represented by the following formula (A):

[Chem. 1]

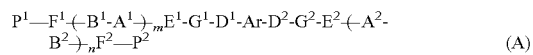
(A)

[In formula (A), m and n each independently represent an integer of 0 to 3;

$B^1$, $B^2$, $D^1$, $D^2$, $E^1$, and $E^2$ each independently represent —$CR^1R^2$—, —$CH_2$—$CH_2$—, —O—, —S—, —CO—O—, —O—CO—, —O—CO—O—, —C(=S)—O—, —O—C(=S)—, —O—C(=S)—O—, —CO—$NR^1$—, —$NR^2$—CO—, —O—$CH_2$—, —$CH_2$—O—, —S—$CH_2$—, —S—, or a single bond; and $R^1$ and $R^2$ each independently represent a hydrogen atom, a fluorine atom, or an alkyl group having 1 to 4 carbon atoms;

$A^1$, $A^2$, $G^1$, and $G^2$ each independently represent a divalent alicyclic hydrocarbon group having 3 to 16 carbon atoms or a divalent aromatic hydrocarbon group having 6 to 20 carbon atoms, the hydrogen atom contained in the alicyclic hydrocarbon group and the aromatic hydrocarbon group is optionally substituted with a halogen atom, —$R^3$, —$OR^3$, a cyano group, or a nitro group, —$CH_2$— contained in the alicyclic hydrocarbon group is optionally substituted with —O—, —S—, —NH—, or —$NR^4$—, and —CH(—)— contained in the alicyclic hydrocarbon group is optionally substituted with —N(—)—, $R^3$ and $R^4$ each independently represent an alkyl group having 1 to 4 carbon atoms, and the hydrogen atom contained in the alkyl group is optionally substituted with a fluorine atom;

$F^1$ and $F^2$ each independently represent an alkanediyl group having 1 to 12 carbon atoms, the hydrogen atom contained in the alkanediyl group is optionally substituted with —$OR^3$ or a halogen atom, and —$CH_2$— contained in the alkanediyl group is optionally substituted with —O— or —CO—;

P[1] and P[2] each independently represent a hydrogen atom or a polymerizable group (provided that at least one of P[1] and P[2] represents a polymerizable group); and Ar is a divalent aromatic group which is optionally substituted, and at least one of a nitrogen atom, an oxygen atom, or a sulfur atom is contained in the aromatic group.]

[6] The liquid crystal composition according to [5], in which Ar in the above formula (A) is an aromatic group having 10 or more and 30 or less π electrons.

[7] The liquid crystal composition according to any of [1] to [6], having a maximum absorption wavelength ($\lambda_{max}$) in the range of 300 to 400 nm.

[8] The liquid crystal composition according to any of [5] to [7], in which Ar in the above formula (A) is an aromatic group having a heterocyclic ring.

[9] The liquid crystal composition according to [8], in which the aromatic group having a heterocyclic ring is an aromatic group having a benzothiazole group.

[10] The liquid crystal composition according to any of [5] to [9], in which both G[1] and G[2] are a trans-1,4-cyclohexanediyl group.

[11] A retardation film formed from a liquid crystal composition defined in any of [1] to [10].

[12] The retardation film according to [11], satisfying the following formula (1)

$$0.80 \leq Re(450)/Re(550) < 1.00 \quad (1)$$

[In formula (1), Re(λ) represents a front retardation value at a light having a wavelength λnm.]

[13] A polarizing plate containing the retardation film defined in [11] or [12].

[14] An optical display containing the polarizing plate defined in [13].

Effect of the Invention

According to the present invention, it is possible to provide a liquid crystal composition that inhibits occurrence of an orientation defect of a liquid crystal compound and exhibits excellent storage stability when dissolved in a solvent.

DETAILED DESCRIPTION OF THE PREFERRED EMBODIMENTS

The liquid crystal composition of the present invention contains a polymerizable liquid crystal compound (A) having 5 or more ring structures in its main chain (hereinafter sometimes referred to as "polymerizable liquid crystal compound (A)" and a polymer (B) of polymerizable liquid crystal compound (A) (hereinafter sometimes referred to as "polymer (B)". In the present invention, the term "main chain" herein means a main carbon chain in a molecular chain of a polymerizable liquid crystal compound, or a portion corresponding to a stem having the maximum carbon atoms.

<Polymerizable Liquid Crystal Compound (A)>

The polymerizable liquid crystal compound (A) contains 5 or more ring structures in its main chain. Examples of the ring structure that may be contained in the main chain of polymerizable liquid crystal compound (A) include a univalent or divalent alicyclic hydrocarbon group, aromatic hydrocarbon group, and aromatic heterocyclic group. These ring structures may be monocyclic or polycyclic. The polycyclic ring structure may be a fused type or an assembly type.

Examples of the monocyclic ring structure include an alicyclic hydrocarbon group, an aromatic hydrocarbon group, and an aromatic heterocyclic group each having a 3 to 20-membered ring. Of these, an alicyclic hydrocarbon group, an aromatic hydrocarbon group, and an aromatic heterocyclic group each having preferably a 4 to 10-membered ring structure, more preferably a 5- or 6-membered ring structure, and even more preferably a 6-membered ring structure may be used. Specific examples thereof include a benzene ring, a cyclohexane ring, a pyrimidine ring, a pyridazine ring, a pyrazine ring, pyridine ring, piperizine ring, a tetrahydropyran ring, a dioxane ring, and a thiazine ring.

Examples of the polycyclic ring structure include a polycyclic aromatic group, an aromatic heterocyclic group, and polycyclic alicyclic hydrocarbon group. Of these, a polycyclic aromatic group having a heterocyclic ring is preferable. Specific examples thereof include an indole group, a benzimidazole group, a benzofuran group, a benzothiophene group, and a benzothiazole group.

The number of the ring structure in polymerizable liquid crystal compound (A) is 5 or more, preferably 13 or less, more preferably 9 or less, even more preferably 5 or more and 7 or less, and especially preferably 5. When polymerizable liquid crystal compound (A) has 5 or more ring structures in its main chain, thermal stability of the liquid crystal phase is enhanced. In the present invention, in the case where the ring structure is a polycyclic group, the entire group is counted as one ring structure.

Polymerizable liquid crystal compound (A) contained in the liquid crystal compound of the present invention is preferably a compound having 5 or more ring structures in its main chain represented by the following formula (A). The main chain preferably contains two or more monocyclic ring structures, and more preferably four or more monocyclic ring structures. When polymerizable liquid crystal compound (A) is a compound represented by the following formula (A), it is excellent in solubility in a solvent, less likely to cause an orientation defect, and can exhibit a better desired effect of the present invention.

Formula (A):

[Chem. 2]

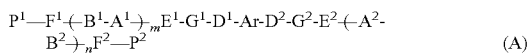

In formula (A), m and n each independently represent an integer of 0 to 3.

B[1], B[2], D[1], D[2], E[1], and E[2] each independently represent —CR[1]R[2]—, —CH$_2$—CH$_2$—, —O—, —S—, —CO—O—, —O—CO—, —O—CO—O—, —C(=S)—O—, —O—C(=S)—, —O—C(=S)—O—, —CO—NR[1]—, —NR[2]—CO—, —O—CH$_2$—, —CH$_2$—O—, —S—CH$_2$—, —CH$_2$—S—, or a single bond; and R[1] and R[2] each independently represent a hydrogen atom, a fluorine atom, or an alkyl group having 1 to 4 carbon atoms.

A[1], A[2], G[1] and G[2] each independently represent a divalent alicyclic hydrocarbon group having 3 to 16 carbon atoms or a divalent aromatic hydrocarbon group having 6 to 20 carbon atoms; the hydrogen atom contained in the alicyclic hydrocarbon group and the aromatic hydrocarbon group is optionally substituted with a halogen atom, —R[3], —OR[3], a cyano group, or a nitro group; —CH$_2$— contained in the alicyclic hydrocarbon group is optionally substituted with —O—, —S—, —NH—, or —NR[4]—; —CH(—)— contained in the alicyclic hydrocarbon group is optionally substituted with —N(—)—; and $R^4$ each independently represent an alkyl group having 1 to 4 carbon atoms; and the hydrogen atom contained in the alkyl group is optionally substituted with a fluorine atom.

$F^1$ and $F^2$ each independently represent an alkanediyl group having 1 to 12 carbon atoms; the hydrogen atom contained in the alkanediyl group is optionally substituted with —$OR^3$ or a halogen atom; and —$CH_2$— contained in the alkanediyl group is optionally substituted with —O— or —CO—.

$P^1$ and $P^2$ each independently represent a hydrogen atom or a polymerizable group (provided that at least one of $P^1$ and $P^2$ represents a polymerizable group).

Ar is a divalent aromatic group which is optionally substituted; and at least one of a nitrogen atom, an oxygen atom, or a sulfur atom is contained in the aromatic group.

In formula (A), m and n each independently represent an integer of 0 to 3. Provided that in the case where one of m and n is 0, the other represents an integer of 2 or 3. m and n are each preferably 1 or 2, and more preferably 1. From the viewpoints of easily producing polymerizable liquid crystal compound (A) and reducing the production cost, m and n are preferably the same integer. Further, in the case where m and n are each 2 or 3, a plurality of As and Bs may be the same or different from each other. From the viewpoint of industrially easily producing polymerizable liquid crystal compound (A), it is preferable that a plurality of As and Bs are the same as each other.

In formula (A), $B^1$, $B^2$, $D^1$, $D^2$, $E^1$, and $E^2$ each independently represent —$CR^1R^2$—, —$CH_2$—$CH_2$—, —O—, —S—, —CO—O—, —O—CO—, —O—CO—O—, —C(=S)—O—, —O—C(=S)—, —O—C(=S)—O—, —CO—$NR^1$—, —$NR^2$—CO—, —O—$CH_2$—, —$CH_2$—O—, —S—$CH_2$—, —$CH_2$—S—, or a single bond. In the above-mentioned formula, $R^1$ and $R^2$ each independently represent a hydrogen atom, a fluorine atom, or an alkyl group having 1 to 4 carbon atoms.

From the viewpoint of easily exhibiting a liquid crystal phase, $B^1$ and $B^2$ are each independently preferably —O—, —S—, —O—CO—, —CO—O—, —O—CO—O—, —O—C(=S)—, —O—C(=S)—O—, —O—$CH_2$—, or —$CH_2$—O—, and more preferably —O—, —O—CO—, or —CO—O—. From the viewpoints of easily producing polymerizable liquid crystal compound (A) and reducing the production cost, it is preferable that $B^1$ and $B^2$ are the same as each other. The phrase "$B^1$ and $B^2$ are the same as each other" means that in the case where Ar is regarded as a center, the structures of $B^1$ and $B^2$ are the same as each other. For example, in the case where $B^1$ is —O—CO—, $B^{2'}$ which is the same as $B^1$, is —CO—O—. The same applies to the following relations of $D^1$ and $D^2$, $E^1$ and $E^2$, $A^1$ and $A^2$, $G^1$ and $G^2$, $F^1$ and $F_2$, and $P^1$ and $P^2$.

From the viewpoint of easily exhibiting a liquid crystal phase, $D^1$, $D^2$, $E^1$, and $E^2$ are each independently preferably —O—, —S—, —O—CO—, —CO—O—, —O—CO—O—, —CO—$NR^1$—, or —$NR^2$—CO—, and more preferably —O—, —O—CO—, or —CO—C—. From the viewpoints of easily producing polymerizable liquid crystal compound (A) and reducing the production cost, it is preferable that each pair of $D^1$ and $D^2$, and $E^1$ and $E^2$ are the same as each other.

In formula (A), $A^1$, $A^2$, $G^1$, and $G^2$ each independently represent a divalent alicyclic hydrocarbon group having 3 to 16 carbon atoms or a divalent aromatic hydrocarbon group having 6 to 20 carbon atoms. The number of carbon atoms of the divalent alicyclic hydrocarbon group is preferably 4 to 15, more preferably 5 to 10, and even more preferably 5 or 6. The number of carbon atoms of the divalent aromatic hydrocarbon group is preferably 6 to 18, more preferably 6 to 16, and even more preferably 5 or 6. The hydrogen atom contained in the alicyclic hydrocarbon group and the aromatic hydrocarbon group is optionally substituted with a halogen atom, —$R^3$, —$OR^3$, a cyano group, or a nitro group. Here, $R^3$ represents an alkyl group having 1 to 4 carbon atoms, and the hydrogen atom contained in the alkyl group is optionally substituted with a fluorine atom.

Examples of the alkyl group having 1 to 4 carbon atoms include a methyl group, an ethyl group, a propyl group, an isopropyl group, a butyl group, an isobutyl group, a sec-butyl group, and a tert-butyl group. Of these, an alkyl group having 1 to 3 carbon atoms is preferable, an alkyl group having 1 or 2 carbon atoms is more preferable, and a methyl group is especially preferable.

Examples of the alkoxy group having 1 to 4 carbon atoms in —$OR^3$ include a methoxy group, an ethoxy group, a propoxy group, an isopropoxy group, a butoxy group, an isobutoxy group, sec-butoxy group, and a tert-butoxy group. Of these, an alkoxy group having 1 to 3 carbon atoms is preferable, an alkoxy group having 1 or 2 carbon atoms is more preferable, and a methoxy group is especially preferable.

Examples of the divalent alicyclic hydrocarbon group include a cycloalkanediyl group. —$CH_2$— (methylene group) contained in the alicyclic hydrocarbon group is optionally substituted with —O—, —S—, —NH—, or —$NR^4$—; and —CH(—)— is optionally substituted with —N(—)—. Here, $R^4$ represents a hydrogen atom or an alkyl group having 1 to 4 carbon atoms.

Examples of the divalent alicyclic hydrocarbon group include the groups represented by the following formulae (g-1) to (g-4). Examples of the divalent alicyclic hydrocarbon group in which —$CH_2$— contained in the alicyclic hydrocarbon group is replaced by —O—, —S—, —NH— or —$NR^4$— include the groups represented by the following formulae (g-5) to (g-8). Examples of the divalent alicyclic hydrocarbon group in which —CH(—)— contained in the alicyclic hydrocarbon group is replaced by —N(—)— include the groups represented by the following formulae (g-9) and (g-10). Of these, a 5- or 6-membered alicyclic hydrocarbon group is preferable.

[Chem. 3]

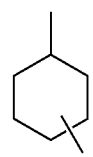

(g-1)

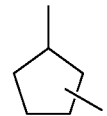

(g-2)

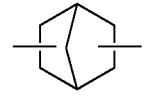

(g-3)

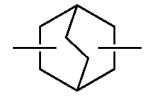

(g-4)

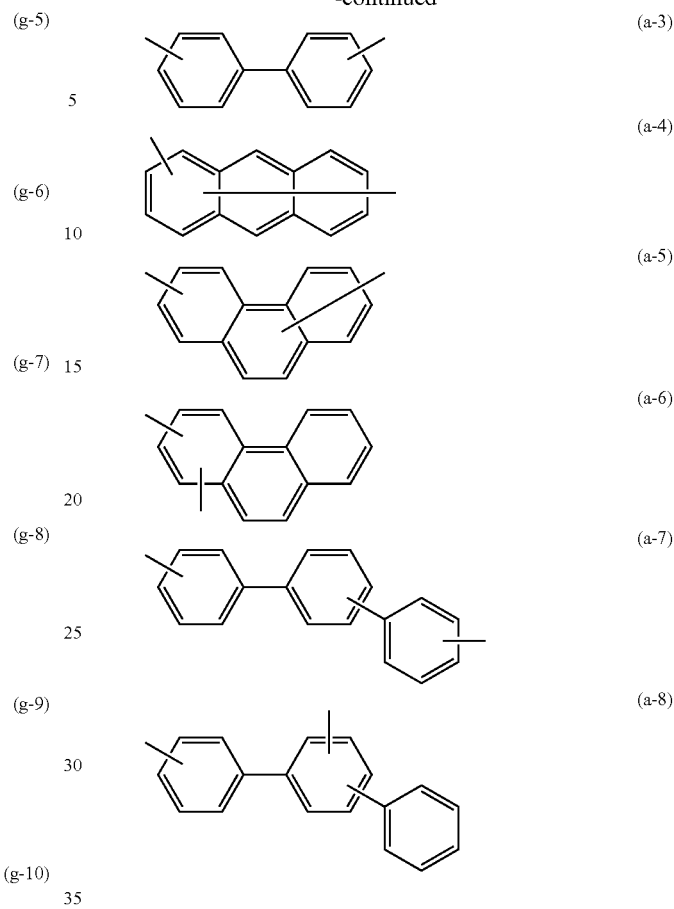

The divalent alicyclic hydrocarbon group is preferably a group represented by formula (g-1), more preferably a cyclohexane-1,4-diyl group, and especially preferably a trans-cyclohexane-1,4-diyl group.

Examples of the divalent aromatic hydrocarbon group include the groups represented by formulae (a-1) to (a-8). The divalent aromatic hydrocarbon group is preferably 1,4-phenylene group.

[Chem. 4]

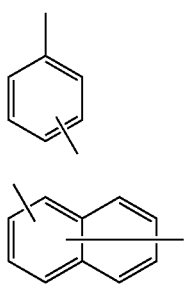

In one embodiment of the present invention, from the viewpoint of producing the compound of the present invention, it is preferable that $A^1$ and $A^2$ are each independently a divalent aromatic hydrocarbon group. Further, in one embodiment of the present invention, from the viewpoint of producing the compound of the present invention, it is preferable that $G^1$ and $G^2$ are each independently a divalent alicyclic hydrocarbon group, more preferably a trans-cyclohexane-1,4-diyl group, and it is especially preferable that both $G^1$ and $G^2$ are a trans-cyclohexane-1,4-diyl group. In the case where both $G^1$ and $G^2$ are a trans-cyclohexane-1,4-diyl group, especially better liquid crystallinity is exhibited. Also, in the case, exhibiting a reverse wavelength dispersion characteristic of the retardation film tend to be higher so that the value of $[(Re(\lambda)/Re(550))/(\lambda/550)]$ is to be 1 or close to 1 and tend to be possible uniform conversion of polarized light over the wider wavelength region. Also, from the viewpoints of easily producing polymerizable liquid crystal compound (A) and reducing the production cost, it is preferable that each pair of $A^1$ and $A^2$, and $G^1$ and $G^2$ are the same as each other.

In formula (A), $F^1$ and $F^2$ each independently represent an alkanediyl group having 1 to 12 carbon atoms, preferably 2 to 15 carbon atoms, more preferably 3 to 12 carbon atoms, and even more preferably 4 to 10 carbon atoms. The hydrogen atom contained in the alkanediyl group is optionally substituted with —$OR^3$ or a halogen atom, and —$CH_2$— contained in the alkanediyl group is optionally substituted with —O— or —CO—. $R^3$ represents an alkyl group having 1 to 4 carbon atoms, and the hydrogen atom contained in the alkyl group is optionally substituted with a fluorine atom. From the viewpoints of easily producing polymerizable liquid crystal compound (A) and reducing the production cost, it is preferable that $F^1$ and $F^2$ are the same as each other.

In formula (A), $P^1$ and $P^2$ and each independently represent a hydrogen atom or a polymerizable group, provided that at least one of $P^1$ and $P^2$ represents a polymerizable group, and it is preferable that both of $P^1$ and $P^2$ represent a polymerizable group. The polymerizable group contains a group capable of being involved in polymerization reaction. Examples thereof include a vinyl group, a p-(2-phenylethenyl) phenyl group, an acryloyl group, an acryloyloxy group, a methacryloyl group, a methacryloyloxy group, a carboxyl group, a methylcarboxy group, a hydroxyl group, a carbamoyl group, an alkylamino group having 1 to 4 carbon atoms, an amino group, a formyl group, —N=C=O, —N=C=S, an oxiranyl group, and an oxetanyl group.

Of these, the polymerizable group is preferably a radical polymerizable group or a cationic polymerizable group in terms of suitability for photo polymerization. In particular, an acryloyl group, an acryloyloxy group, a methacryloyl group, or a methacryloyloxy group is preferable in terms of easy handling and easy production, and an acryloyl group or an acryloyloxy group is more preferable in terms of high polymerizing ability.

In formula (A), the divalent aromatic group represented by Ar contains at least one of a nitrogen atom, an oxygen atom, and a sulfur atom. In the present invention, this means that these hetero atoms are contained in Ar, and Ar may or may not have a heterocyclic ring. The divalent aromatic group represented by Ar is preferably an aromatic group having a heterocyclic ring, from the viewpoint of exhibiting a reverse wavelength dispersion characteristic of the resulting retardation film. As such aromatic group, an aromatic group having, for example, a furan ring, a benzofuran ring, a pyrrole ring, a thiophene ring, a pyridine ring, a thiazole ring, a benzothiazole ring, a phenanthroline ring, or the like may be used. Of these, an aromatic group having a benzene ring, a thiazole ring or a benzothiazole ring is more preferable, and an aromatic group having a benzothiazole ring is even more preferable.

The aromatic group represented by Ar preferably has a π electron. A total number $N_\pi$ of the π electron contained in the aromatic group is preferably 10 or more, more preferably 12 or more, and even more preferably 14 or more; preferably 30 or less, and more preferably 25 or less, from the viewpoint of exhibiting a reverse wavelength dispersion characteristic of the retardation film obtained from the liquid crystal composition.

Examples of the aromatic group represented by Ar include the following groups.

[Chem. 5]

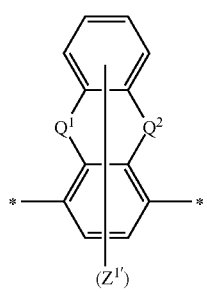
(Ar-1)

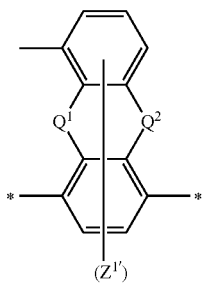
(Ar-2)

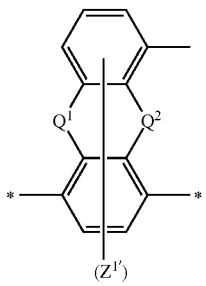
(Ar-3)

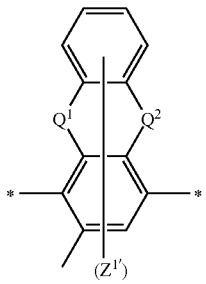
(Ar-4)

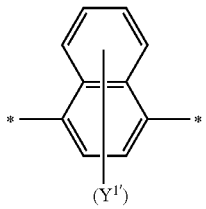
(Ar-5)

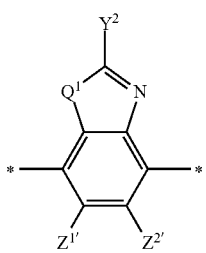
(Ar-6)

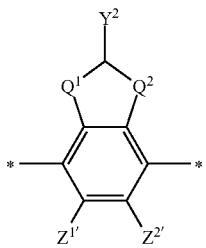
(Ar-7)

-continued
(Ar-8)
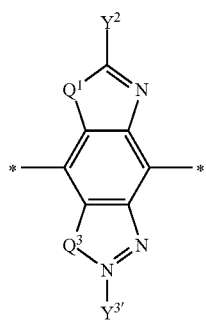
(Ar-9)
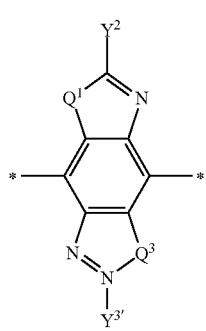
(Ar-10)
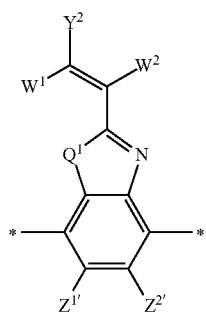
(Ar-11)
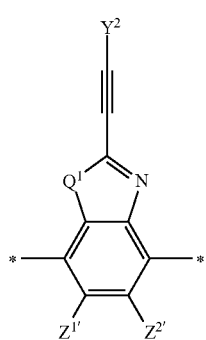
(Ar-12)
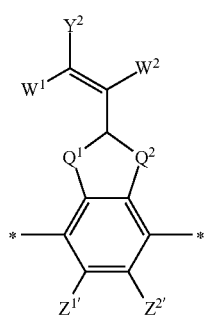
-continued
(Ar-13)
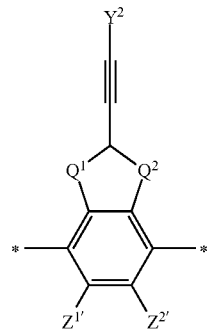
(Ar-14)
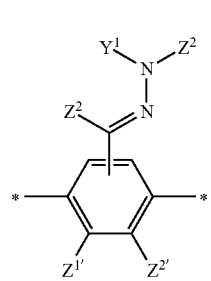
(Ar-15)
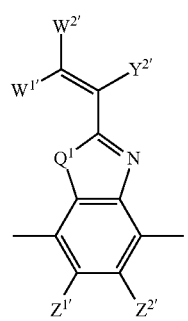
(Ar-16)
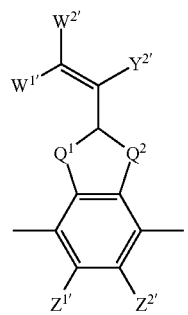
(Ar-17)
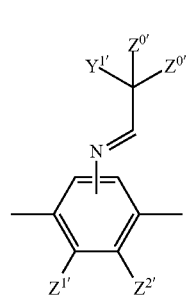

-continued (Ar-18)
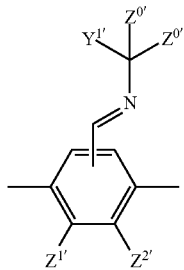

(Ar-19)
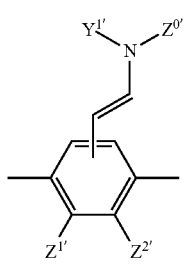

(Ar-20)
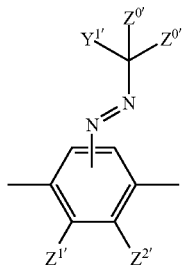

(Ar-21)
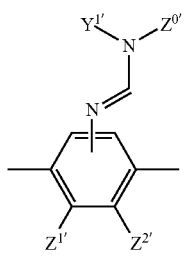

(Ar-22)
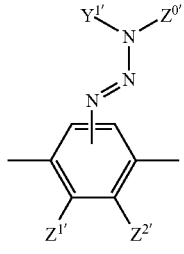

In formulae (Ar-1) to (Ar-22), * represents a linking unit, and $Z^{0'}$, $Z^{1'}$, and $Z^{2'}$ independently represent a hydrogen atom, a halogen atom, an alkyl group having 1 to 6 carbon atoms, a cyano group, a nitro group, an alkylsulfinyl group having 1 to 6 carbon atoms, an alkylsulfonyl group having 1 to 6 carbon atoms, a carboxyl group, a fluoroalkyl group having 1 to 6 carbon atoms, an alkoxy group having 1 to 6 carbon atoms, an alkylthio group having 1 to 6 carbon atoms, an N-alkylamino group having 1 to 6 carbon atoms, an N,N-dialkylamino group having 2 to 12 carbon atoms, an N-alkylsulfamoyl group having 1 to 6 carbon atoms, or an N,N-dialkylsulfamoyl group having 2 to 12 carbon atoms.

$Q^1$, $Q^2$, and $Q^3$ each independently represent —$CR^5R^6$—, —S—, —$NR^7$—, —CO—, or —O—.

$R^5$, $R^6$, and $R^7$ each independently represent a hydrogen atom or an alkyl group having 1 to 4 carbon atoms.

$Y^{1'}$, $Y^{2'}$, and $Y^{3'}$ each independently represent an aromatic hydrocarbon group or an aromatic heterocyclic group, which is optionally substituted.

$W^{1'}$ and $W^{2'}$ each independently represent a hydrogen atom, a cyano group, a methyl group, or a halogen atom.

m represents an integer of 0 to 6.

Examples of the halogen atom include a fluorine atom, a chlorine atom, a bromine atom, and an iodine atom. Of these, a fluorine atom, a chlorine atom, or a bromine atom is preferable.

Examples of the alkyl group having 1 to 6 carbon atoms include a methyl group, an ethyl group, a propyl group, an isopropyl group, a butyl group, an isobutyl group, sec-butyl group, a tert-butyl group, a pentyl group, and a hexyl group. Of these, an alkyl group having 1 to 4 carbon atoms is preferable, an alkyl group having 1 to 2 carbon atoms is more preferable, and a methyl group is especially preferable.

Examples of the alkylsulfinyl group having 1 to 6 carbon atoms include a methyl sulfinyl group, an ethyl sulfinyl group, a propyl sulfinyl group, an isopropyl sulfinyl group, a butyl sulfinyl group, an isobutyl sulfinyl group, a sec-butyl sulfinyl group, a tert-butyl sulfinyl group, a pentyl sulfinyl group, and a hexyl sulfinyl group. Of these, an alkylsulfinyl group having 1 to 4 carbon atoms is preferable, an alkylsulfinyl group having 1 to 2 carbon atoms is more preferable, and a methylsulfinyl group is especially preferable.

Examples of the alkylsulfonyl group having 1 to 6 carbon atoms include a methylsulfonyl group, an ethylsulfonyl group, a propylsulfonyl group, an isopropylsulfonyl group, a butylsulfonyl group, an isobutylsulfonyl group, a sec-butylsulfonyl group, a tert-butylsulfonyl group, a pentyl sulfonyl group, and a hexyl sulfonyl group. Of these, an alkylsulfonyl group having 1 to 4 carbon atoms is preferable, an alkylsulfonyl group having 1 to 2 carbon atoms is more preferable, and a methylsulfonyl group is especially preferable.

Examples of the fluoroalkyl group having 1 to 6 carbon atoms include a fluoromethyl group, a trifluoromethyl group, a fluoroethyl group, a pentafluoroethyl group, a heptafluoropropyl group, and a nonafluorobutyl group. Of these, a fluoroalkyl group having 1 to 4 carbon atoms is preferable, a fluoroalkyl group having 1 to 2 carbon atoms is more preferable, and a trifluoromethyl group is especially preferable.

Examples of the alkoxy group having 1 to 6 carbon atoms include a methoxy group, an ethoxy group, a propoxy group, an isopropoxy group, a butoxy group, an isobutoxy group, a sec-butoxy group, a tert-butoxy group, a pentyloxy group, and a hexyloxy group. Of these, an alkoxy group having 1 to 4 carbon atoms is preferable, an alkoxy group having 1 to 2 carbon atoms is more preferable, and a methoxy group is especially preferable.

Examples of the alkylthio group having 1 to 6 carbon atoms include a methylthio group, an ethylthio group, a propylthio group, an isopropylthio group, a butylthio group, an isobutylthio group, a sec-butylthio group, a tert-butylthio group, a pentylthio group, and a hexylthio group. Of these, an alkylthio group having 1 to 4 carbon atoms is preferable, an alkylthio group having 1 to 2 carbon atoms is more preferable, and a methylthio group is especially preferable.

Examples of the N-alkylamino group having 1 to 6 carbon atoms include an N-methylamino group, an N-ethylamino group, an N-propylamino group, an N-isopropylamino group, an N-butylamino group, an N-isobutylamino group, an N-sec-butylamino group, an N-tert-butylamino group, an N-sec-pentylamino group, and an N-hexylamino group. Of these, an N-alkylamino group having 1 to 4 carbon atoms is preferable, an N-alkylamino group having 1 to 2 carbon atoms is more preferable, and an N-methylamino group is especially preferable.

Examples of the N,N-dialkylamino group having 2 to 12 carbon atoms include an N,N-dimethylamino group, an N-methyl-N-ethylamino group, an N,N-diethylamino group, an N,N-dipropylamino group, an N,N-diisopropylamino group, an N,N-dibutylamino group, an N,N-diisobutylamino group, an N,N-dipentylamino group, and an N,N-dihexylamino group. Of these, an N,N-dialkylamino group having 2 to 8 carbon atoms is preferable, an N,N-dialkylamino group having 2 to 4 carbon atoms is more preferable, and an N,N-dimethylamino group is especially preferable.

Examples of the N-alkylsulfamoyl group having 1 to 6 carbon atoms include an N-methylsulfamoyl group, an N-ethylsulfamoyl group, an N-propylsulfamoyl group, an N-isopropylsulfamoyl group, an N-butylsulfamoyl group, an N-isobutyl sulfamoyl group, an N-sec-butylsulfamoyl group, an N-tert-butylsulfamoyl group, an N-pentylsulfamoyl group, and N-hexylsulfamoyl group. Of these, an N-alkylsulfamoyl group having 1 to 4 carbon atoms is preferable, an N-alkylsulfamoyl group having 1 to 2 carbon atoms is more preferable, and an N-methylsulfamoyl group is especially preferable.

Examples of the N,N-dialkylsulfamoyl group having 2 to 12 carbon atoms include an N,N-dimethylsulfamoyl group, an N-methyl-N-ethylsulfamoyl group, an N,N-diethylsulfamoyl group, an N,N-dipropylsulfamoyl group, an N,N-diisopropylsulfamoyl group, an N,N-dibutylsulfamoyl group, an N,N-diisobutylsulfamoyl group, an N,N-dipentylsulfamoyl group, and an N,N-dihexylsulfamoyl group. Of these, an N,N-dialkylsulfamoyl group having 2 to 8 carbon atoms is preferable, an N,N-dialkylsulfamoyl group having 2 to 4 carbon atoms is more preferable, and an N,N-dimethylsulfamoyl group is especially preferable.

It is preferable that $Z^{0'}$, $Z^{1'}$, and $Z^{2'}$ are each independently a hydrogen atom, a halogen atom, a methyl group, a cyano group, a nitro group, a carboxyl group, a methylsulfonyl group, a trifluoromethyl group, a methoxy group, a methylthio group, an N-methylamino group, an N,N-dimethylamino group, an N-methylsulfamoyl group, or a N,N-dimethylsulfamoyl group.

Examples of the alkyl group having 1 to 4 carbon atoms in $R^5$, $R^6$, and $R^7$ include a methyl group, an ethyl group, a propyl group, an isopropyl group, a butyl group, an isobutyl group, and a tert-butyl group. Of these, an alkyl group having 1 to 2 carbon atoms is preferable, and a methyl group is more preferable.

$Q^1$ and $Q^2$ are each independently preferably —S—, —CO—, —NH—, or —N(CH$_3$)—, and $Q^3$ is preferably —S— or —CO—.

Examples of the aromatic hydrocarbon group in $Y^{1'}$, $Y^{2'}$, and $Y^{3'}$ include an aromatic hydrocarbon group having 6 to 20 carbon atoms such as a phenyl group, a naphthyl group, an anthryl group, a phenanthryl group, and a biphenyl group. Of these, a phenyl group and a naphthyl group are preferable, and a phenyl group is more preferable. Examples of the aromatic heterocyclic group include aromatic heterocyclic group having 4 to 20 carbon atoms containing at least one of hetero atoms such as a nitrogen atom, an oxygen atom, and a sulfur atom, including a furyl group, a pyrrolyl group, a thienyl group, a pyridinyl group, a thiazolyl group, and a benzothiazolyl group. Of these, a furyl group, a pyrrolyl group, a thienyl group, a pyridinyl group, a thiazolyl group and a benzothiazolyl group are preferable.

The aromatic hydrocarbon group and the aromatic heterocyclic group optionally have at least one substituent.

Examples of the substituent include a halogen atom, an alkyl group having 1 to 6 carbon atoms, a cyano group, a nitro group, an alkylsulfinyl group having 1 to 6 carbon atoms, an alkylsulfonyl group having 1 to 6 carbon atoms, a carboxyl group, a fluoroalkyl group having 1 to 6 carbon atoms, an alkoxy group having 1 to 6 carbon atoms, an alkylthio group having 1 to 6 carbon atoms, an N-alkylamino group having 1 to 6 carbon atoms, an N,N-dialkylamino group having 2 to 12 carbon atoms, an N-alkylsulfamoyl group having 1 to 6 carbon atoms, and an N,N-dialkylsulfamoyl group having 2 to 12 carbon atoms. Of these, a halogen atom, an alkyl group having 1 to 2 carbon atoms, a cyano group, a nitro group, an alkylsulfonyl group having 1 to 2 carbon atoms, a fluoroalkyl group having 1 to 2 carbon atoms, an alkoxy group having 1 to 2 carbon atoms, an alkylthio group having 1 to 2 carbon atoms, an N-alkylamino group having 1 to 2 carbon atoms, an N,N-dialkylamino group having 2 to 4 carbon atoms, and an alkylsulfamoyl group having 1 to 2 carbon atoms are preferable.

Examples of the halogen atom, alkyl group having 1 to 6 carbon atoms, cyano group, nitro group, alkylsulfinyl group having 1 to 6 carbon atoms, alkylsulfonyl group having 1 to 6 carbon atoms, carboxyl group, fluoroalkyl group having 1 to 6 carbon atoms, alkoxy group having 1 to 6 carbon atoms, alkylthio group having 1 to 6 carbon atoms, N-alkylamino group having 1 to 6 carbon atoms, N,N-dialkylamino group having 2 to 12 carbon atoms, N-alkylsulfamoyl group having 1 to 6 carbon atoms, and N,N-dialkylsulfamoyl group having 2 to 12 carbon atoms include the same groups as those illustrated above.

In formula (Ar-14), $Y^{1'}$ may form an aromatic heterocyclic group together with the nitrogen atom to which $Y^{1'}$ bonds and $Z^{0'}$. Examples of the aromatic heterocyclic group include a pyrrole ring, an imidazole ring, a pyridine ring, a pyrimidine ring, an indole ring, a quinoline ring, an isoquinoline ring, a purine ring, a pyrrolidine ring, and a piperidine ring. Such aromatic heterocyclic group optionally has a substituent. Further, $Y^{1'}$ may be a polycyclic aromatic hydrocarbon group or a polycyclic aromatic heterocyclic group which is optionally substituted, to be described later, together with the nitrogen atom to which $Y^{1'}$ bonds and $Z^{0'}$.

$Y^{1'}$, $Y^{2'}$, and $Y^{3'}$ may be each independently a polycyclic aromatic hydrocarbon group or a polycyclic aromatic heterocyclic group which is optionally substituted. The polycyclic aromatic hydrocarbon group refers to a group derived from a fused polycyclic aromatic hydrocarbon group or an aromatic ring assembly. The polycyclic aromatic heterocyclic group refers to a group derived from a fused polycyclic aromatic heterocyclic group or an aromatic ring assembly. For example, $Y^{1'}$, $Y^{2'}$, and $Y^{3'}$ are each independently preferably any of the groups represented by the following formulae ($Y^1$-1) to ($Y^1$-7), and more preferably any of the groups represented by formulae ($Y^1$-1) or ($Y^1$-4).

[Chem. 6]

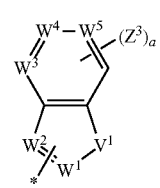

($Y^1$-1)

(Y¹-2) 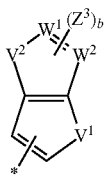

(Y¹-3) 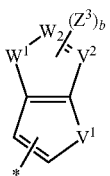

(Y¹-4) 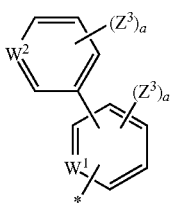

(Y¹-5) 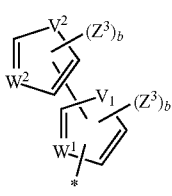

(Y¹-6) 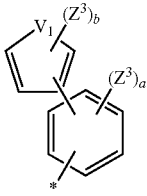

(Y¹-7) 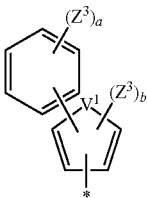

In the above formulae (Y¹-1) to (Y¹-7), * represents a linking unit, and $Z^3$ independently represents a halogen atom, an alkyl group having 1 to 6 carbon atoms, a cyano group, a nitro group, a nitroxide group, a sulfone group, a sulfoxide group, a carboxyl group, a fluoroalkyl group having 1 to 6 carbon atoms, an alkoxy group having 1 to 6 carbon atoms, a thioalkyl group having 1 to 6 carbon atoms, an N,N-dialkylamino group having 2 to 8 carbon atoms, or an N-alkylamino group having 1 to 4 carbon atoms.

$V^1$ and $V^2$ each independently represent —CO—, —S—, —$NR^8$—, —O—, —Se— or —$SO_2$—.

$W^1$ to $W^5$ each independently represent —C= or —N=.

Provided that at least one of $V^1$, $V^2$, and $W^1$ to $W^5$ represents a group containing S, N, O or Se.

$R^8$ represents a hydrogen atom or an alkyl group having 1 to 4 carbon atoms.

a independently represents an integer of 0 to 3.

b independently represents an integer of 0 to 2.

Any of the groups represented by formulae (Y¹-1) to (Y¹-7) is preferably any of the groups represented by the following formulae (Y²-1) to (Y²-16), and more preferably any of the groups represented by the following formulae (Y³-1) to (Y³-6), and especially preferably the group represented by formula (Y³-1) or (Y³-3). * represents a linking unit.

[Chem. 7]

(Y²-1) 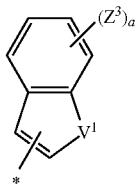

(Y²-2) 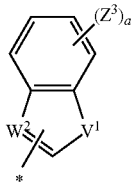

(Y²-3) 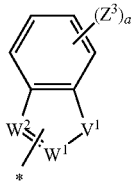

(Y²-4) 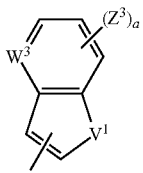

(Y²-5) 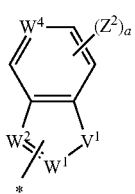

(Y²-6) 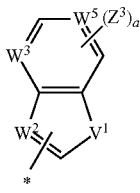

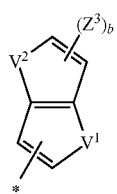 (Y²-7)
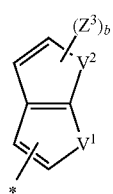 (Y²-8)
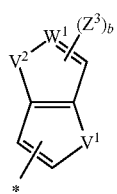 (Y²-9)
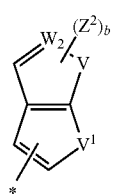 (Y²-10)
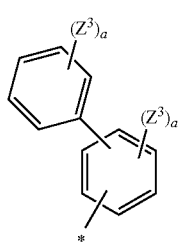 (Y²-11)
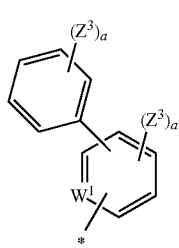 (Y²-12)
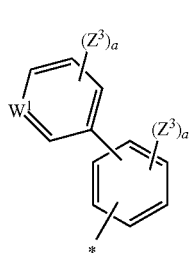 (Y²-13)
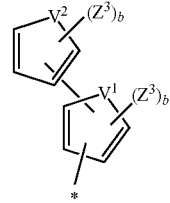 (Y²-14)
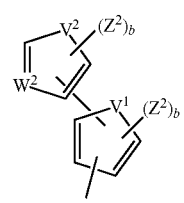 (Y²-15)
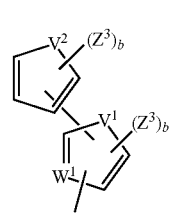 (Y²-16)
In formulae (Y²-1) to (Y²-16), Z³, a, b, V¹, V² and W¹ to W⁵ are the same as defined above.
[Chem. 8]
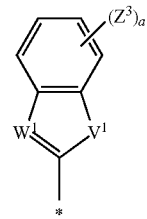 (Y³-1)
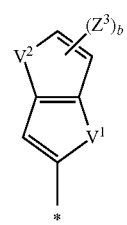 (Y³-2)
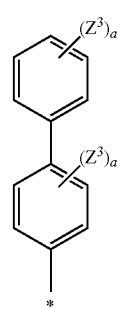 (Y³-3)

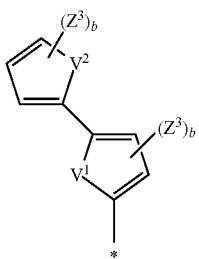
(Y³-4)

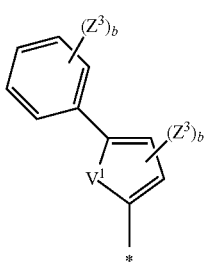
(Y³-5)

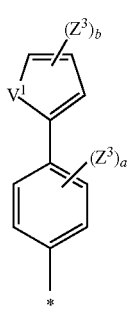
(Y³-6)

In formulae (Y³-1) to (Y³-6), Z³, a, b, V¹, V² and W¹ are the same as defined above.

Examples of Z³ include a halogen atom, an alkyl group having 1 to 6 carbon atoms, a cyano group, a nitro group, an alkylsulfinyl group having 1 to 6 carbon atoms, an alkylsulfonyl group having 1 to 6 carbon atoms, a carboxyl group, a fluoroalkyl group having 1 to 6 carbon atoms, an alkoxy group having 1 to 6 carbon atoms, an alkylthio group having 1 to 6 carbon atoms, an N-alkylamino group having 1 to 6 carbon atoms, an N,N-dialkylamino group having 2 to 12 carbon atoms, an N-alkylsulfamoyl group having 1 to 6 carbon atoms, and an N,N-dialkylsulfamoyl group having 2 to 12 carbon atoms. Of these, a halogen atom, a methyl group, an ethyl group, an isopropyl group, a sec-butyl group, a cyano group, a nitro group, a sulfone group, a nitroxide group, a carboxyl group, a trifluoromethyl group, a methoxy group, a thiomethyl group, an N,N-dimethylamino group, and an N-methylamino group are preferable; a halogen atom, a methyl group, an ethyl group, an isopropyl group, a sec-butyl group, a cyano group, a nitro group, a trifluoromethyl group are more preferable; and a methyl group, an ethyl group, an isopropyl group, a sec-butyl group, a pentyl group, and a hexyl group are especially preferable.

Examples of the halogen atom, alkyl group having 1 to 6 carbon atoms, alkylsulfinyl group having 1 to 6 carbon atoms, alkylsulfonyl group having 1 to 6 carbon atoms, fluoroalkyl group having 1 to 6 carbon atoms, alkoxy group having 1 to 6 carbon atoms, alkylthio group having 1 to 6 carbon atoms, N-alkylamino group having 1 to 6 carbon atoms, N,N-dialkylamino group having 2 to 12 carbon atoms, N-alkylsulfamoyl group having 1 to 6 carbon atoms, and N,N-dialkylsulfamoyl group having 2 to 12 carbon atoms include the same groups as those illustrated above.

It is preferable that $V^1$ and $V^2$ are each independently —S—, —NR⁸— or —O—.

It is preferable that $W^1$ to $W^5$ are each independently —C═ or —N═.

It is preferable that at least one of $V^1$, $V^2$, and $W^1$ to $W^5$ represents a group containing S, N or O.

It is preferable that a is 0 or 1. It is preferable that b is 0.

Specific examples of $Y^{1'}$ to $Y^{3'}$ include the groups represented by the following formulae (ar-1) to (ar-840). * represents a linking unit.

[Chem. 9]

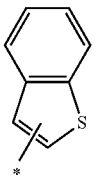
(ar-001)

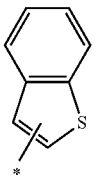
(ar-002)

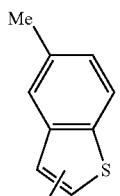
(ar-003)

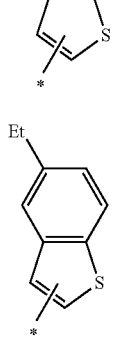
(ar-004)

(ar-005)

-continued
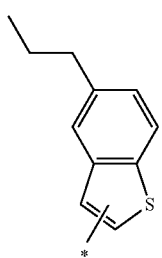
(ar-006)
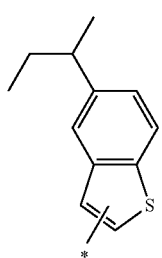
(ar-007)
[Chem. 10]
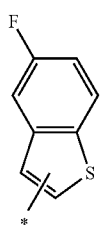
(ar-008)
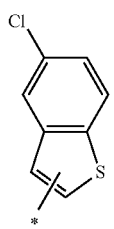
(ar-009)
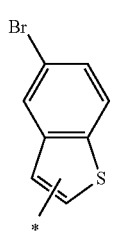
(ar-010)
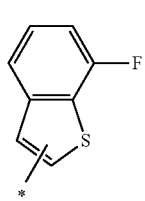
(ar-011)
-continued
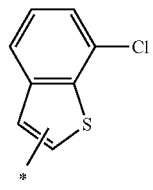
(ar-012)
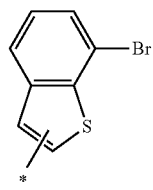
(ar-013)
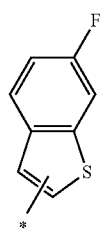
(ar-014)
[Chem. 11]
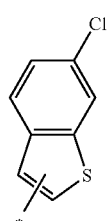
(ar-015)
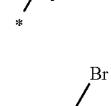
(ar-016)
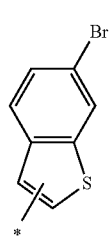
(ar-017)
(ar-018)

-continued
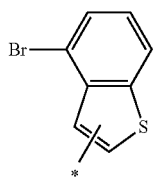
(ar-019)
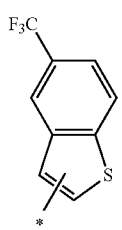
(ar-020)
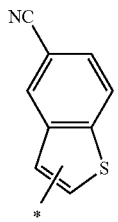
(ar-021)
[Chem. 12]
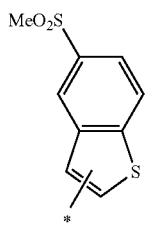
(ar-022)
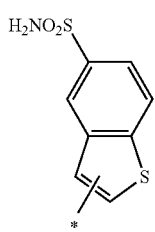
(ar-023)
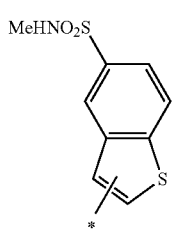
(ar-024)
-continued
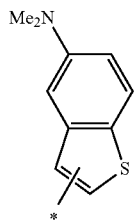
(ar-025)
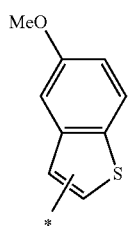
(ar-026)
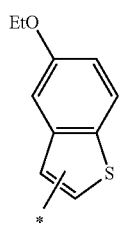
(ar-027)
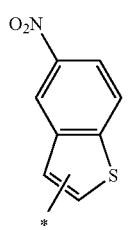
(ar-028)
[Chem. 13]
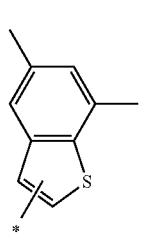
(ar-029)
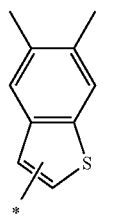
(ar-030)

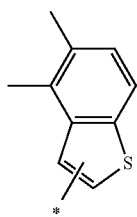 (ar-031)
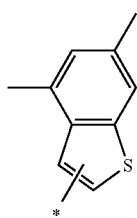 (ar-032)
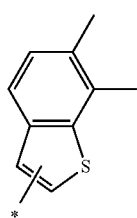 (ar-033)
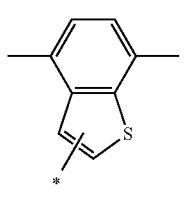 (ar-034)
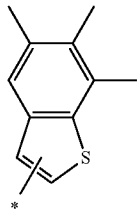 (ar-035)
[Chem. 14]
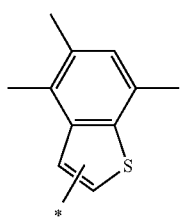 (ar-036)
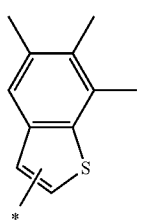 (ar-037)
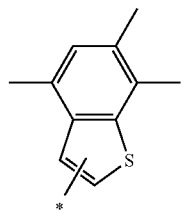 (ar-038)
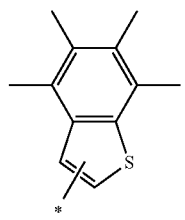 (ar-039)
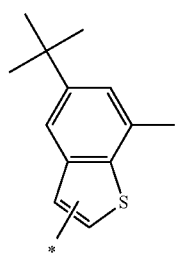 (ar-040)
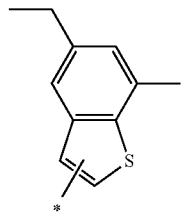 (ar-041)
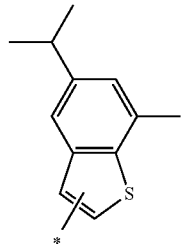 (ar-042)
[Chem. 15]
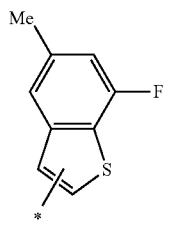 (ar-043)

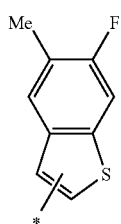 (ar-044)
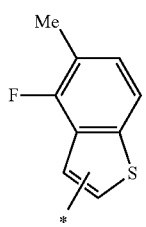 (ar-045)
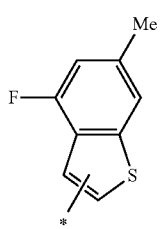 (ar-046)
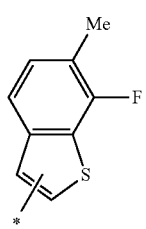 (ar-047)
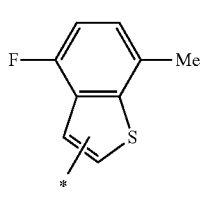 (ar-048)
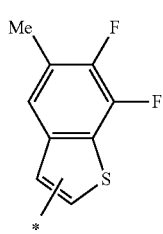 (ar-049)
[Chem. 16]
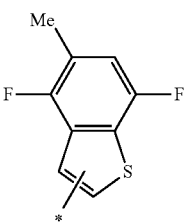 (ar-050)
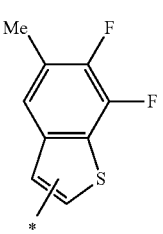 (ar-051)
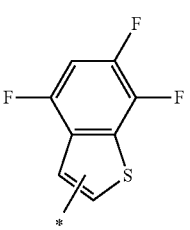 (ar-052)
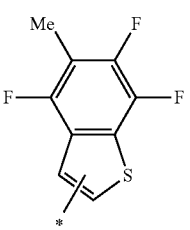 (ar-053)
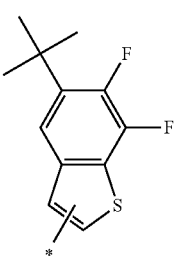 (ar-054)
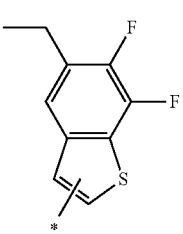 (ar-055)

[Chem. 17]
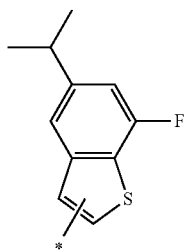
(ar-056)
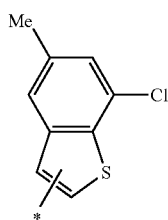
(ar-057)
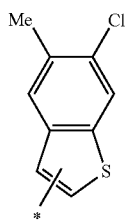
(ar-058)
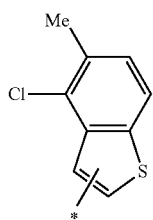
(ar-059)
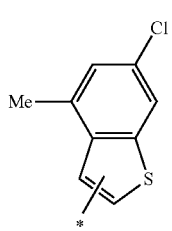
(ar-060)
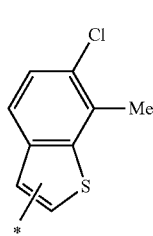
(ar-061)
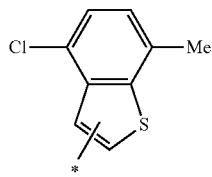
(ar-062)
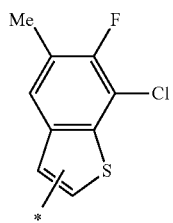
(ar-063)
[Chem. 18]
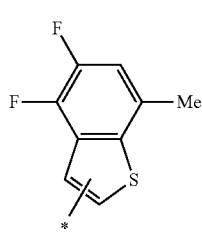
(ar-064)
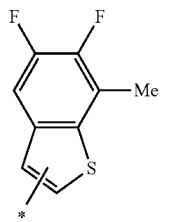
(ar-065)
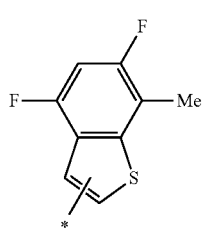
(ar-066)
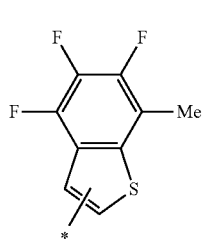
(ar-067)

-continued
(ar-068) 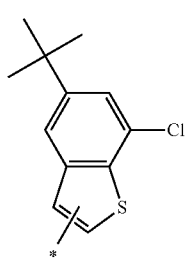
(ar-069) 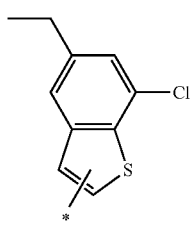
(ar-070) 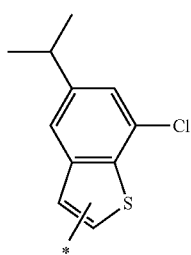
[Chem. 19]
(ar-071) 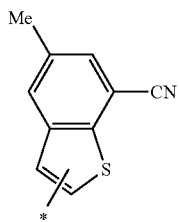
(ar-072) 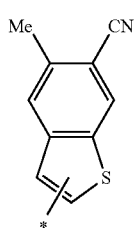
(ar-073) 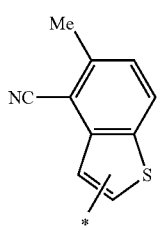
-continued
(ar-074) 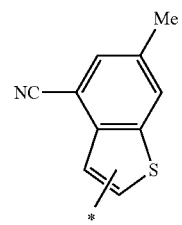
(ar-075) 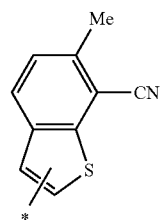
(ar-076) 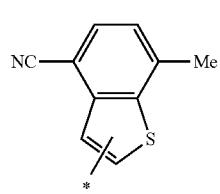
(ar-077) 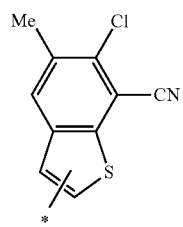
[Chem. 20]
(ar-078) 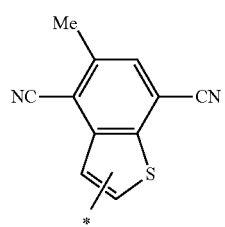
(ar-079) 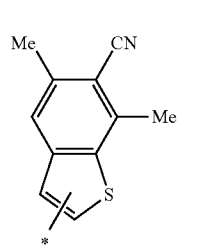

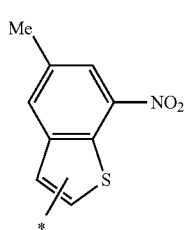 (ar-080)
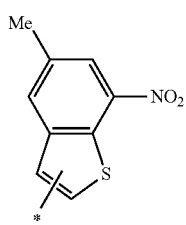 (ar-081)
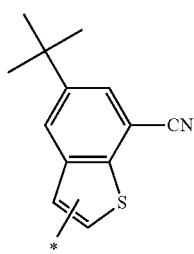 (ar-082)
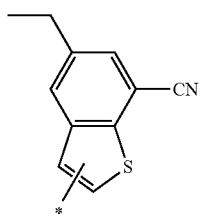 (ar-083)
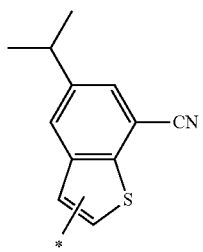 (ar-084)
[Chem. 21]
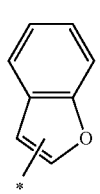 (ar-085)
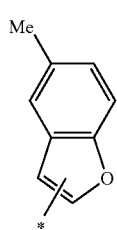 (ar-086)
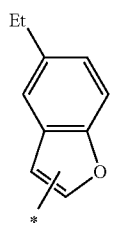 (ar-087)
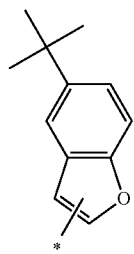 (ar-088)
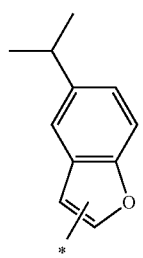 (ar-089)
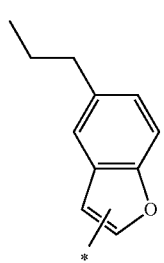 (ar-090)
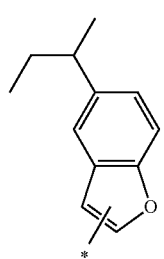 (ar-091)

[Chem. 22]
(ar-092) 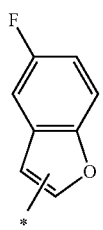
(ar-093) 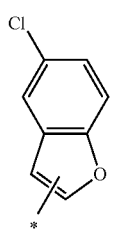
(ar-094) 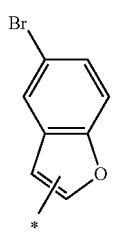
(ar-095) 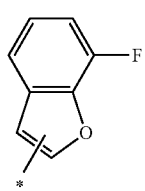
(ar-096) 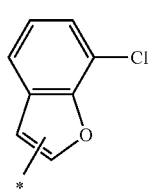
(ar-097) 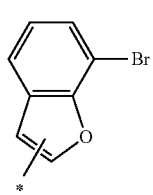
(ar-098) 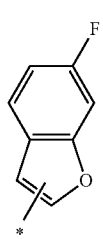
[Chem. 23]
(ar-099) 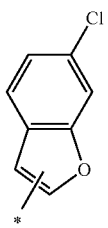
(ar-100) 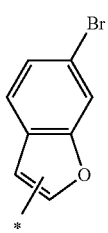
(ar-101) 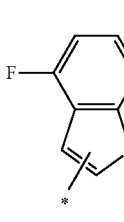
(ar-102) 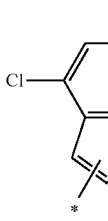
(ar-103) 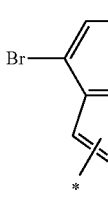
(ar-104) 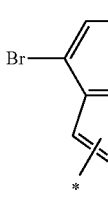
(ar-105) 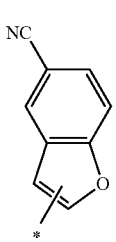

[Chem. 24]
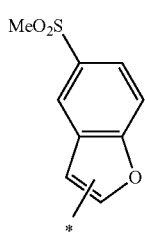
(ar-106)
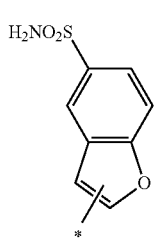
(ar-107)
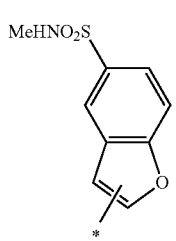
(ar-108)
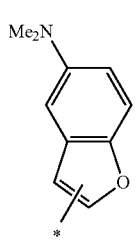
(ar-109)
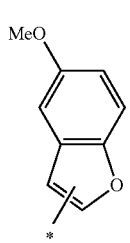
(ar-110)
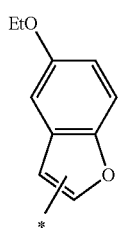
(ar-111)
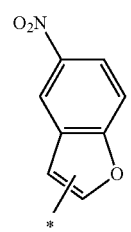
(ar-112)
[Chem. 25]
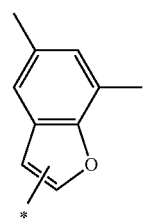
(ar-113)
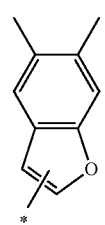
(ar-114)
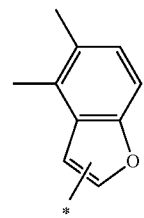
(ar-115)
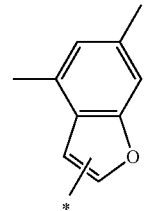
(ar-116)
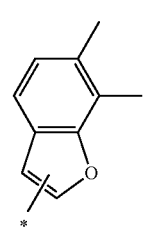
(ar-117)

(ar-118) 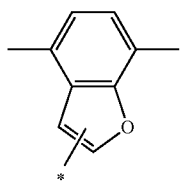
(ar-119) 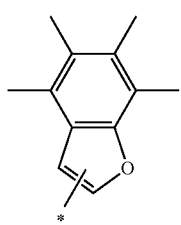
[Chem. 26]
(ar-120) 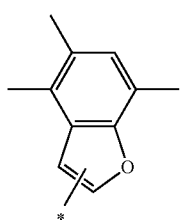
(ar-121) 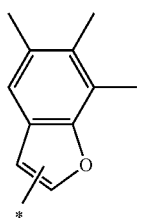
(ar-122) 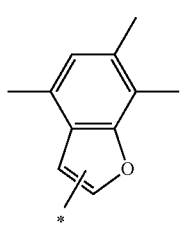
(ar-123) 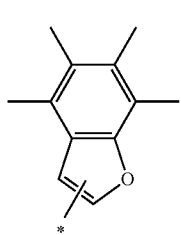
(ar-124) 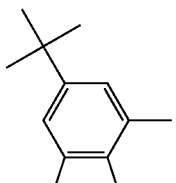
(ar-125) 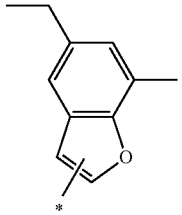
(ar-126) 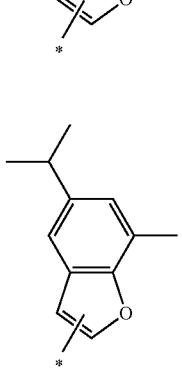
[Chem. 27]
(ar-127) 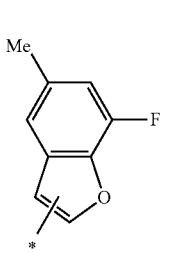
(ar-128) 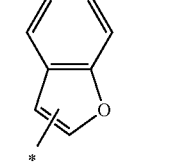
(ar-129) 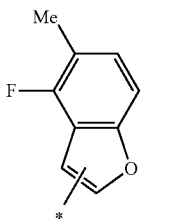

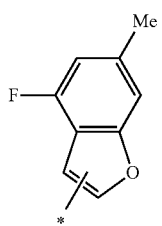
(ar-130)
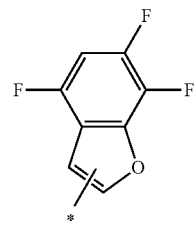
(ar-136)
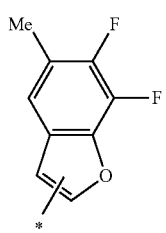
(ar-131)
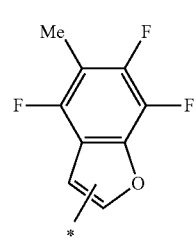
(ar-137)
(ar-132)
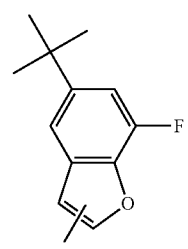
(ar-138)
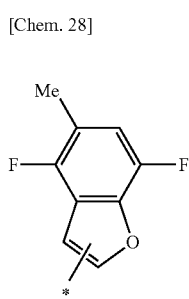
(ar-133)
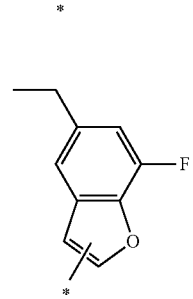
(ar-139)
[Chem. 28]
(ar-134)
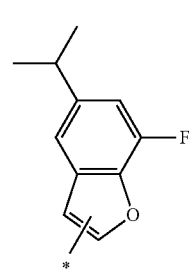
(ar-140)
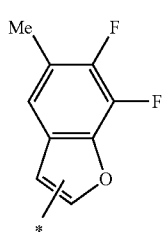
[Chem. 29]
(ar-135)
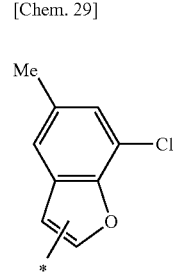
(ar-141)

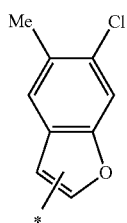
(ar-142)
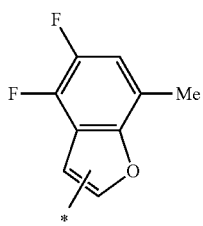
(ar-148)
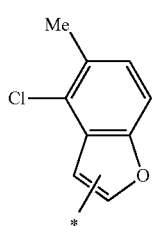
(ar-143)
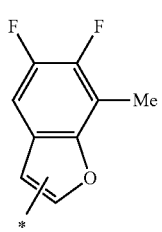
(ar-149)
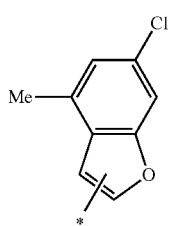
(ar-144)
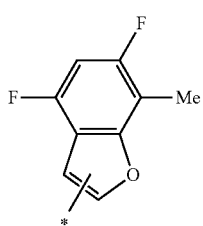
(ar-150)
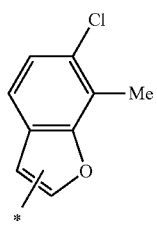
(ar-145)
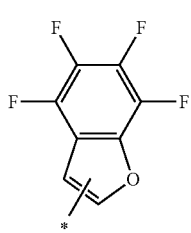
(ar-151)
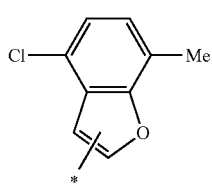
(ar-146)
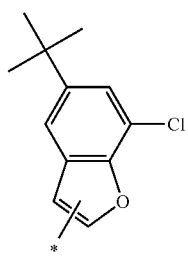
(ar-152)
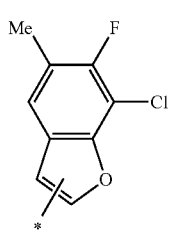
(ar-147)
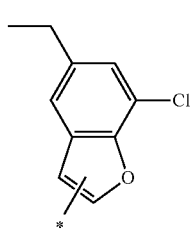
(ar-153)

(ar-154) 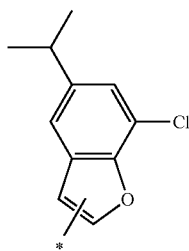
[Chem. 31]
(ar-155) 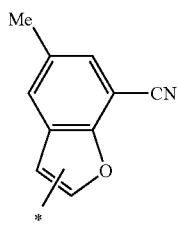
(ar-156) 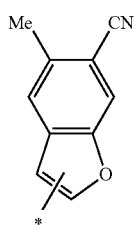
(ar-157) 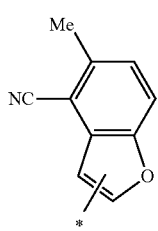
(ar-158) 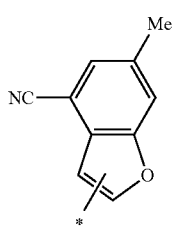
(ar-159) 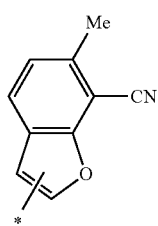
(ar-160) 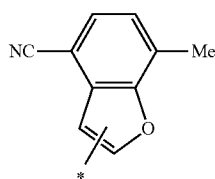
(ar-161) 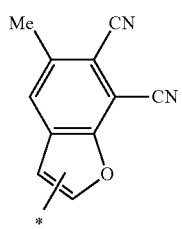
[Chem. 32]
(ar-162) 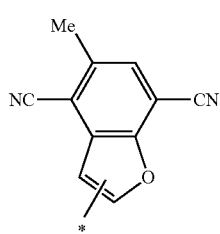
(ar-163) 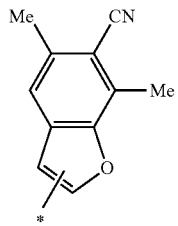
(ar-164) 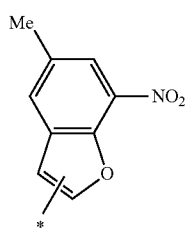
(ar-165) 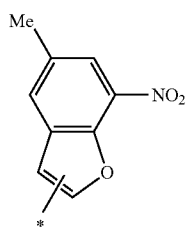

-continued
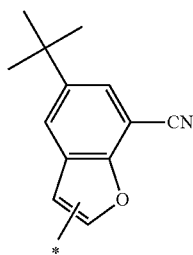 (ar-166)
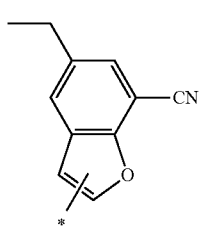 (ar-167)
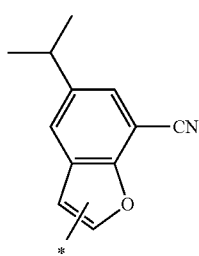 (ar-168)
[Chem. 33]
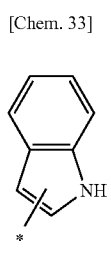 (ar-169)
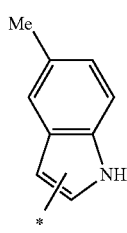 (ar-170)
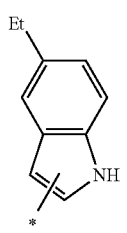 (ar-171)
-continued
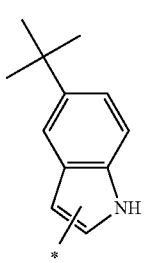 (ar-172)
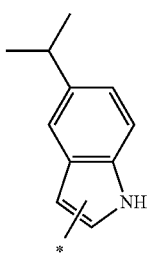 (ar-173)
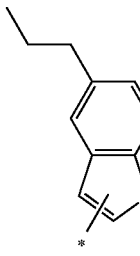 (ar-174)
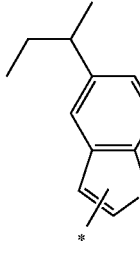 (ar-175)
[Chem. 34]
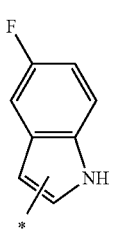 (ar-176)
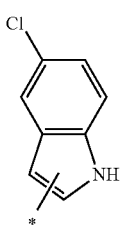 (ar-177)

(ar-178) 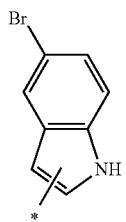
(ar-179) 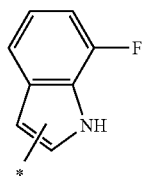
(ar-180) 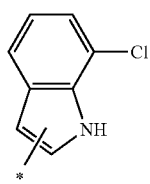
(ar-181) 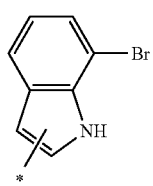
(ar-182) 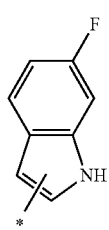
[Chem. 35]
(ar-183) 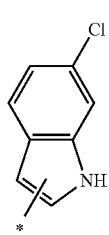
(ar-184) 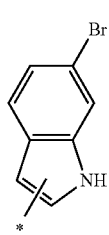
(ar-185) 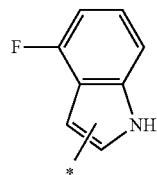
(ar-186) 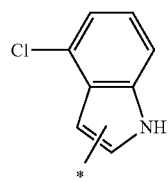
(ar-187) 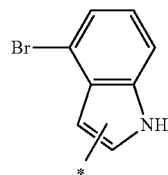
(ar-188) 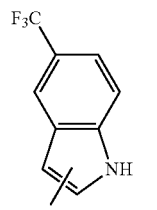
(ar-189) 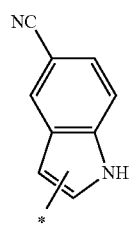
[Chem. 36]
(ar-190) 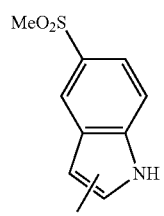
(ar-191) 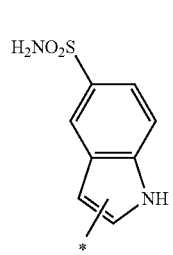

(ar-192) 
(ar-193) 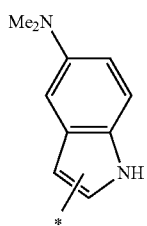
(ar-194) 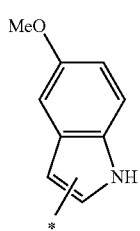
(ar-195) 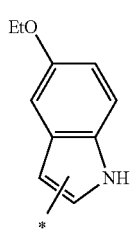
(ar-196) 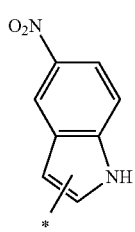
[Chem. 37]
(ar-197) 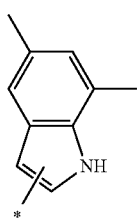
(ar-198) 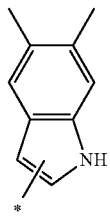
(ar-199) 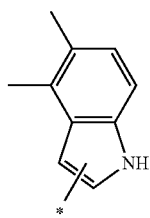
(ar-200) 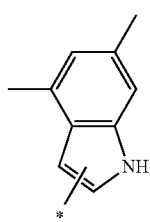
(ar-201) 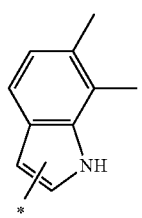
(ar-202) 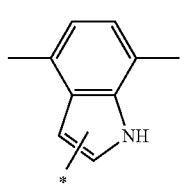
(ar-203) 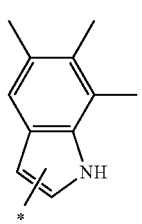
[Chem. 38]
(ar-204) 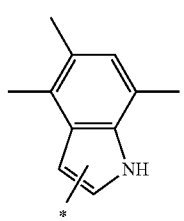

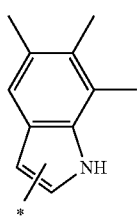
(ar-205)
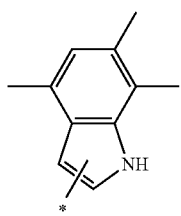
(ar-206)
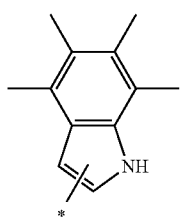
(ar-207)
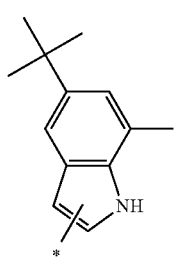
(ar-208)
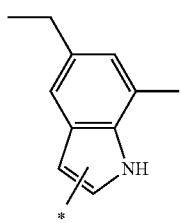
(ar-209)
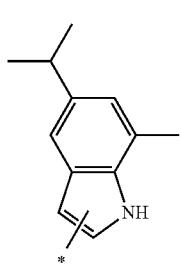
(ar-210)
[Chem. 39]
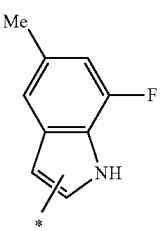
(ar-211)
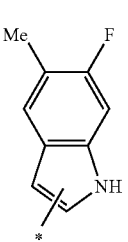
(ar-212)
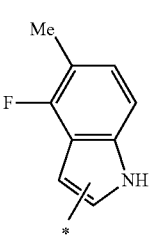
(ar-213)
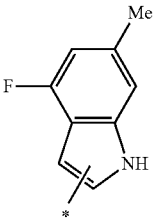
(ar-214)
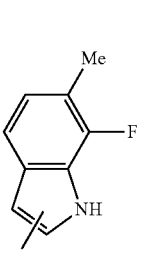
(ar-215)
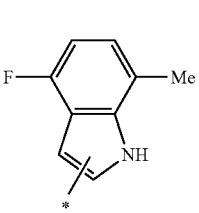
(ar-216)

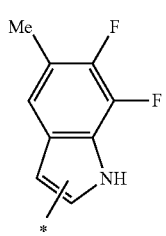 (ar-217)
[Chem. 40]
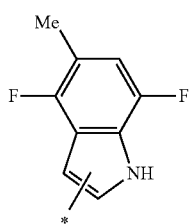 (ar-218)
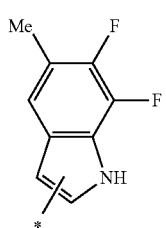 (ar-219)
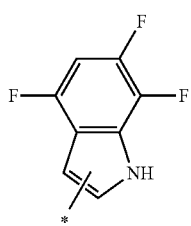 (ar-220)
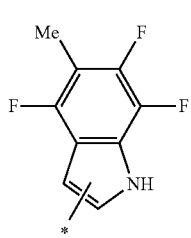 (ar-221)
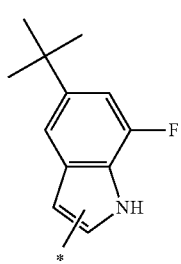 (ar-222)
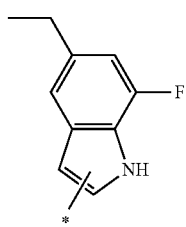 (ar-223)
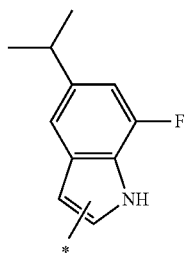 (ar-224)
[Chem. 41]
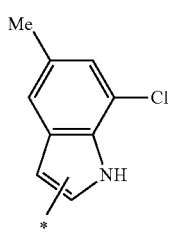 (ar-225)
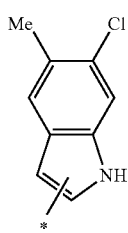 (ar-226)
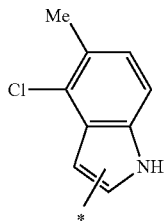 (ar-227)
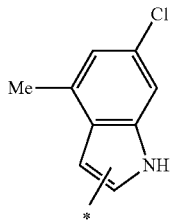 (ar-228)

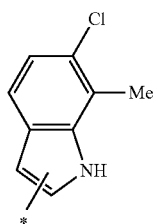
(ar-229)
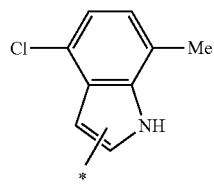
(ar-230)
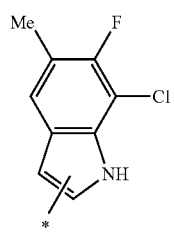
(ar-231)
[Chem. 42]
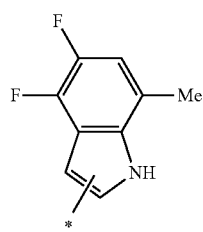
(ar-232)
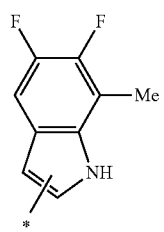
(ar-233)
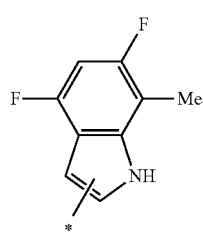
(ar-234)
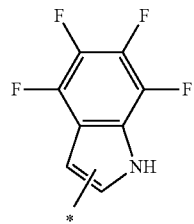
(ar-235)
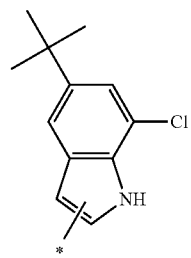
(ar-236)
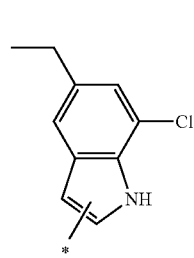
(ar-237)
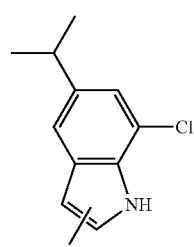
(ar-238)
[Chem. 43]
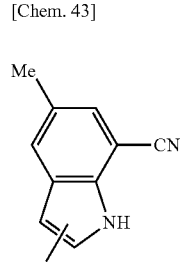
(ar-239)
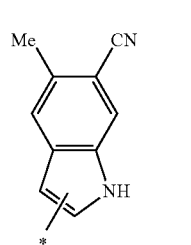
(ar-240)

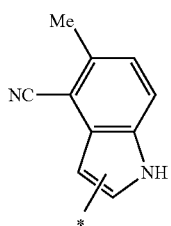 (ar-241)
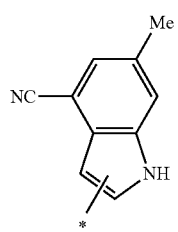 (ar-242)
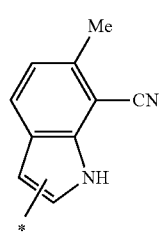 (ar-243)
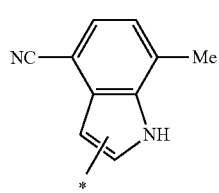 (ar-244)
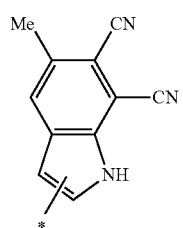 (ar-245)
[Chem. 44]
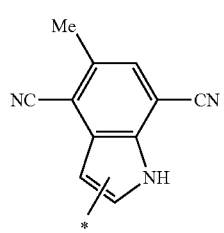 (ar-246)
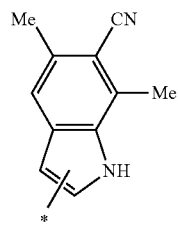 (ar-247)
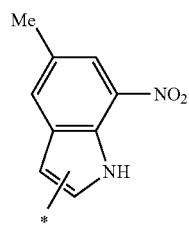 (ar-248)
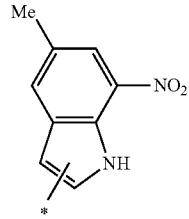 (ar-249)
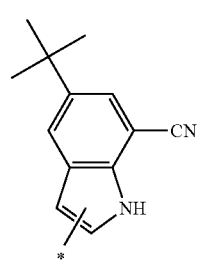 (ar-250)
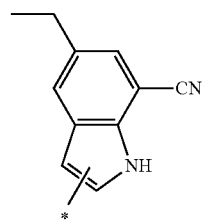 (ar-251)
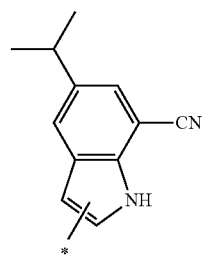 (ar-252)

[Chem. 45]
(ar-253)
(ar-254)
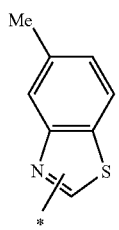
(ar-255)
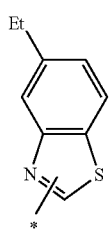
(ar-256)
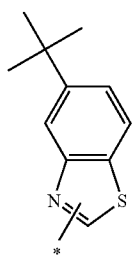
(ar-257)
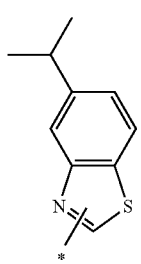
(ar-258)
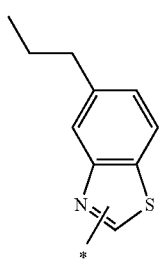
(ar-259)
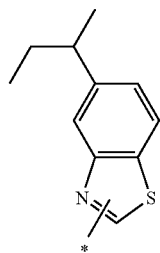
[Chem. 46]
(ar-260)
(ar-261)
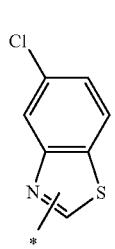
(ar-262)
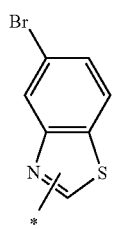
(ar-263)
(ar-264)
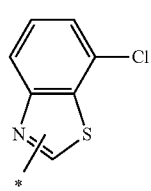
(ar-265)
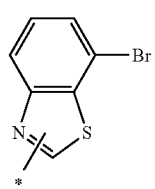

(ar-266)
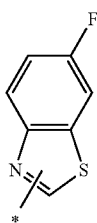
[Chem. 47]
(ar-267)
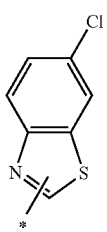
(ar-268)
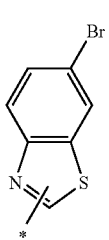
(ar-269)
(ar-270)
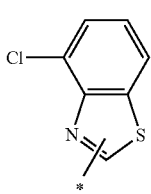
(ar-271)
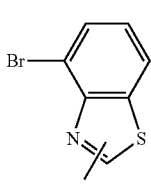
(ar-272)
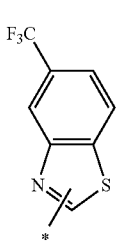
(ar-273)
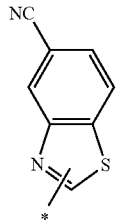
[Chem. 48]
(ar-274)
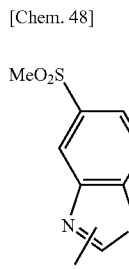
(ar-275)
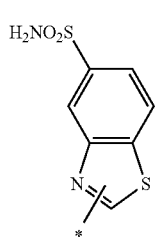
(ar-276)
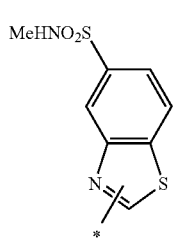
(ar-277)
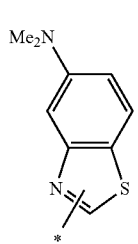
(ar-278)
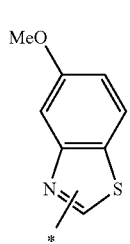

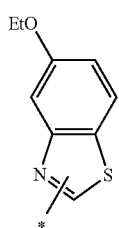
(ar-279)
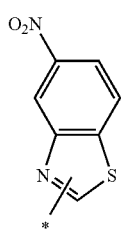
(ar-280)
[Chem. 49]
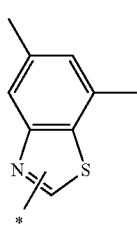
(ar-281)
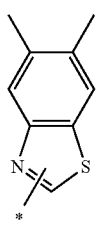
(ar-282)
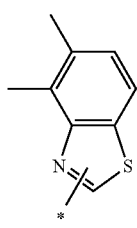
(ar-283)
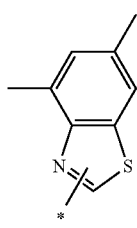
(ar-284)
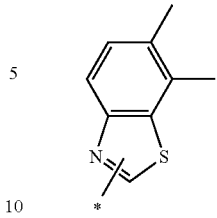
(ar-285)
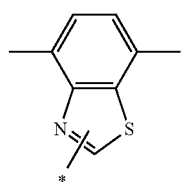
(ar-286)
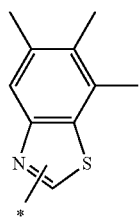
(ar-287)
[Chem. 50]
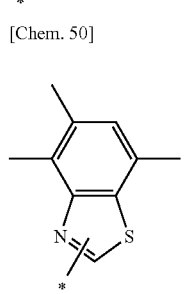
(ar-288)
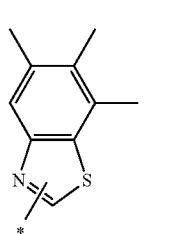
(ar-289)
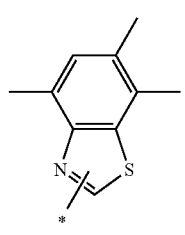
(ar-290)
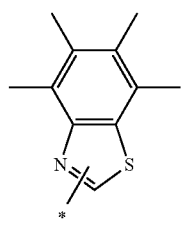
(ar-291)

(ar-292) 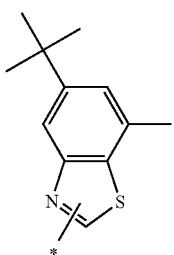
(ar-293) 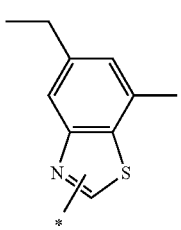
(ar-294) 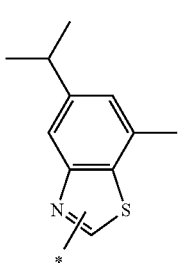
[Chem. 51]
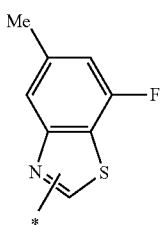
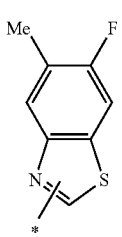
(ar-297) 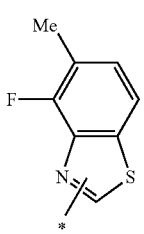
(ar-298) 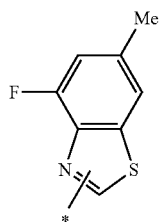
(ar-299) 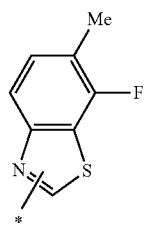
(ar-300) 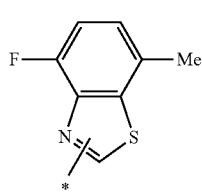
(ar-301) 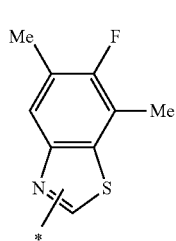
[Chem. 52]
(ar-302) 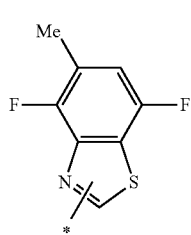
(ar-303) 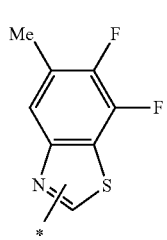

-continued
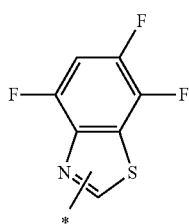
(ar-304)
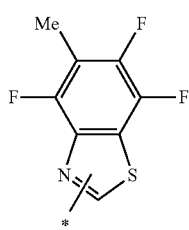
(ar-305)
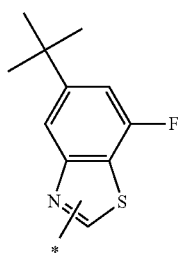
(ar-306)
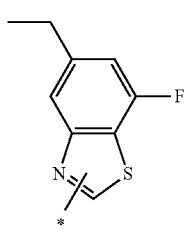
(ar-307)
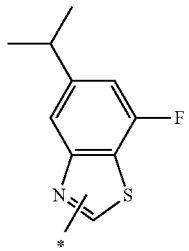
(ar-308)
[Chem. 53]
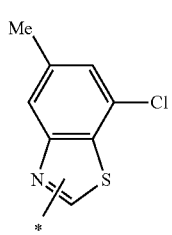
(ar-309)
-continued
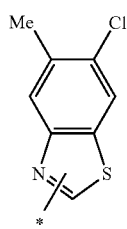
(ar-310)
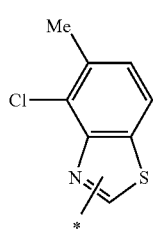
(ar-311)
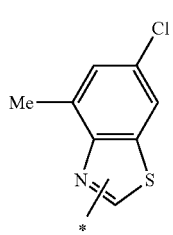
(ar-312)
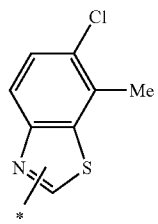
(ar-313)
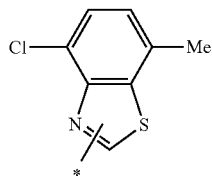
(ar-314)
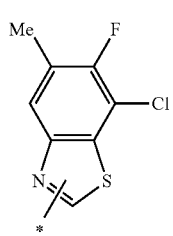
(ar-315)

[Chem. 54]
(ar-316) 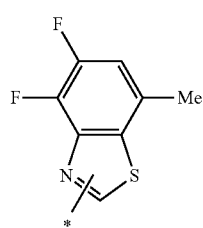
(ar-317) 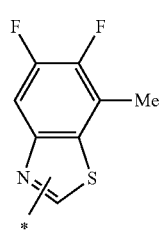
(ar-318) 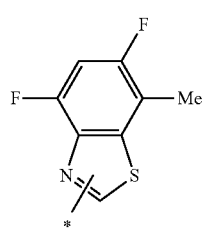
(ar-319) 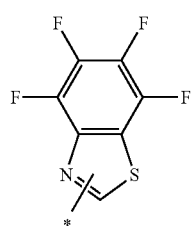
(ar-320) 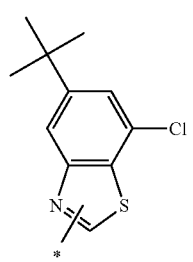
(ar-321) 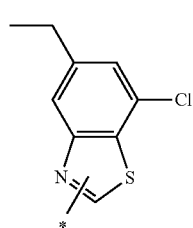
(ar-322) 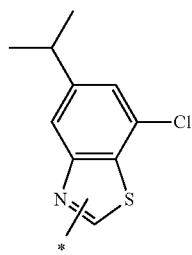
[Chem. 55]
(ar-323) 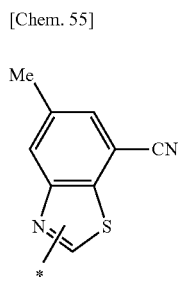
(ar-324) 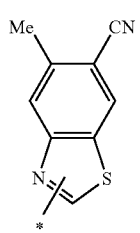
(ar-325) 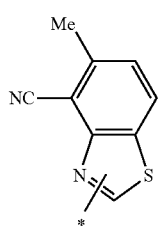
(ar-326) 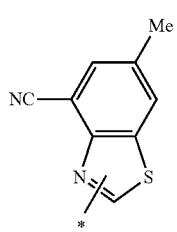
(ar-327) 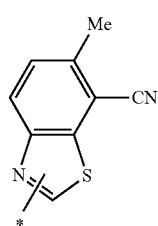

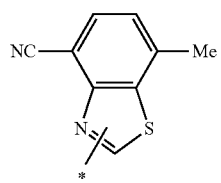 (ar-328)
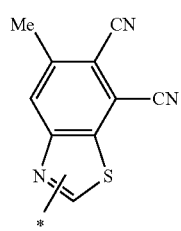 (ar-329)
[Chem. 56]
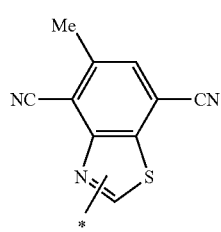 (ar-330)
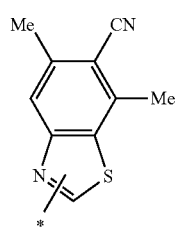 (ar-331)
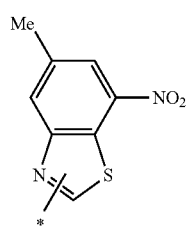 (ar-332)
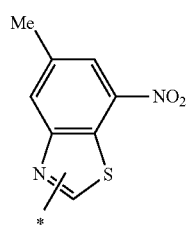 (ar-333)
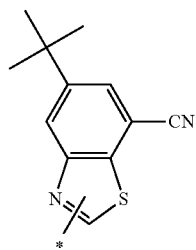 (ar-334)
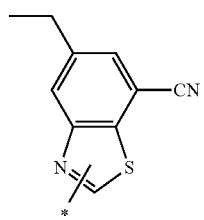 (ar-335)
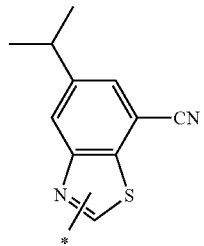 (ar-336)
[Chem. 57]
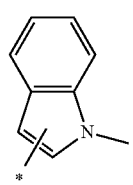 (ar-337)
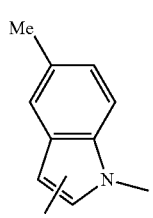 (ar-338)
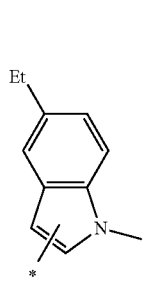 (ar-339)

(ar-340)
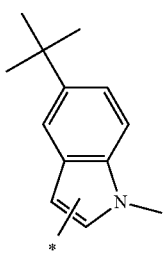
(ar-341)
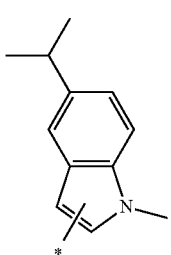
(ar-342)
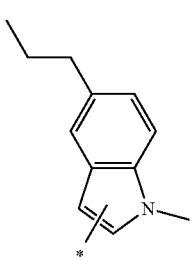
(ar-343)
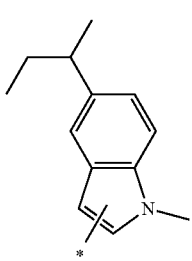
[Chem. 58]
(ar-344)
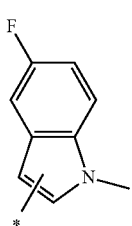
(ar-345)
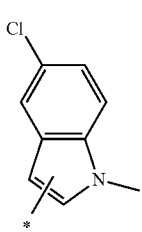
(ar-346)
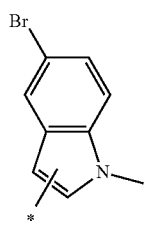
(ar-347)
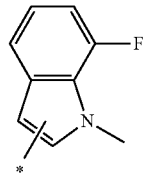
(ar-348)
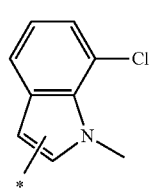
(ar-349)
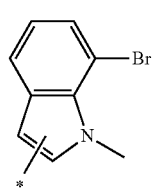
[Chem. 59]
(ar-350)
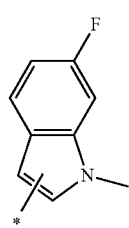
(ar-351)
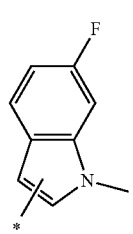
(ar-352)
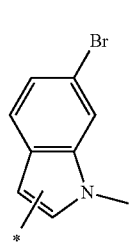

(ar-353)
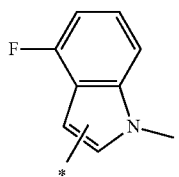
(ar-354)
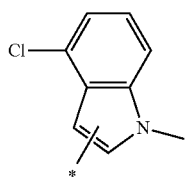
(ar-355)
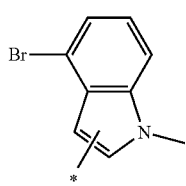
(ar-356)
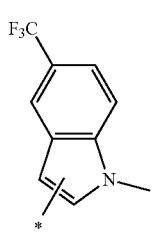
(ar-357)
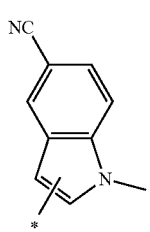
[Chem. 60]
(ar-358)
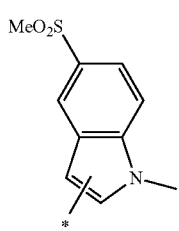
(ar-359)
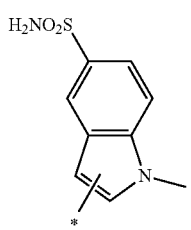
(ar-360)
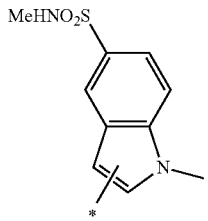
(ar-361)
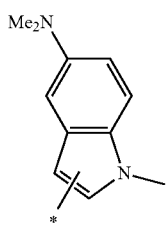
(ar-362)
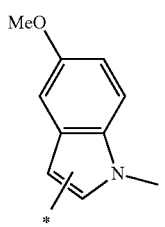
(ar-363)
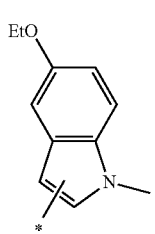
(ar-364)
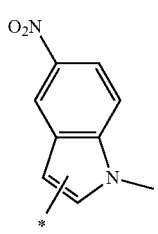
[Chem. 61]
(ar-365)
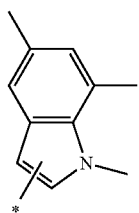

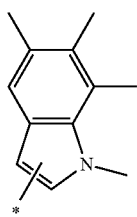 (ar-366)
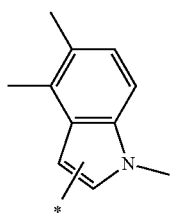 (ar-367)
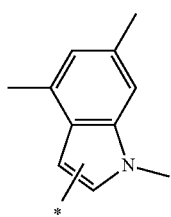 (ar-368)
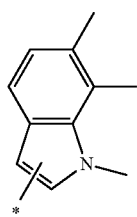 (ar-369)
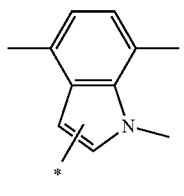 (ar-370)
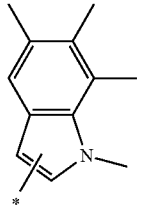 (ar-371)
[Chem. 62]
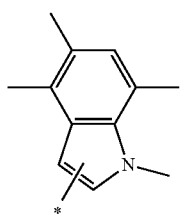 (ar-372)
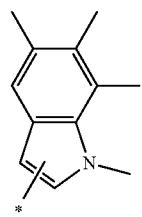 (ar-373)
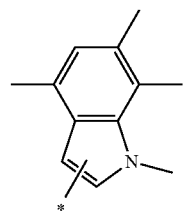 (ar-374)
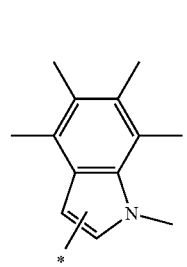 (ar-375)
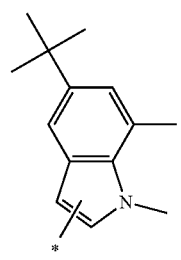 (ar-376)
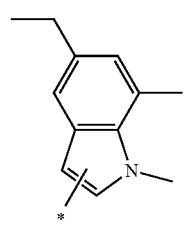 (ar-377)
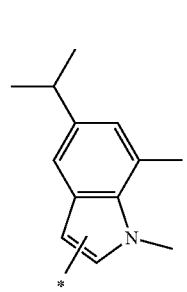 (ar-378)

[Chem. 63]
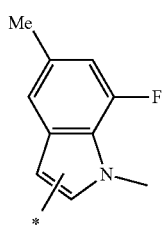 (ar-379)
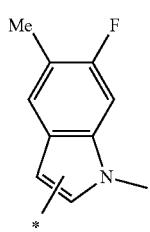 (ar-380)
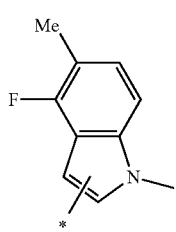 (ar-381)
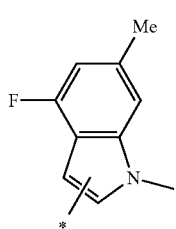 (ar-382)
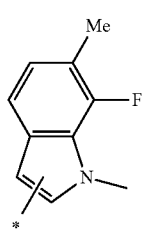 (ar-383)
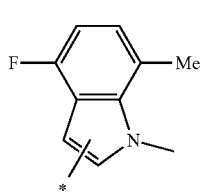 (ar-384)
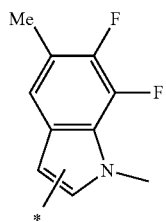 (ar-385)
[Chem. 64]
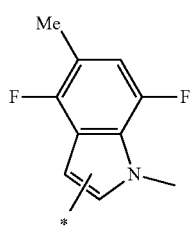 (ar-386)
(ar-387)
(ar-388)
(ar-389)
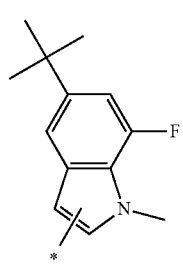 (ar-390)

(ar-391) 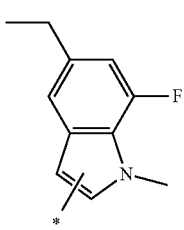
(ar-392) 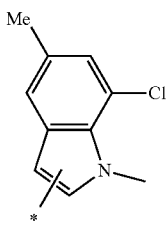
[Chem. 65]
(ar-393) 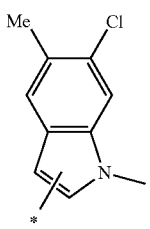
(ar-394) 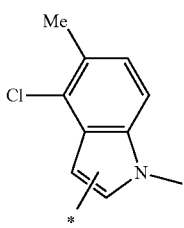
(ar-395) 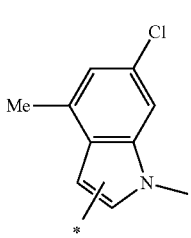
(ar-396)
(ar-397) 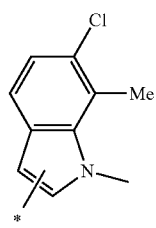
(ar-398) 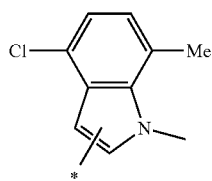
(ar-399) 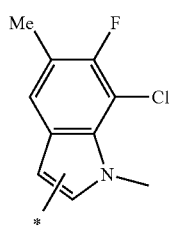
[Chem. 66]
(ar-400) 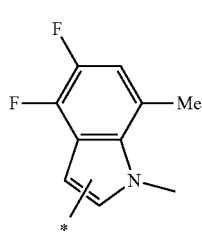
(ar-401) 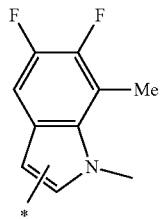
(ar-402) 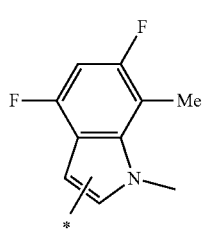

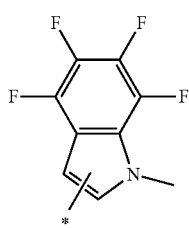
(ar-403)
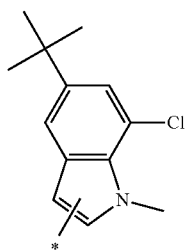
(ar-404)
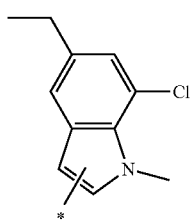
(ar-405)
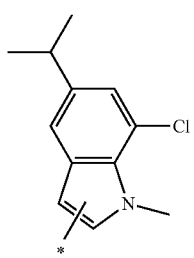
(ar-406)
[Chem. 67]
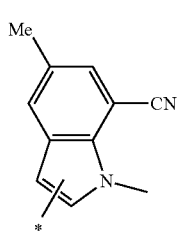
(ar-407)
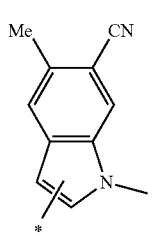
(ar-408)
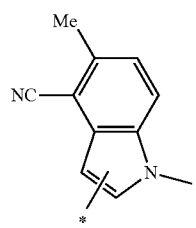
(ar-409)
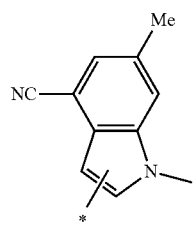
(ar-410)
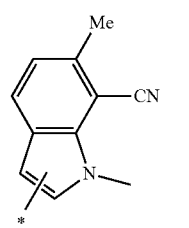
(ar-411)
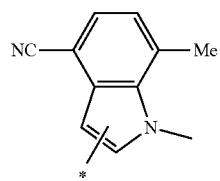
(ar-412)
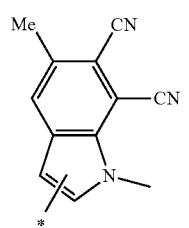
(ar-413)
[Chem. 68]
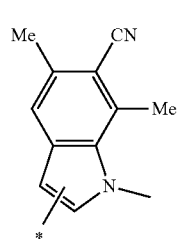
(ar-414)
(ar-415)

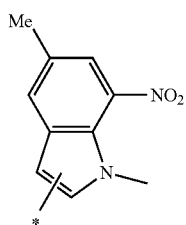 (ar-416)
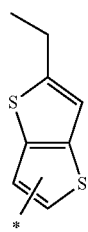 (ar-422)
(ar-417)
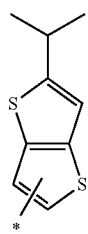 (ar-423)
(ar-418)
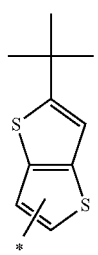 (ar-424)
(ar-419)
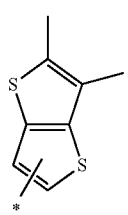 (ar-425)
(ar-420)
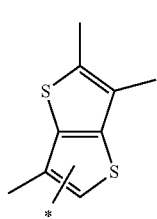 (ar-426)
[Chem. 69]
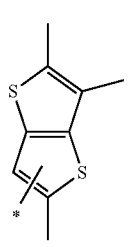 (ar-427)
(ar-421)

[Chem. 70]
(ar-428) 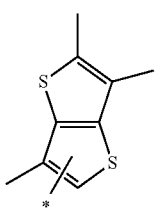
(ar-429) 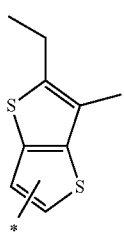
(ar-430) 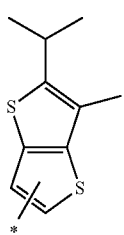
(ar-431) 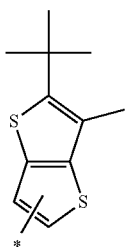
(ar-432) 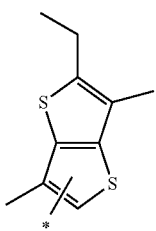
(ar-433) 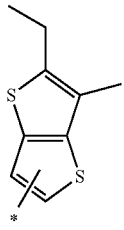
(ar-434) 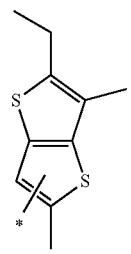
[Chem. 71]
(ar-435) 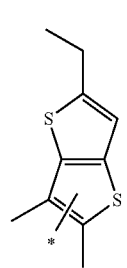
(ar-436) 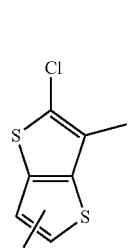
(ar-437) 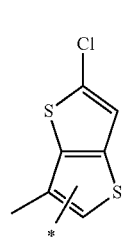
(ar-438) 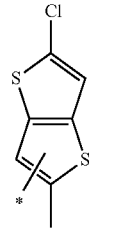
(ar-439) 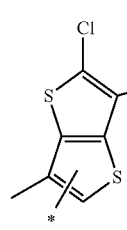

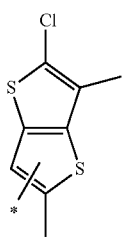 (ar-440)
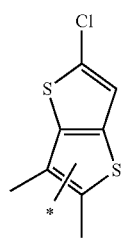 (ar-441)
[Chem. 72]
 (ar-442)
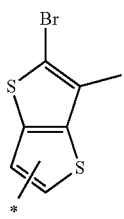 (ar-443)
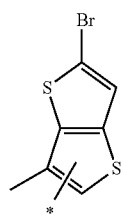 (ar-444)
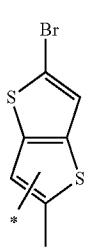 (ar-445)
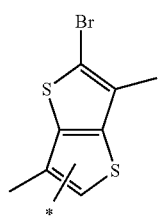 (ar-446)
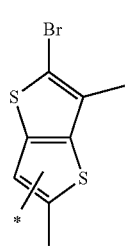 (ar-447)
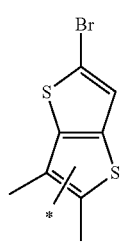 (ar-448)
[Chem. 73]
 (ar-449)
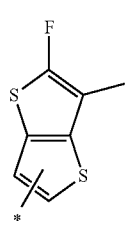 (ar-450)
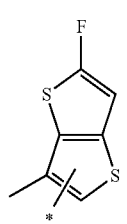 (ar-451)

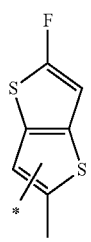 (ar-452)
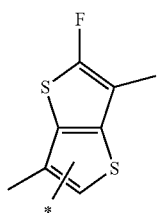 (ar-453)
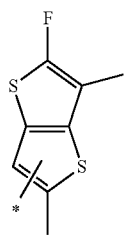 (ar-454)
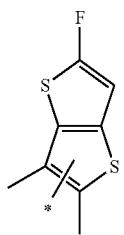 (ar-455)
[Chem. 74]
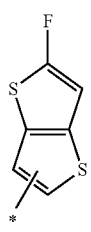 (ar-456)
 (ar-457)
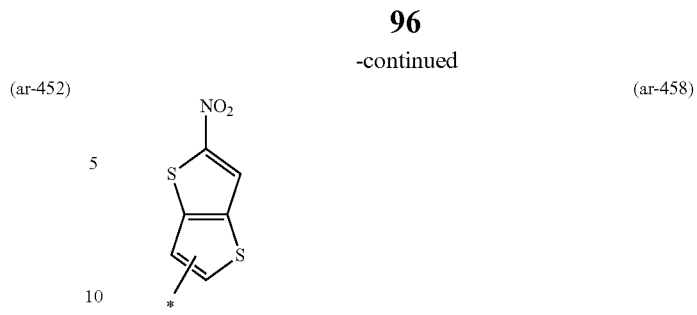 (ar-458)
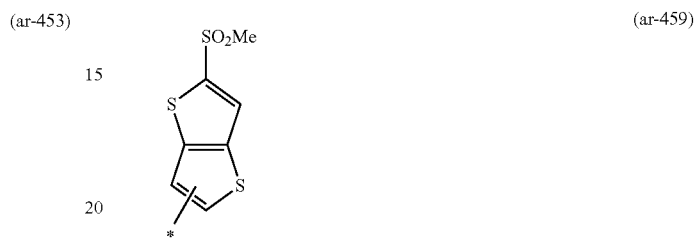 (ar-459)
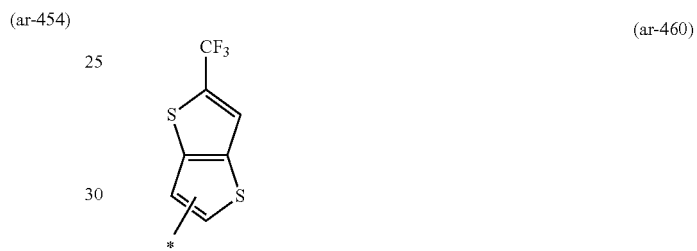 (ar-460)
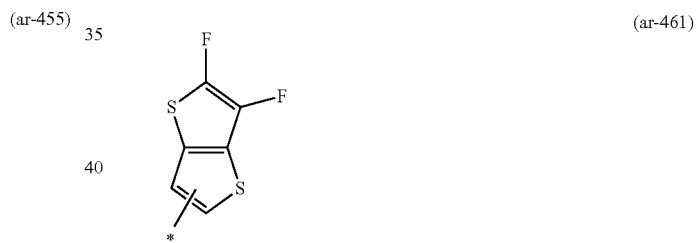 (ar-461)
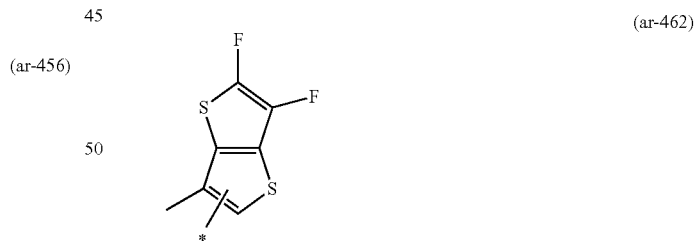 (ar-462)
[Chem. 75]
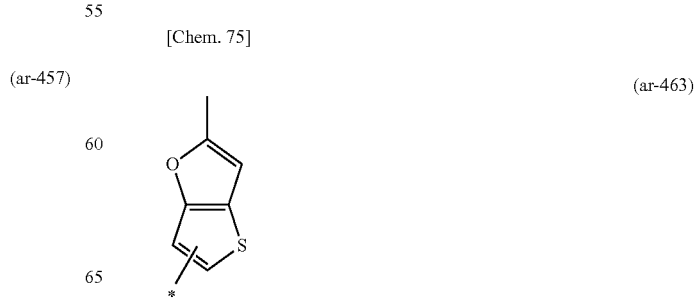 (ar-463)

(ar-464)
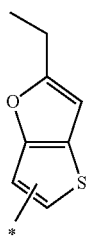
(ar-465)
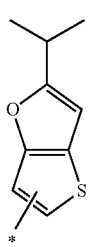
(ar-466)
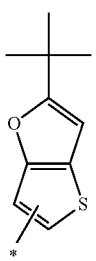
(ar-467)
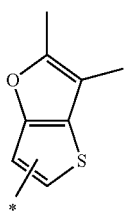
(ar-468)
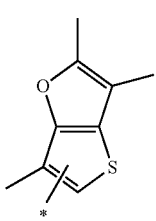
(ar-469)
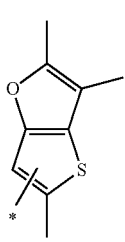
[Chem. 76]
(ar-470)
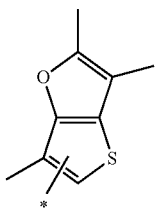
(ar-471)
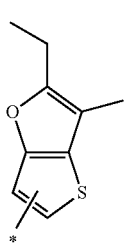
(ar-472)
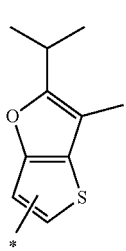
(ar-473)
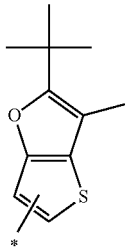
(ar-474)
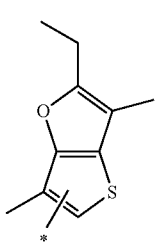
(ar-475)
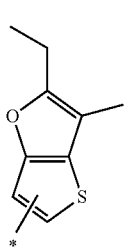

(ar-476) 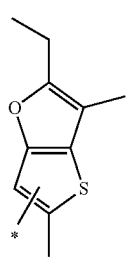
[Chem. 77]
(ar-477) 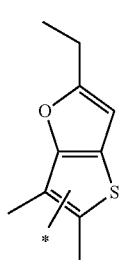
(ar-478) 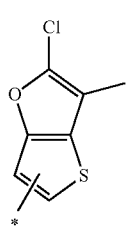
(ar-479) 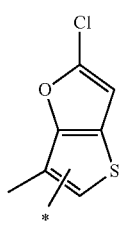
(ar-480) 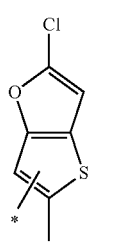
(ar-481) 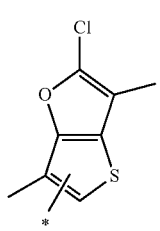
(ar-482) 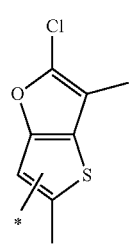
(ar-483) 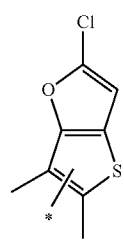
[Chem. 78]
(ar-484) 
(ar-485) 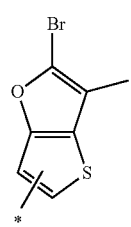
(ar-486) 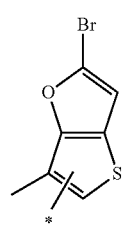
(ar-487) 

-continued
(ar-488) 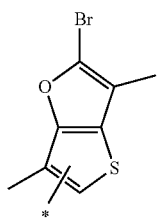
(ar-489) 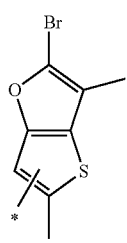
(ar-490) 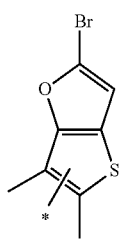
[Chem. 79]
(ar-491) 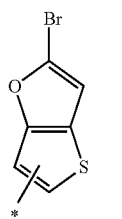
(ar-492) 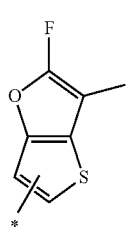
(ar-493) 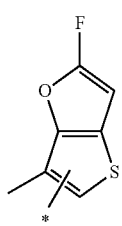
-continued
(ar-494) 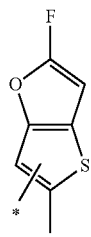
(ar-495) 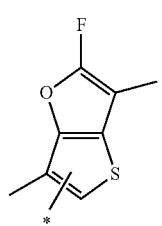
(ar-496) 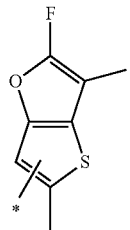
(ar-497) 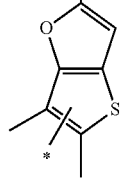
[Chem. 80]
(ar-498) 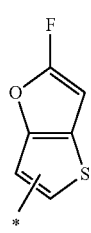
(ar-499) 

(ar-500) 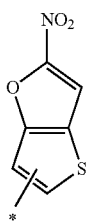
(ar-501) 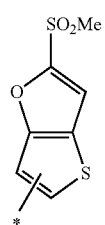
(ar-502) 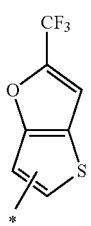
(ar-503) 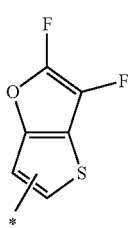
(ar-504) 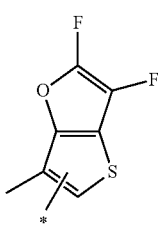
[Chem. 81]
(ar-505)
(ar-506) 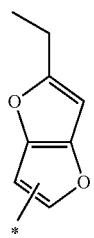
(ar-507) 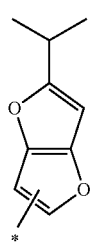
(ar-508) 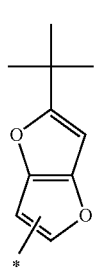
(ar-509) 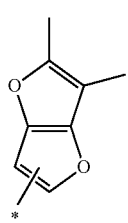
(ar-510) 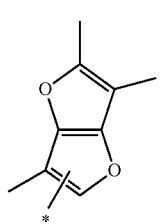
(ar-511) 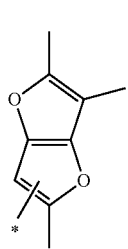

[Chem. 82]
(ar-512) 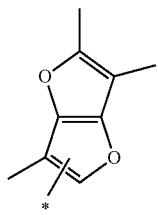
(ar-513) 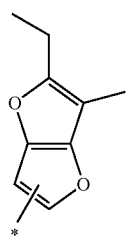
(ar-514) 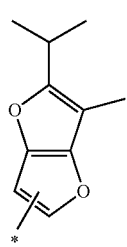
(ar-515) 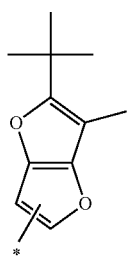
(ar-516) 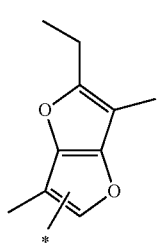
(ar-517) 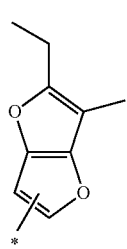
(ar-518) 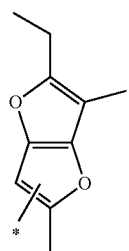
[Chem. 83]
(ar-519) 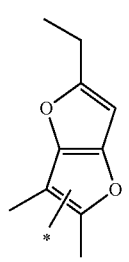
(ar-520) 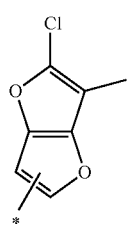
(ar-521) 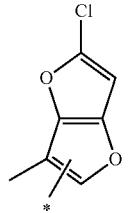
(ar-522) 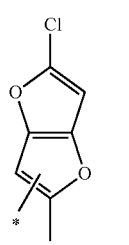
(ar-523) 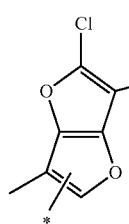

(ar-524) 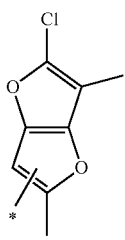
(ar-525) 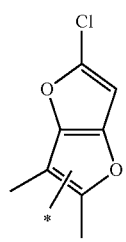
[Chem. 84]
(ar-526) 
(ar-527) 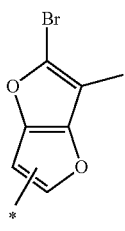
(ar-528) 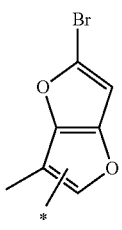
(ar-529) 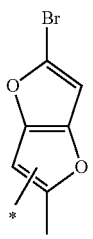
(ar-530) 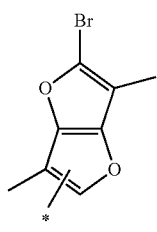
(ar-531) 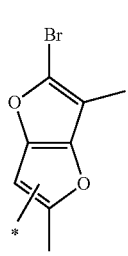
(ar-532) 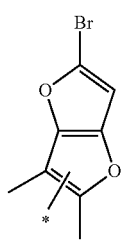
[Chem. 85]
(ar-533) 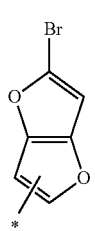
(ar-534) 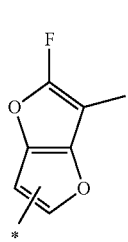
(ar-535) 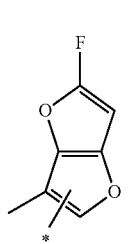

(ar-536)
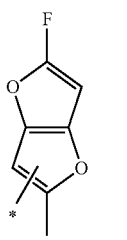
(ar-537)
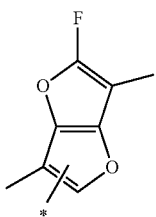
(ar-538)
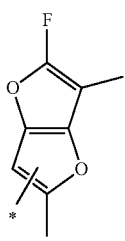
(ar-539)
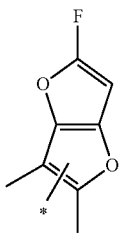
[Chem. 86]
(ar-540)
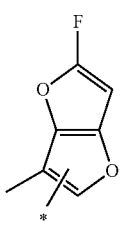
(ar-541)
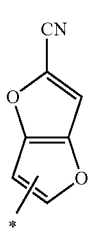
(ar-542)
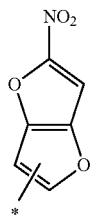
(ar-543)
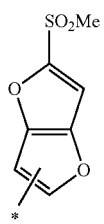
(ar-544)
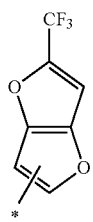
(ar-545)
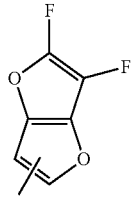
(ar-546)
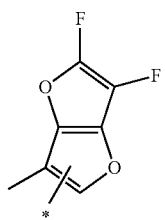
[Chem. 87]
(ar-547)
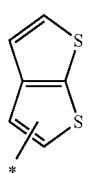
(ar-548)
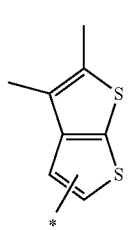

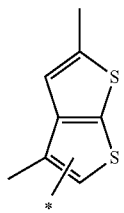 (ar-549)
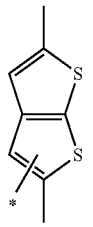 (ar-550)
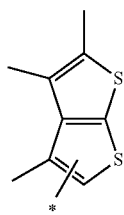 (ar-551)
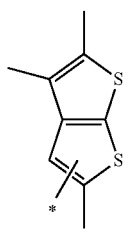 (ar-552)
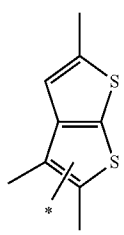 (ar-553)
[Chem. 88]
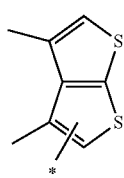 (ar-554)
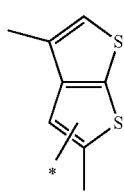 (ar-555)
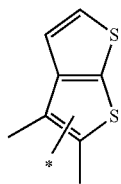 (ar-556)
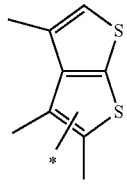 (ar-557)
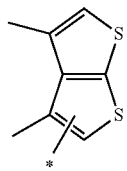 (ar-558)
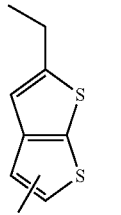 (ar-559)
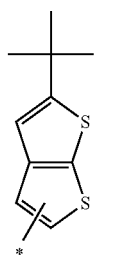 (ar-560)
[Chem. 89]
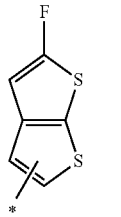 (ar-561)
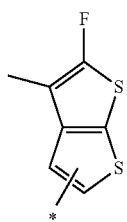 (ar-562)

(ar-563)
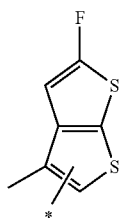
(ar-564)
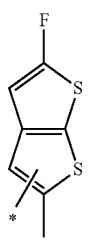
(ar-565)
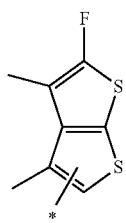
(ar-566)
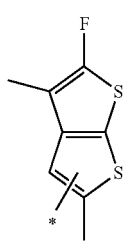
(ar-567)
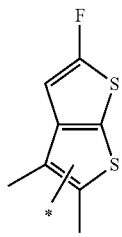
[Chem. 90]
(ar-568)
(ar-569)
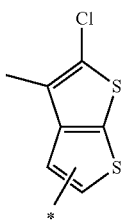
(ar-570)
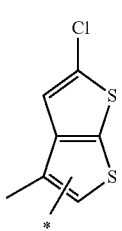
(ar-571)
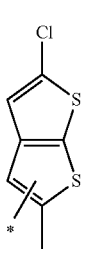
(ar-572)
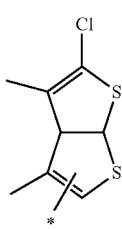
(ar-573)
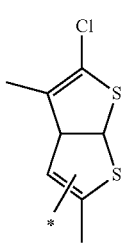
(ar-574)
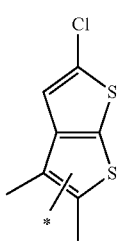

[Chem. 91]
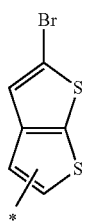 (ar-575)
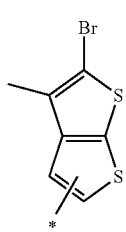 (ar-576)
(ar-577)
(ar-578)
(ar-579)
(ar-580)
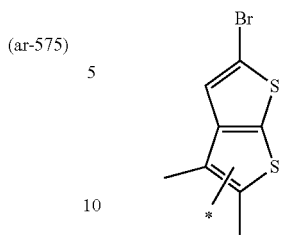 (ar-581)
[Chem. 92]
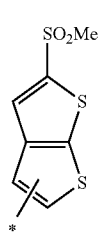 (ar-582)
(ar-583)
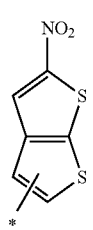 (ar-584)
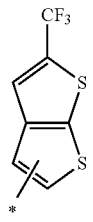 (ar-585)
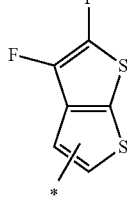 (ar-586)

(ar-587) 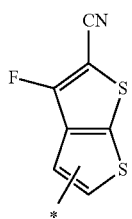
(ar-588) 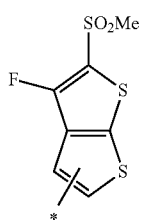
[Chem. 93]
(ar-589) 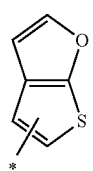
(ar-590) 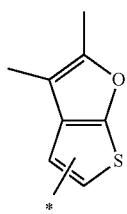
(ar-591) 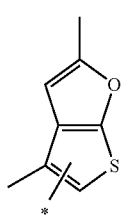
(ar-592) 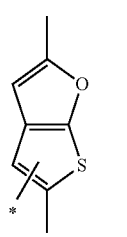
(ar-593) 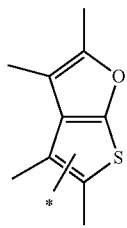
(ar-594) 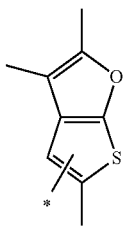
(ar-595) 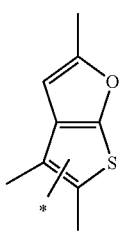
[Chem. 94]
(ar-596) 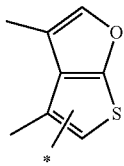
(ar-597) 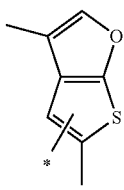
(ar-598) 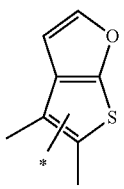
(ar-599) 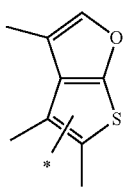
(ar-600) 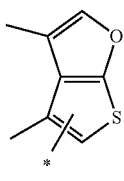

(ar-601) 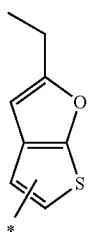
(ar-602) 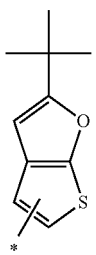
[Chem. 95]
(ar-603) 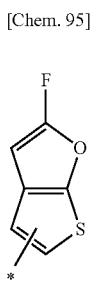
(ar-604) 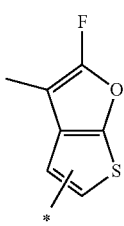
(ar-605) 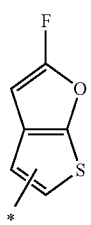
(ar-606) 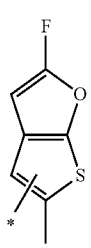
(ar-607) 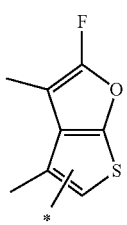
(ar-608) 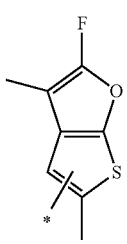
(ar-609) 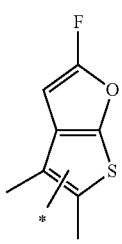
[Chem. 96]
(ar-610) 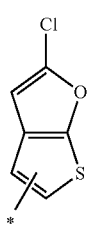
(ar-611) 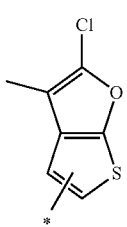
(ar-612) 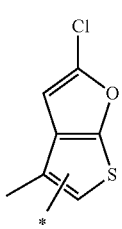

| | |
|---|---|
| (ar-613) 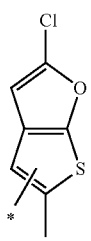 | (ar-619) 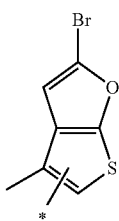 |
| (ar-614) 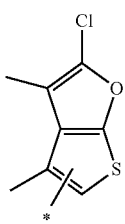 | (ar-620) 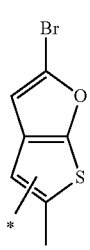 |
| (ar-615) 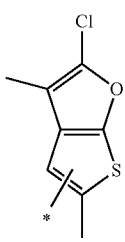 | (ar-621) 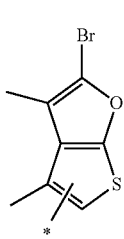 |
| (ar-616) 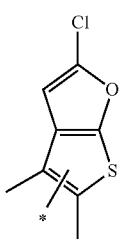 | (ar-622) 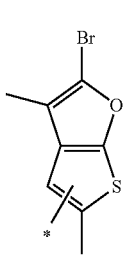 |
| [Chem. 97] | (ar-623) 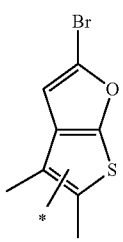 |
| (ar-617) 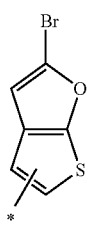 | [Chem. 98] |
| (ar-618) 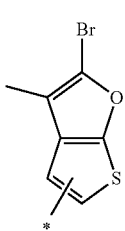 | (ar-624) 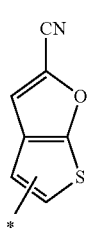 |

(ar-625) 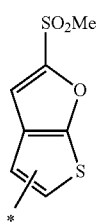
(ar-626) 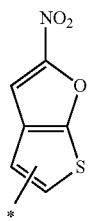
(ar-627) 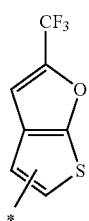
(ar-628) 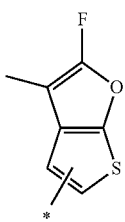
(ar-629) 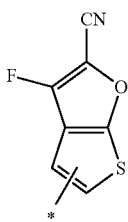
(ar-630) 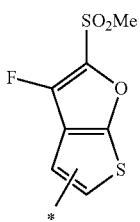
[Chem. 99]
(ar-631) 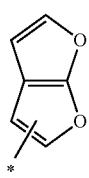
(ar-632) 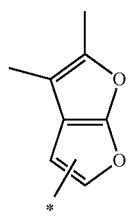
(ar-633) 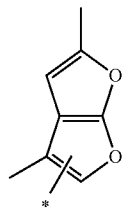
(ar-634) 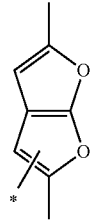
(ar-635) 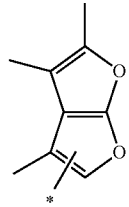
(ar-636) 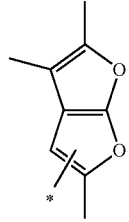
(ar-637) 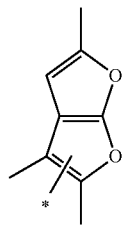
[Chem. 100]
(ar-638) 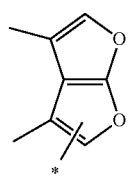

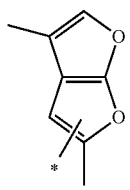 (ar-639)
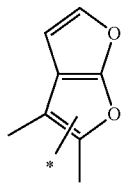 (ar-640)
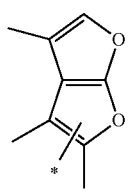 (ar-641)
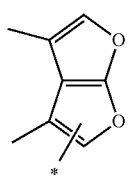 (ar-642)
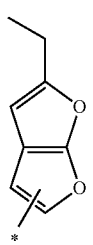 (ar-643)
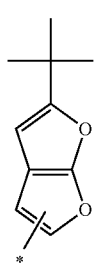 (ar-644)
[Chem. 101]
 (ar-645)
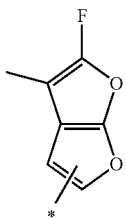 (ar-646)
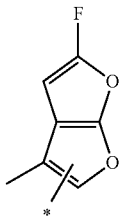 (ar-647)
 (ar-648)
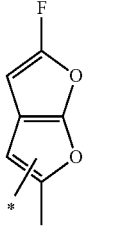 (ar-649)
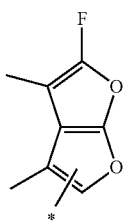 (ar-650)
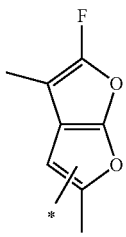 (ar-651)

[Chem. 102]
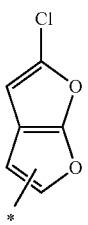
(ar-652)
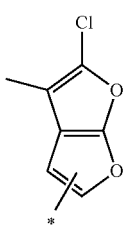
(ar-653)
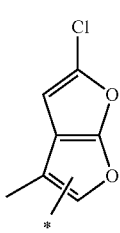
(ar-654)
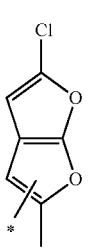
(ar-655)
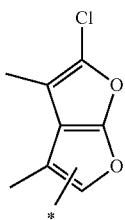
(ar-656)
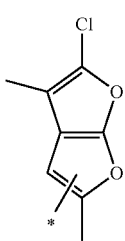
(ar-657)
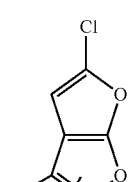
[Chem. 103]
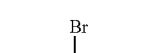

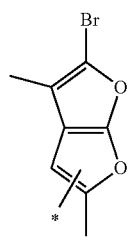 (ar-664)
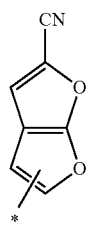 (ar-665)
[Chem. 104]
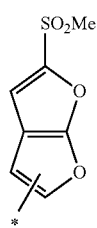 (ar-666)
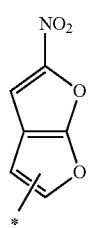 (ar-667)
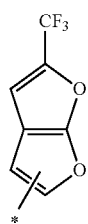 (ar-668)
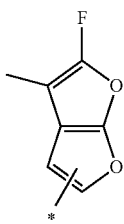 (ar-669)
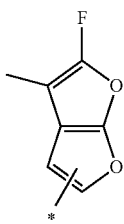 (ar-670)
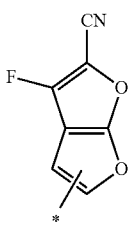 (ar-671)
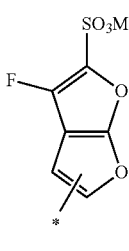 (ar-672)
[Chem. 105]
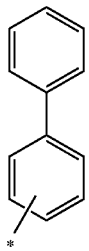 (ar-673)
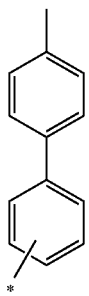 (ar-674)
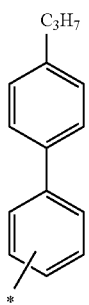 (ar-675)

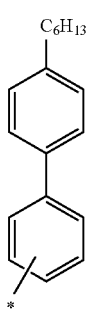 (ar-676)
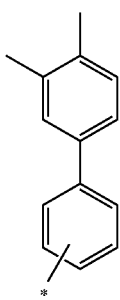 (ar-677)
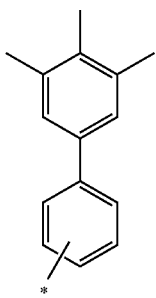 (ar-678)
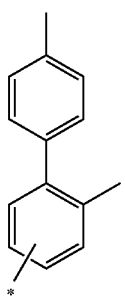 (ar-679)
[Chem. 106]
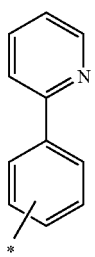 (ar-680)
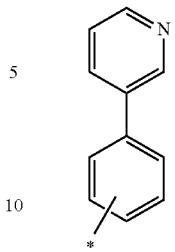 (ar-681)
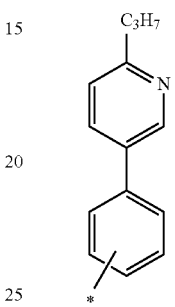 (ar-682)
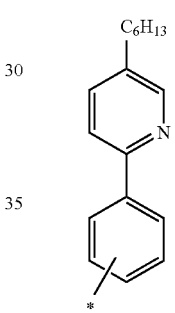 (ar-683)
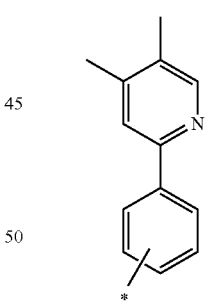 (ar-684)
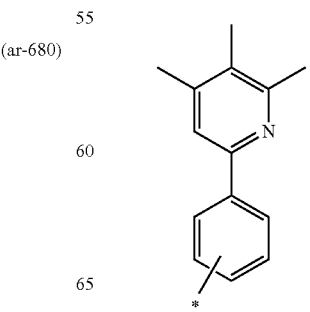 (ar-685)

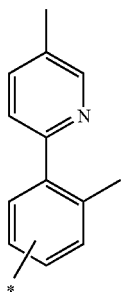
(ar-686)
[Chem. 107]
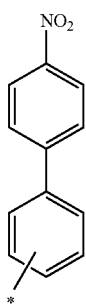
(ar-687)
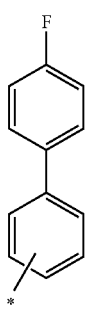
(ar-688)
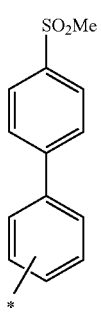
(ar-689)
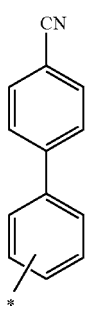
(ar-690)
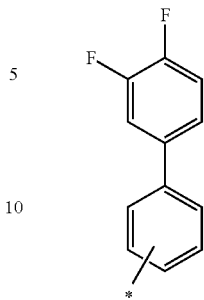
(ar-691)
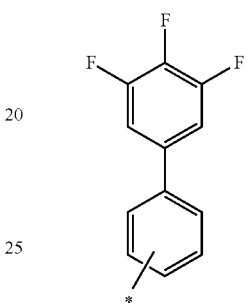
(ar-692)
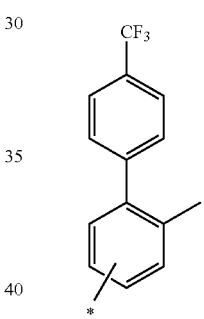
(ar-693)
[Chem. 108]
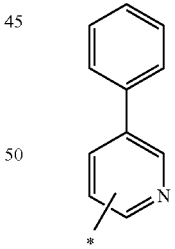
(ar-694)
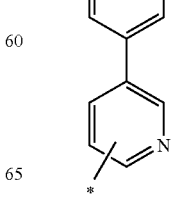
(ar-695)

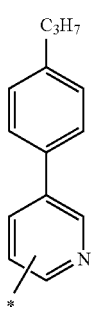 (ar-696)
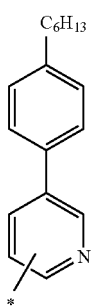 (ar-697)
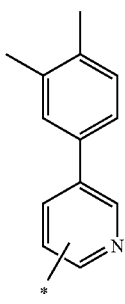 (ar-698)
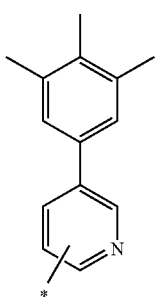 (ar-699)
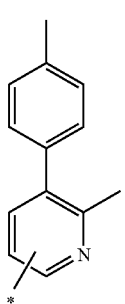 (ar-700)
[Chem. 109]
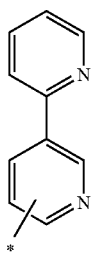 (ar-701)
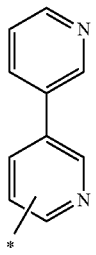 (ar-702)
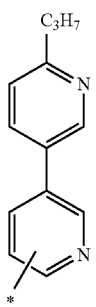 (ar-703)
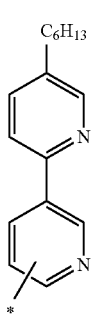 (ar-704)
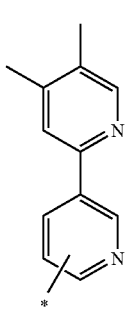 (ar-705)

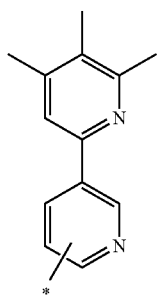
(ar-706)
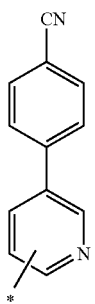
(ar-711)
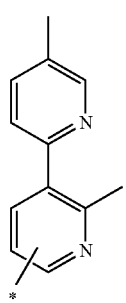
(ar-707)
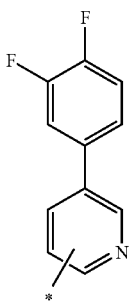
(ar-712)
[Chem. 110]
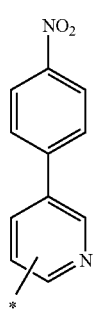
(ar-708)
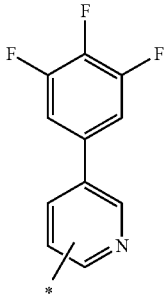
(ar-713)
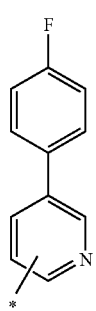
(ar-709)
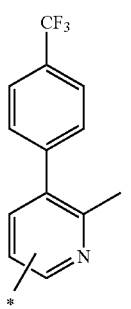
(ar-714)
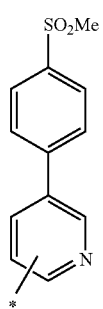
(ar-710)
[Chem. 111]
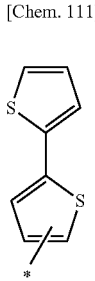
(ar-715)

(ar-716) 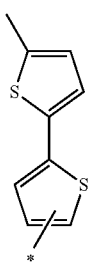
(ar-717) 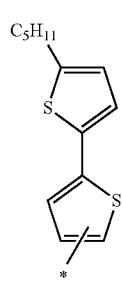
(ar-718) 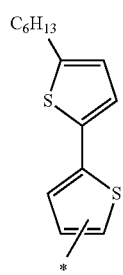
(ar-719) 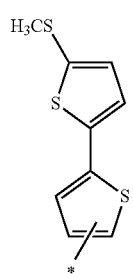
(ar-720) 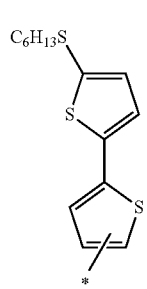
(ar-721) 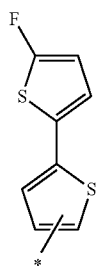
[Chem. 112]
(ar-722) 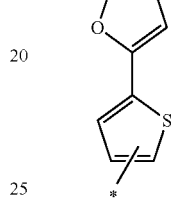
(ar-723) 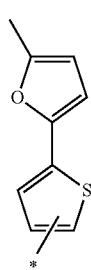
(ar-724) 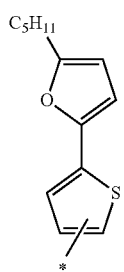
(ar-725) 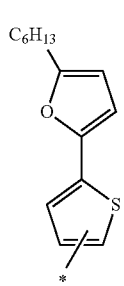

(ar-726) 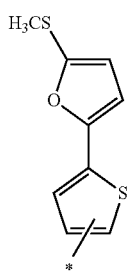
(ar-727) 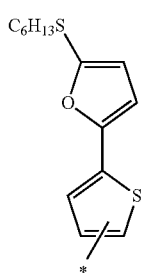
(ar-728) 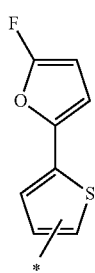
[Chem. 113]
(ar-729) 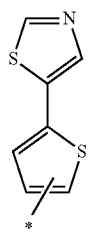
(ar-730) 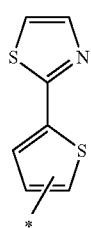
(ar-731) 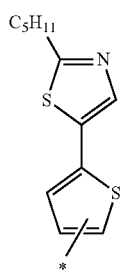
(ar-732) 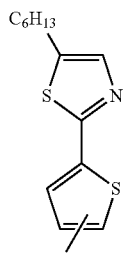
(ar-733) 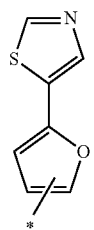
(ar-734) 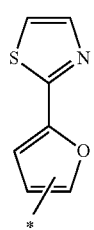
(ar-735) 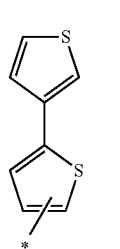
[Chem. 114]
(ar-736) 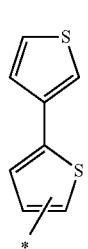

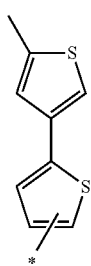 (ar-737)
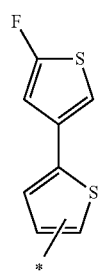 (ar-742)
[Chem. 115]
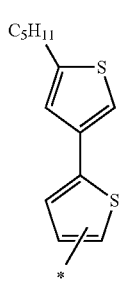 (ar-738)
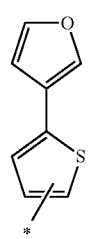 (ar-743)
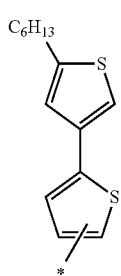 (ar-739)
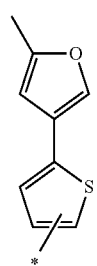 (ar-744)
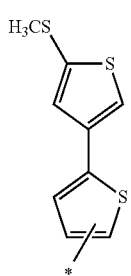 (ar-740)
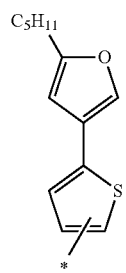 (ar-745)
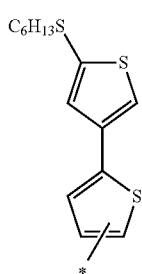 (ar-741)
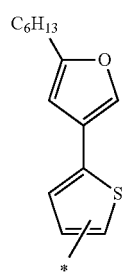 (ar-746)

(ar-747) 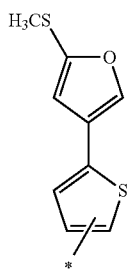
(ar-748) 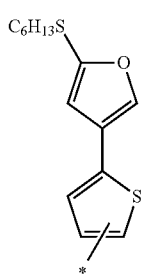
(ar-749) 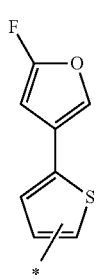
[Chem. 116]
(ar-750) 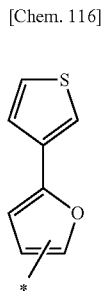
(ar-751) 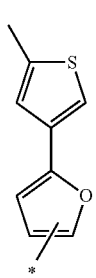
(ar-752) 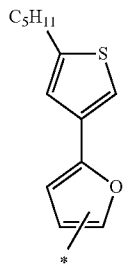
(ar-753) 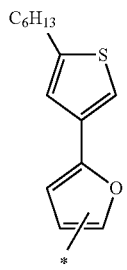
(ar-754) 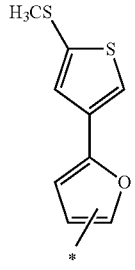
(ar-755) 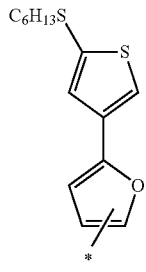
(ar-756) 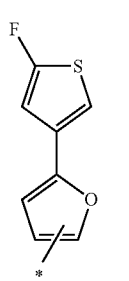

[Chem. 117]
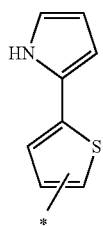 (ar-757)
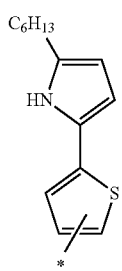 (ar-758)
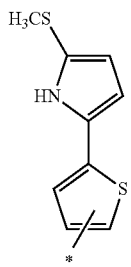 (ar-759)
(ar-760)
(ar-761)
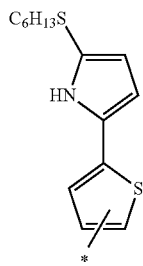 (ar-762)
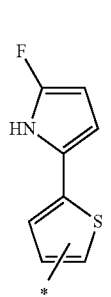 (ar-763)
[Chem. 118]
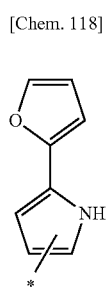 (ar-764)
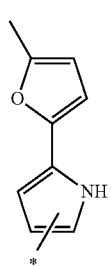 (ar-765)
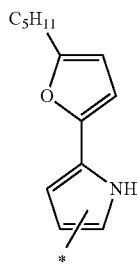 (ar-766)

-continued (ar-767)

(ar-768)

(ar-769)

(ar-770)

[Chem. 119]

(ar-771)

(ar-772)

-continued (ar-773)

(ar-774)

(ar-775)

(ar-776)

(ar-777)

[Chem. 120]

(ar-778)

(ar-779) 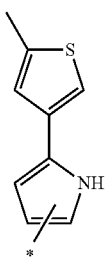
(ar-780) 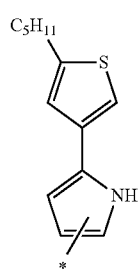
(ar-781) 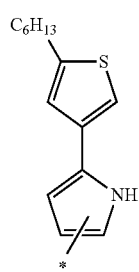
(ar-782) 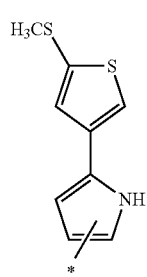
(ar-783) 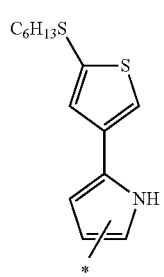
(ar-784) 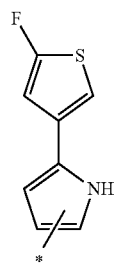
[Chem. 121]
(ar-785) 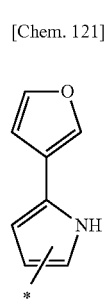
(ar-786) 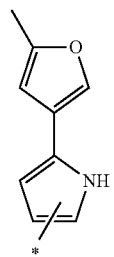
(ar-787) 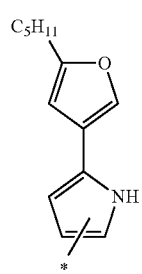
(ar-788) 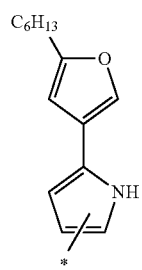

(ar-789) 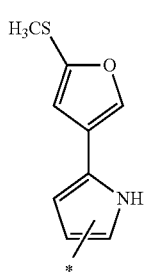
(ar-794) 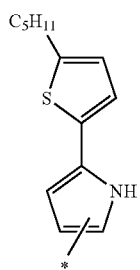
(ar-790) 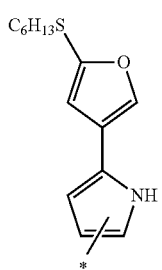
(ar-795) 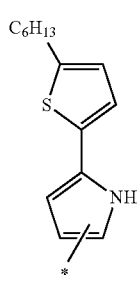
(ar-791) 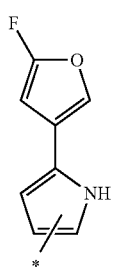
(ar-796) 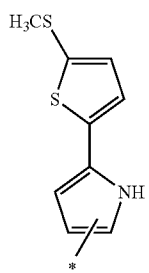
[Chem. 122]
(ar-792) 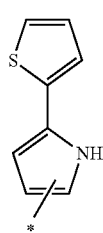
(ar-797) 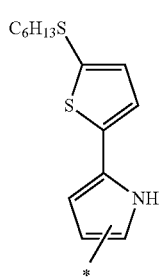
(ar-793) 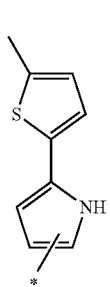
(ar-798) 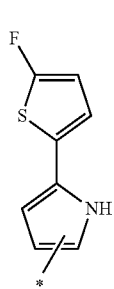

[Chem. 123]
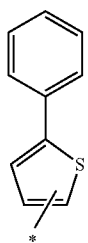 (ar-799)
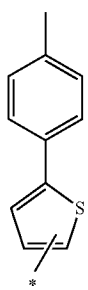 (ar-800)
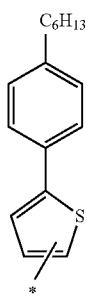 (ar-801)
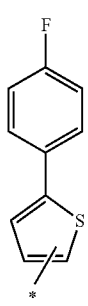 (ar-802)
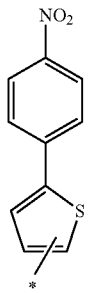 (ar-803)
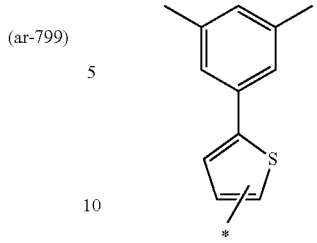 (ar-804)
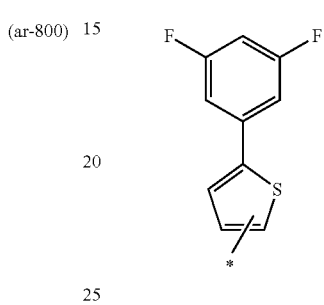 (ar-805)
[Chem. 124]
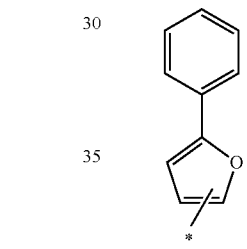 (ar-806)
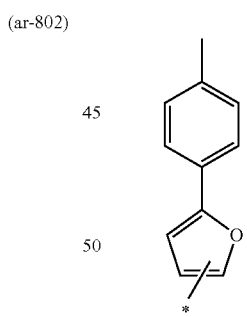 (ar-807)
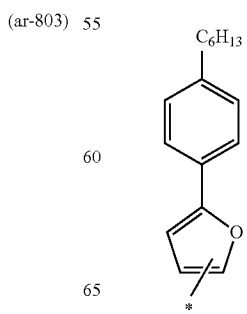 (ar-808)

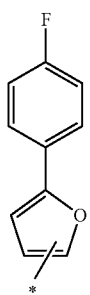 (ar-809)
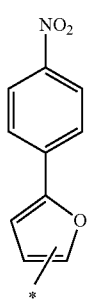 (ar-810)
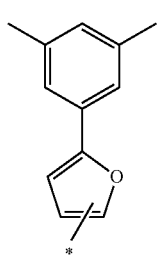 (ar-811)
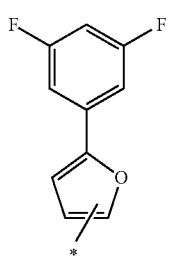 (ar-812)
[Chem. 125]
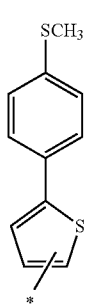 (ar-813)
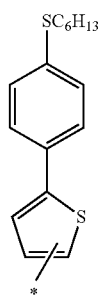 (ar-814)
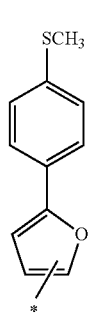 (ar-815)
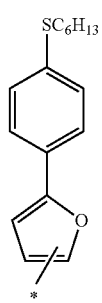 (ar-816)
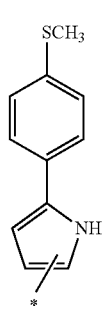 (ar-817)
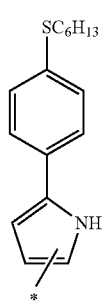 (ar-818)

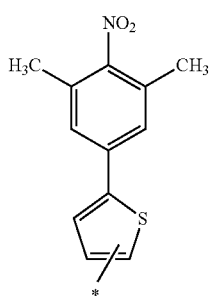
(ar-819)
[Chem. 126]
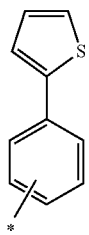
(ar-820)
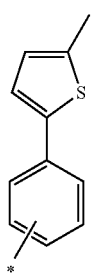
(ar-821)
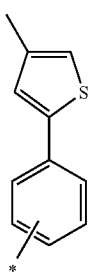
(ar-822)
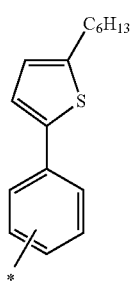
(ar-823)
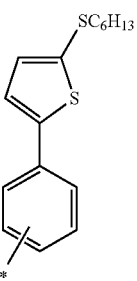
(ar-824)
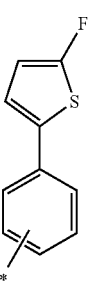
(ar-825)
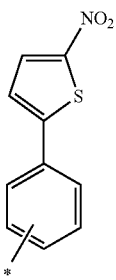
(ar-826)
[Chem. 127]
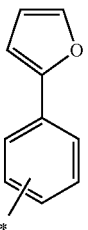
(ar-827)
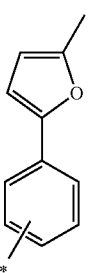
(ar-828)

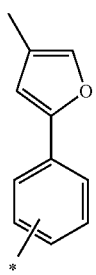 (ar-829)
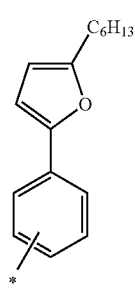 (ar-830)
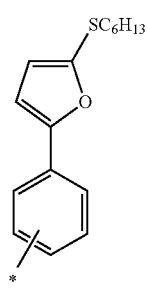 (ar-831)
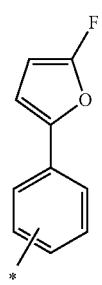 (ar-832)
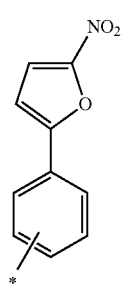 (ar-833)
[Chem. 128]
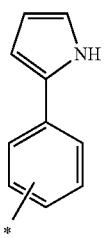 (ar-834)
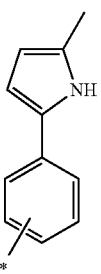 (ar-835)
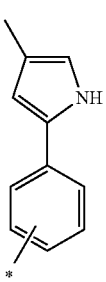 (ar-836)
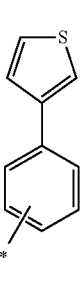 (ar-837)
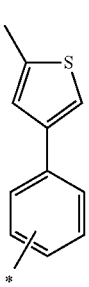 (ar-838)

(ar-839)

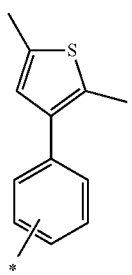

(ar-840)

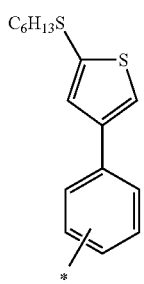

Specific examples of polymerizable liquid crystal compound (A) represented by formula (A) include the following compounds and the examples are not limited to these examples. The liquid crystal composition of the present invention may contain only one kind, or two or more kinds of polymerizable liquid crystal compounds as polymerizable liquid crystal compound (A).

[Chem. 129]

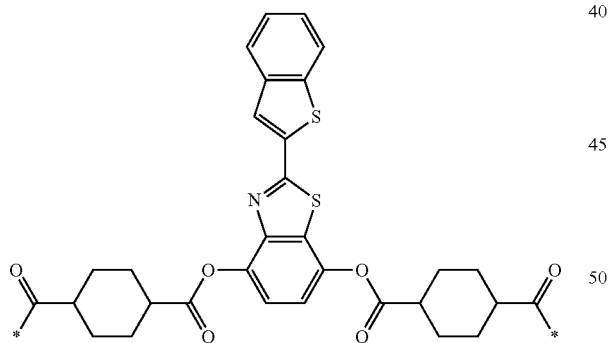

(A1-1)

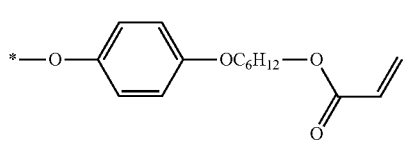

(A1-2)

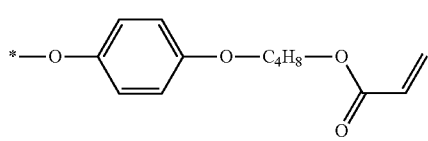

(A1-3)

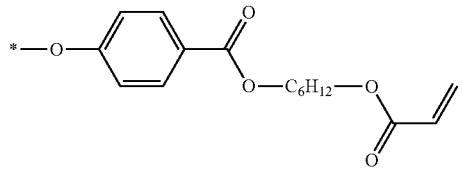

(A1-4)

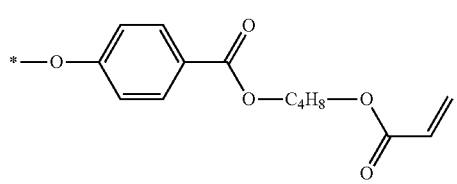

(A1-5)

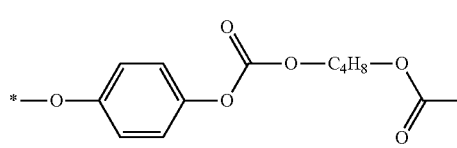

(A1-6)

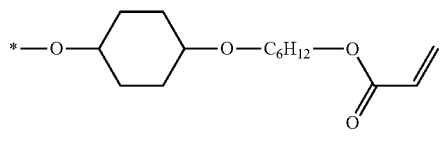

(A1-7)

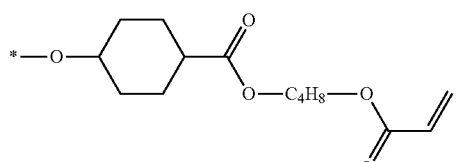

(A1-8)

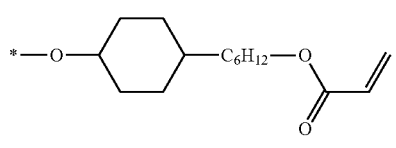

[Chem. 130]

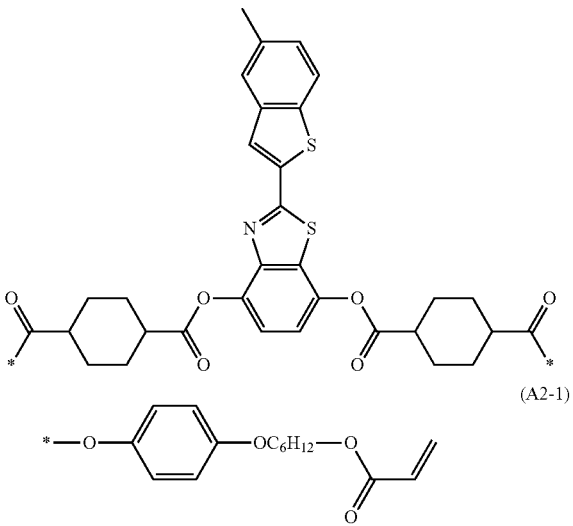

(A2-1)

(A2-2)
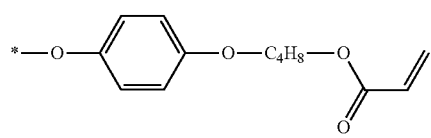
(A2-3)
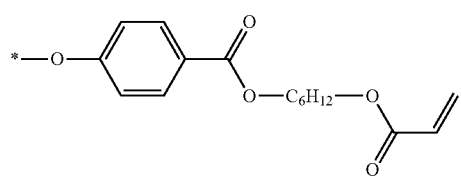
(A2-4)
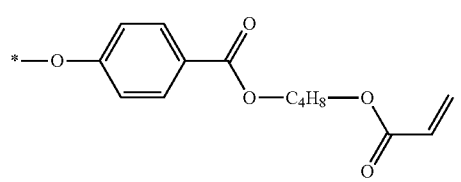
(A2-5)
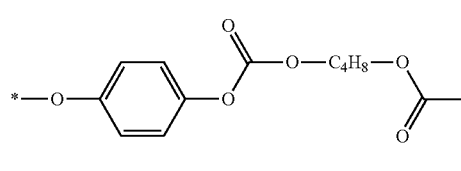
(A2-6)
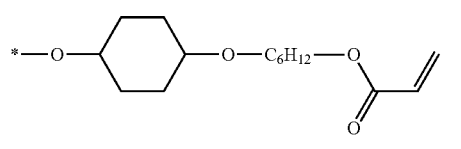
(A2-7)
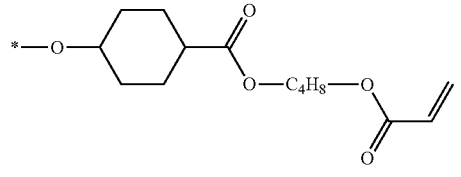
(A2-8)
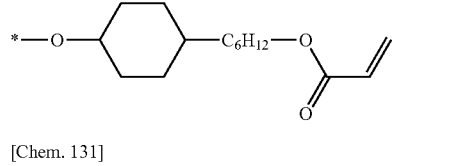
[Chem. 131]
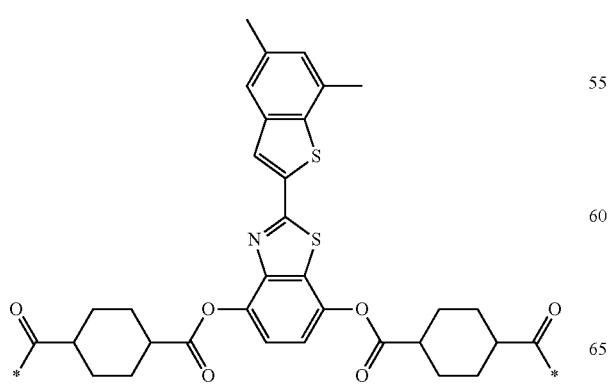
(A3-1)
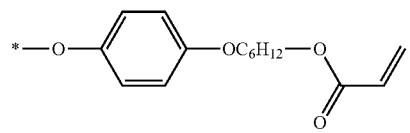
(A3-2)
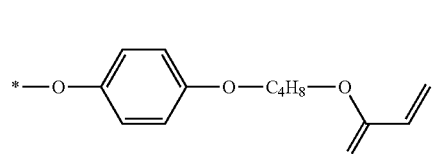
(A3-3)
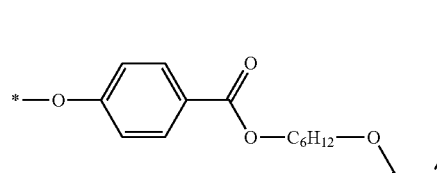
(A3-4)
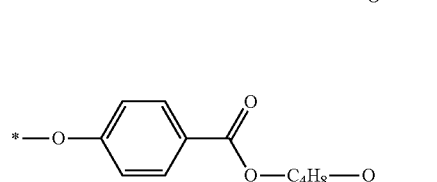
(A3-5)
(A3-6)
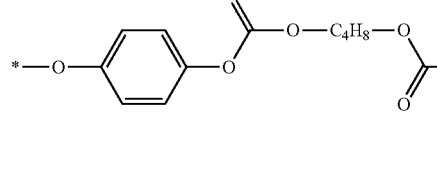
(A3-7)
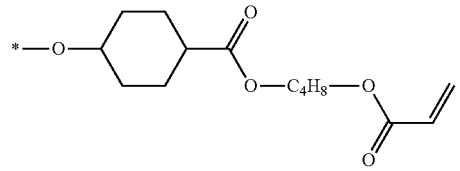
(A3-8)
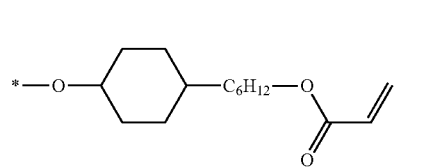

[Chem. 132]
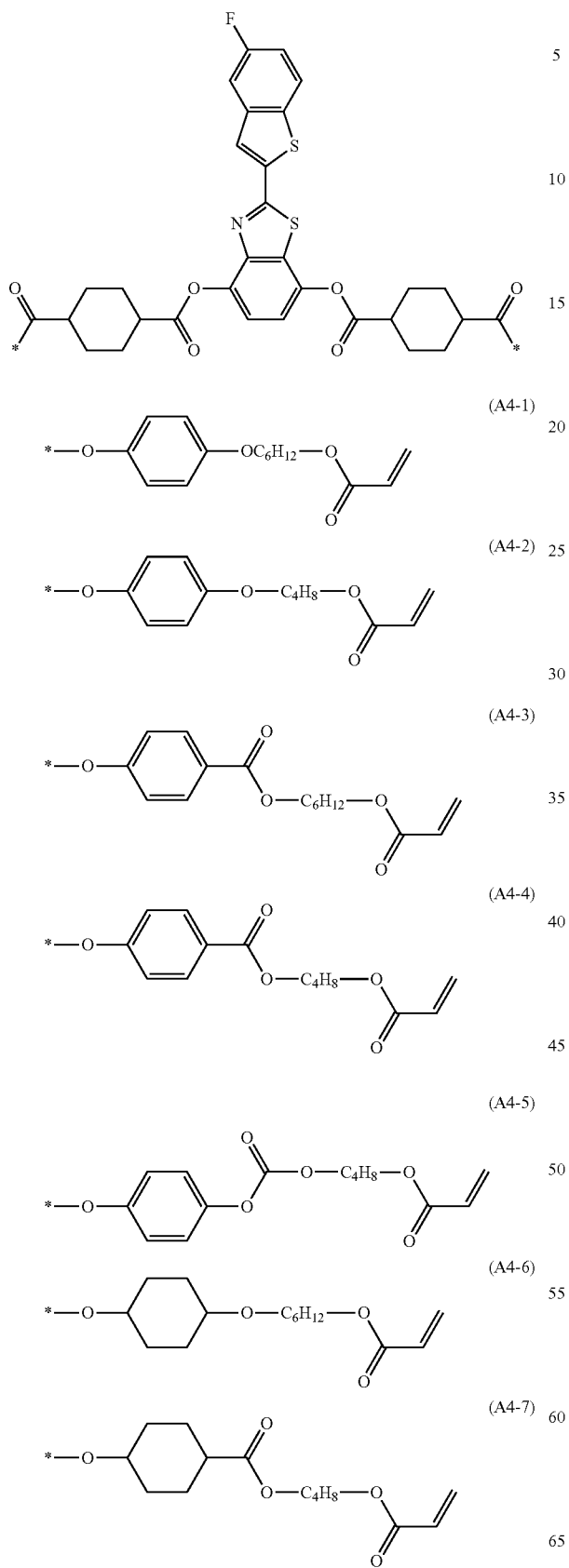
(A4-1)
(A4-2)
(A4-3)
(A4-4)
(A4-5)
(A4-6)
(A4-7)
-continued
(A4-8)
[Chem. 133]
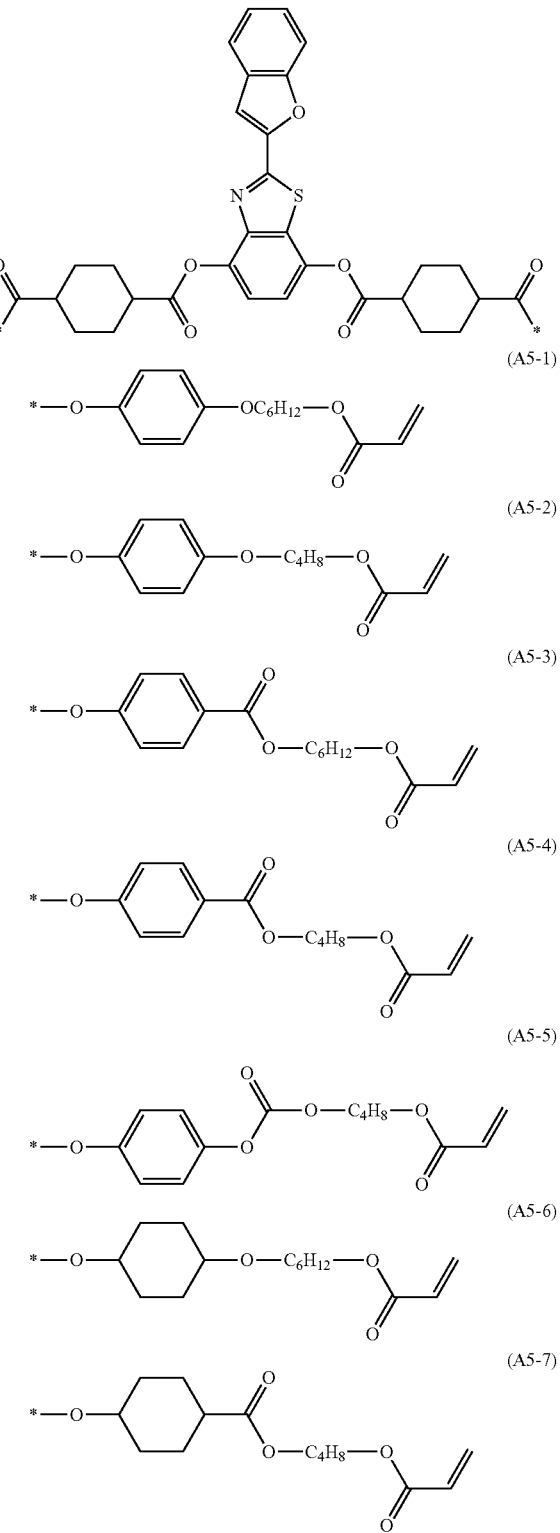
(A5-1)
(A5-2)
(A5-3)
(A5-4)
(A5-5)
(A5-6)
(A5-7)

(A5-8)
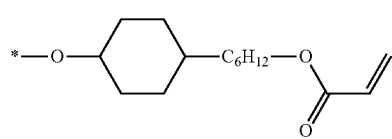
(A4-7)
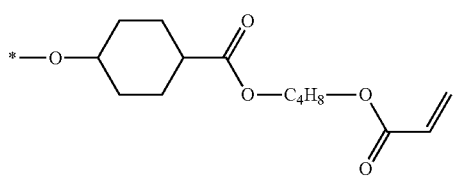
[Chem. 134]
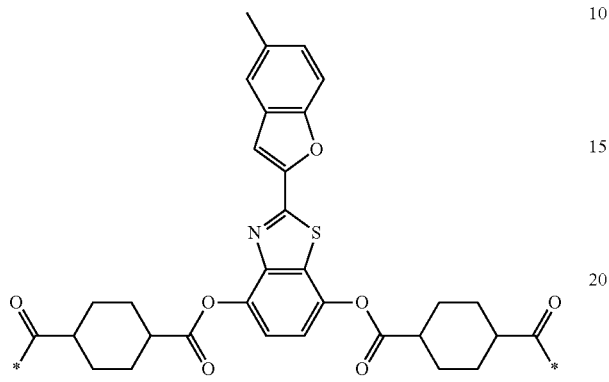
(A6-8)
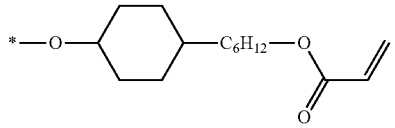
[Chem. 135]
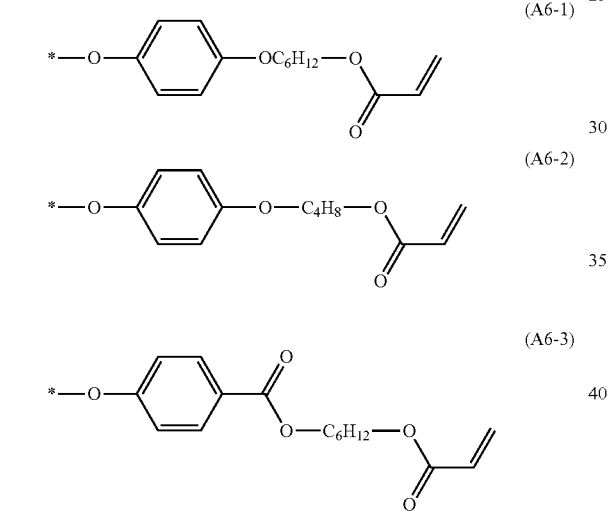
(A6-1)
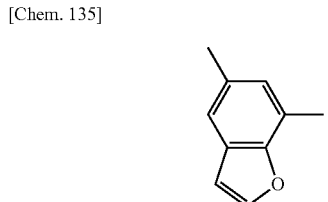
(A7-1)
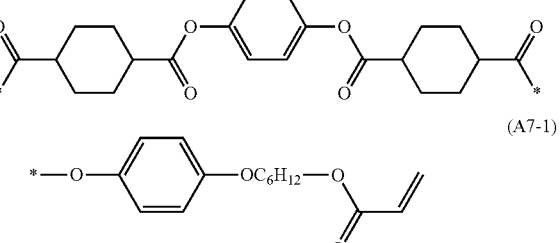
(A6-2)
(A7-2)
(A6-3)
(A7-3)
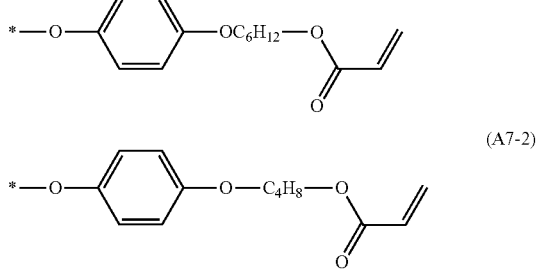
(A6-4)
(A7-4)
(A6-5)
(A7-5)
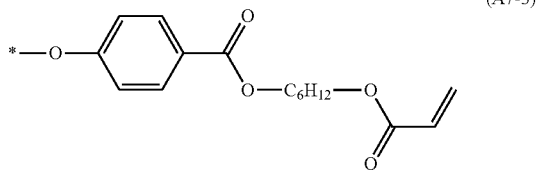
(A6-6)
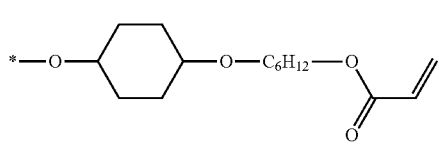
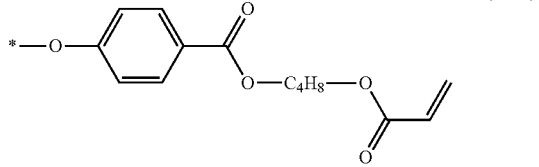
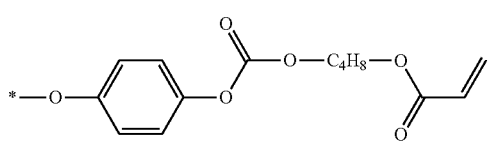

(A7-6)
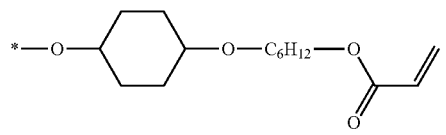

(A7-7)
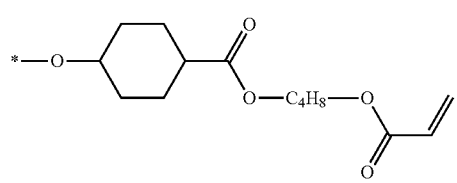

(A7-8)
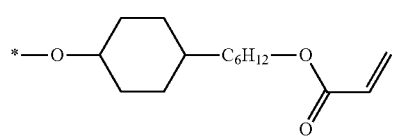

[Chem. 136]

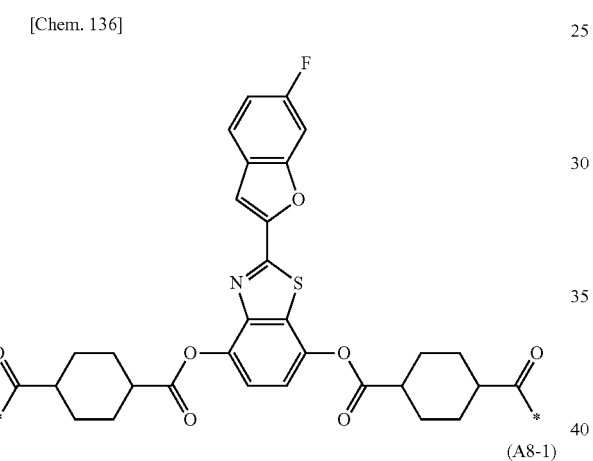

(A8-1)

*—O—⟨phenyl⟩—OC$_6$H$_{12}$—O—C(=O)—CH=CH$_2$ (A8-2)

*—O—⟨phenyl⟩—O—C$_4$H$_8$—O—C(=O)—CH=CH$_2$ (A8-3)

*—O—⟨phenyl⟩—C(=O)—O—C$_6$H$_{12}$—O—C(=O)—CH=CH$_2$ (A8-4)

*—O—⟨phenyl⟩—C(=O)—O—C$_4$H$_8$—O—C(=O)—CH=CH$_2$ (A8-5)

*—O—⟨phenyl⟩—O—C(=O)—O—C$_4$H$_8$—O—C(=O)—CH=CH$_2$ (A8-6)

*—O—⟨cyclohexyl⟩—O—C$_6$H$_{12}$—O—C(=O)—CH=CH$_2$ (A8-7)

*—O—⟨cyclohexyl⟩—C(=O)—O—C$_4$H$_8$—O—C(=O)—CH=CH$_2$ (A8-8)

*—O—⟨cyclohexyl⟩—C$_6$H$_{12}$—O—C(=O)—CH=CH$_2$

[Chem. 137]

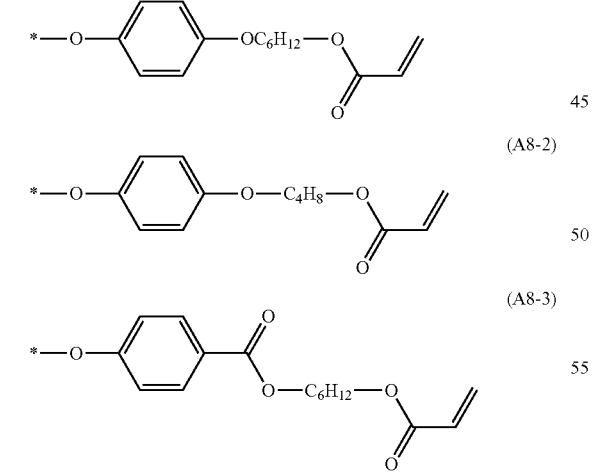

(A9-1)

*—O—⟨phenyl⟩—OC$_6$H$_{12}$—O—C(=O)—CH=CH$_2$ (A9-2)

*—O—⟨phenyl⟩—O—C$_4$H$_8$—O—C(=O)—CH=CH$_2$ (A9-3)

*—O—⟨phenyl⟩—C(=O)—O—C$_6$H$_{12}$—O—C(=O)—CH=CH$_2$

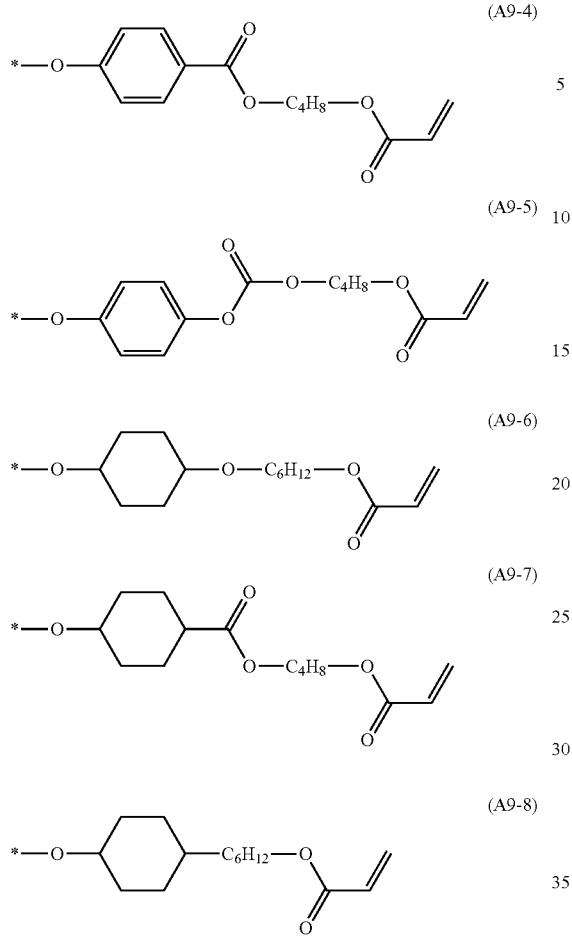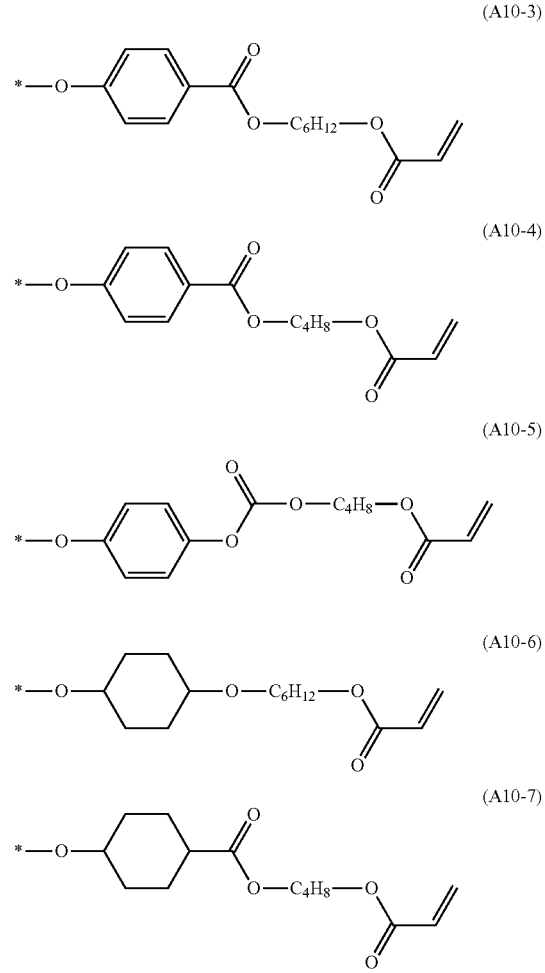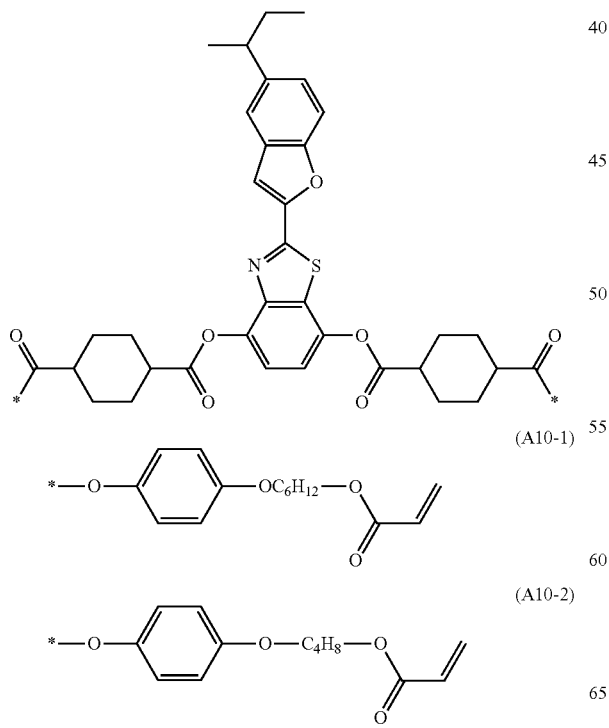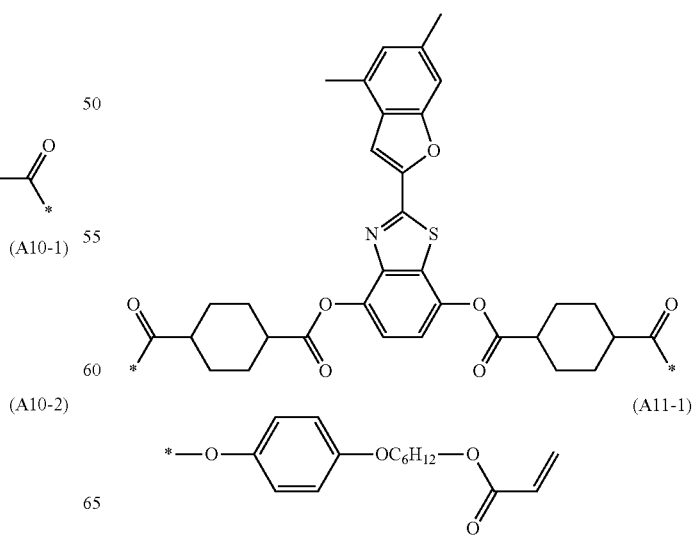

(A11-2) 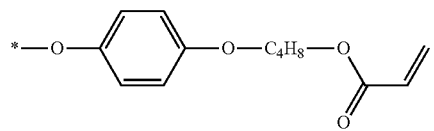
(A11-3) 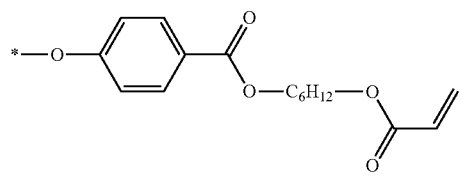
(A11-4) 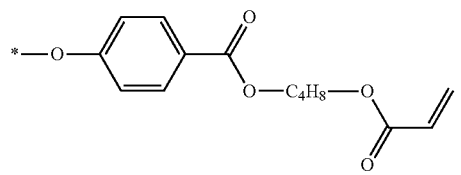
(A11-5) 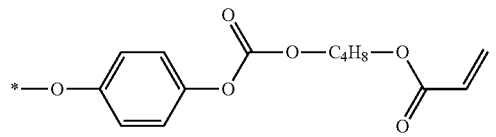
(A11-6) 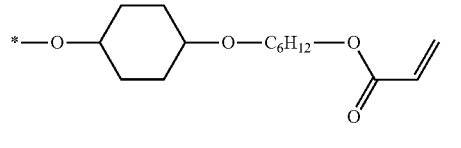
(A11-7) 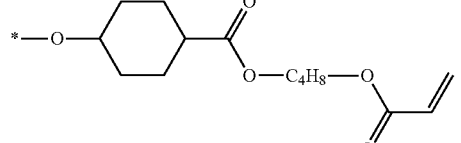
(A11-8) 
[Chem. 140]
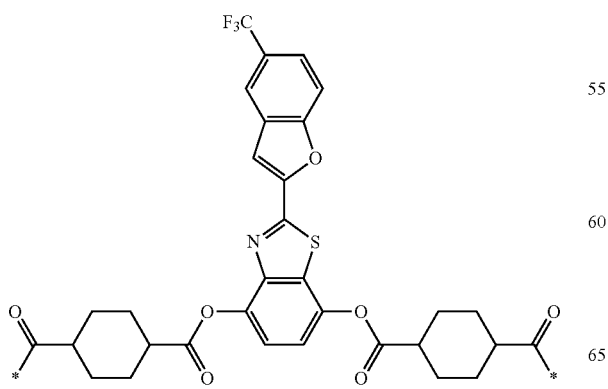
(A12-1) 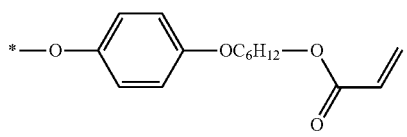
(A12-2) 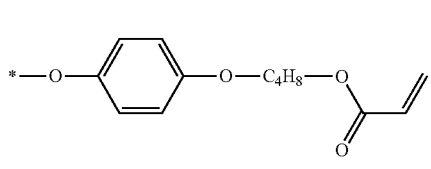
(A12-3) 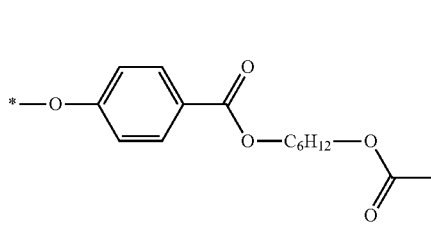
(A12-4) 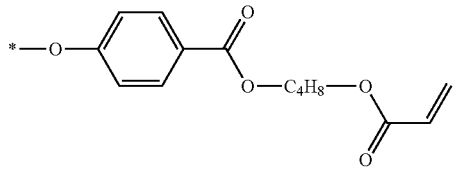
(A12-5) 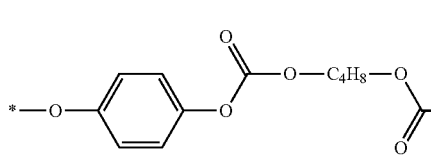
(A12-6) 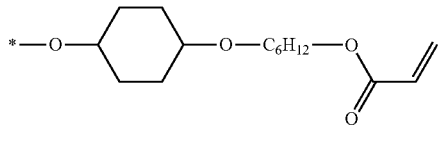
(A12-7) 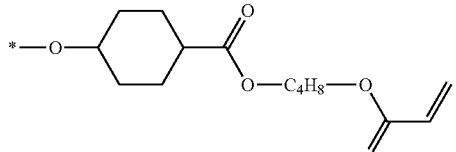
(A12-8) 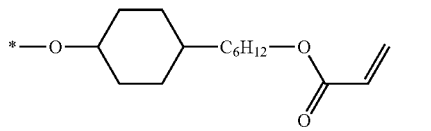

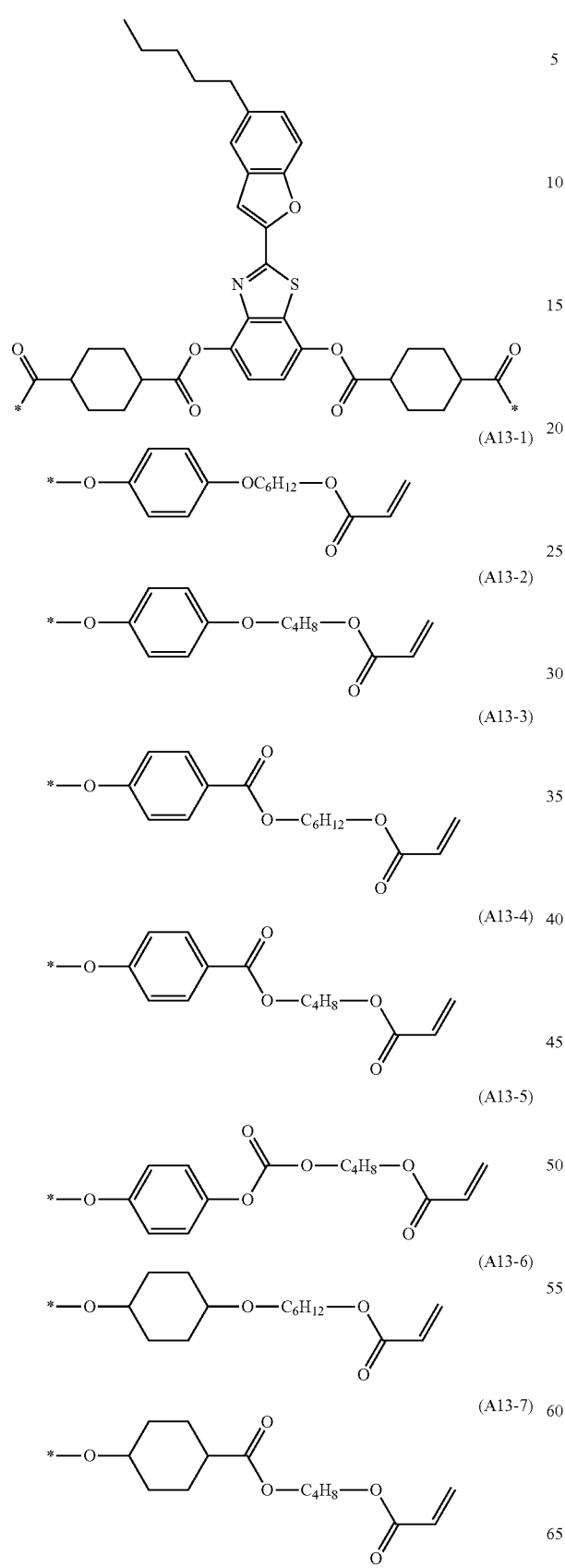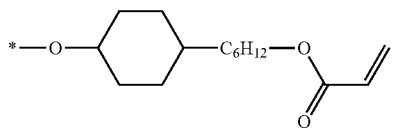

-continued
(A14-7)
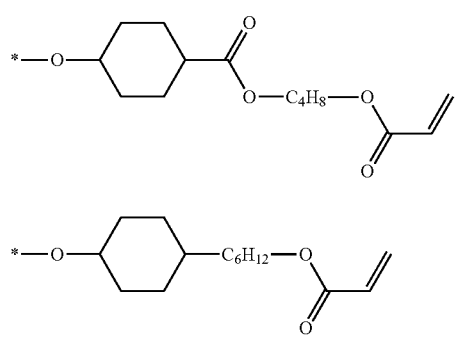
(A14-8)
[Chem. 143]
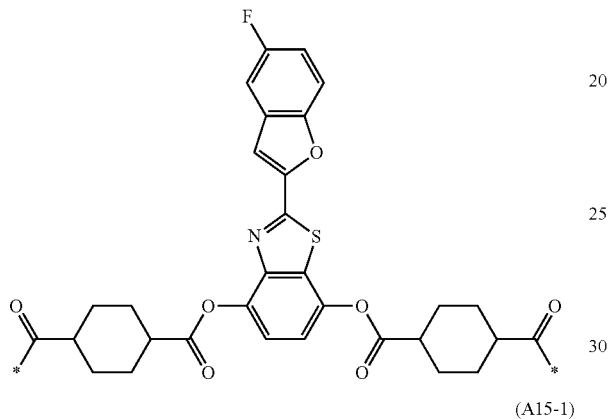
(A15-1)
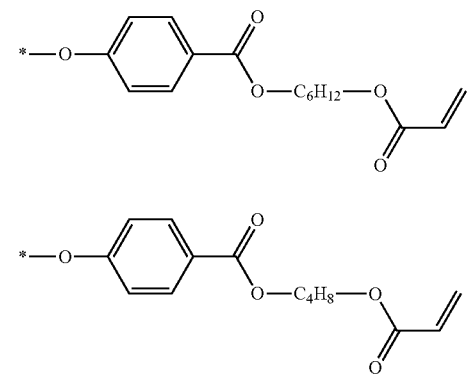
(A15-2)
(A15-3)
(A15-4)
(A15-5)
-continued
(A15-6)
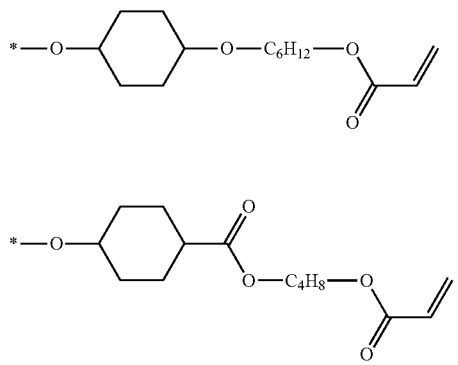
(A15-7)
(A15-8)
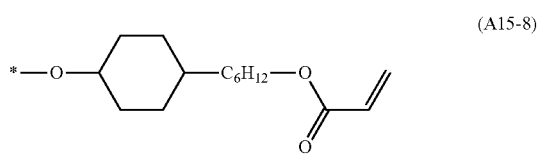
[Chem. 144]
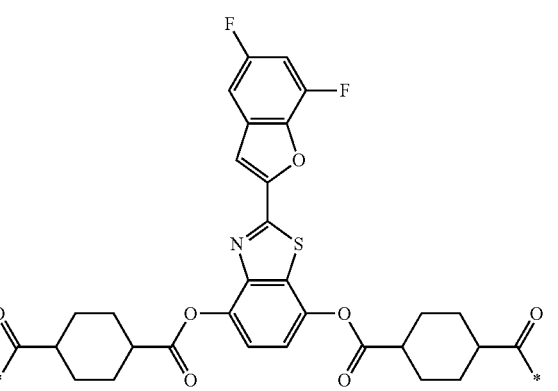
(A16-1)
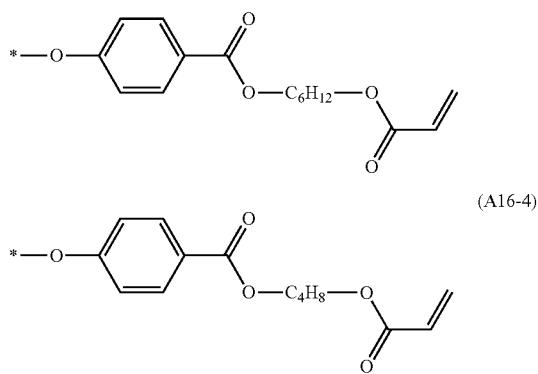
(A16-2)
(A16-3)
(A16-4)

(A16-5) 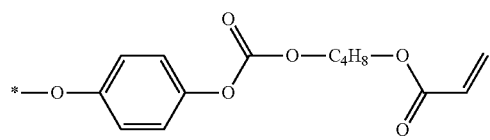
(A16-6) 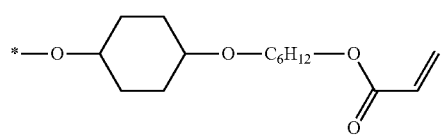
(A16-7) 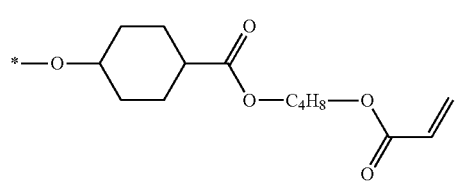
(A16-8) 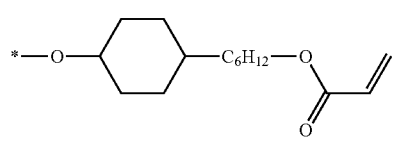
[Chem. 145]
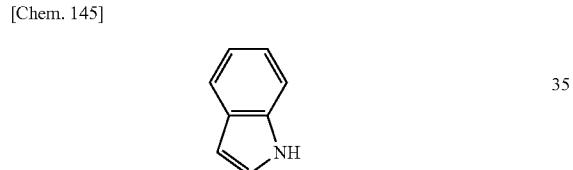
(A17-1) 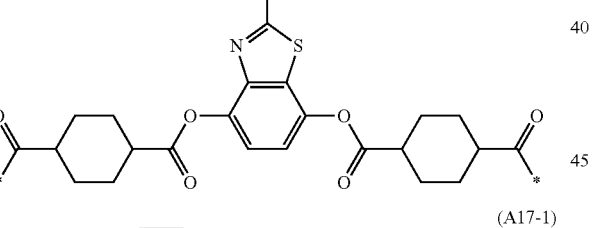
(A17-2) 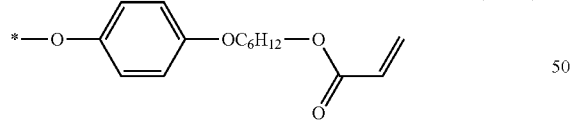
(A17-3) 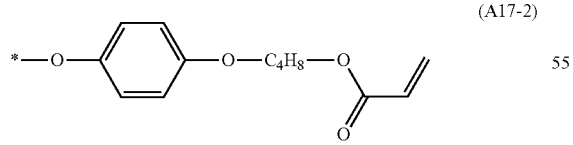
(A17-4) 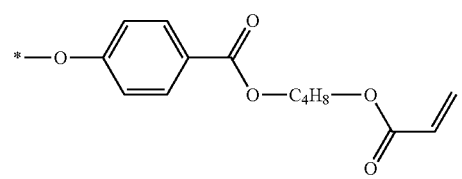
(A17-5) 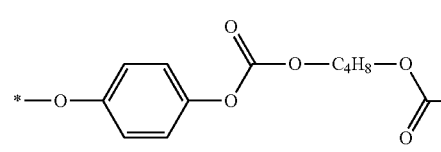
(A17-6) 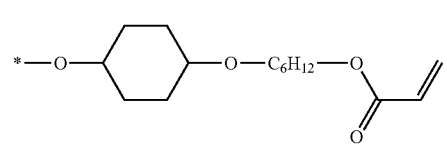
(A17-7) 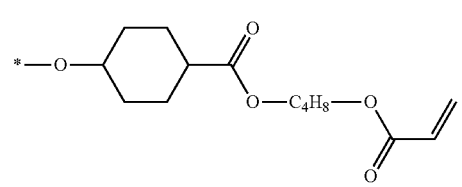
(A17-8) 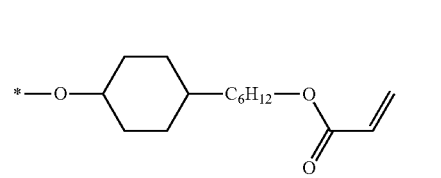
[Chem. 146]
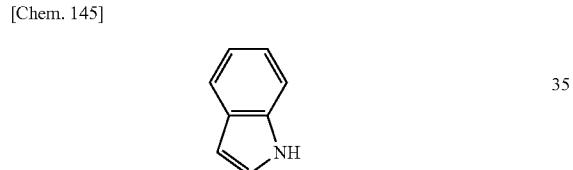
(A18-1) 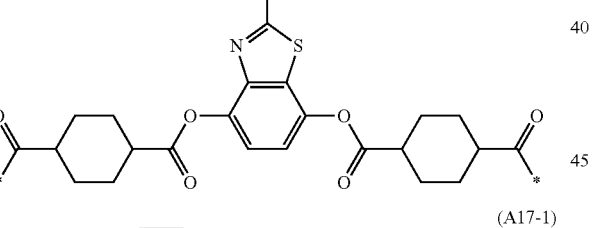
(A18-2) 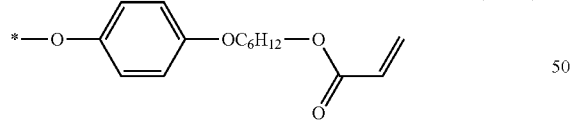

(A18-3)
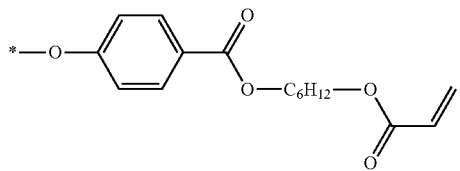
(A18-4)
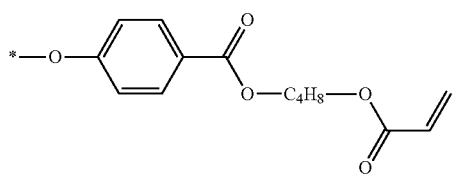
(A18-5)
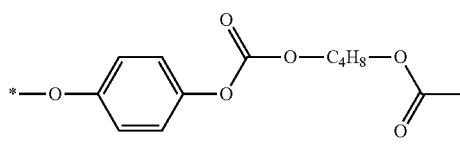
(A18-6)
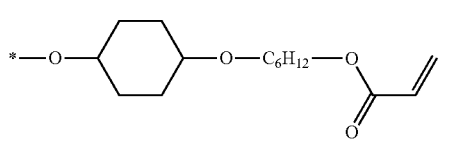
(A18-7)
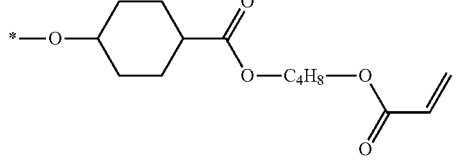
(A18-8)
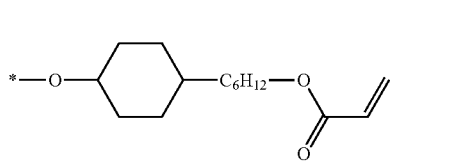
[Chem. 147]
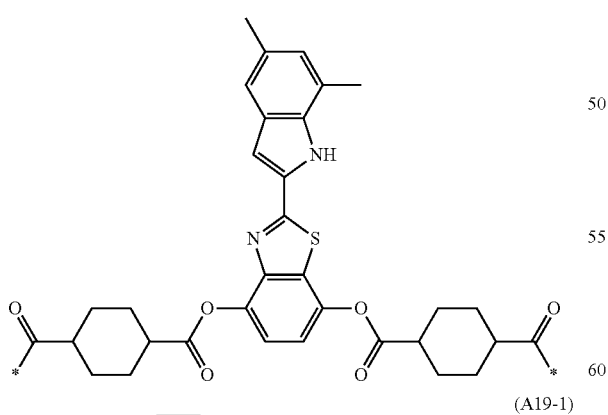
(A19-1)
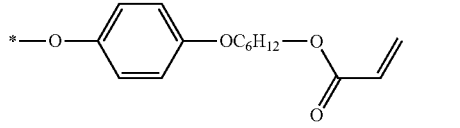
(A19-2)
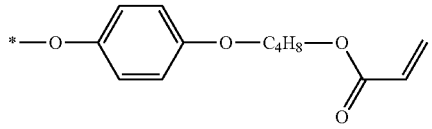
(A19-3)
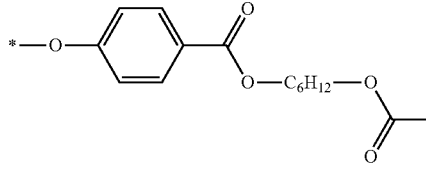
(A19-4)
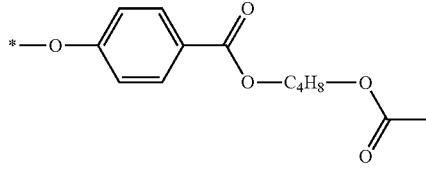
(A19-5)
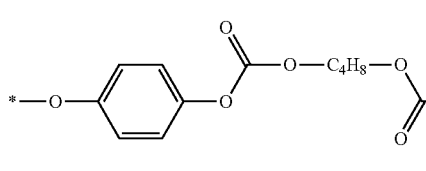
(A19-6)
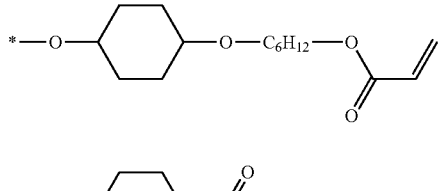
(A19-7)
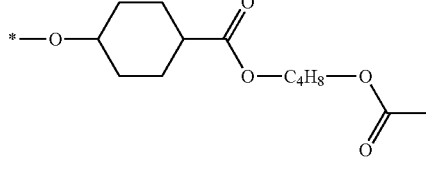
(A19-8)
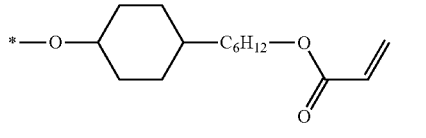
[Chem. 148]
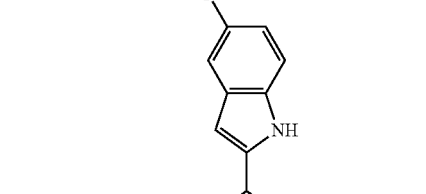
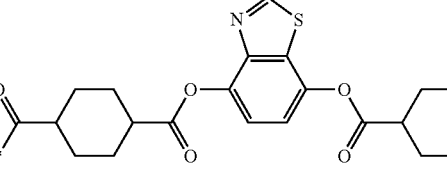

(A20-1) 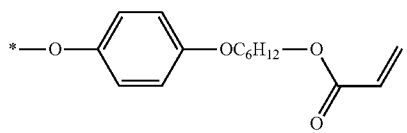
(A20-2) 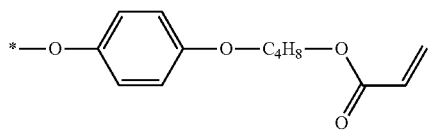
(A20-3) 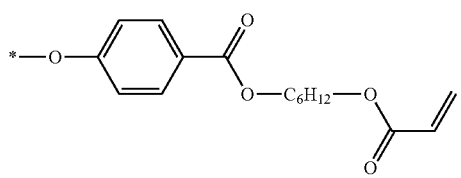
(A20-4) 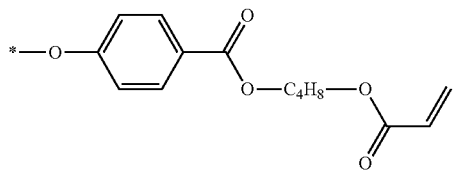
(A20-5) 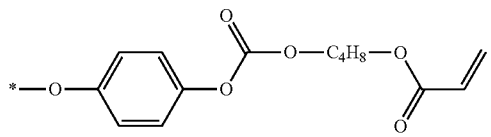
(A20-6) 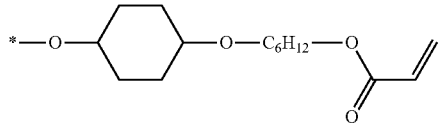
(A20-7) 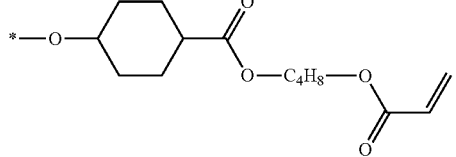
(A20-8) 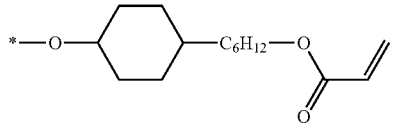
[Chem. 149]
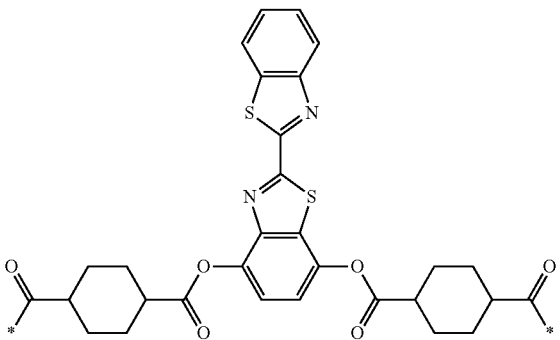
(A21-1) 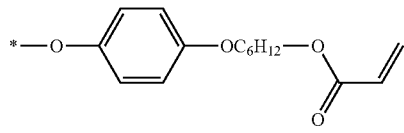
(A21-2) 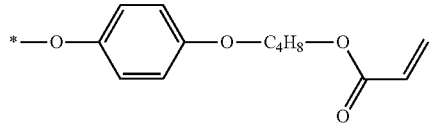
(A21-3) 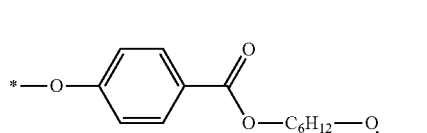
(A21-4) 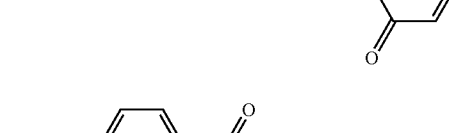
(A21-5) 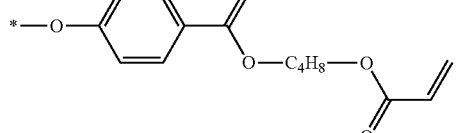
(A21-6) 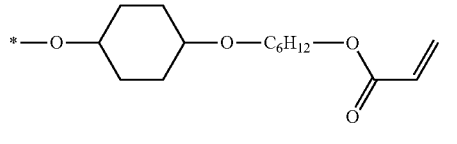
(A21-7) 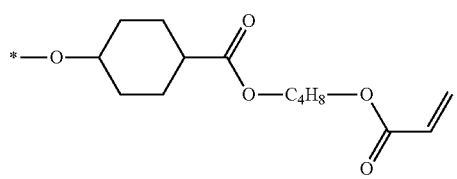

(A21-8)
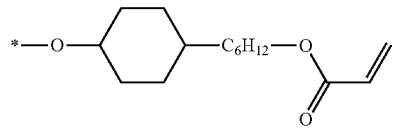
[Chem. 150]
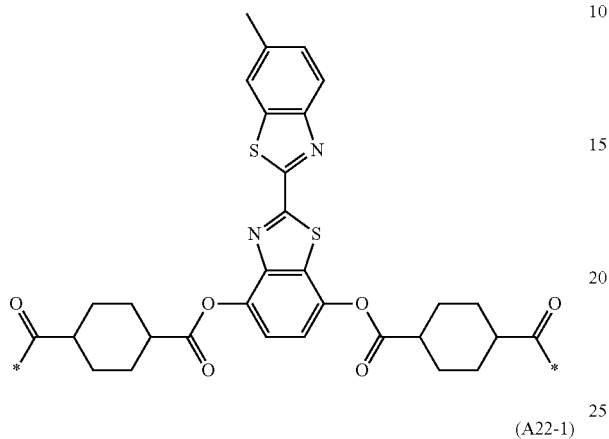
(A22-1)
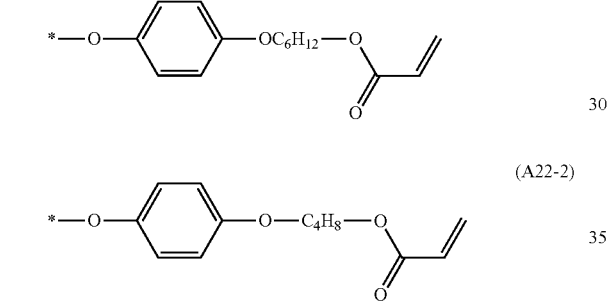
(A22-2)
(A22-3)
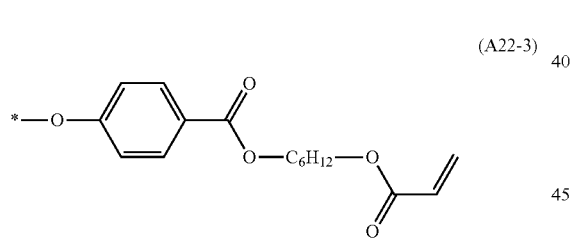
(A22-4)
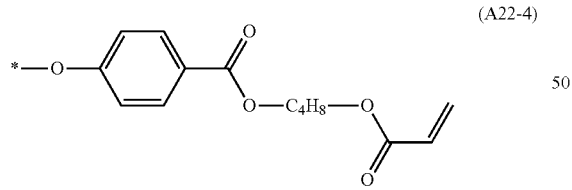
(A22-5)
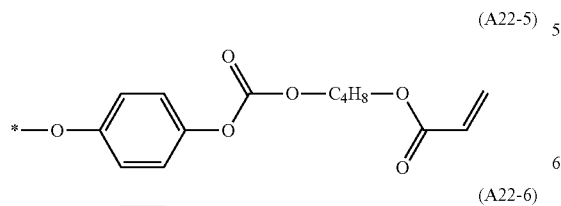
(A22-6)
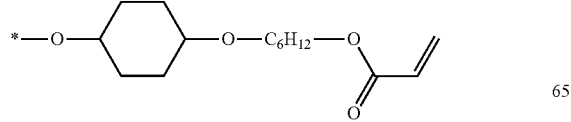
(A22-7)
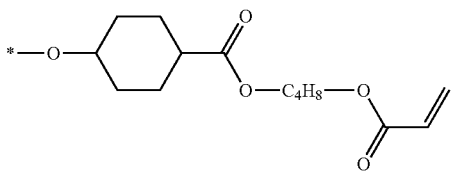
(A22-8)
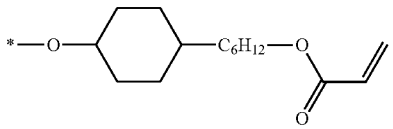
[Chem. 151]
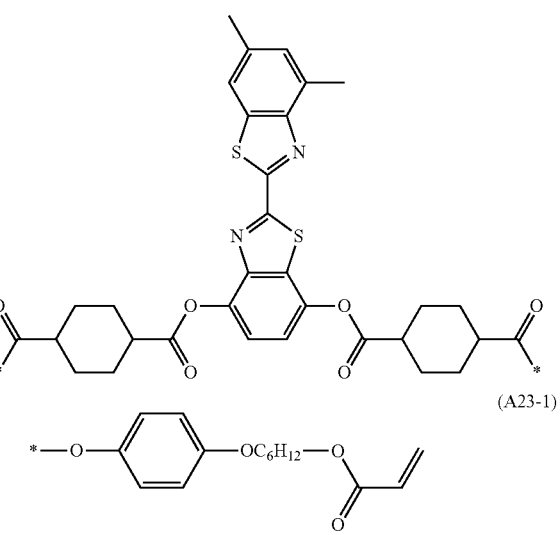
(A23-1)
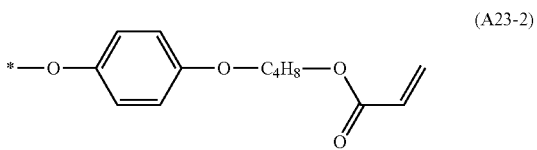
(A23-2)
(A23-3)
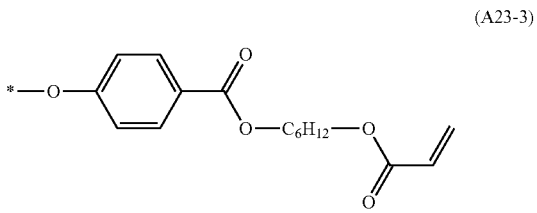
(A23-4)
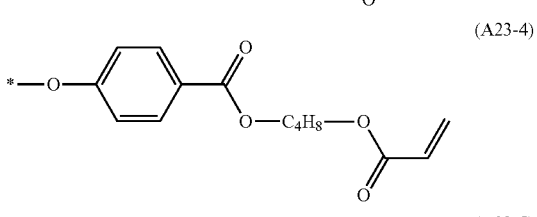
(A23-5)
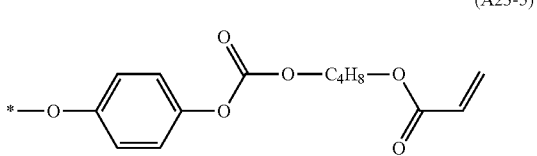

(A23-6)
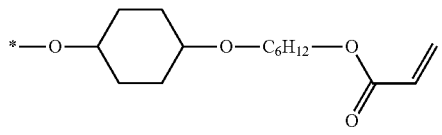
(A23-7)
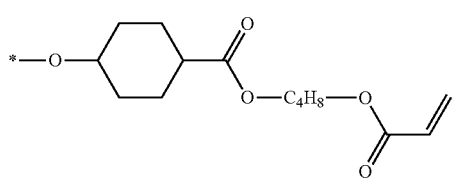
(A23-8)
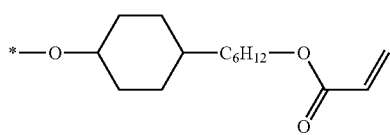
[Chem. 152]
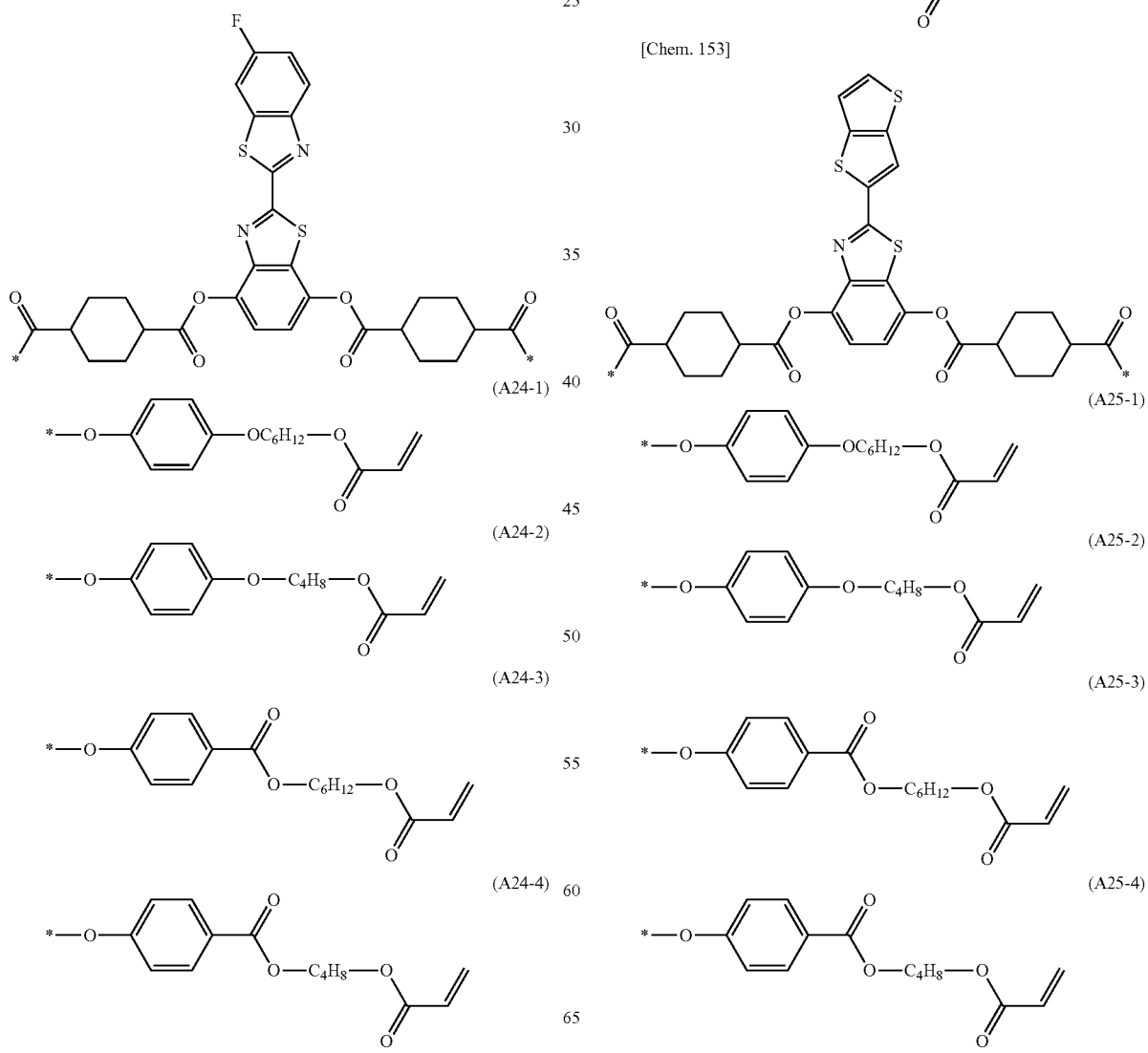
(A24-1)
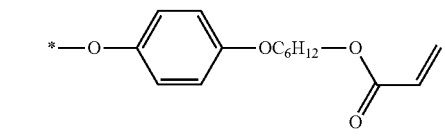
(A24-2)
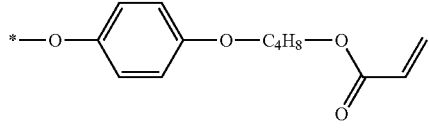
(A24-3)
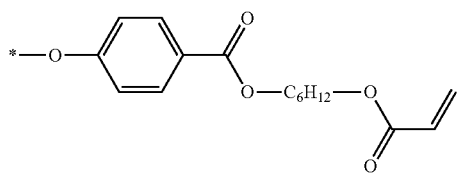
(A24-4)
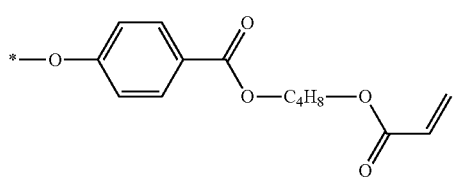
(A24-5)
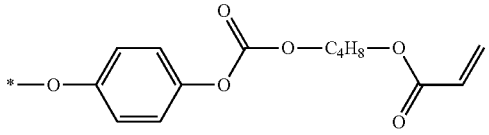
(A24-6)
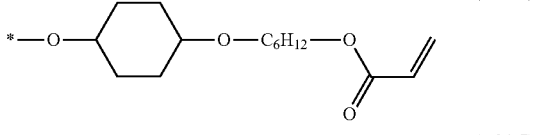
(A24-7)
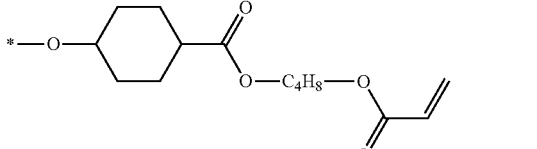
(A24-8)
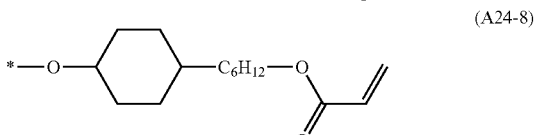
[Chem. 153]
(A25-1)
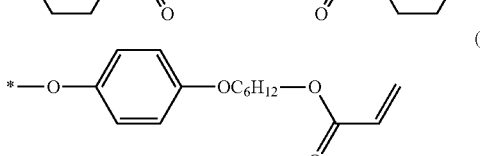
(A25-2)
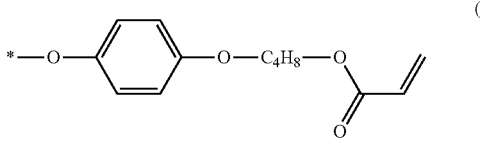
(A25-3)
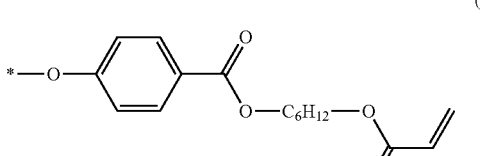
(A25-4)

-continued
(A25-5)
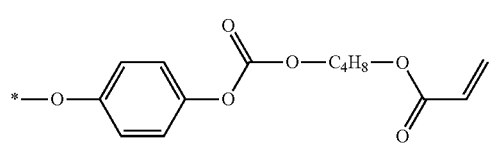
(A25-6)
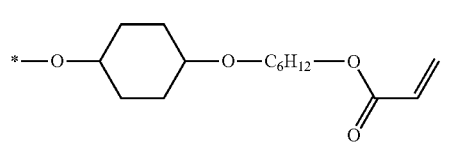
(A25-7)
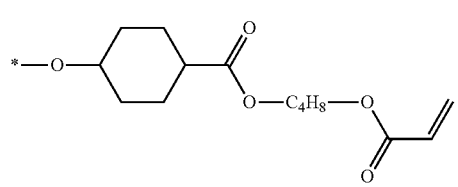
(A25-8)
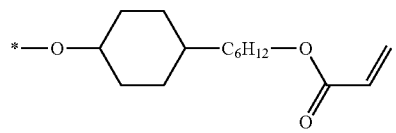
[Chem. 154]
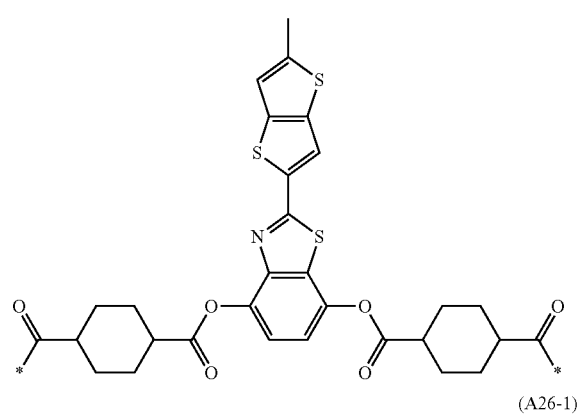
(A26-1)
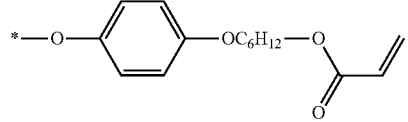
(A26-2)
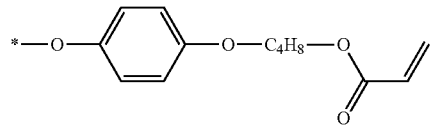
(A26-3)
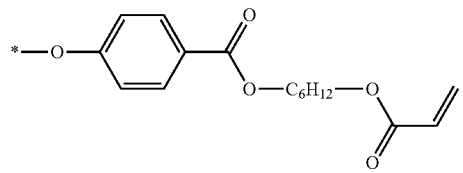
-continued
(A26-4)
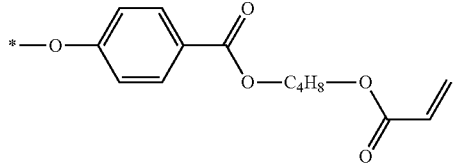
(A26-5)
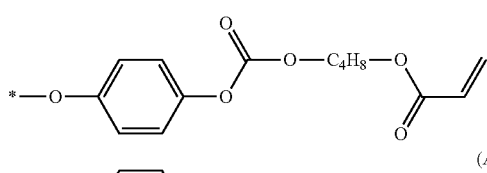
(A26-6)
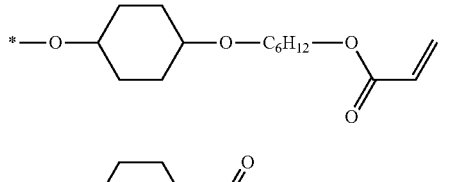
(A26-7)
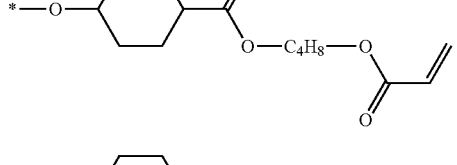
(A26-8)
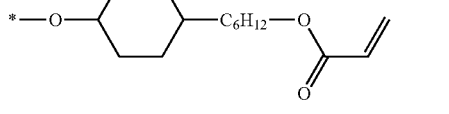
[Chem. 155]
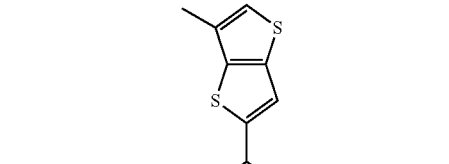
(A27-1)
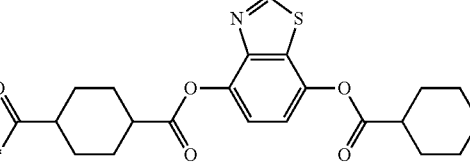
(A27-2)
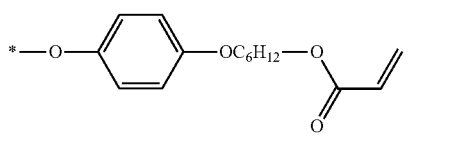
(A27-3)
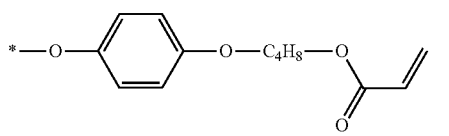
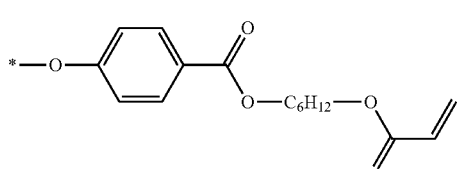

(A27-4)
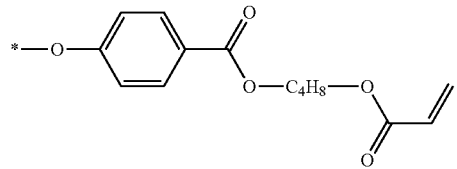
(A27-5)
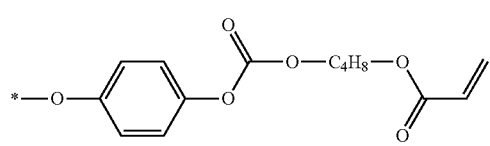
(A27-6)
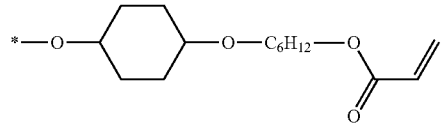
(A27-7)
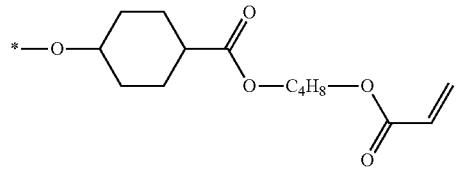
(A27-8)
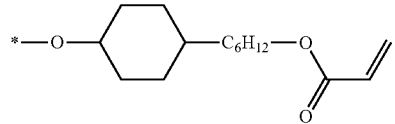
[Chem. 156]
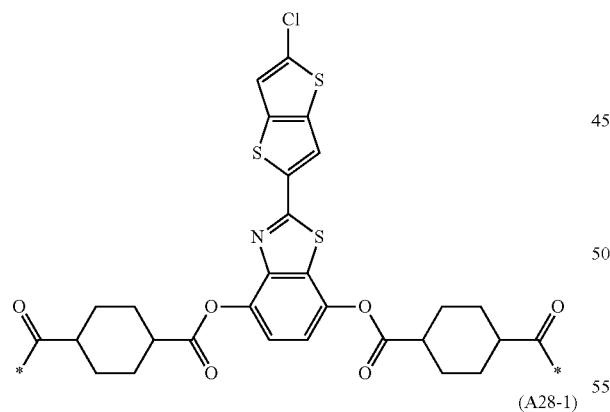
(A28-1)
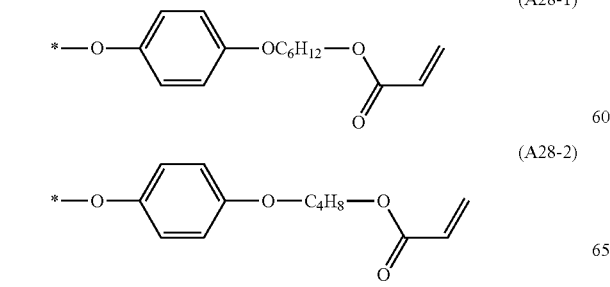
(A28-2)
(A28-3)
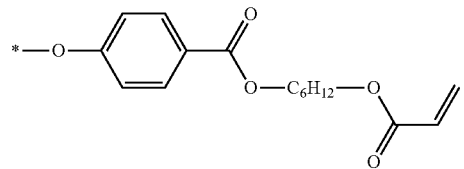
(A28-4)
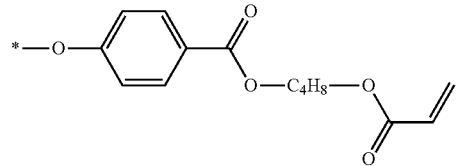
(A28-5)
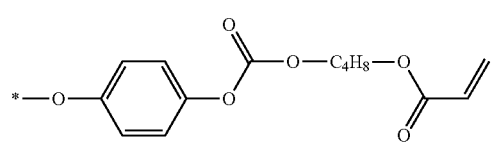
(A28-6)
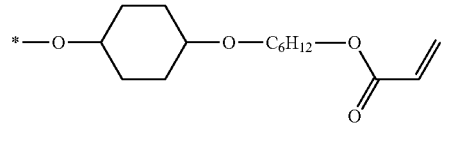
(A28-7)
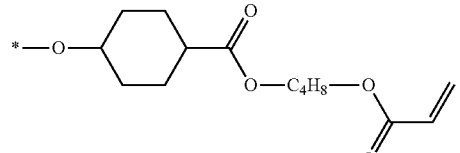
(A28-8)
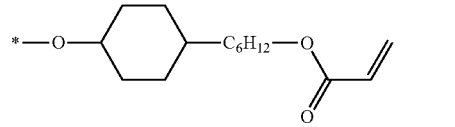
[Chem. 157]
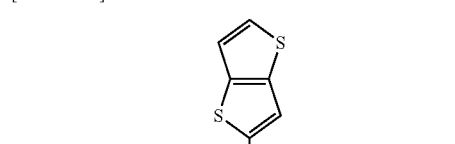
(A29-1)
(A29-2)
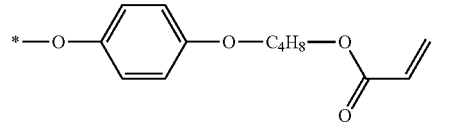

(A29-3)
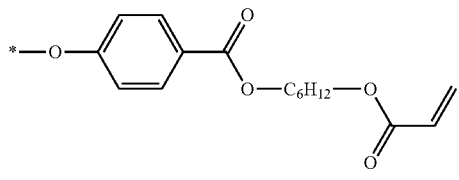
(A29-4)
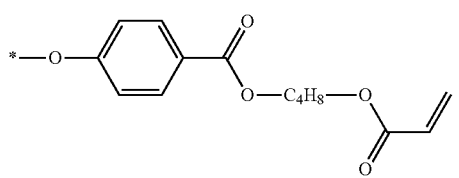
(A29-5)
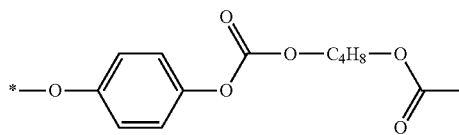
(A29-6)
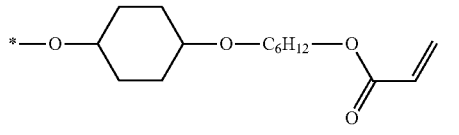
(A29-7)
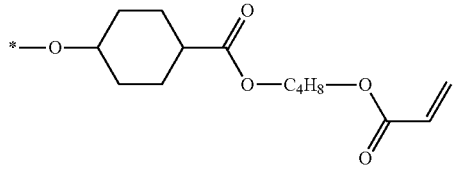
(A29-8)
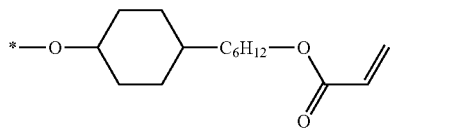
[Chem. 158]
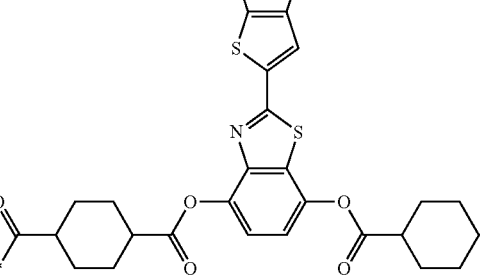
(A30-1)
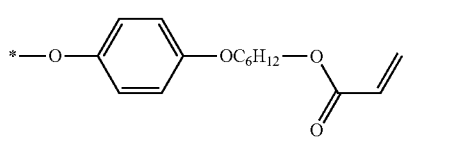
(A30-2)
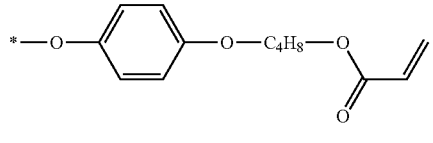
(A30-3)
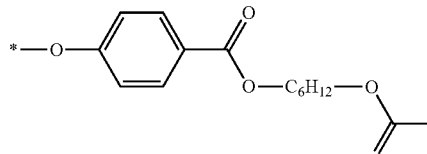
(A30-4)
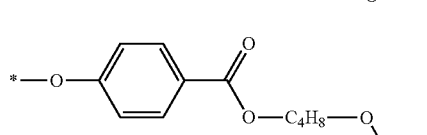
(A30-5)
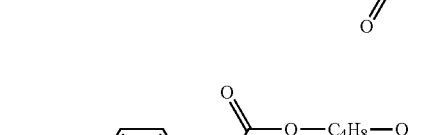
(A30-6)
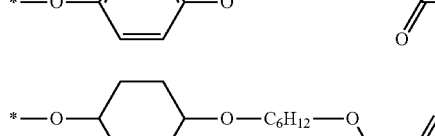
(A30-7)
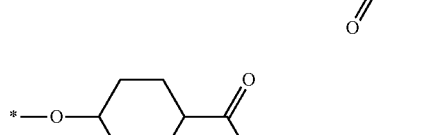
(A30-8)
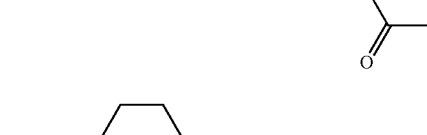
[Chem. 159]
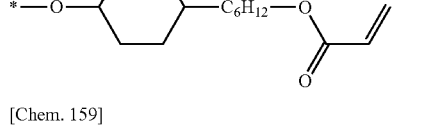

(A31-1) 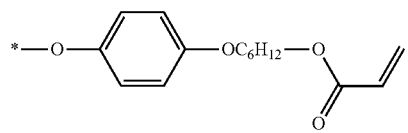
(A31-2) 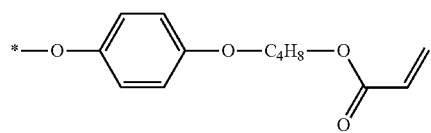
(A31-3) 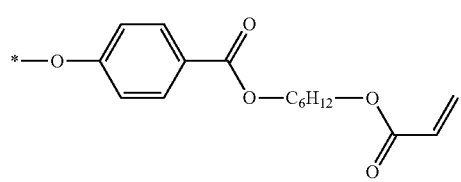
(A31-4) 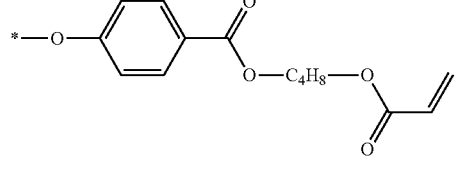
(A31-5) 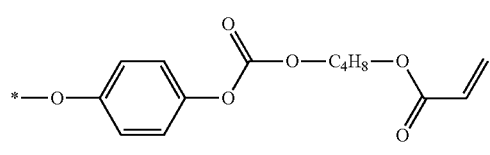
(A31-6) 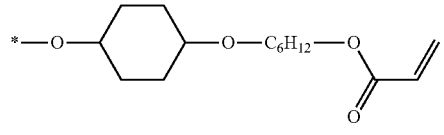
(A31-7) 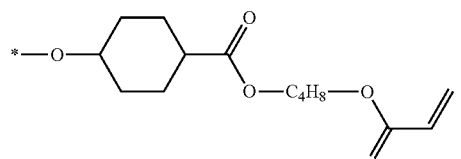
(A31-8) 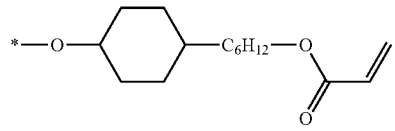
[Chem. 160]
(A32-1) 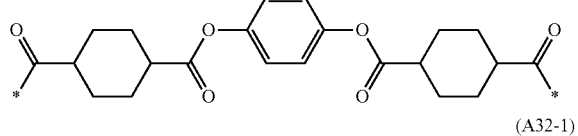
(A32-2) 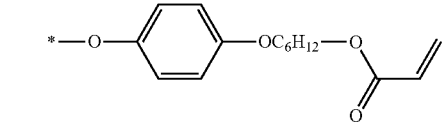
(A32-3) 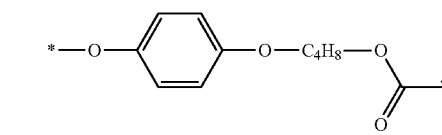
(A32-4) 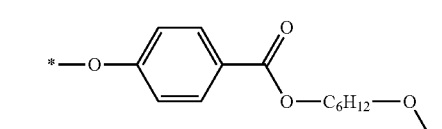
(A32-5) 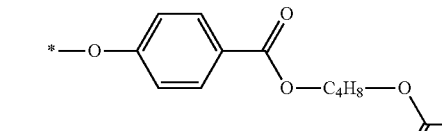
(A32-6) 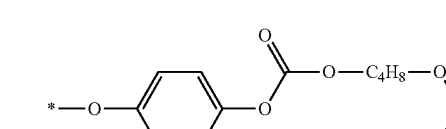
(A32-7) 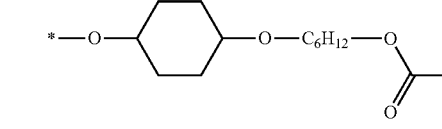

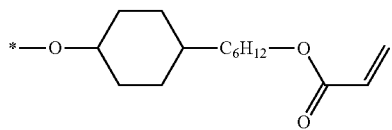
(A32-8)
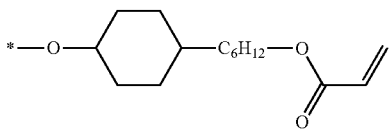
(A33-8)
[Chem. 161]
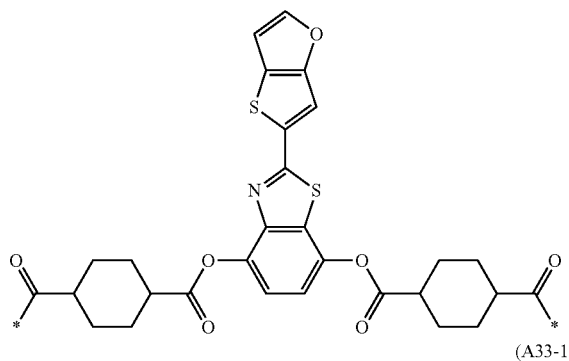
(A33-1)
[Chem. 162]
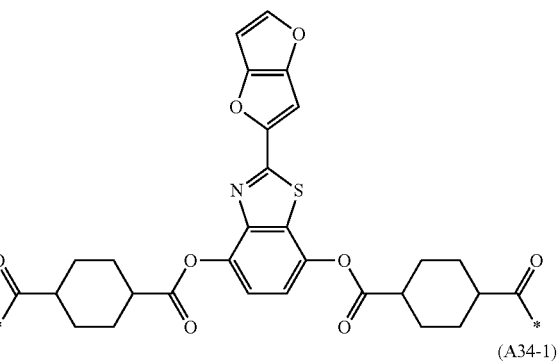
(A34-1)
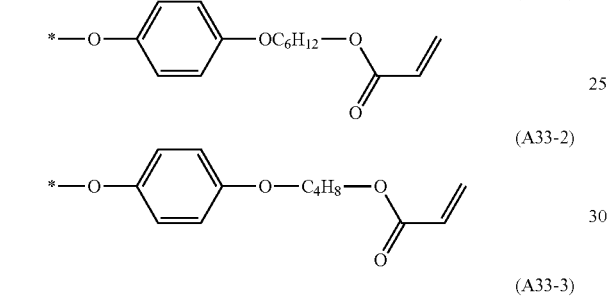
(A33-2)
(A33-3)
(A33-4)
(A33-5)
(A33-6)
(A33-7)
(A34-2)
(A34-3)
(A34-4)
(A34-5)
(A34-6)
(A34-7)

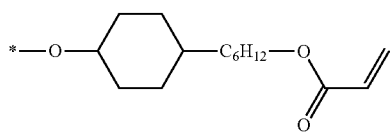
(A34-8)
[Chem. 163]
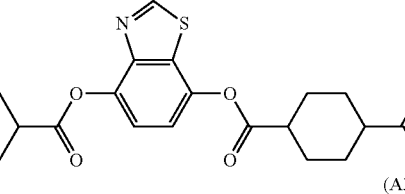
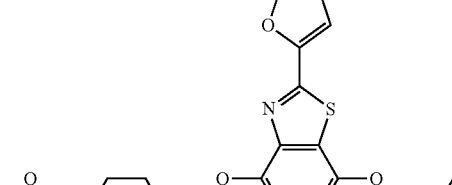
(A35-1)
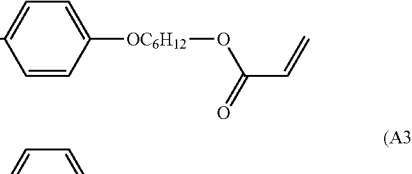
(A35-2)
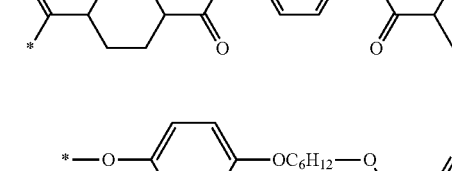
(A35-3)
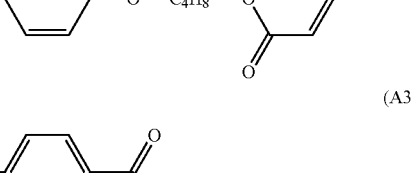
(A35-4)
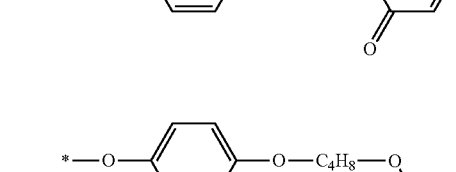
(A35-5)
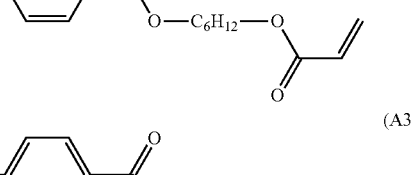
(A35-6)
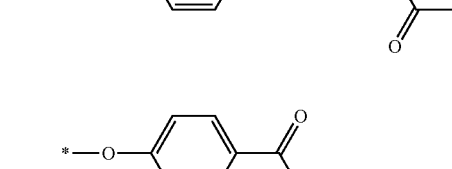
(A35-7)
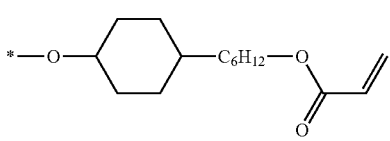
(A35-8)
[Chem. 164]
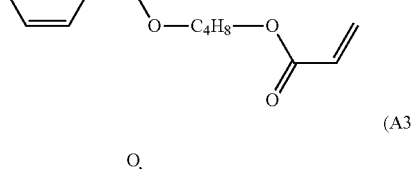
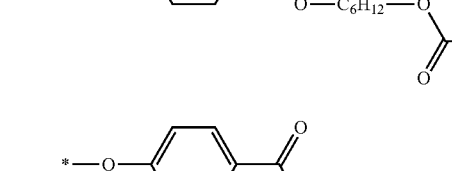
(A36-1)
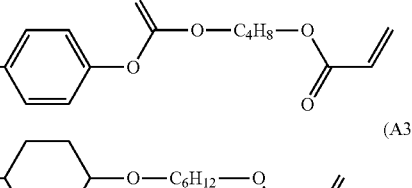
(A36-2)
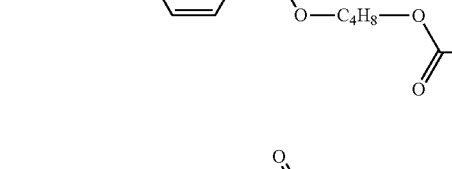
(A36-3)
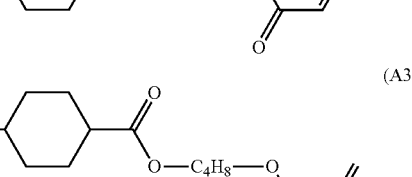
(A36-4)
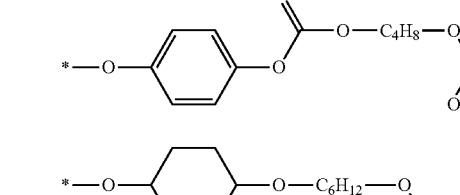
(A36-5)
(A36-6)

[Chem. 165]

(A36-7)

(A36-8)

[Chem. 166]

(A37-7)

(A37-8)

(A37-1)

(A37-2)

(A37-3)

(A37-4)

(A37-5)

(A37-6)

(A38-1)

(A38-2)

(A38-3)

(A38-4)

(A38-5)

(A38-6)

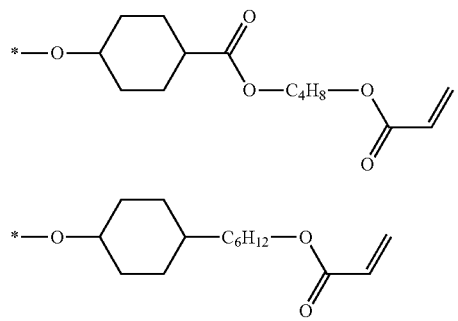

-continued
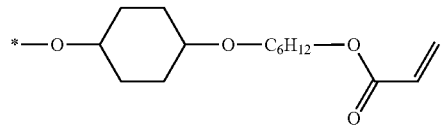
(A40-6)
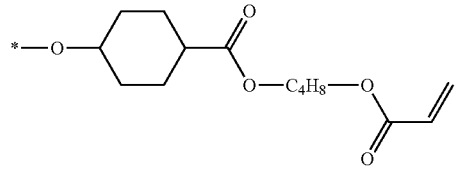
(A40-7)
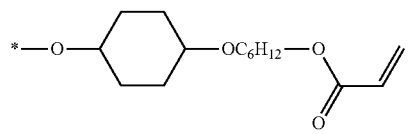
(A40-8)
[Chem. 169]
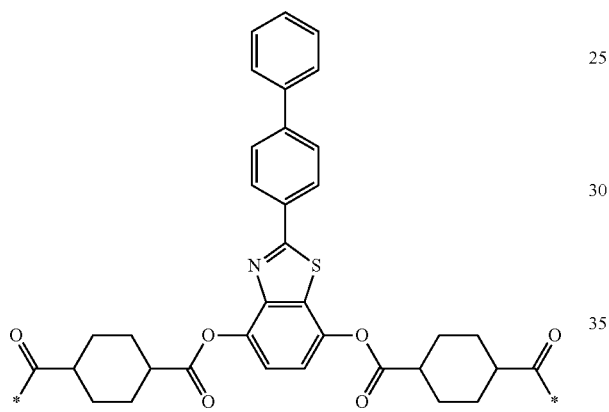
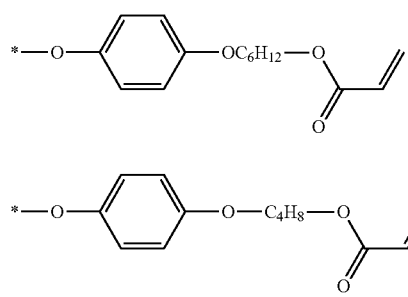
(A41-1)
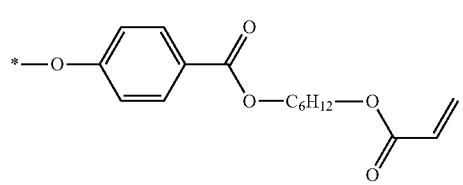
(A41-2)
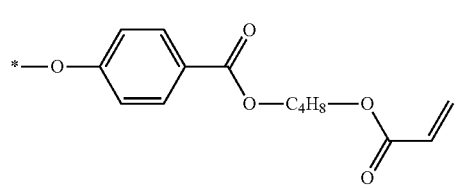
(A41-3)
(A41-4)
-continued
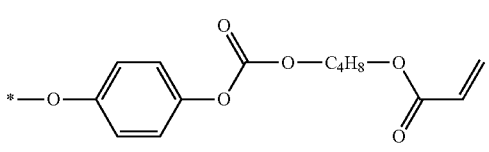
(A41-5)
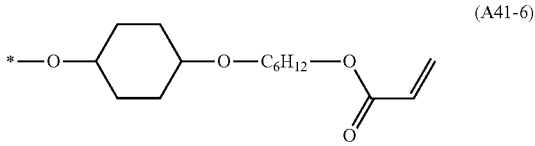
(A41-6)
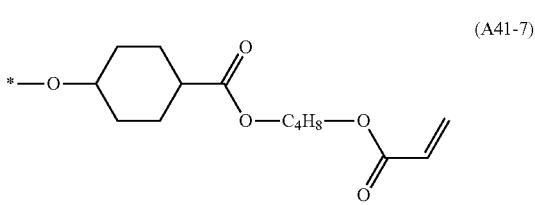
(A41-7)
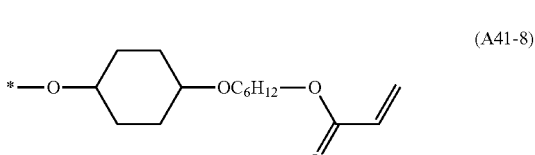
(A41-8)
[Chem. 170]
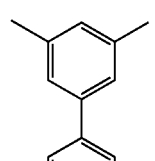
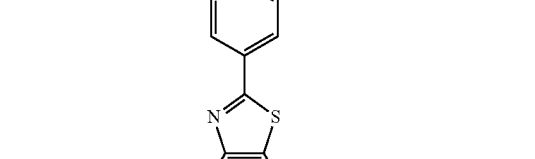
(A42-1)
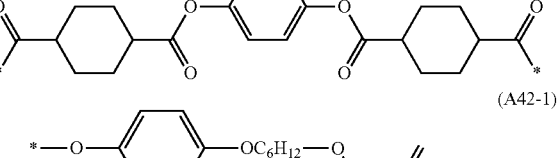
(A42-2)
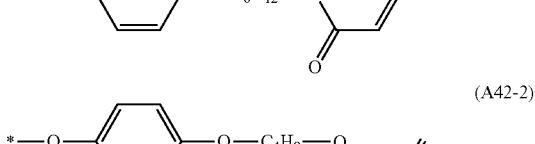
(A42-3)
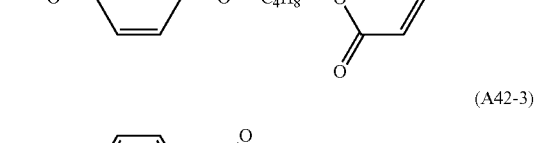
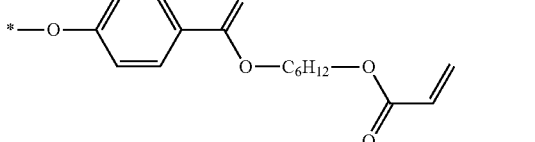

(A42-4)
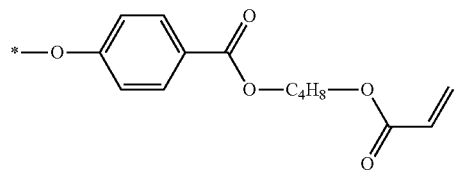
(A42-5)
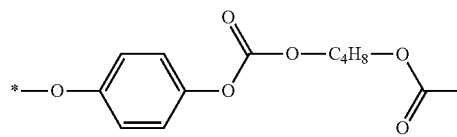
(A42-6)
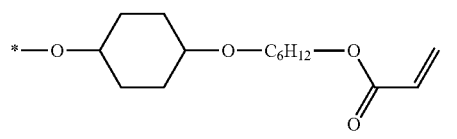
(A42-7)
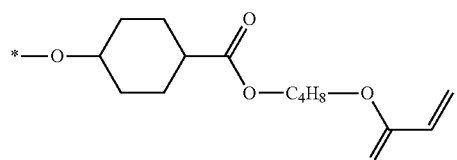
(A42-8)
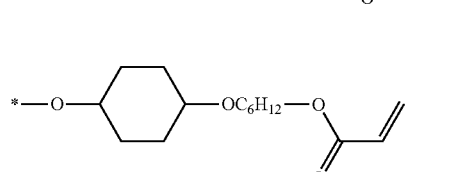
[Chem. 171]
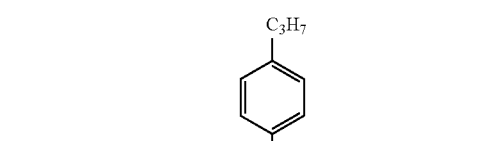
(A43-1)
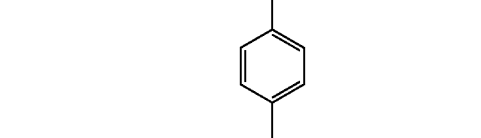
(A43-2)
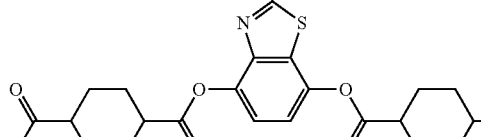
(A43-3)
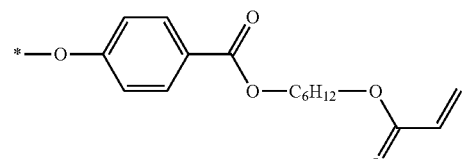
(A43-4)
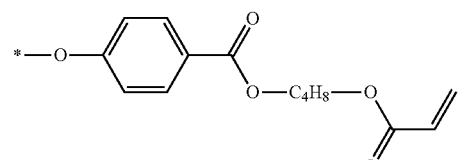
(A43-5)
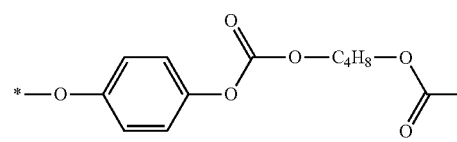
(A43-6)
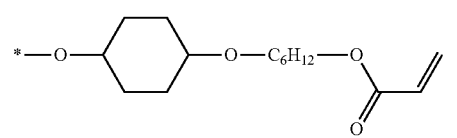
(A-43-7)
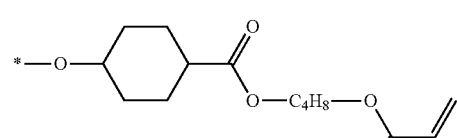
(A43-8)
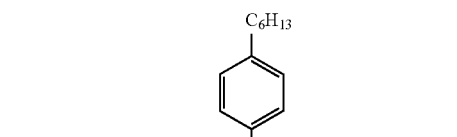
[Chem. 172]
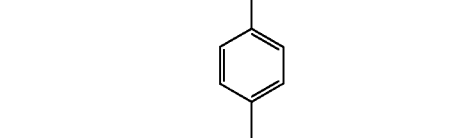
(A44-1)
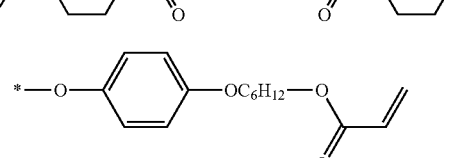

(A44-2) 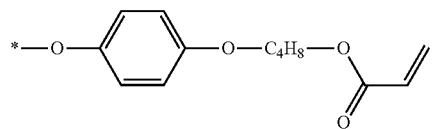
(A44-3) 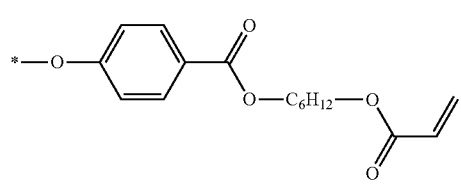
(A44-4) 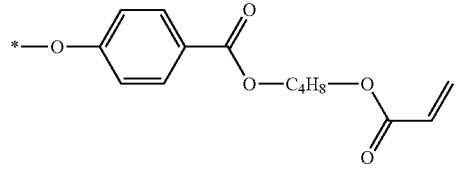
(A44-5) 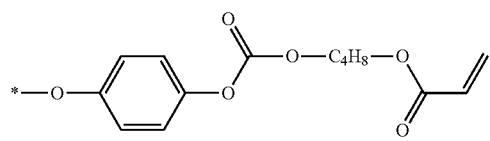
(A44-6) 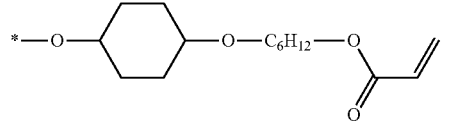
(A44-7) 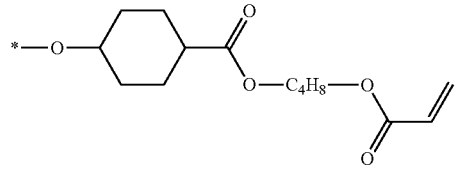
(A44-8) 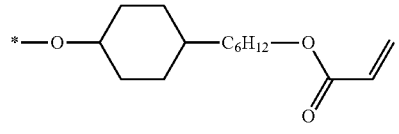
[Chem. 173]
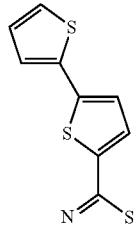
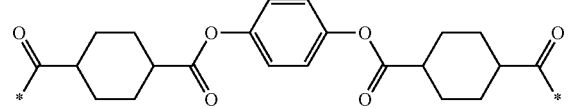
(A45-1) 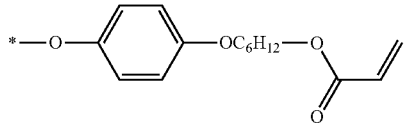
(A45-2) 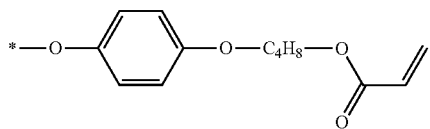
(A45-3) 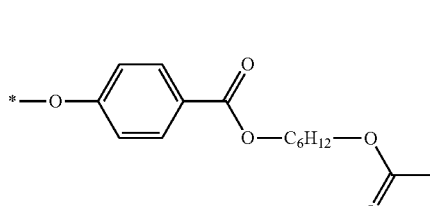
(A45-4) 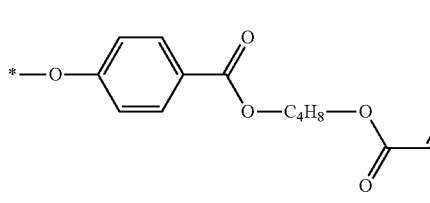
(A45-5) 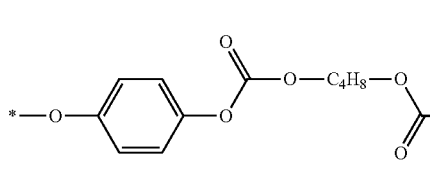
(A45-6) 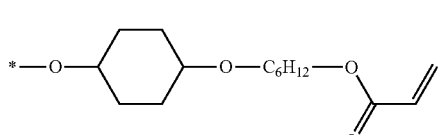
(A45-7) 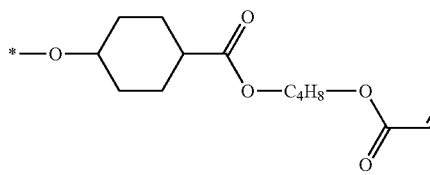
(A45-8) 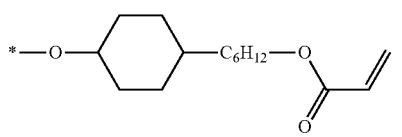

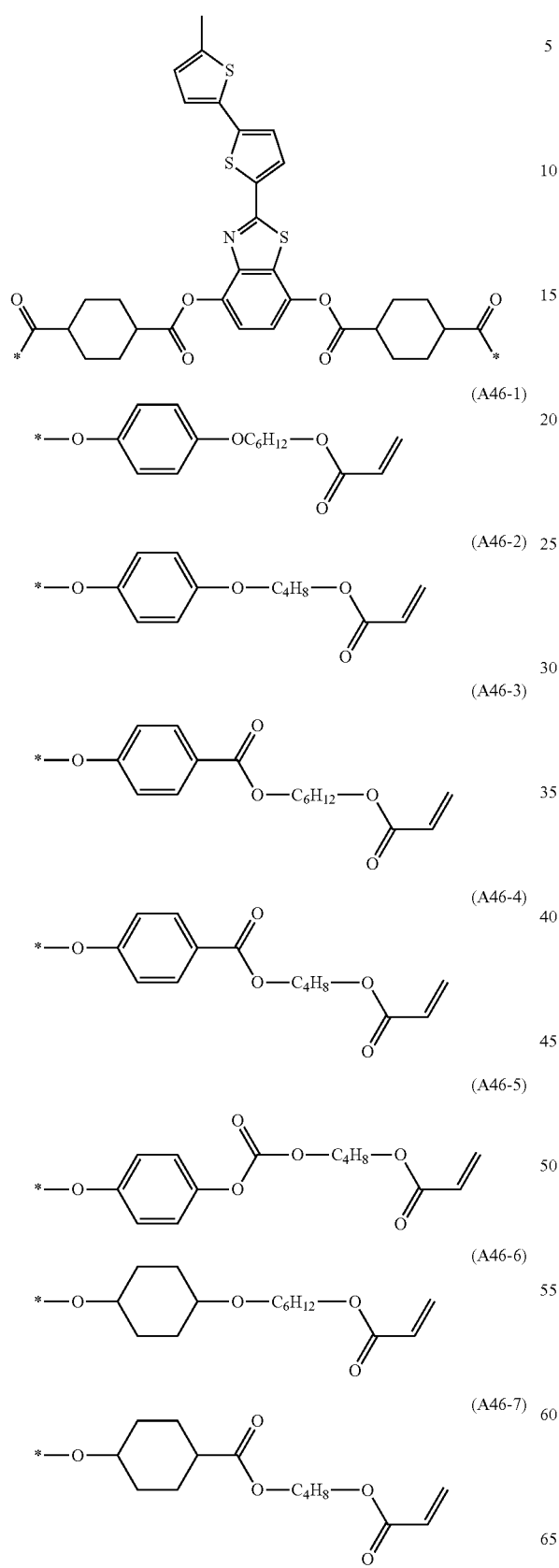
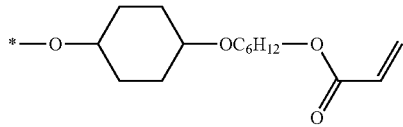
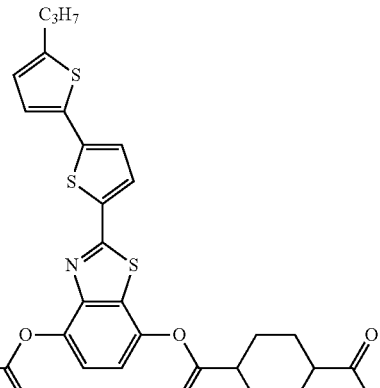

-continued
(A47-7) 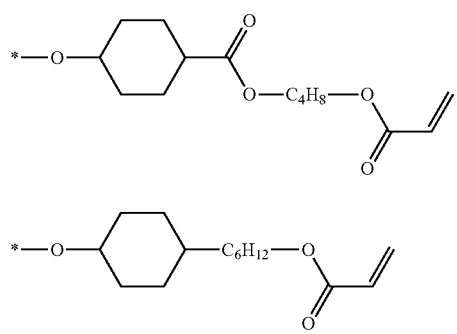
(A47-8)
[Chem. 176]
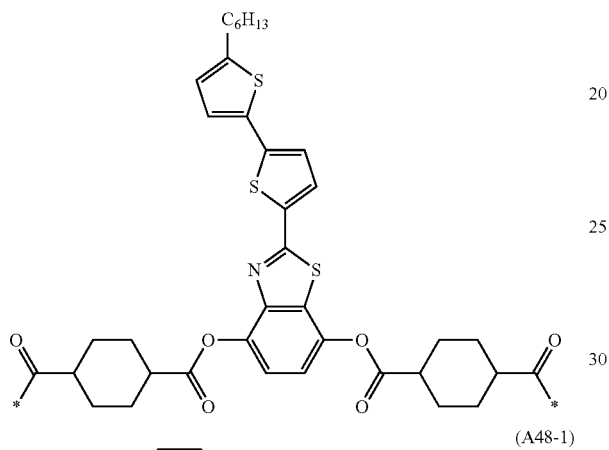
(A48-1)
(A48-2)
(A48-3)
(A48-4)
(A48-5)
-continued
(A48-6) 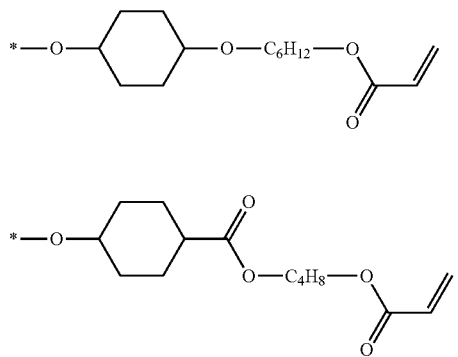
(A48-7)
(A48-8)
[Chem. 177]
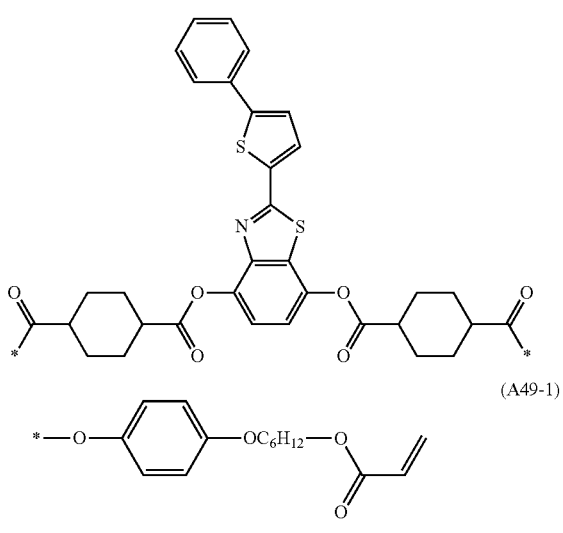
(A49-1)
(A49-2)
(A49-3)
(A49-4)
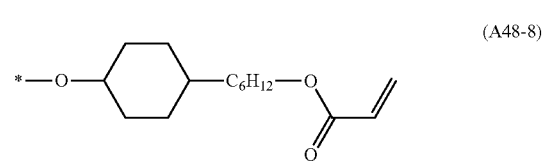
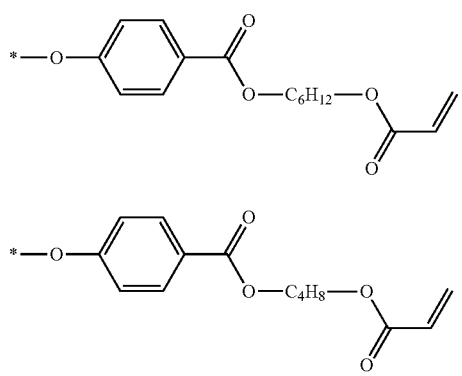

-continued
(A49-5)
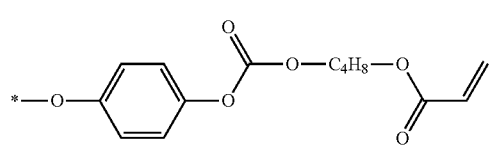
(A49-6)
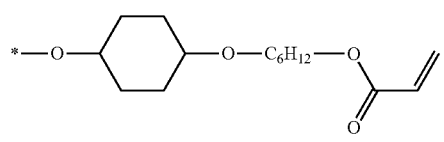
(A49-7)
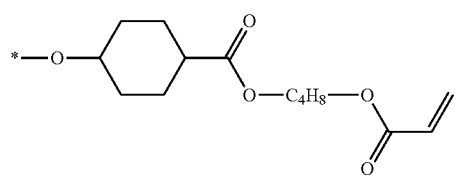
(A49-8)
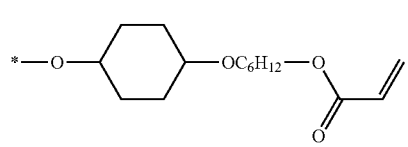
[Chem. 178]
(A50-4)
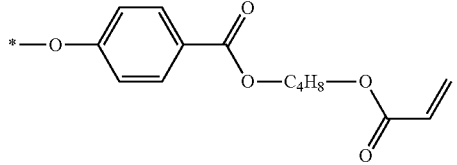
(A50-5)
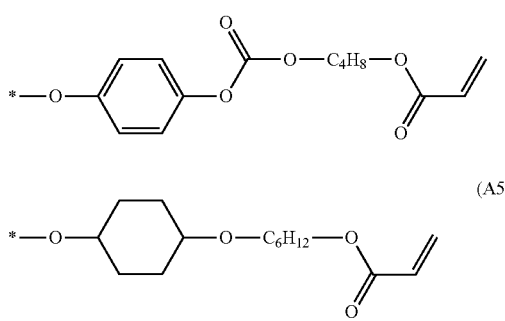
(A50-6)
(A50-7)
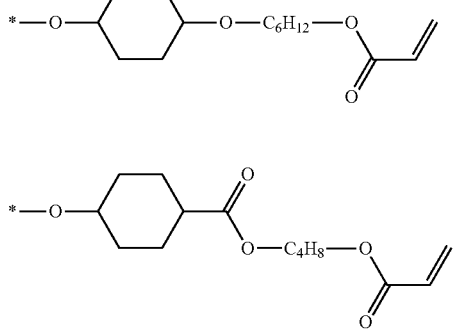
(A50-8)
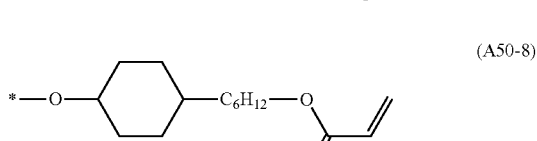
[Chem. 179]
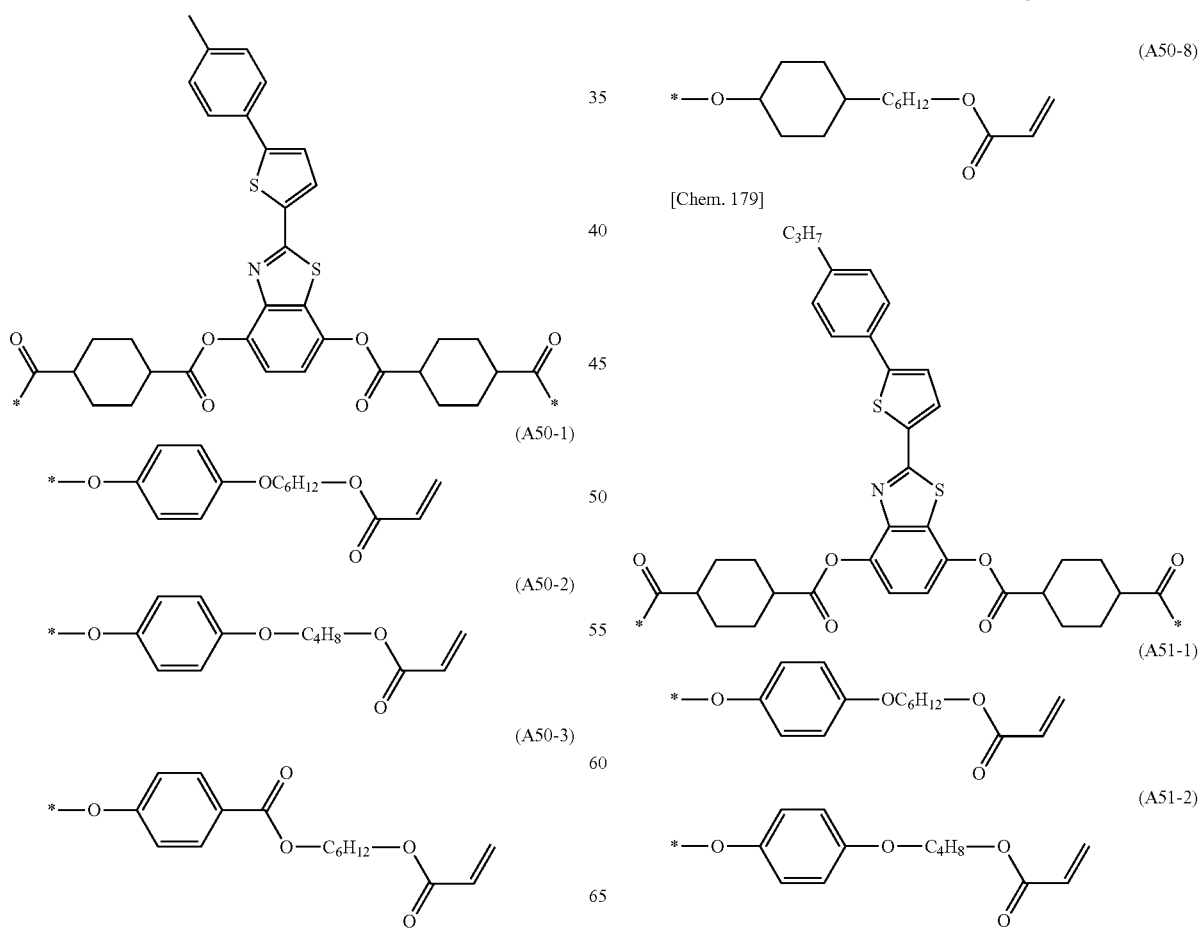
(A50-1)
(A50-2)
(A50-3)
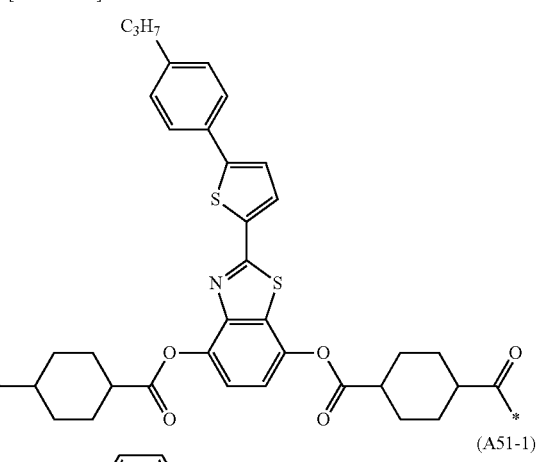
(A51-1)
(A51-2)

(A51-3) 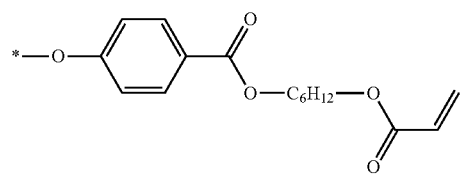
(A51-4) 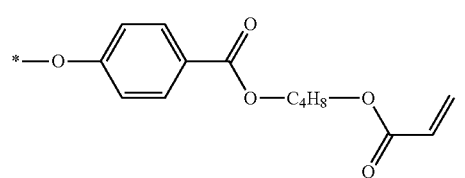
(A51-5) 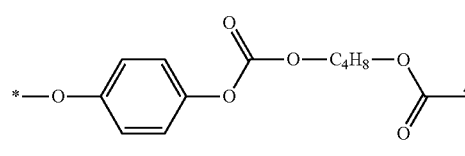
(A51-6) 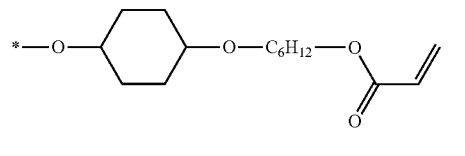
(A51-7) 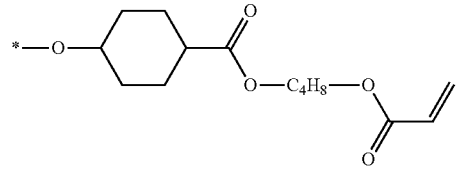
(A51-8) 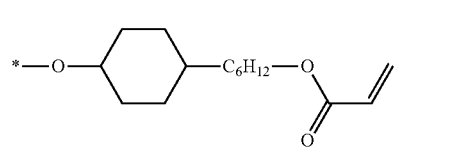
[Chem. 180]
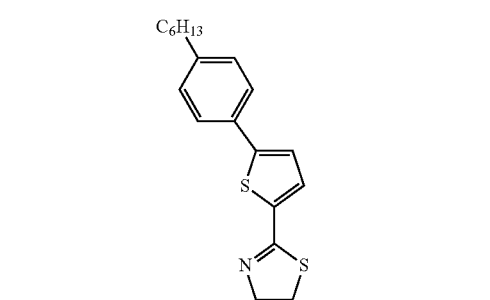
(A52-1) 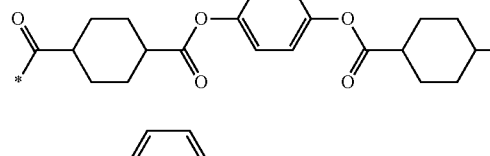
(A52-2) 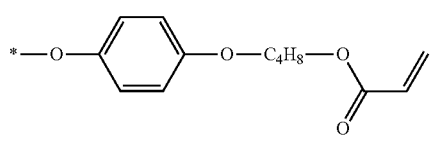
(A52-3) 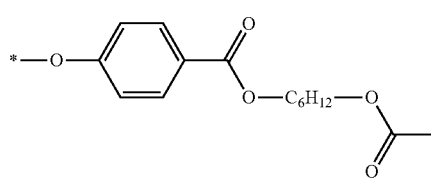
(A52-4) 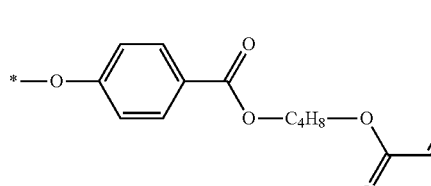
(A52-5) 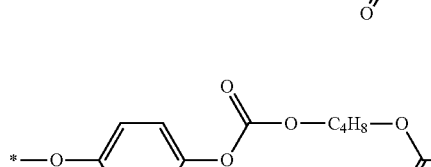
(A52-6) 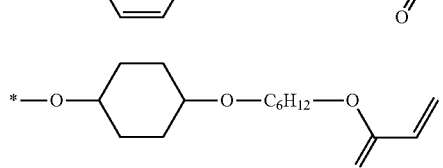
(A52-7) 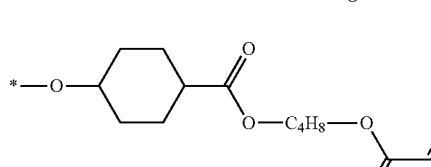
(A52-8) 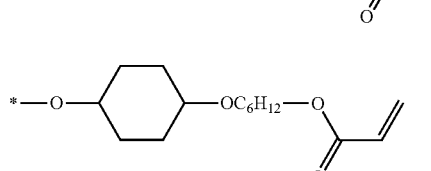
[Chem. 181]
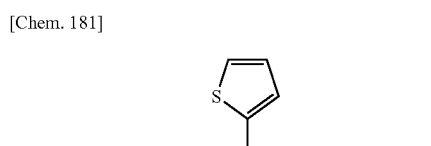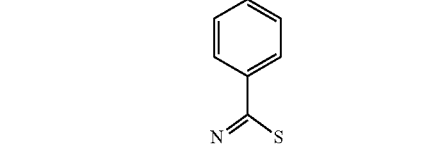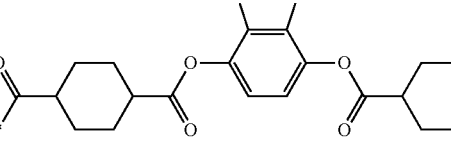

(A53-1) 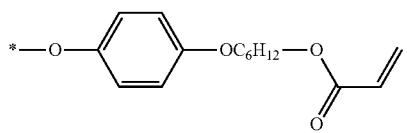
(A53-2) 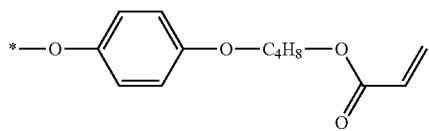
(A53-3) 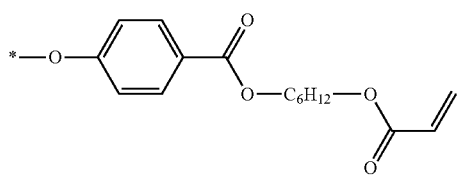
(A53-4) 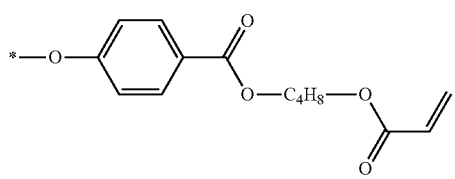
(A53-5) 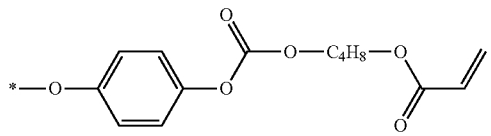
(A53-6) 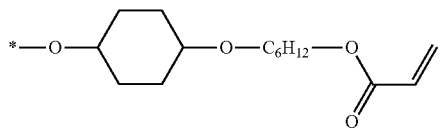
(A53-7) 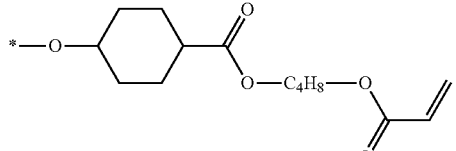
(A53-8) 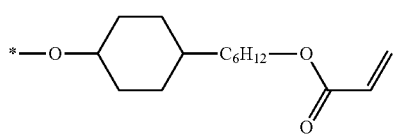
[Chem. 182]
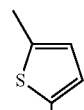
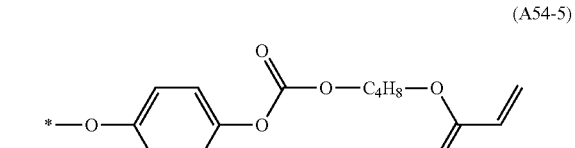
(A54-1)
(A54-2)
(A54-3)
(A54-4)
(A54-5)
(A54-6) 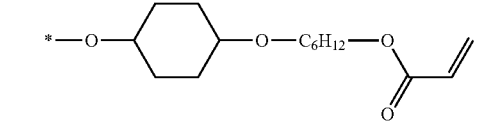
(A54-7) 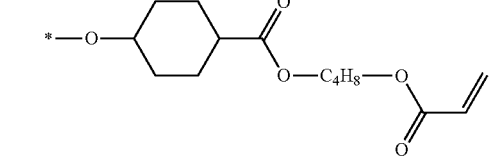

(A54-8)
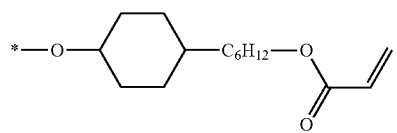
[Chem. 183]
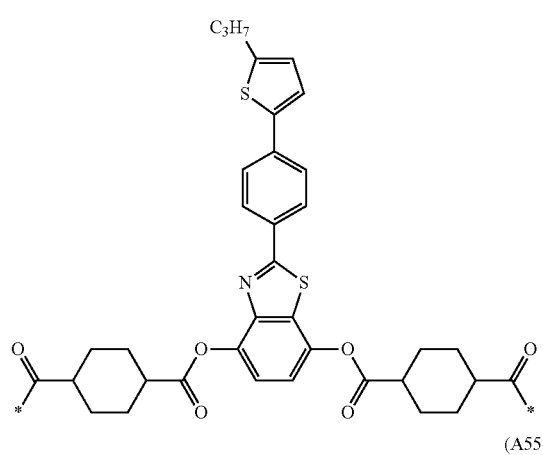
(A55-1)
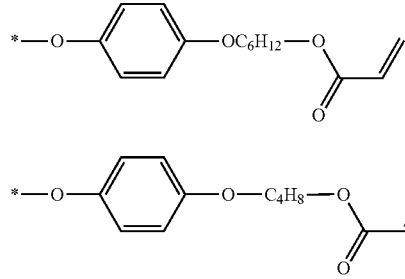
(A55-2)
(A55-3)
(A55-4)
(A55-5)
(A55-6)
(A55-7)
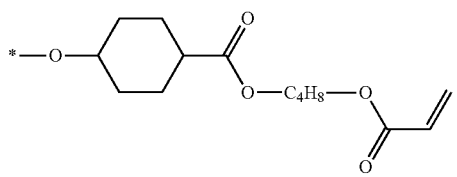
(A55-8)
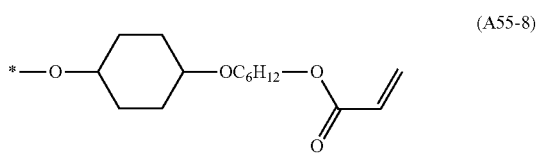
[Chem. 184]
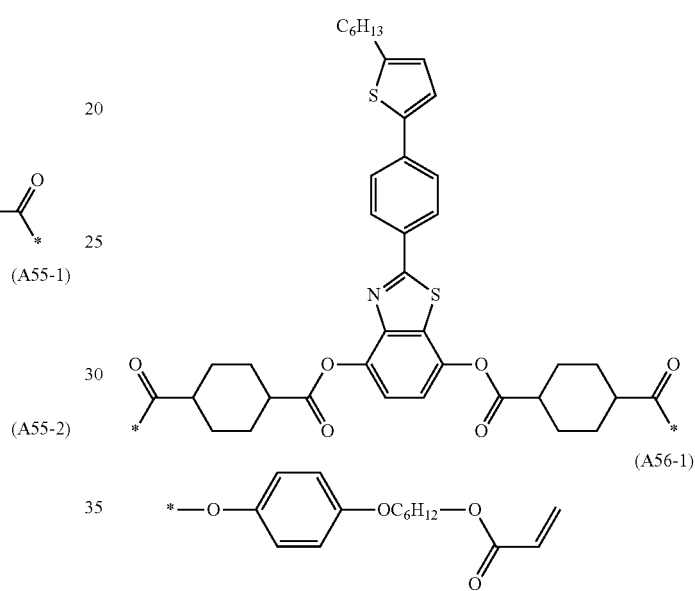
(A56-1)
(A56-2)
(A56-3)
(A56-4)
(A56-5)

(A56-6)
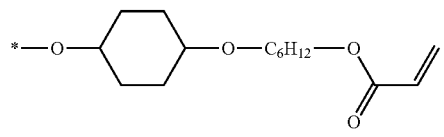
(A56-7)
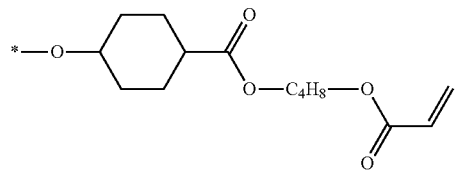
(A56-8)
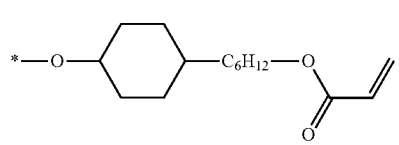
[Chem. 185]
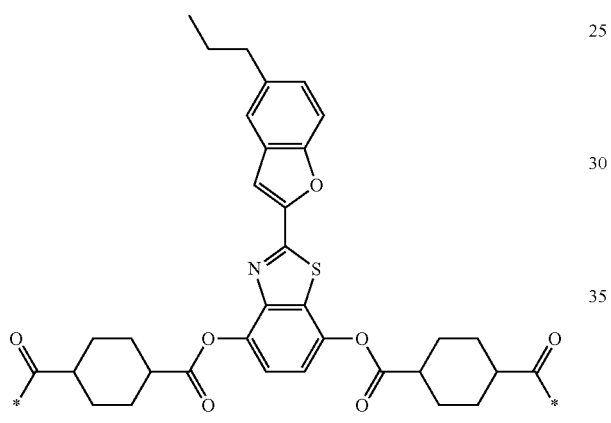
(A57-1)
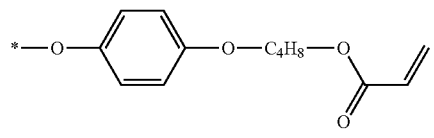
(A57-2)
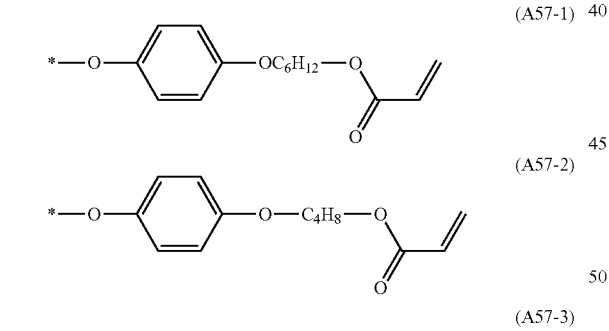
(A57-3)
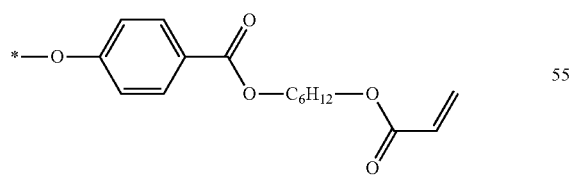
(A57-4)
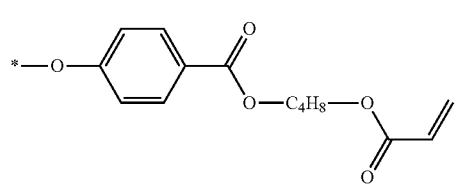
(A57-5)
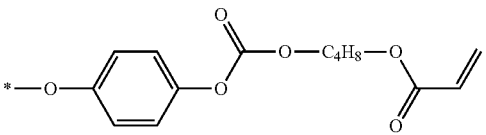
(A57-6)
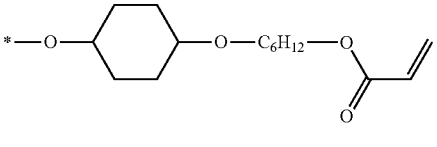
(A57-7)
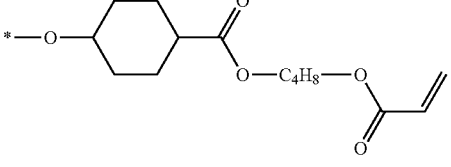
(A57-8)
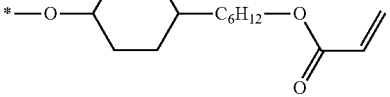
[Chem. 186]
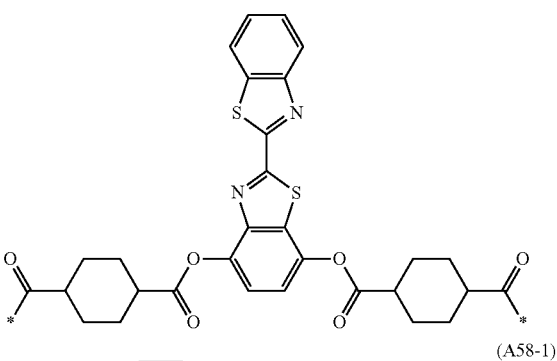
(A58-1)
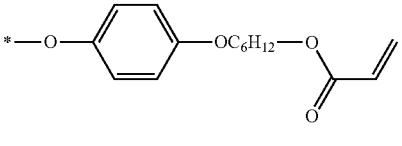
(A58-2)
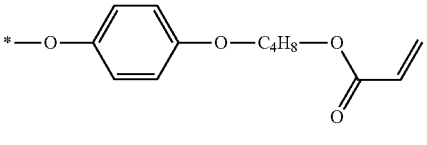
(A58-3)
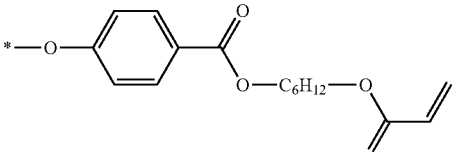
(A58-4)

(A58-5)
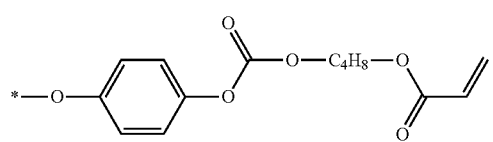
(A58-6)
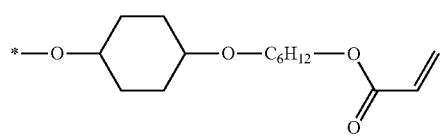
(A58-7)
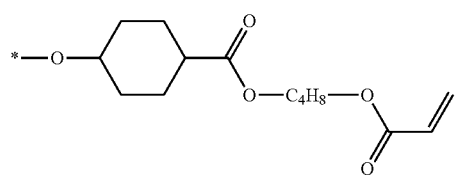
(A58-8)
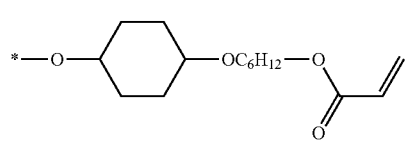
[Chem. 187]
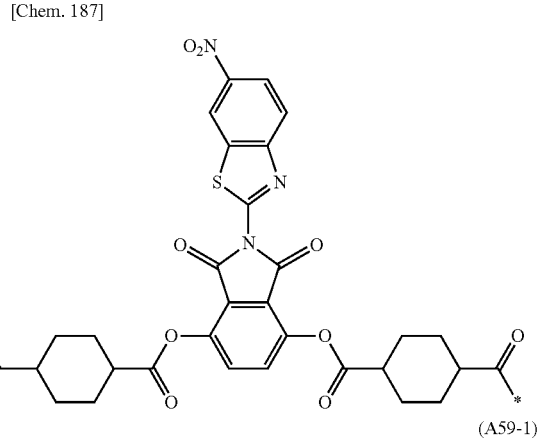
(A59-1)
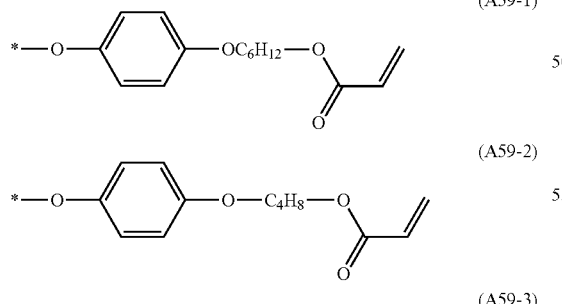
(A59-2)
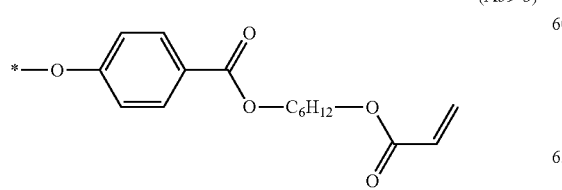
(A59-3)
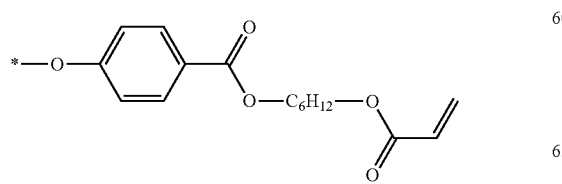
(A59-4)
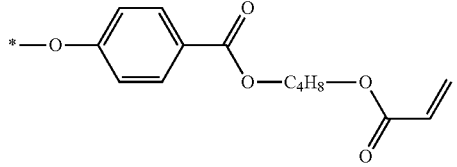
(A59-5)
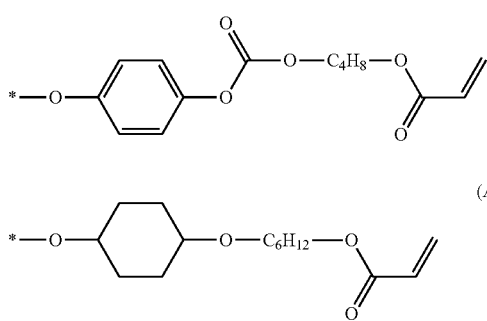
(A59-6)
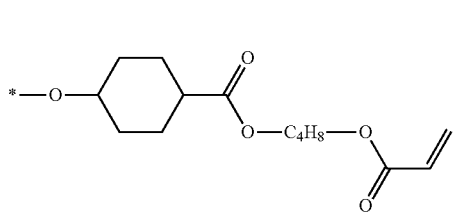
(A59-7)
(A59-8)
[Chem. 188]
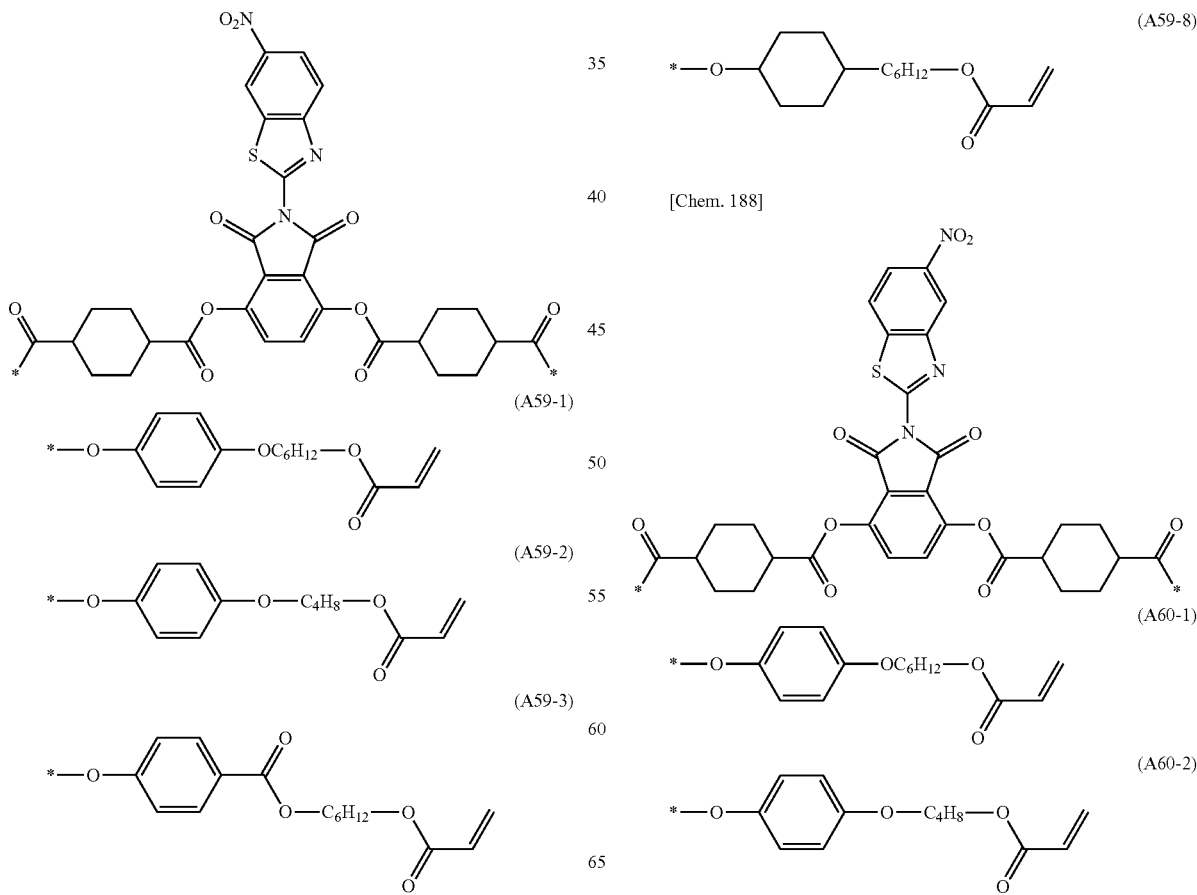
(A60-1)
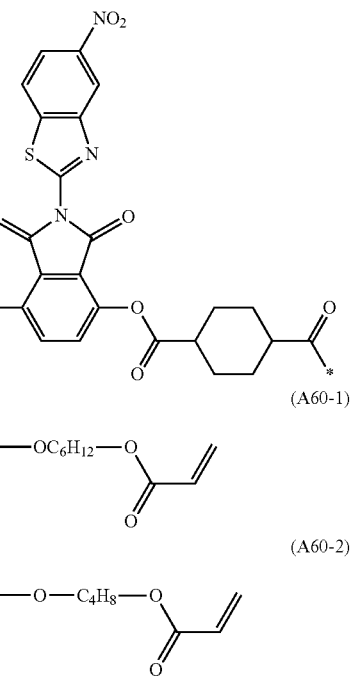
(A60-2)

(A60-3)
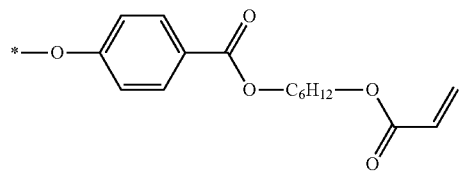
(A60-4)
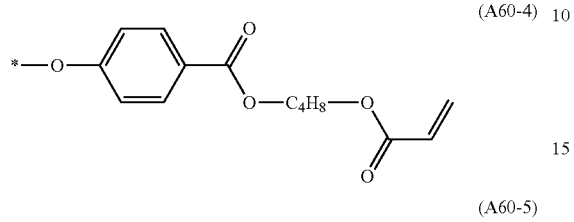
(A60-5)
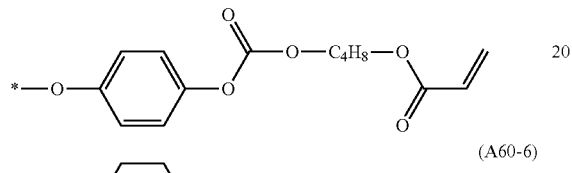
(A60-6)
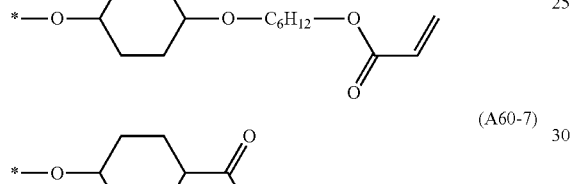
(A60-7)
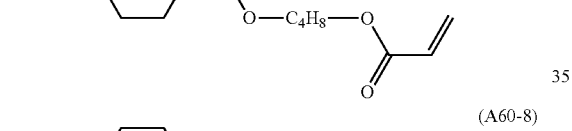
(A60-8)
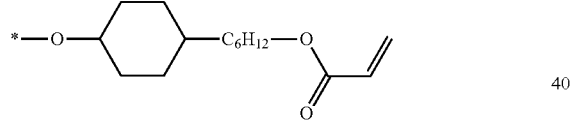
[Chem. 189]
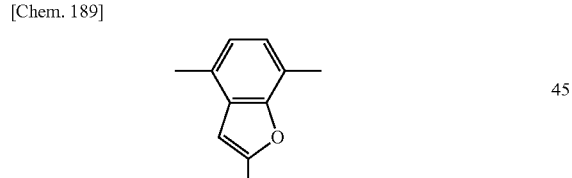
(A61-1)
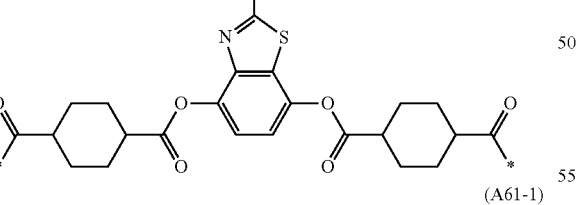
(A61-2)
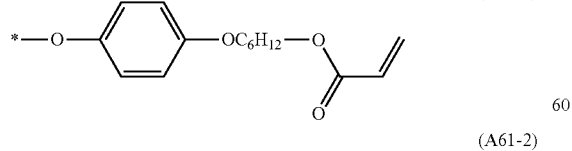
(A61-3)
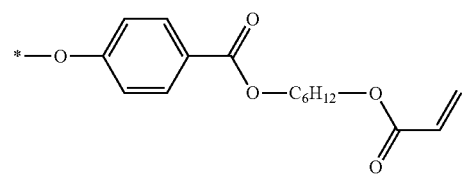
(A61-4)
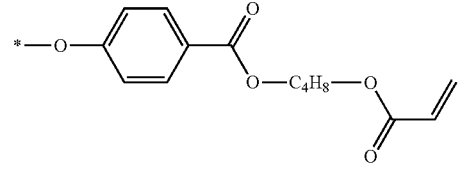
(A61-5)
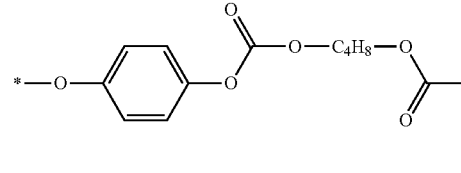
(A61-6)
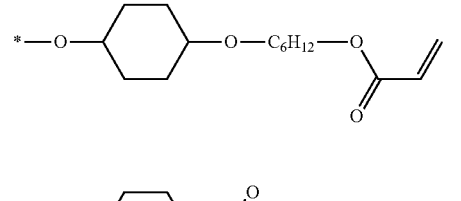
(A61-7)
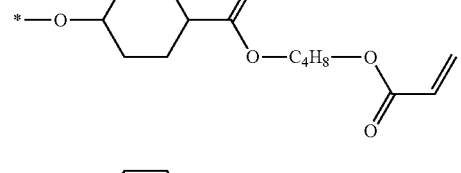
(A61-8)
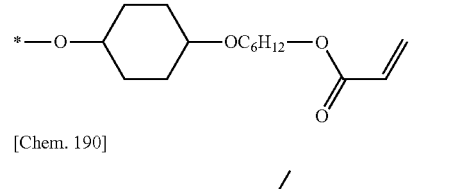
[Chem. 190]
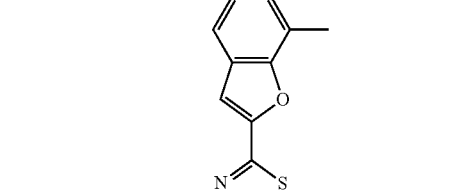
(A62-1)
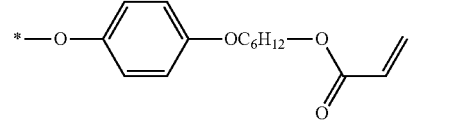

-continued
(A62-2) 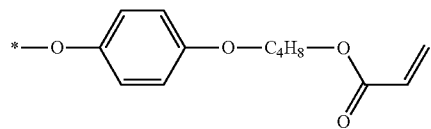
(A62-3) 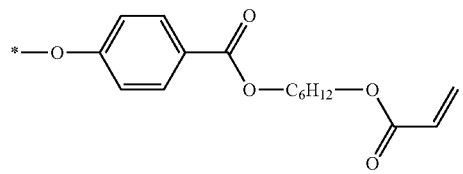
(A62-4) 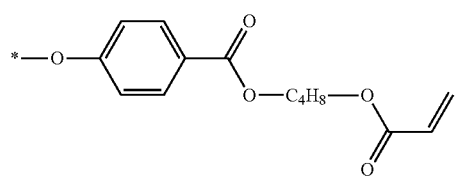
(A62-5) 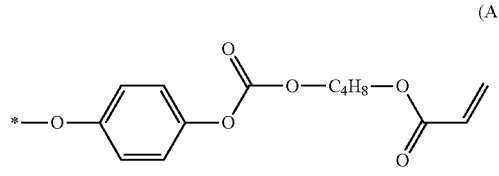
(A62-6) 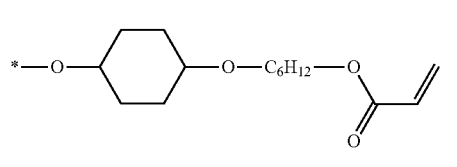
(A62-7) 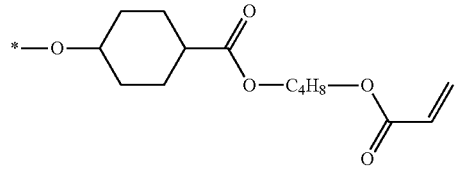
(A62-8) 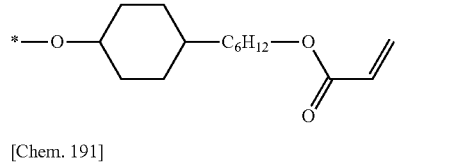
[Chem. 191]
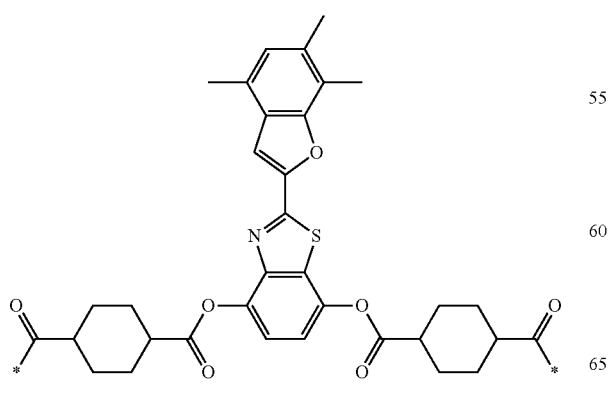
-continued
(A63-1) 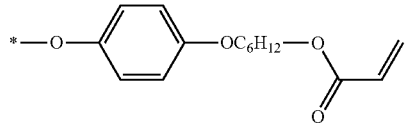
(A63-2) 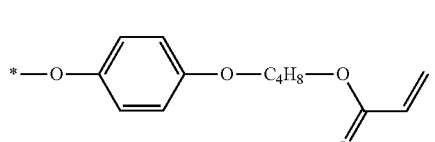
(A63-3) 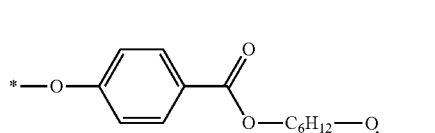
(A63-4) 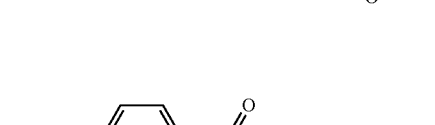
(A63-5) 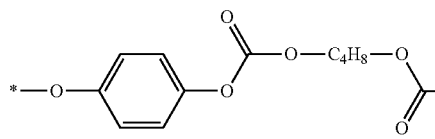
(A63-6) 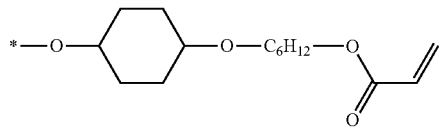
(A63-7) 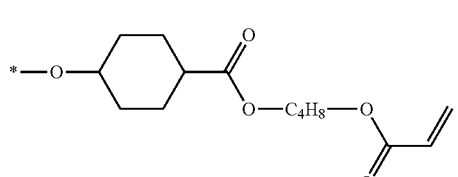
(A63-8) 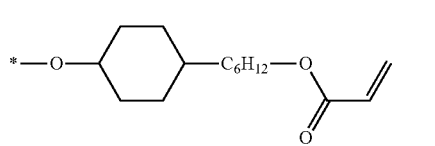

[Chem. 192]
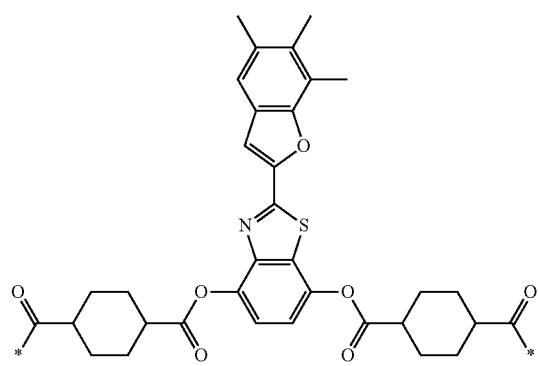
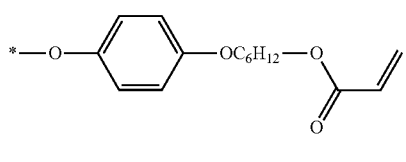
(A64-1)
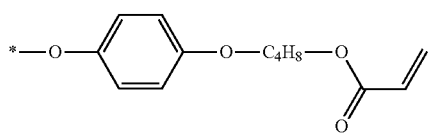
(A64-2)
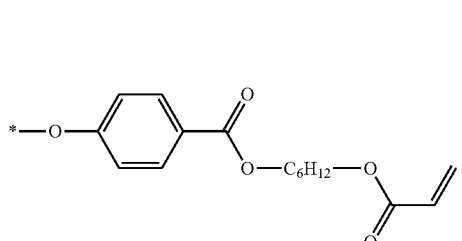
(A64-3)
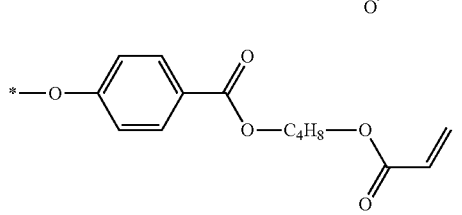
(A64-4)
(A64-5)
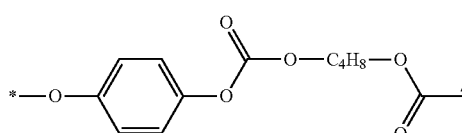
(A64-6)
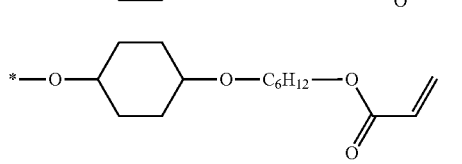
(A64-7)
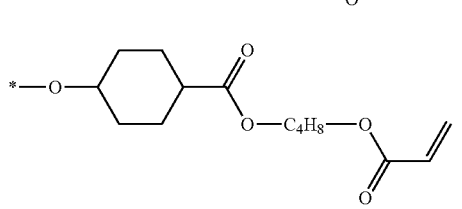
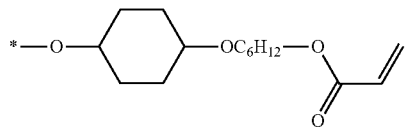
(A64-8)
[Chem. 193]
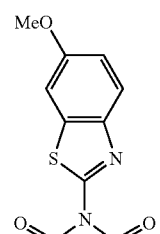
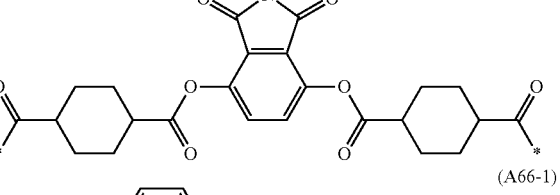
(A66-1)
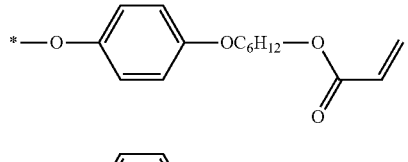
(A66-2)
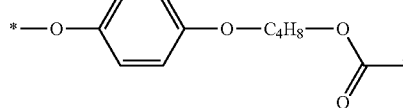
(A66-3)
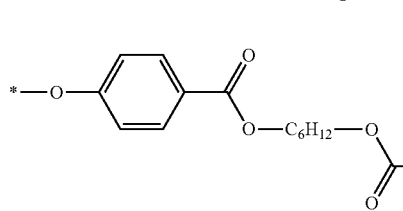
(A66-4)
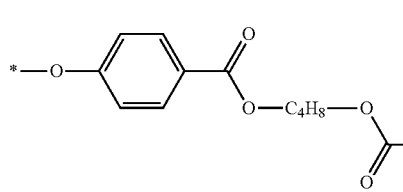
(A66-5)
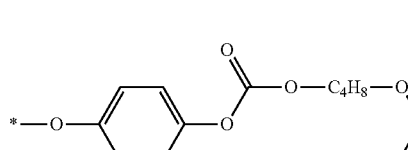
(A66-6)
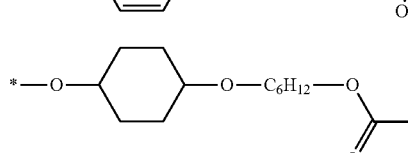
(A70-2)
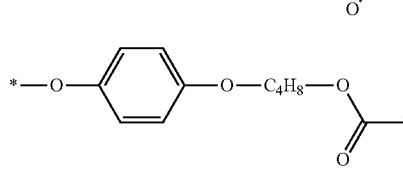

(A70-3) 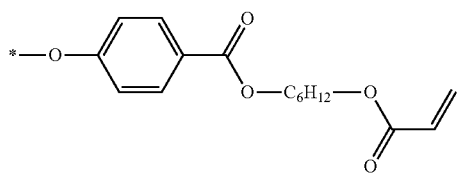

(A70-4) 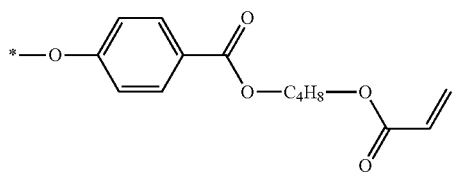

(A70-5) 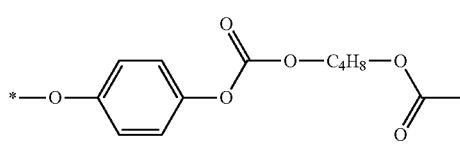

(A70-6) 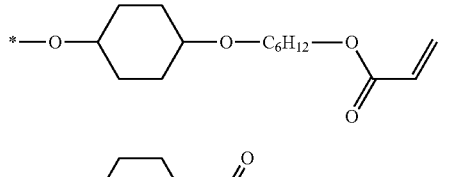

(A70-7) 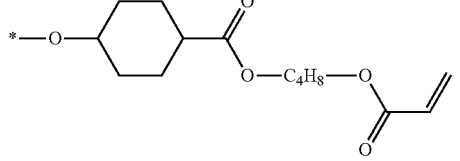

(A70-8) 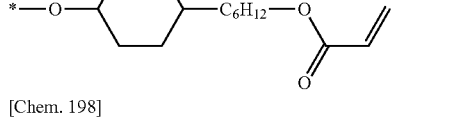

[Chem. 198]

(A71-1) 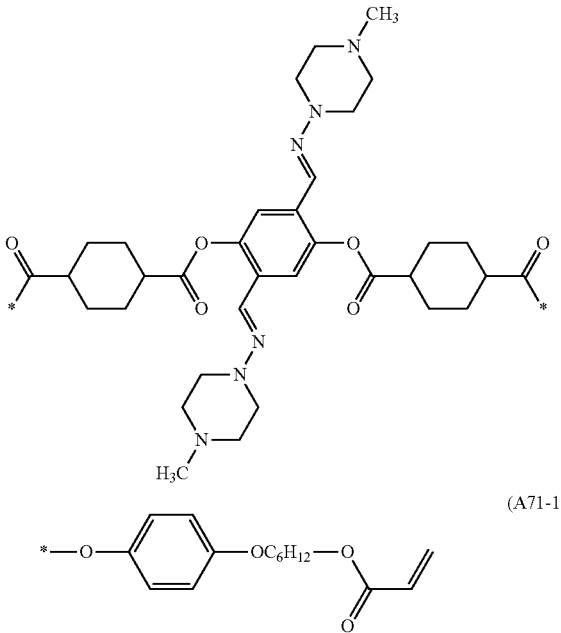

(A71-2) 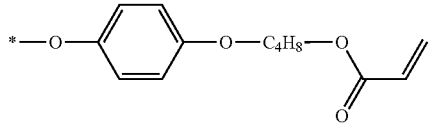

(A71-3) 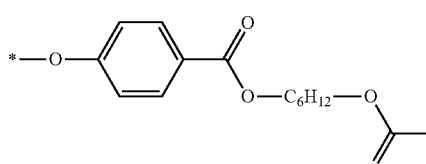

(A71-4) 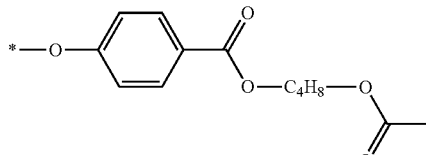

(A71-5) 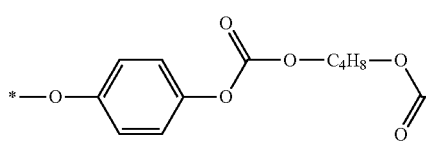

(A71-6) 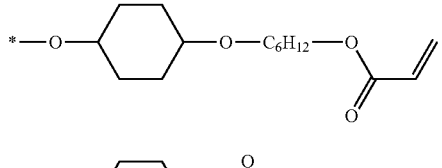

(A71-7) 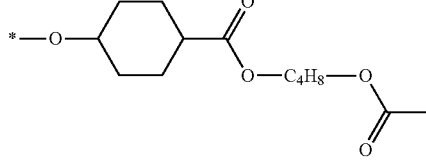

(A71-8) 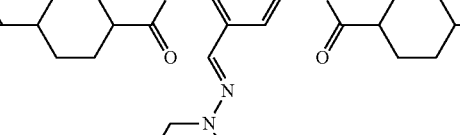

The method for producing polymerizable liquid crystal compound (A) is not particularly limited, and polymerizable liquid crystal compound (A) can be produced by appropriately combining known organic synthesis reactions described in Methoden der Organischen Chemie, Organic Reactions, Organic Syntheses, Comprehensive Organic Synthesis, Shin Jikken Kagaku Koza, etc. (e.g., a condensation reaction, an esterification reaction, Williamson reaction, Ullmann reaction, Wittig reaction, Schiff base formation reaction, benzylation reaction, Sonogashira reaction, Suzuki-Miyaura reaction, Negishi reaction, Kumada reaction, Hiyama reaction, Buchwald-Hartwig reaction, Friedel-Crafts reaction, Heck reaction, aldol reaction, etc.) depending on its structure.

For example, a polymerizable liquid crystal compound (in the case of satisfying the relation of m=n in the formula) represented by the following formula (A-1):

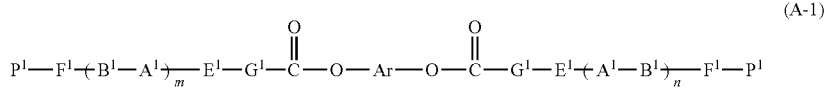

(A-1)

which is one kind of polymerizable liquid crystal compound (A) can be produced by conducting an esterification reaction of an alcohol compound (B) represented by formula (B):

[Chem. 200]

(B)

and a carboxylic acid compound (C) represented by formula (C):

[Chem. 201]

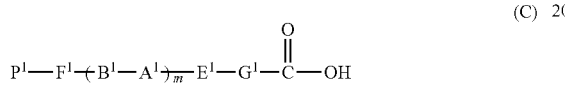

(C)

$Ar$, $A^1$, $B^1$, $E^1$, $F^1$, $G^1$, $P^1$, m, and n in the above formulae (A-1), (B), and (C) are the same as those defined in the above-mentioned polymerizable liquid crystal compound (A).

Alcohol compound (B) may be a compound in which two hydroxyl groups are bonded to an aromatic group of Ar. The aromatic group of Ar is the same as defined above, and examples thereof include compounds in which two * portions each refer to a hydroxyl group in the above formulae (Ar-1) to (Ar-14).

Examples of carboxylic acid compound (c) include the following compounds.

[Chem. 202]

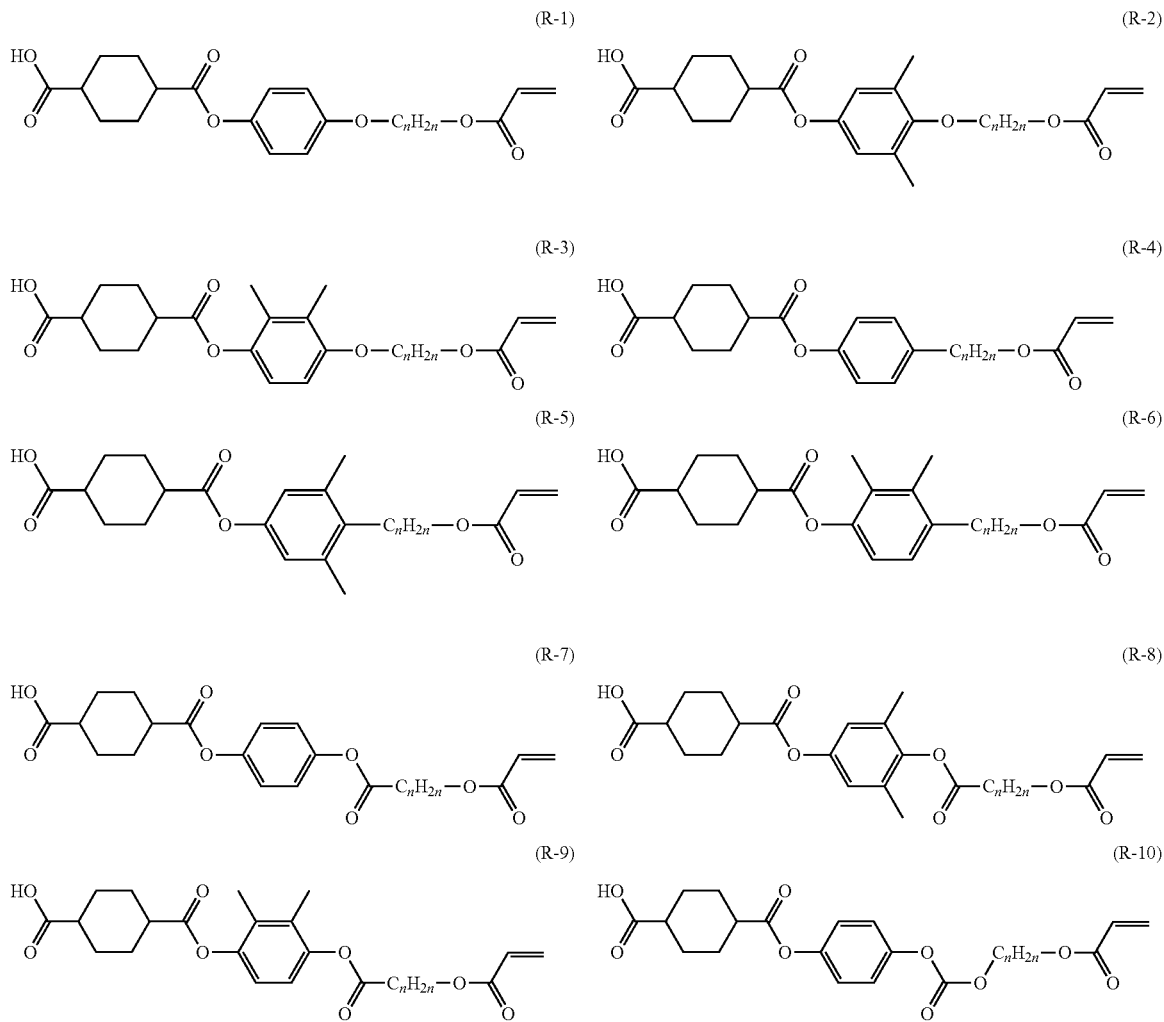

-continued
(R-11)
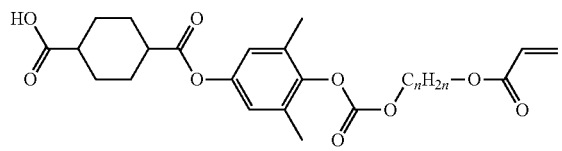
(R-12)
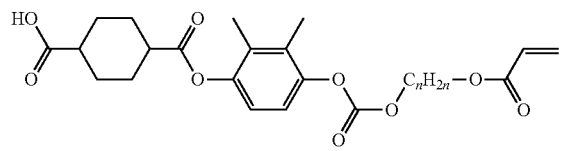
(R-13)
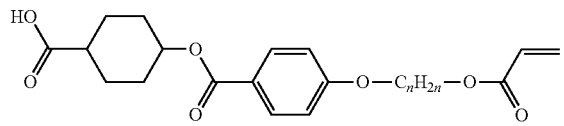
(R-14)
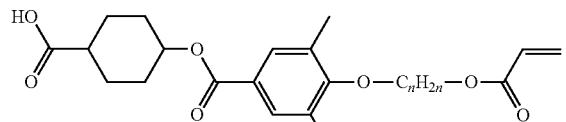
(R-15)
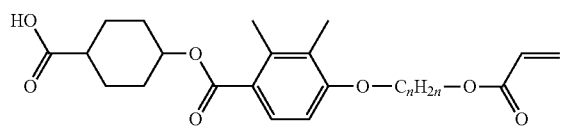
(R-16)
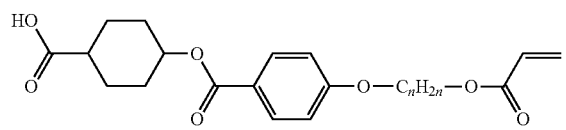
(R-17)
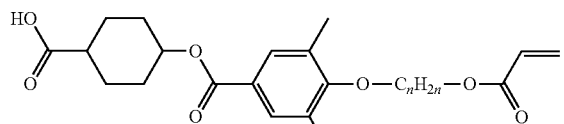
(R-18)
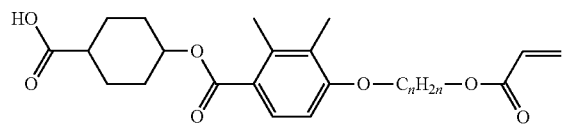
(R-19)
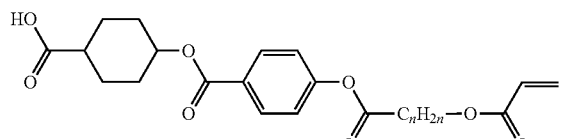
(R-20)
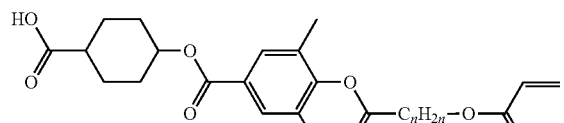
(R-21)
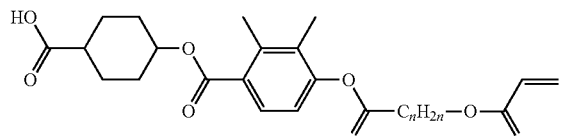
(R-22)
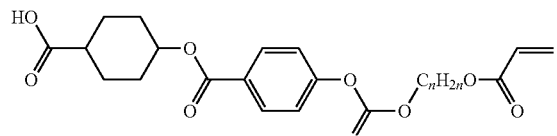
(R-23)
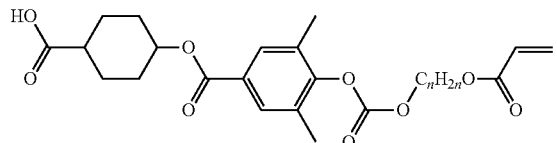
(R-24)
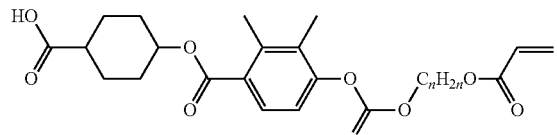
[Chem. 203]
(R-25)
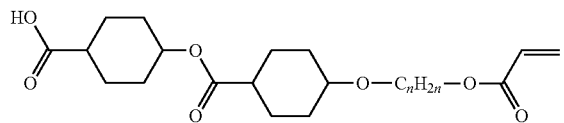
(R-26)
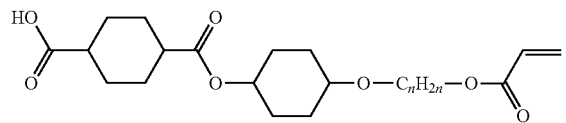
(R-27)
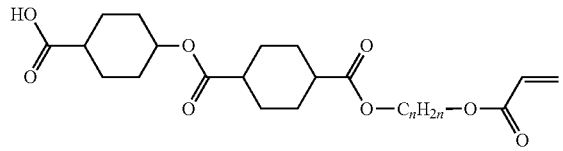
(R-28)
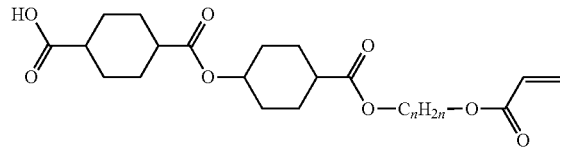

-continued
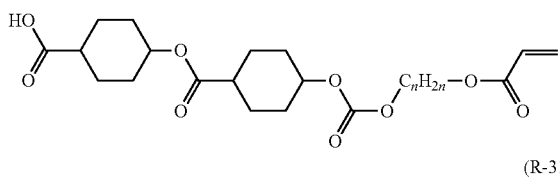 (R-29)
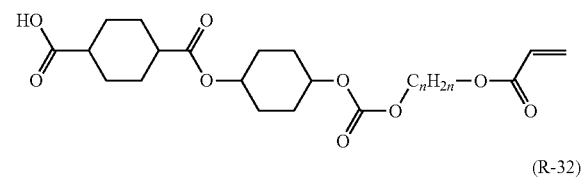 (R-30)
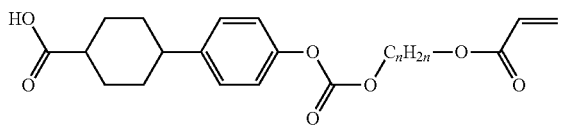 (R-31)
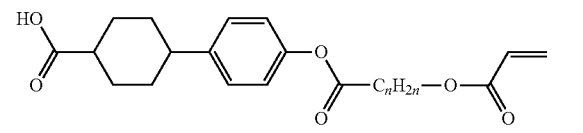 (R-32)
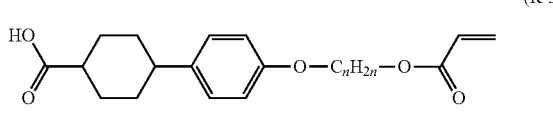 (R-33)
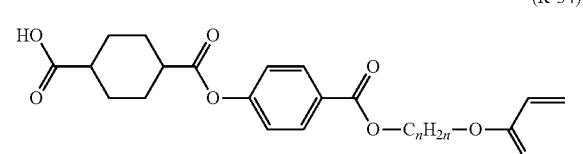 (R-34)
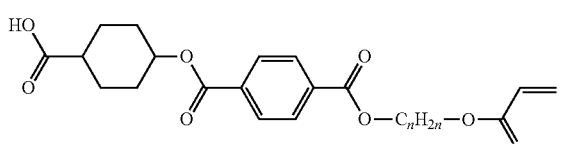 (R-35)
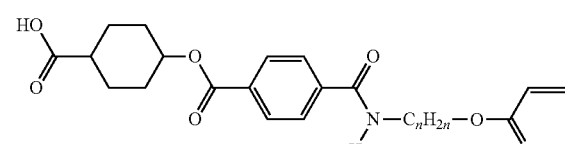 (R-36)
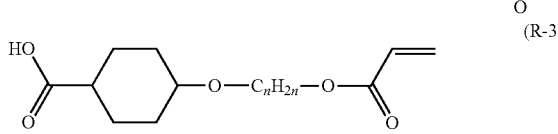 (R-37)
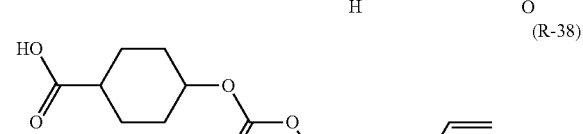 (R-38)
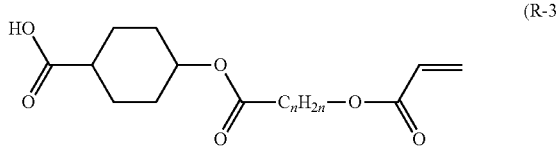 (R-39)
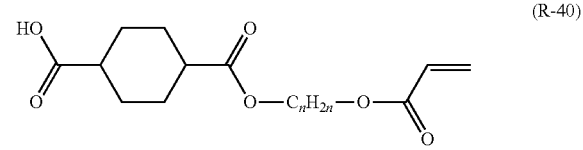 (R-40)
[Chem. 204]
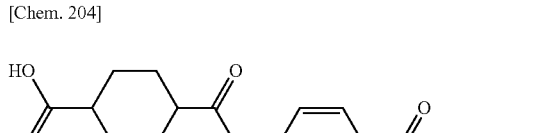 (R-41)
(R-42)
(R-43)

-continued
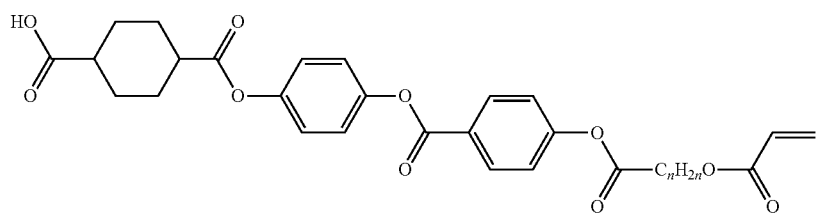
(R-44)
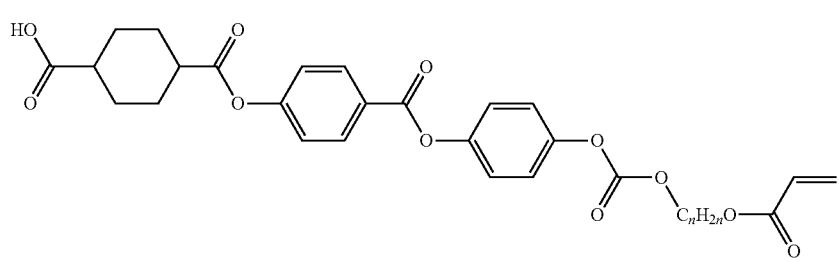
(R-45)
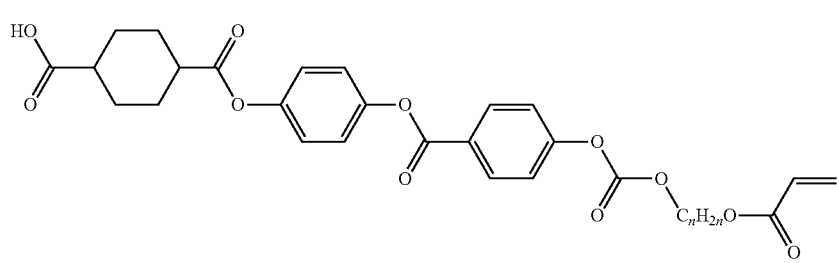
(R-46)
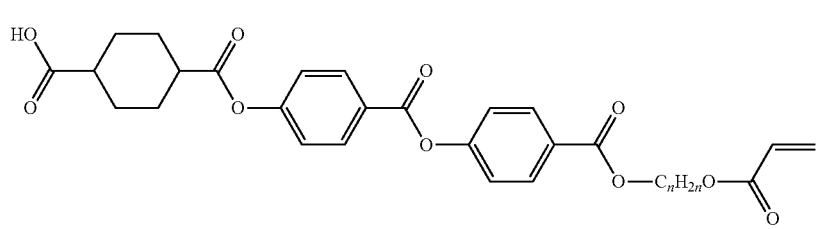
(R-47)
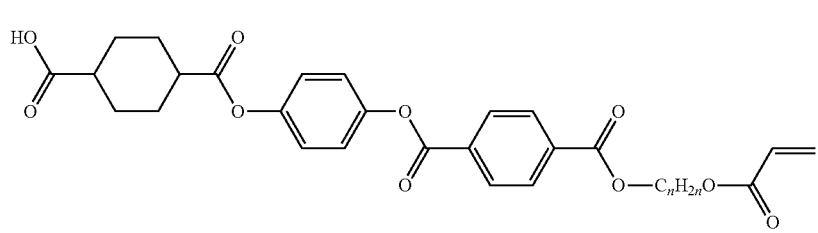
(R-48)
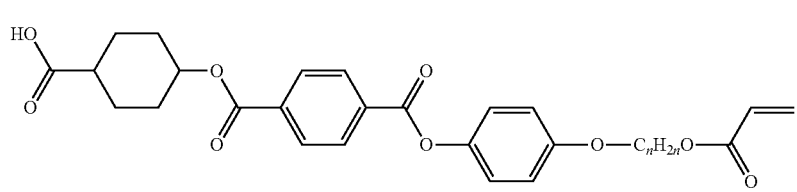
(R-49)
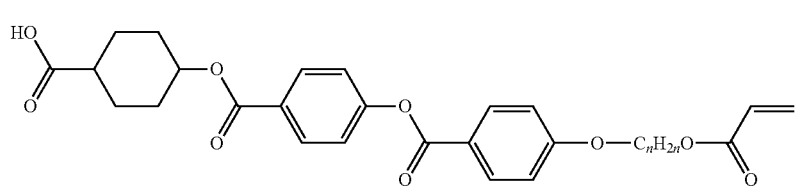
(R-50)

-continued
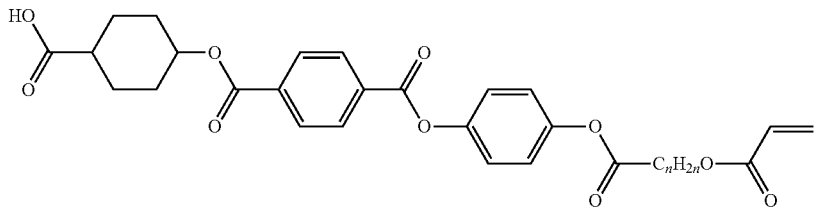
(R-51)
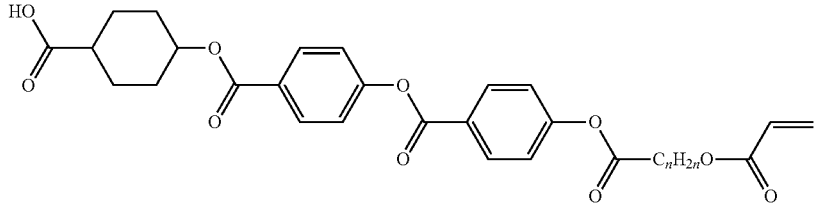
(R-52)
[Chem. 205]
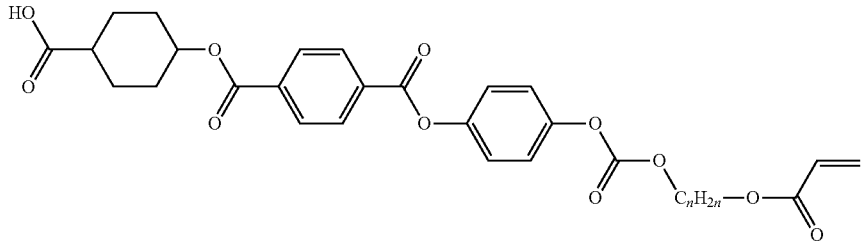
(R-53)
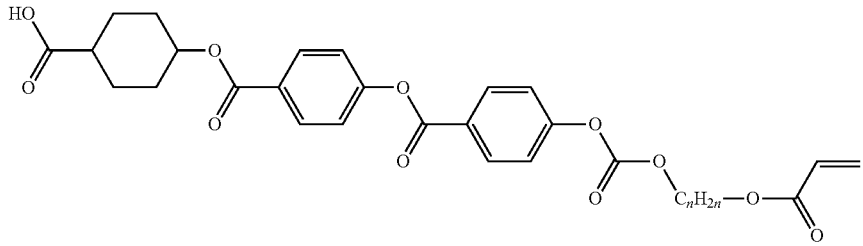
(R-54)
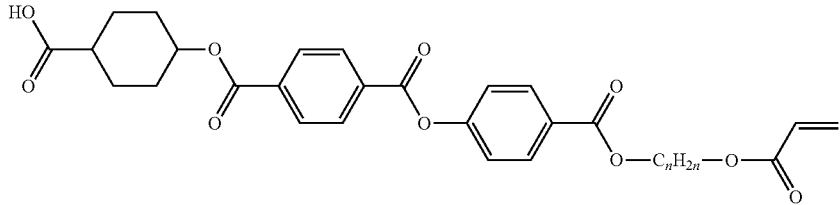
(R-55)
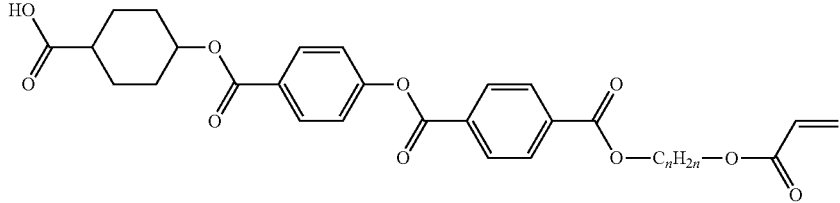
(R-56)
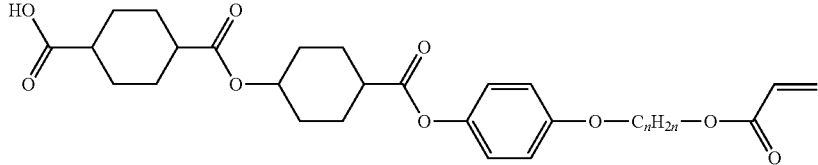
(R-57)

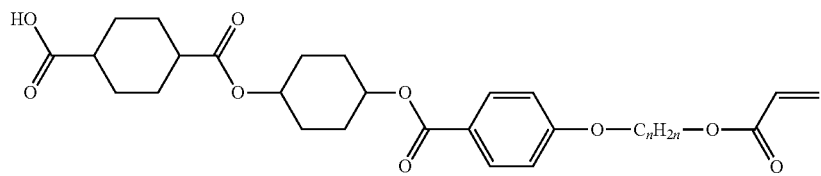
(R-58)
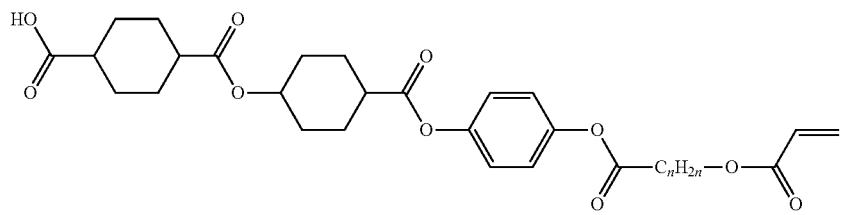
(R-59)
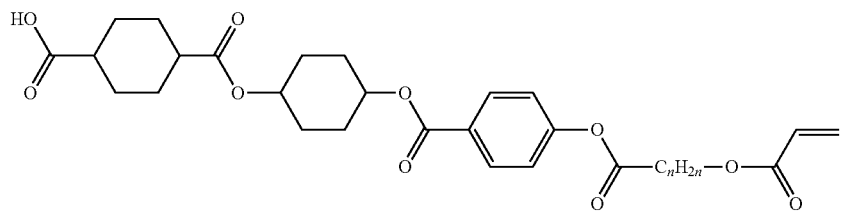
(R-60)
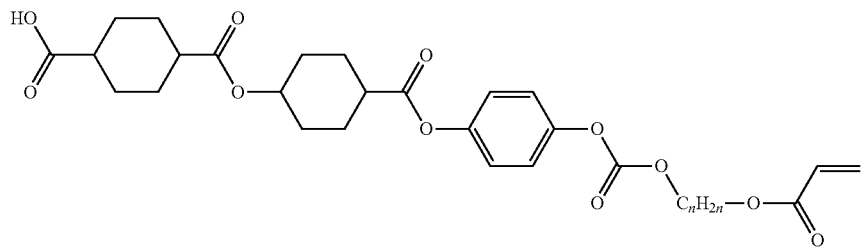
(R-61)
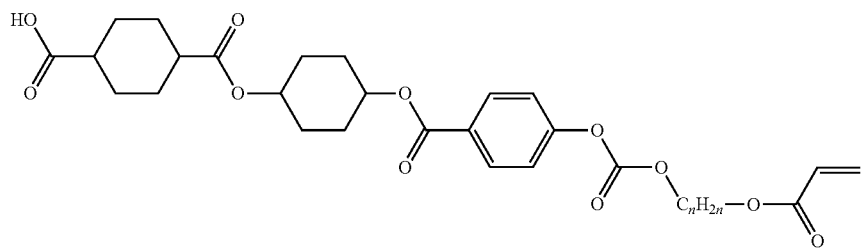
(R-62)
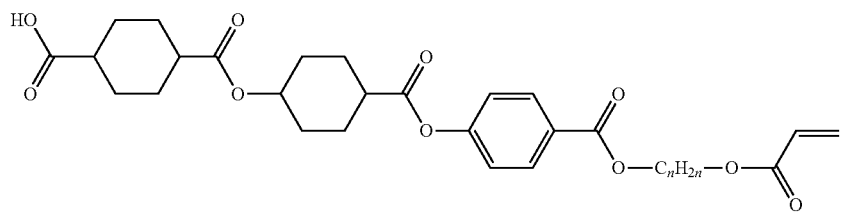
(R-63)
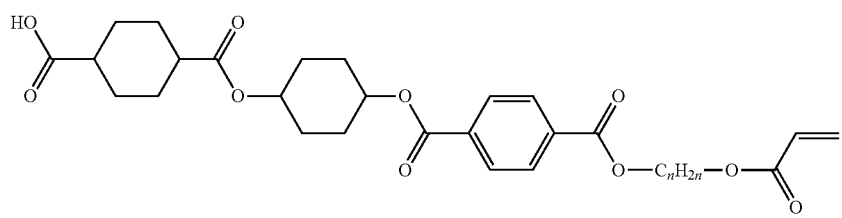
(R-64)

[Chem. 206]
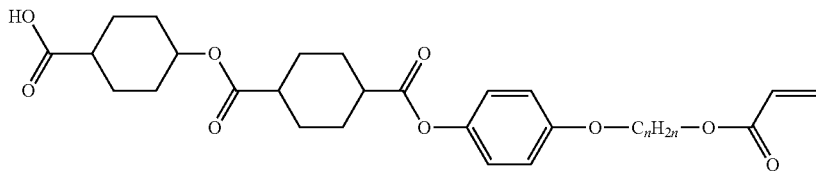 (R-65)
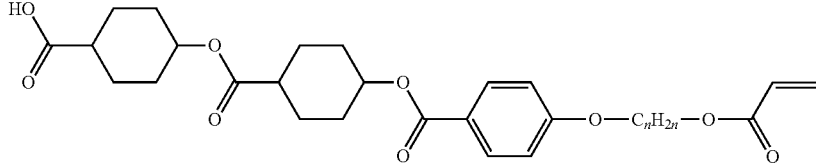 (R-66)
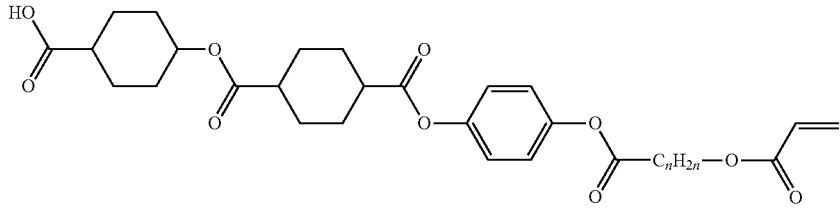 (R-67)
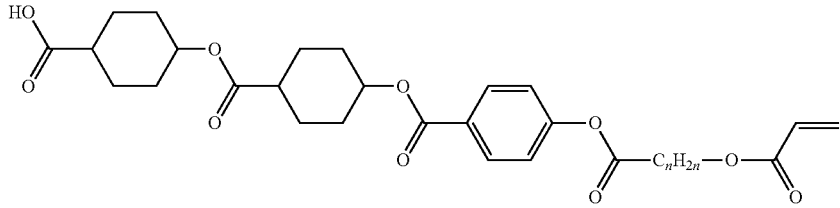 (R-68)
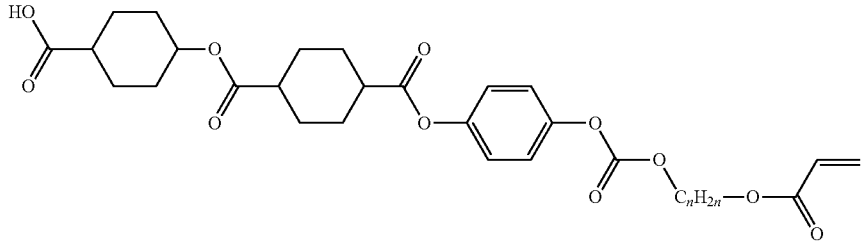 (R-69)
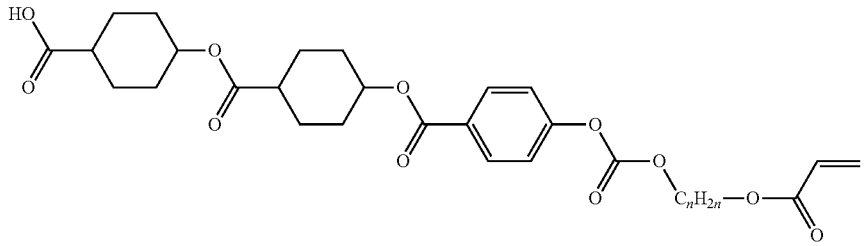 (R-70)
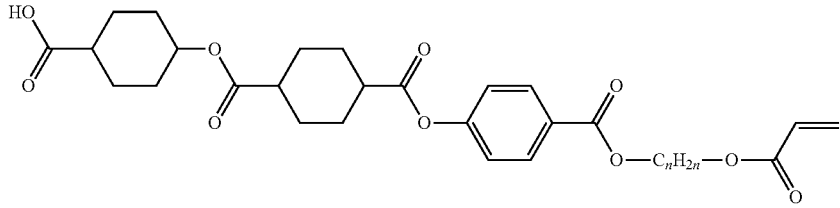 (R-71)

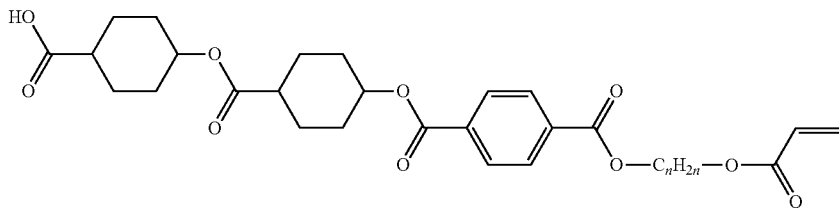
(R-72)
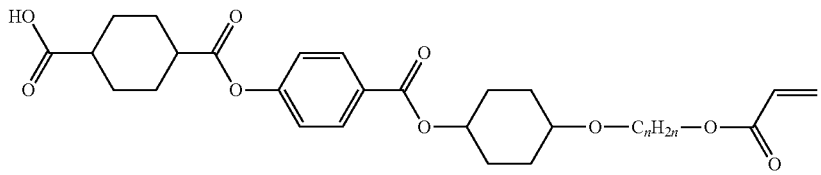
(R-73)
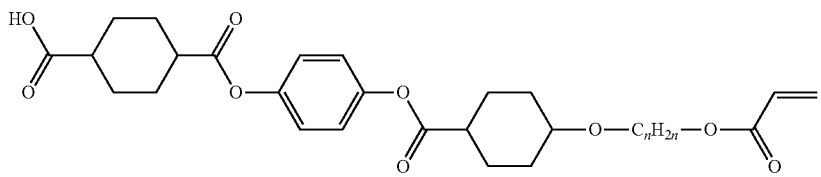
(R-74)
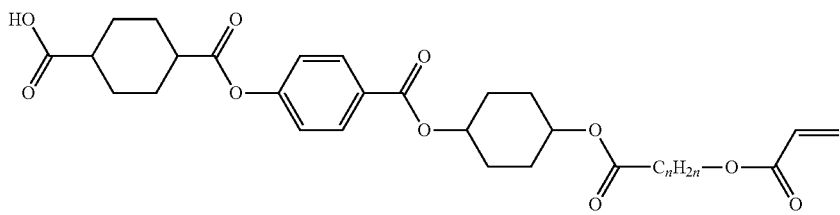
(R-75)
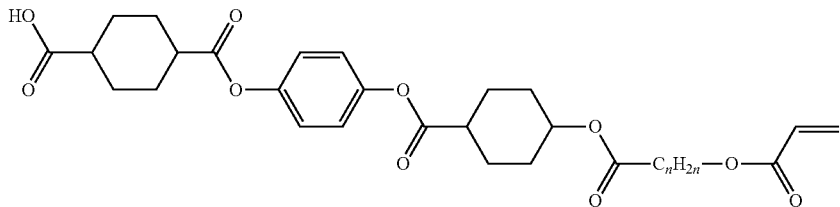
(R-76)
[Chem. 207]
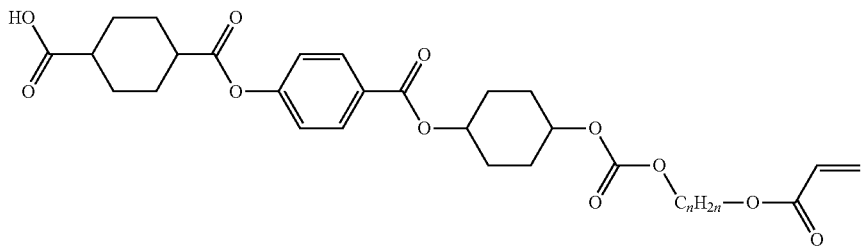
(R-77)
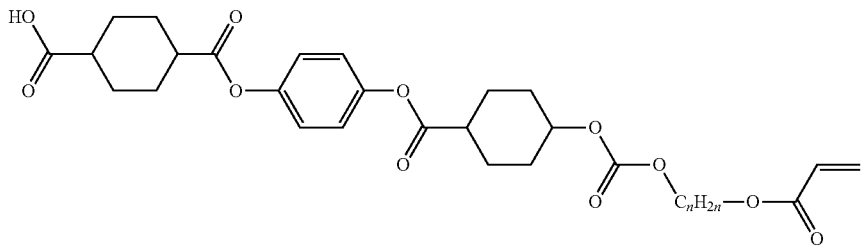
(R-78)

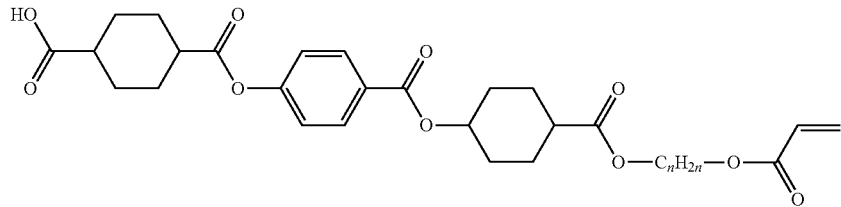
(R-79)
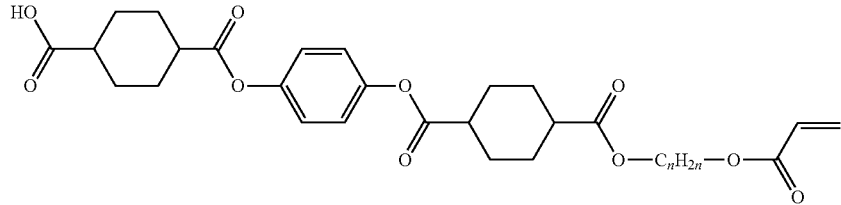
(R-80)
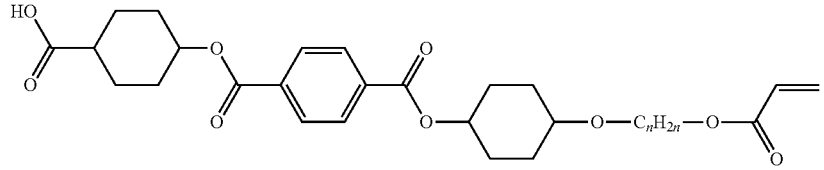
(R-81)
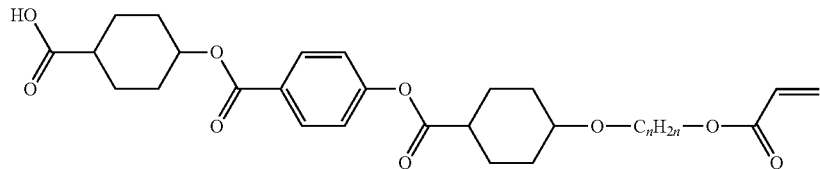
(R-82)
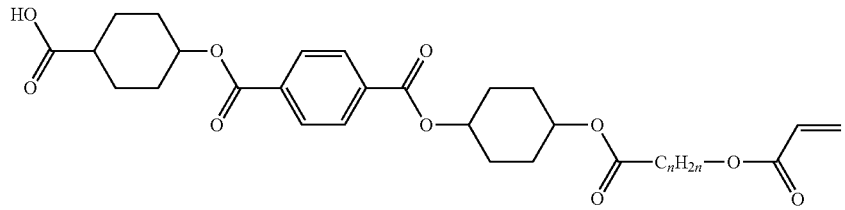
(R-83)
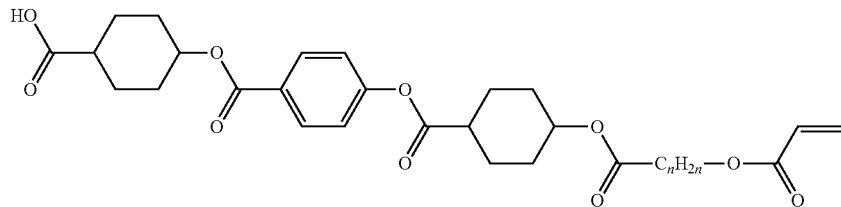
(R-84)
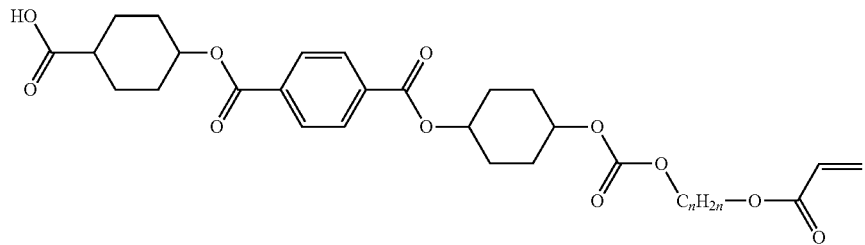
(R-85)

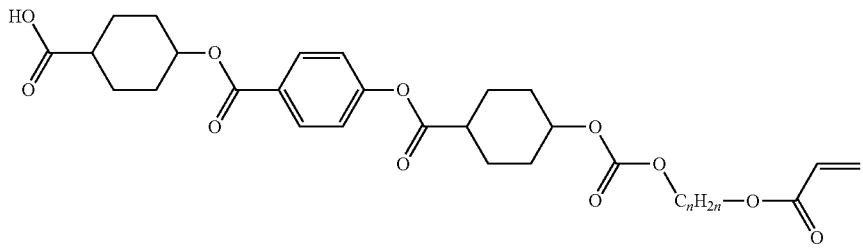
(R-86)
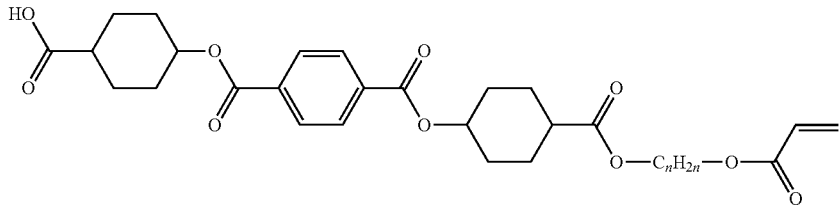
(R-87)
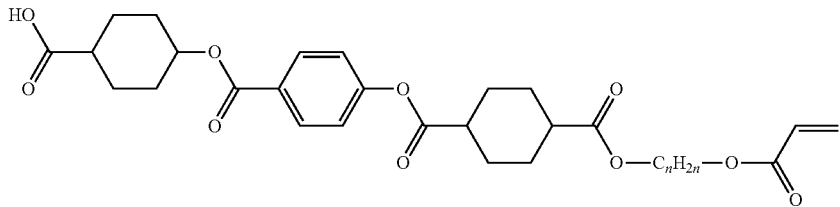
(R-88)
[Chem. 208]
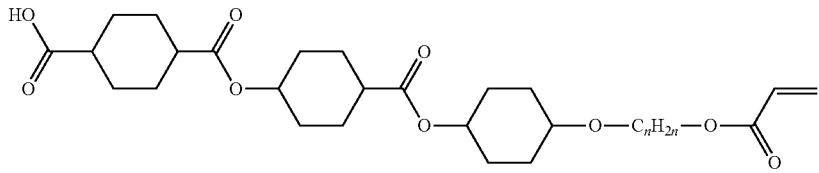
(R-89)
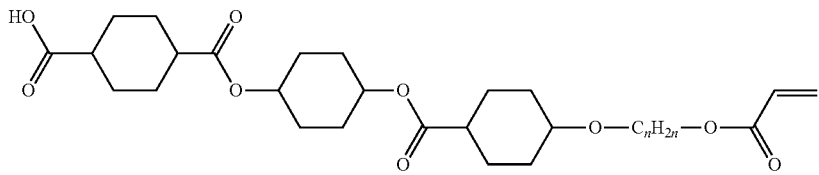
(R-90)
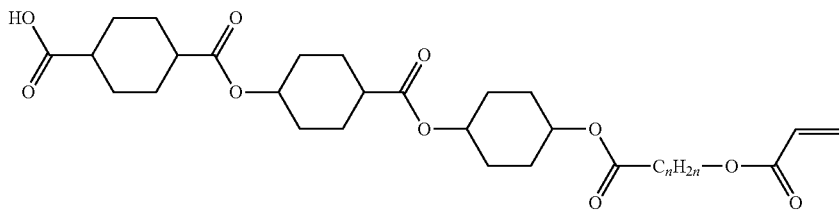
(R-91)
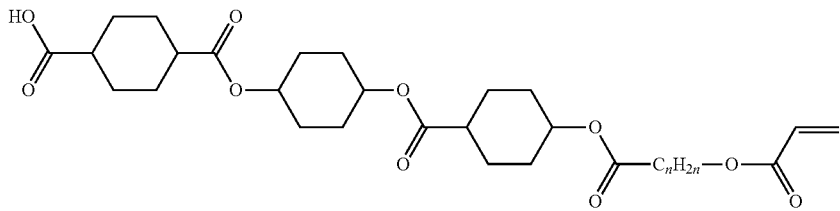
(R-92)

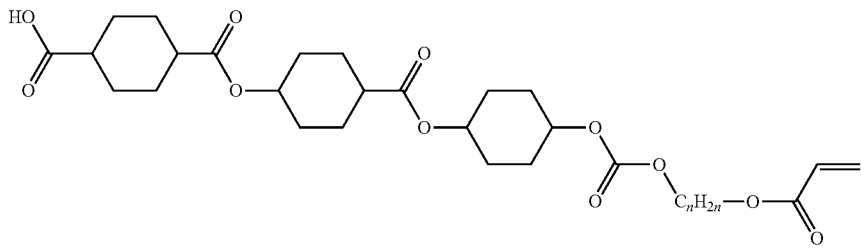
(R-93)
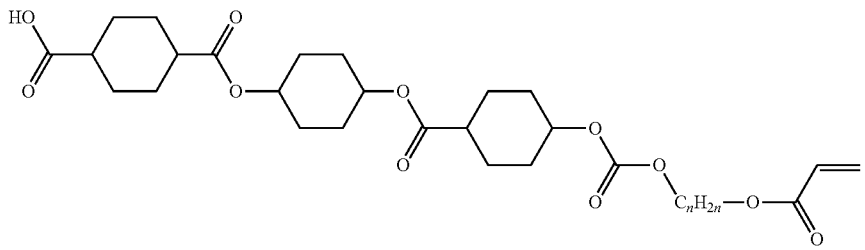
(R-94)
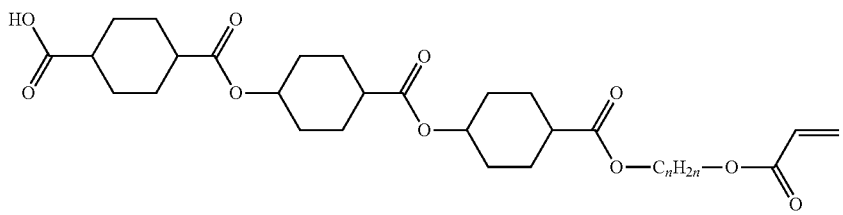
(R-95)
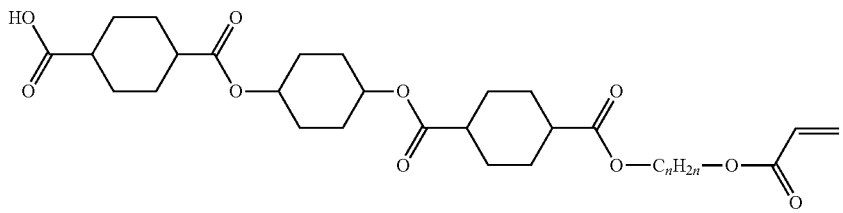
(R-96)
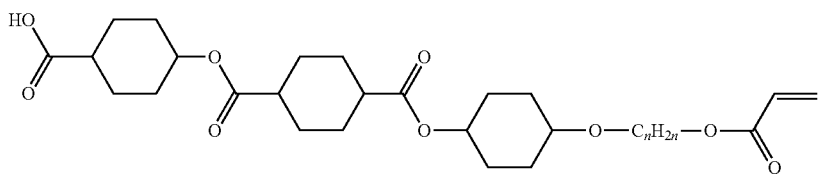
(R-97)
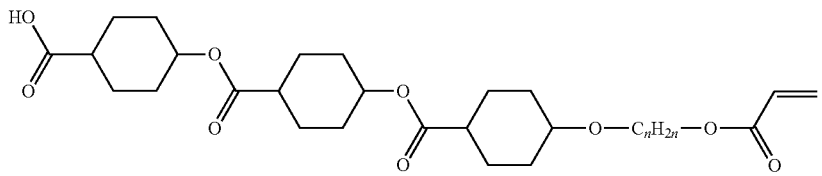
(R-98)
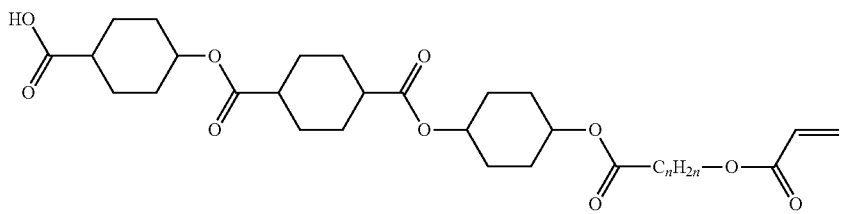
(R-99)

-continued

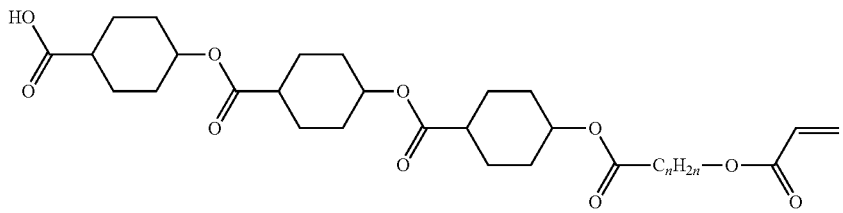

(R-100)

[Chem. 209]

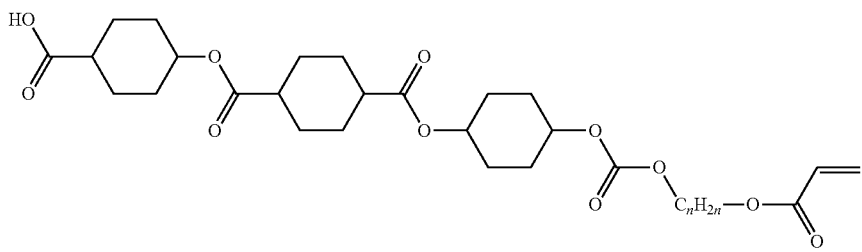

(R-101)

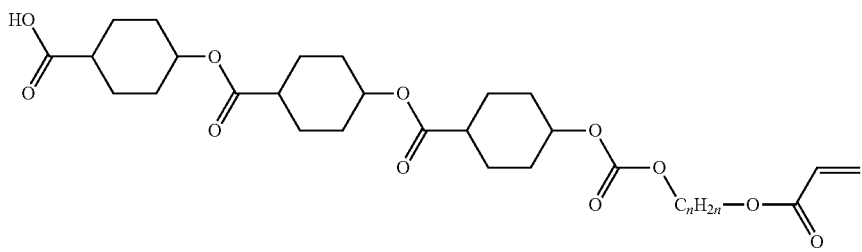

(R-102)

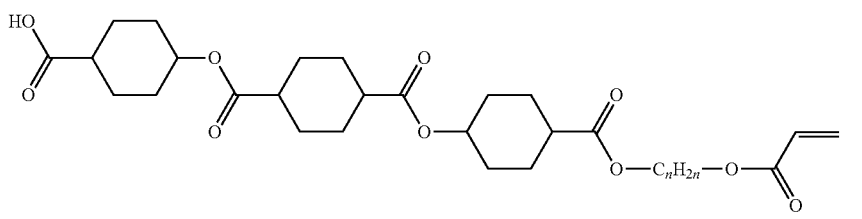

(R-103)

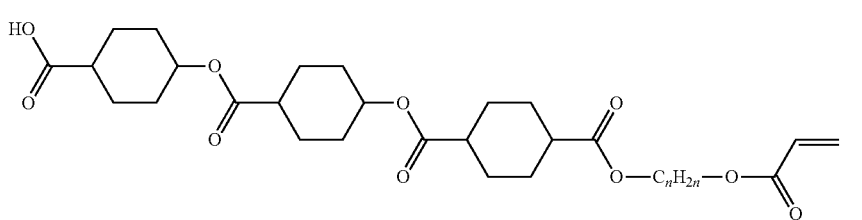

(R-104)

The esterification reaction of alcohol compound (B) and carboxylic acid compound (C) is conducted in the presence of a condensing agent. The esterification reaction in the presence of a condensing agent can realize efficient and prompt esterification reaction.

Examples of the condensing agent include carbodiimide compounds such as 1-cyclohexyl-3-(2-morpholinoethyl)carbodiimide metho-p-toluenesulfonate, dicyclohexylcarbodiimide, diisopropylcarbodiimide, 1-ethyl-3-(3-dimethylaminopropyl)carbodiimide, 1-ethyl-3-(3-dimethylaminopropyl)carbodiimide hydrochloric acid salt (water-soluble carbodiimide: commercially available as WSC), bis(2,6-diisopropylphenyl)carbodiimide and bis(trimethylsilyl)carbodiimide; 2-methyl-6-nitrobenzoic anhydride, 2,2'-carbonylbis-1H-imidazole, 1,1'-oxalyldimidazole, diphenylphosphoryl azide, 1(4-nitrobenzenesulfonyl)-1H-1,2,4-triazole, 1H-benzotriazol-1-yloxytripyrrolidinophosphonium hexafluorophosphate, 1H-benzotriazol-1-yloxytris(dimethylamino)phosphonium hexafluorophosphate, N,N,N',N'-tetramethyl-O—(N-succinimidyl)uronium tetrafluoroborate, N-(1,2,2,2-tetrachloroethoxycarbonyloxy)succinimide, N-carbobenzoxysuccinimide, O-(6-chlorobenzotriazol-1-yl)-N,N,N',N'-tetramethyluronium tetrafluoroborate, O-(6-chlorobenzotriazol-1-yl)-N,N,N',N'-tetramethyluronium hexafluorophosphate, 2-bromo-1-ethylpyridinium tetrafluoroborate, 2-chloro-1,3-dimethylimidazolinium chloride, 2-chloro-1,3-dimethylimidazolinium hexafluorophosphate, 2-chloro-1-methylpyridinium iodide, 2-chloro-1-methylpyridinium p-toluenesulfonate, 2-fluoro-1-methylpyridinium p-toluenesulfonate and pentachlorophenyl trichloroacetate.

Of these, preferable are carbodiimide compounds, 2,2'-carbonylbis-1H-imidazole, 1,1'-oxalyldimidazole, diphenylphosphoryl azide, 1H-benzotriazol-1-yloxytripyrrolidinophosphonium hexafluorophosphate, 1H-benzotriazol-1-yloxytris(dimethylamino)phosphonium hexafluorophosphate, N,N,N',N'-tetramethyl-O—(N-succinimidyl)uronium tetrafluoroborate, N-(1,2,2,2-tetrachloroethoxycarbonyloxy)succinimide, O-(6-chlorobenzotriazol-1-yl)-N,N,N',N'-tetramethyluronium hexafluorophosphate, 2-chloro-1,3-dimethylimidazolinium chloride, 2-chloro-1,3-dimethylimidazolinium hexafluorophosphate, 2-chloro-1-methylpyridinium iodide, and 2-chloro-1-methylpyridinium p-toluenesulfonate.

More preferable are carbodiimide compounds, 2,2'-carbonylbis-1H-imidazole, 1H-benzotriazol-1-yloxytripyrrolidinophosphonium hexafluorophosphate, 1H-benzotriazol-1-yloxytris(dimethylamino)phosphonium hexafluorophosphate, N,N,N',N'-tetramethyl-O—(N-succinimidyl)uronium tetrafluoroborate, O-(6-chlorobenzotriazol-1-yl)-N,N,N',N'-tetramethyluronium hexafluorophosphate, 2-chloro-1,3-dimethylimidazolinium chloride, and 2-chloro-1-methylpyridinium iodide; and even more preferable are carbodiimide compounds from the viewpoint of economic advantages.

Of the carbodiimide compounds, preferable are dicyclohexylcarbodiimide, diisopropylcarbodiimide, 1-ethyl-3-(3-dimethylaminopropyl)carbodiimide, 1-ethyl-3-(3-dimethylaminopropyl)carbodiimide hydrochloric acid salt (water-soluble carbodiimide: commercially available as WSC), and bis(2,6-diisopropylphenyl)carbodiimide.

The amount of the condensing agent used is usually from 2 to 4 moles relative to 1 mole of alcohol compound (B).

In the esterification reaction, further, N-hydroxysuccinimide, benzotriazole, p-nitrophenol, 3,5-dibutyl-4-hydroxytoluene, or the like may be added as an additive and then mixed. The amount of the additive used is preferably from 0.01 to 1.5 moles relative to 1 mole of alcohol compound (B).

The esterification reaction may be conducted in the presence of a catalyst. Examples of the catalyst include N,N-dimethylaminopyridine, N,N-dimethylaniline, and dimethylammonium pentafluorobenzenesulfonate. Of these, N,N-dimethylaminopyridine and N,N-dimethylaniline are preferable, and N,N-dimethylaminopyridine is more preferable. The amount of the catalyst used is preferably from 0.01 to 0.5 moles relative to 1 mole of alcohol compound (B).

The esterification reaction is usually conducted in a solvent. Examples of the solvent include ketone solvents such as acetone, methyl ethyl ketone, cyclopentanone, cyclohexanone, methyl amyl ketone, and methyl isobutyl ketone; aliphatic hydrocarbon solvents such as pentane, hexane, and heptane; aromatic hydrocarbon solvents such as toluene, xylene, benzene, and chlorobenzene; nitrile solvents such as acetonitrile; ether solvents such as tetrahydrofuran and dimethoxyethane; ester solvents such as ethyl lactate; halogenated hydrocarbon solvents such as chloroform and dichloromethane; and nonprotic polar solvents such as dimethyl sulfoxide, N-methyl-2-pyrrolidone, N,N-dimethylformamide, N,N-dimethylacetamide, and hexamethylphosphoric triamide. These organic solvents may be used alone or in combination.

Of these, from the viewpoints of reaction yield and productivity, the solvent is preferably non-polar organic solvents such as pentane, hexane, heptane, toluene, xylene, benzene, chlorobenzene, chloroform, and dichloromethane, and more preferably toluene, xylene, benzene, chlorobenzene, chloroform, and dichloromethane. These organic solvents may be used alone or in combination.

The amount of carboxylic acid compound (C) used is preferably from 2 to 10 moles, more preferably from 2 to 5 moles, and even more preferably from 2 to 3 moles, relative to 1 mole of alcohol compound (B).

The amount of the solvent used is preferably from 0.5 to 50 parts by mass, more preferably from 1 to 20 parts by mass, and even more preferably from 2 to 10 parts by mass, relative to 1 part by mass of the total amount of alcohol compound (B) and carboxylic acid compound (C).

The esterification reaction temperature is preferably from −20 to 120° C., more preferably from −20 to 60° C., and even more preferably from −10 to 20° C., from the viewpoints of reaction yield and productivity. The esterification reaction time is preferably from 1 minute to 72 hours, more preferably from 1 to 48 hours, and even more preferably from 1 to 24 hours, from the viewpoints of reaction yield and productivity. A polymerizable liquid crystal compound can be obtained from the resulting suspension by a method such as filtration or decantation.

<Polymer (B)>

Polymer (B) contained in the liquid crystal composition of the present invention is a polymer obtained by polymerizing polymerizable liquid crystal compound (A) as a monomer. The liquid crystal composition of the present invention enhances solubility in a solvent by containing polymer (B) as well as polymerizable liquid crystal compound (A). Moreover, such containing enables the liquid crystal composition to suppress precipitation of crystals, and also to suppress precipitation of the polymerizable liquid crystal compound even during long-term storage, thereby achieving excellent storage stability. Without wishing to be bound by a particular theory, it would appear that in a solution having polymerizable liquid crystal compound (A) and polymer (B) dissolved therein, polymer (B) enhances solvation of polymerizable liquid crystal compound (A) to stabilize the supersaturated conditions.

In order to generally enhance the solubility in a solvent, a technique of introducing a long-chain alkyl group is used for compounds having many ring structures. In the polymerizable liquid crystal compound, however, when a long chain alkyl group is introduced as a substituent, the presence of the introduced substituent disturbs the molecular orientation of the liquid crystal composition, causing an orientation defect in the optical film. The liquid crystal composition of the present invention enhances the solubility of the polymerizable liquid crystal compound by adding polymer (B) without introducing a substituent such as a long chain alkyl group or the like, which can achieve excellent storage stability during dissolution in a solvent. In addition, since the liquid crystal composition can suppress the precipitation of the polymerizable liquid crystal compound, an orientation defect in the retardation film formed from the liquid crystal composition of the present invention is less likely to occur. Furthermore, when the storage stability of the liquid crystal composition of the present invention is enhanced, coating stability of the liquid crystal composition can also be enhanced.

As polymerizable liquid crystal compound (A) used as a monomer, the same compound as the polymerizable liquid crystal compound (A) described hereinabove may be used. Polymer (B) may be a homopolymer that is polymerized with one kind of polymerizable liquid crystal compound (A) as a monomer, or a copolymer that is copolymerized with two or more kinds of polymerizable liquid crystal compounds (A). As long as the effects in accordance with the present invention are exhibited, polymer (B) may contain a structural unit derived from a polymerizable liquid crystal compound that is compolymerizable with polymerizable liquid crystal compound (A) and that has a different structure from polymerizable liquid crystal compound (A). From the viewpoint of reducing the production cost, however, polymer (B) preferably has only a structural unit derived from polymerizable liquid crystal compound (A), and more preferably has a structural unit derived from only one kind of polymerizable liquid crystal compound (A). The liquid crystal composition of the present invention may contain only one kind or two or more kinds of polymers.

Polymer (B) has a weight average molecular weight (Mw) determined by gel permeation chromatography (GPC) of preferably 4,000 to 200,000, more preferably 4,000 to 180,000, even more preferably 4,000 to 150,000, and especially preferably 4,000 to 100,000. When the weight average molecular weight (Mw) thereof is within the above range, the liquid crystal compound containing such polymer (B) has excellent storage stability and an orientation defect is less likely to occur during formation of layers. In particular, the molecular weight as well as the content of polymer (B) in the liquid crystal composition to be described later are appropriately adjusted, to thereby obtain a liquid crystal composition that has high solubility in a solvent, is excellent in storage stability, and is less likely to cause an orientation defect.

Polymer (B) can be obtained by polymerizing polymerizable liquid crystal compound (A) using a polymerization initiator as required, for example, by a polymerizing method known in the art.

The polymerization initiator is not particularly limited as long as it has an ability to initiate polymerization of the polymerizable liquid crystal compound. The polymerization initiator can be appropriately selected from known polymerization initiators and used. Examples of the polymerization initiator to be used to obtain polymer (B) include a photo-polymerization initiator and a thermal polymerization initiator. Of these, a thermal polymerization initiator is preferable from the viewpoint of controlling the molecular weight of polymer (B).

Examples of the thermal polymerization initiator include an azo compound such as azobisisobutyronitrile (AIBN), and an organic peroxide such as benzoyl peroxide (BPO).

In the case of using the polymerization initiator, the amount thereof is, for example, usually from 0.01 to 30 parts by mass, preferably from 0.1 to 20 parts by mass, and more preferably from 1 to 10 parts by mass, relative to the total amount 100 parts by mass of all the monomers used to constitute polymer (B). When the amount thereof is within the above range, polymer (B) suitable for suppressing the precipitation of polymerizable liquid crystal compound (A) can be obtained.

Polymer (B) can be obtained as follows. For example, polymerizable liquid crystal compound (A), a polymerization initiator, and a solvent are mixed, the mixture is subjected to polymerization reaction by heating, and a usual crystallization operation is then performed such as by distilling off the solvent from the resulting solution, by adding a poor solvent to the mixture to cause crystallization, or by cooling the mixture to cause crystallization. The solvent used is not particularly limited and may be a solvent that is inert to the polymerization reaction. Examples thereof include a solvent that may be contained in the liquid crystal composition to be described later. In addition, as an additive, a chain transfer agent or the like may be used.

The heating temperature in the polymerization reaction may be appropriately determined according to the desired molecular weight of polymer (B), the kind of thermal polymerization initiator to be used, reaction concentration, or the like, and is usually from 20 to 120° C., and for example, preferably from 40 to 80° C., and more preferably from 40 to 60° C. The heating time is usually from 10 minutes to 24 hours, preferably from 10 minutes to 10 hours, and more preferably from 10 minutes to 5 hours.

<Liquid Crystal Composition>

The liquid crystal composition of the present invention may contain as polymer (B) a polymer that is polymerized with as a monomer polymerizable liquid crystal compound (A) contained in the liquid crystal composition or a polymer that is polymerized with as a monomer polymerizable liquid crystal compound (A) different from the polymerizable liquid crystal compound (A) contained in the liquid crystal composition. As the polymer that is polymerized with as a monomer polymerizable liquid crystal compound (A) different from the polymerizable liquid crystal compound (A) contained in the liquid crystal composition, for example, in the case where polymerizable liquid crystal compound (A) contained in the liquid crystal composition is a compound represented by the above formula (A), a polymer of polymerizable liquid crystal compound (A) having a different ring structure in Ar in formula (A) may be used. Polymer (B) may be a homopolymer or a copolymer as described above. When polymer (B) has the same structural unit as the polymerizable liquid crystal compound contained in the liquid crystal composition, in the case of dissolving the liquid crystal composition in various solvents, a polymerizable liquid crystal compound is not likely to be precipitated during storage or coating, thereby obtaining a liquid crystal composition having excellent stability. Therefore, it is preferable that the liquid crystal composition of the present invention contains as polymer (B) a polymer that is polymerized with as a monomer polymerizable liquid crystal compound (A) contained in the liquid crystal composition. In a preferred embodiment of the present invention, the liquid crystal composition contains as polymer (B) only a polymer that is polymerized with as a monomer polymerizable liquid crystal compound (A) contained in the liquid crystal composition.

In the liquid crystal composition of the present invention, polymer (B) has an area percentage value determined by gel permeation chromatography (GPO) of preferably 0.01% or more and 40% or less, more preferably 0.1% or more and 40% or less, even more preferably 0.1% or more and 20% or less, and especially preferably 0.4% or more and 20% or less, relative to the total peak area of polymerizable liquid crystal compound (A) and polymer (B) contained in the liquid crystal composition. When the area percentage value thereof is not less than the above-mentioned lower limit, the liquid crystal composition of the present invention dissolved in various solvents is less likely to precipitate the polymerizable liquid crystal compound during storage. When the area percentage value thereof is not more than the above-mentioned upper limit, the liquid crystal orientation state can be satisfactorily maintained during film formation, so that an orientation defect is less likely to occur. The above-mentioned area percentage value is a value obtained by determining a polymer (B) area value based on the GPC results measured using HLC-8220 manufactured by Tosoh Corporation and then calculating by the following formula:

$$\text{Polymer }(B)\text{ area percentage} = \frac{\text{Polymer }(B)\text{ area value}}{\text{Polymer }(A)\text{ area value} + \text{Polymer }(B)\text{ area value}} \times 100$$

The maximum absorption wavelength ($\lambda_{max}$) of the liquid crystal composition of the present invention is preferably from 300 to 400 nm, more preferably from 315 to 385 nm, and even more preferably from 320 to 380 nm. When the maximum absorption wavelength ($\lambda_{max}$) of the liquid crystal composition is not less than the lower limit, the retardation film formed from oriented polymers of the liquid crystal composition tends to exhibit a reverse wavelength dispersion characteristic. When it is not more than the upper limit, light absorption in the visible light region is suppressed and coloring of the film can be suppressed.

The liquid crystal composition of the present invention preferably contains an organic solvent because it facilitates handling or formation of layers at the time of forming the retardation film. When the liquid crystal composition of the present invention dissolved in the solvent is stored, the precipitation of crystals of polymerizable liquid crystal compound (A) contained in the liquid crystal composition can be suppressed. Therefore, in the retardation film manufactured using the liquid crystal composition, the occurrence of a defect can be inhibited. For example, in the case of using N-methylpyrrolidone as the solvent, the liquid crystal composition of the present invention inhibits the precipitation of the crystals as compared with the one not containing polymer (B), and further, even though polymer (B) is present, the liquid crystal composition is not likely to adversely affect the quality of the retardation film. Therefore, a retardation film having high industrial workability and excellent quality can be obtained.

An organic solvent that may be contained in the liquid crystal composition of the present invention is capable of dissolving polymerizable liquid crystal compound (A), polymer (B), or the like, and may be inert to polymerization reaction. Examples of the organic solvent include alcohols such as methanol, ethanol, ethylene glycol, isopropyl alcohol, propylene glycol, methyl cellosolve, butyl cellosolve, and propylene glycol monomethyl ether; ester solvents such as ethyl acetate, butyl acetate, ethylene glycol methyl ether acetate, γ-butyrolactone, propylene glycol methyl ether acetate, and ethyl lactate; ketone solvents such as acetone, methyl ethyl ketone, cyclopentanone, cyclohexanone, methyl amyl ketone, and methyl isobutyl ketone; non-chlorinated aliphatic hydrocarbon solvents such as pentane, hexane, and heptane; non-chlorinated aromatic hydrocarbon solvents such as toluene, xylene, and phenol; nitrile solvents such as acetonitrile; ether solvents such as tetrahydrofuran and dimethoxyethane; chlorinated hydrocarbon solvents such as chloroform and chlorobenzene; and amide solvents such as N-methylpyrrolidone (NMP) and N,N-dimethylformamide (DMF). Of these, ester solvents, ketone solvents, non-chlorinated aromatic hydrocarbon solvents, ether solvents, and amide solvents are preferable, and ketone solvents and amide solvents are more preferable, and amide solvents are even more preferable. These organic solvents may be used alone or in combination.

The content of the organic solvent in the liquid crystal composition of the present invention is preferably from 100 to 10000 parts by mass, more preferably from 200 to 5000 parts by mass, and even more preferably from 500 to 2500 parts by mass, relative to 100 parts by mass of polymerizable liquid crystal compound (A).

The liquid crystal composition of the present invention is excellent in solubility in the organic solvent by virtue of containing polymer (B) together with polymerizable liquid crystal compound (A). Thus, the liquid crystal composition of the present invention is excellent in stability during storage and it is also advantageous in that the liquid crystal composition can reduce the amount of the organic solvent used at the time of coating, storing, or the like. For example, in the case of using N-methylpyrrolidone as the solvent, even though the content of the solvent is, for example, 2500 parts by mass or less relative to 100 parts by mass of polymerizable liquid crystal compound (A), the liquid crystal composition can suppress precipitation of polymerizable liquid crystal compound (A) over a long period of time (e.g., for 24 hours or longer, and preferably 72 hours or longer).

The liquid crystal composition of the present invention can be obtained, for example, by mixing polymer (B) that has been prepared beforehand by the method for preparing polymer (B) as described above, and polymerizable liquid crystal compound (A) so as to set the area percentage value of polymer (B) to a specified value. In addition, in the case where polymer (B) in the liquid crystal composition is only a polymer derived from polymerizable liquid crystal compound (A) contained in the liquid crystal composition, the liquid crystal composition of the present invention can also be obtained as a mixture of unreacted polymerizable liquid crystal compound (A) and polymer (B) thereof by controlling the development of the polymerization reaction of polymerizable liquid crystal compound (A).

In the latter method, the polymerization reaction of polymerizable liquid crystal compound (A) can be controlled by, for example, the kind or amount of the polymerization initiator to be used and reaction conditions such as heating temperature or heating time. Examples of the polymerization initiator include the same as those illustrated regarding polymer (B), and a thermal polymerization initiator is preferable.

The heating temperature is appropriately determined according to the desired ratio of polymerizable liquid crystal compound (A) and polymer (B), the desired molecular weight of polymer (B), the kind of thermal polymerization initiator to be used, reaction concentration, or the like, and is usually from 20 to 120° C., and for example, preferably from 40 to 80° C., and more preferably from 40 to 60° C. Further, the heating time is usually from 10 minutes to 24 hours, preferably from 10 minutes to 10 hours, and more preferably from 10 minutes to 5 hours.

In one embodiment of the present invention, a retardation film formed from oriented polymers of the liquid crystal composition (hereinafter referred to as "the retardation film of the present invention") is provided. It is preferable that the retardation film of the present invention satisfies the relation of a degree of wavelength dispersion Re(450 nm)/Re(550 nm) represented by the following formula (1):

$$0.8 \leq Re(450)/Re(550) < 1.0 \tag{1}$$

[In formula (1), Re(λ) represents a front retardation value at a light having a wavelength λ nm.]

The retardation film of the present invention has a degree of wavelength dispersion Re(450 nm)/Re(550 nm) of more preferably 0.8 or more and less than 0.98, and even more preferably 0.8 or more and less than 0.96. When the degree of wavelength dispersion Re(450 nm)/Re(550 nm) is not less than the lower limit, conversion of circularly polarized light is possible in a short wavelength region around 450 nm, which is preferable. When the degree of wavelength dispersion Re(450 nm)/Re(550 nm) is not more than the upper limit, the resulting retardation film exhibits a reverse wavelength dispersion characteristic, which is preferable.

The retardation film of the present invention is excellent in transparency and can be used in various optical displays. The thickness thereof is preferably from 0.1 to 10 μm, and more preferably from 0.5 to 3 μm in view of reducing photoelasticity.

In the case where the retardation film of the present invention is used in a λ/4 plate, the retardation value (Re(550 nm)) at a wavelength of 550 nm of the resulting retardation film is preferably from 113 to 163 nm, more preferably from 130 to 150 nm, and especially preferably from about 135 nm to 150 nm.

In order to use the retardation film of the present invention as an optical film of VA (vertical alignment) mode, the film thickness may be adjusted so that Re(550 nm) is preferably from about 40 to 100 nm, and more preferably from 60 to 80 nm or so.

A polarizing plate (hereinafter referred to as "the polarizing plate of the present invention"), in particular, an elliptically polarizing plate and a circularly polarizing plate are provided by combining the retardation film of the present invention with a polarizing film. In these plates, the retardation film of the present invention is bonded to the polarizing film. Further, in the present invention, it is possible to provide a wide-band circularly polarizing plate in which the retardation film of the present invention is bonded to the elliptically polarizing plate or the circularly polarizing plate as a wide-band λ/4 plate.

In one embodiment of the present invention, the retardation film can be used for an optical display containing the polarizing plate of the present invention, for example, a reflective liquid crystal display and an organic electroluminescence (EL) display. The above FPD is not particularly limited, and examples thereof include a liquid crystal display (LCD) device and an organic EL display device.

In the present invention, the optical display has the polarizing plate of the present invention, and examples thereof include a liquid crystal display device having a bonded product obtained by bonding the polarizing plate of the present invention and a liquid crystal panel to each other, and an organic EL display device having an organic EL panel in which the polarizing plate of the present invention and a light emitting layer are bonded to each other.

In the present invention, the retardation film refers to a film that is used for converting linearly polarized light into circularly polarized light or elliptically polarized light, and vice versa. The retardation film of the present invention contains a polymer of the liquid crystal composition of the present invention. That is, the retardation film of the present invention contains a polymer formed from a structural unit derived from polymerizable liquid crystal compound (A) and polymer (B).

The retardation film of the present invention can be produced, for example, by the following method.

First, an additive such as the polymerization initiator mentioned below, a polymerization inhibitor, a photosensitizer or a leveling agent is added as required to the liquid crystal composition containing polymerizable liquid crystal compound (A) and polymer (B), and optionally the organic solvent mentioned above, to prepare a mixing solution. In particular, the mixing solution preferably contains an organic solvent because it facilitates formation of layers at the time, and a polymerization initiator because it serves to cure the resulting retardation film.

Examples of the polymerization initiator include a photo-polymerization initiator and a thermal polymerization initiator. Of these, a photo-polymerization initiator is preferable.

Examples of the photo-polymerization initiator include benzoins, benzophenones, benzyl ketals, α-hydroxyketones, α-aminoketones, iodonium salts, and sulfonium salts. More specific examples thereof include Irgacure 907, Irgacure 184, Irgacure 651, Irgacure 819, Irgacure 250, and Irgacure 369 (hereinabove all manufactured by Ciba Japan K.K.); Seikuol BZ, Z, and Seikuol BEE (hereinabove all manufactured by Seiko Chemical Co., Ltd.); Kayacure BP100 (manufactured by Nippon Kayaku Co., Ltd.); Cyracure UVI-6992 (manufactured by the Dow Chemical Company); and Adeka Optomer SP-152 or Adeka Optomer SP-170 (hereinabove all manufactured by Adeka Corporation).

The content of the polymerization initiator is, for example, from 0.1 to 30 parts by mass, preferably from 0.5 to 20 parts by mass, andmore preferably from 0.5 to 10 parts by mass, relative to 100 part by mass of polymerizable liquid crystal compound (A). When the content thereof is within the above range, polymerizable liquid crystal compound (A) can be polymerized without disturbing the orientation of the liquid crystal compound.

Examples of the polymerization inhibitor that may be used for preparing the retardation film of the present invention include hydroquinone or hydroquinones having a substituent such as alkyl ether; catechols having a substituent including alkyl ether such as butyl catechol; pyrogallols; a radical scavenger such as 2,2,6,6-tetramethyl-1-piperidinyloxy radical; thiophenols; β-naphthylamines and β-naphthols.

The use of the polymerization inhibitor allows the polymerization of polymerizable liquid crystal compound (A) to be controlled, so that the stability of the resulting retardation film can be improved. The amount of the polymerization inhibitor used is, for example, from 0.05 to 30 parts by mass, and preferably from 0.1 to 10 parts by mass, relative to 100 parts by mass of polymerizable liquid crystal compound (A). When the amount thereof is within the above range, polymerizable liquid crystal compound (A) can be polymerized without disturbing the orientation of the liquid crystal compound.

Examples of the photosensitizer that may be used for preparing the retardation film of the present invention include xanthones such as xanthone and thioxanthone; anthracene or anthracenes having a substituent such as alkyl ether; phenothiazine; and rubrene.

The use of the photosensitizer can make the polymerization of polymerizable liquid crystal compound (A) highly sensitive. The amount of the photosensitizer used is, for example, from 0.05 to 30 parts by mass, and preferably from 0.1 to 10 parts by mass, relative to 100 parts by mass of polymerizable liquid crystal compound (A). When the amount thereof is within the above range, polymerizable liquid crystal compound (A) can be polymerized without disturbing the orientation of the liquid crystal compound.

Examples of the leveling agent that may be used for preparing the retardation film of the present invention include additives for radiation-curable coating (manufactured by BYK Japan KK: BYK-352, BYK-353 and BYK-361N), coating additives (manufactured by Dow Corning Toray Co., Ltd.: SH28PA, DC11PA and ST80PA), coating additives (manufactured by Shin-Etsu Chemical Co., Ltd.: K9321, KP323, X22-161A and KF6001), and fluorine-based additives (manufactured by DIC Corporation: F-445, F-470 and F-479).

The use of the leveling agent allows the retardation film to be smoothed. Further, by using the leveling agent, in the step of producing the retardation film, it is possible to control the fluidity of the mixing solution containing the liquid crystal composition and to adjust the crosslinkage density of the retardation film which is obtained by polymerizing polymerizable liquid crystal compound (A). The specific numerical value of the amount of the leveling agent used is, for example, from 0.05 to 30 parts by mass, and preferably from 0.05 to 10 parts by mass, relative to 100 parts by mass of polymerizable liquid crystal compound (A). When the amount thereof is within the above range, polymerizable liquid crystal compound (A) can be polymerized without disturbing the orientation of the liquid crystal compound.

It is preferable that the viscosity of the mixing solution containing the liquid crystal composition of the present invention is adjusted, for example, to 10 Pa·s or less, and preferably to 0.1 to 7 Pa·s or so for ease of coating. The viscosity of the mixing solution can be prepared according to the content of the organic solvent.

The concentration of the solids in the mixing solution is, for example, from 5 to 50% by mass, preferably from 5 to 30% by mass, and more preferably 5 to 15% by mass. The term "solids" herein refers to an ingredient remaining after the solvent is removed from the mixing solution (liquid crystal composition). When the concentration of the solids is not less than 5%, there is a tendency that the retardation film does not become excessively thin and the birefringence index required for optical compensation for liquid crystal panels is given thereto. When the concentration thereof is not more than 50%, there is a tendency that unevenness does not easily occur in the thickness of the retardation film because of the low viscosity of the mixing solution.

The mixing solution containing the liquid crystal composition of the present invention is then applied onto a supporting substrate and dried to form an unpolymerized film. When the unpolymerized film exhibits a liquid crystal phase such as a nematic phase, the obtained retardation film has a birefringence characteristic due to monodomain orientation. Since the unpolymerized film is oriented at a low temperature of 0 to 120° C. or so, and preferably 25 to 80° C., a supporting substrate which is not always satisfactory in the heat resistance can be used as an orientation layer. In addition, even when the unpolymerized film is further cooled to 30 to 10° C. or so after the orientation, it is not crystallized, so that the liquid crystal layer is easily handled.

By appropriately adjusting the coating amount and the concentration of the mixing solution, the thickness of the film can be adjusted so as to provide a desired retardation. In the case of the mixing solution having a constant amount of polymerizable liquid crystal compound (A) and polymer (B), the retardation value (retardation value Re(λ)) of the obtained retardation film is determined as formula (I). Therefore, in order to obtain a desired Re(λ), a film thickness d may be adjusted.

$$Re(\lambda) = d \times \Delta n(\lambda) \quad (I)$$

(wherein Re(λ) represents a retardation value at a wavelength of λ nm; d represents a film thickness; and Δn(λ) represents a birefringence index at a wavelength of λ nm.)

Examples of a method for applying the mixing solution to the supporting substrate include an extrusion coating method, a direct gravure coating method, a reverse gravure coating method, a CAP coating method, and a die coating method. Examples thereof also include a method for coating by using a coater such as a dip coater, a bar coater or a spin coater.

Examples of the above-mentioned supporting substrate include glass, plastic sheets, plastic films, or translucent films. Examples of the translucent film include polyolefin films such as polyethylene, polypropylene and norbornene-based polymers; polyvinyl alcohol films; polyethylene terephthalate films; polymethacrylate films; polyacrylate films; cellulose ester films; polyethylene naphthalate films; polycarbonate films; polysulfone films; polyethersulfone films; polyetherketone films; polyphenylenesulfide films; and polyphenylene oxide films.

By using the supporting substrate, the retardation film of the present invention can be easily handled without breakage, even in the steps requiring strength of the retardation film, such as a bonding step, a conveying step, and a storing step of the retardation film.

It is preferable that the orientation layer is formed on the supporting substrate and the mixing solution containing the liquid crystal composition of the present invention is applied onto the orientation layer. It is preferable that the orientation layer has solvent resistance so as not to be dissolved in the mixing solution containing the liquid crystal composition of the present invention when the mixing solution is applied thereonto; has heat resistance at the time of removal of the solvent or of heat-treatment of the liquid crystal orientation; and does not generate peeling due to friction at the time of rubbing. It is also preferable that the orientation layer is composed of a polymer or a composition containing a polymer.

Examples of the above-mentioned polymer include polyamides and gelatins having amide bonds in the molecule, polyimides having imide bonds in the molecule and polyamic acids which are the hydrolysate thereof, polyvinyl alcohol, alkyl-modified polyvinyl alcohols, polyacrylamide, polyoxazoles, polyethylene imine, polystyrene, polyvinylpyrrolidone, polyacrylic acid, and polyacrylic acid esters. These polymers may be used alone, in combination of two or more kinds, or copolymerized. These polymers can be easily obtained by a polycondensation based on dehydration, deamination or the like, a chain polymerization such as radical polymerization, anion polymerization or cation polymerization, coordination polymerization, ring-opening polymerization or some other polymerization.

These polymers can also be dissolved in a solvent and then applied. The solvent is not particularly limited, and specific examples thereof include water; alcohol solvents such as methanol, ethanol, ethylene glycol, isopropyl alcohol, propylene glycol, methylcellosolve, butylcellosolve and propylene glycol monomethyl ether; ester solvents such as ethyl acetate, butyl acetate, ethylene glycol methyl ether acetate, γ-butyrolactone, propylene glycol methyl ether acetate and ethyl lactate; ketone solvents such as acetone, methyl ethyl ketone, cyclopentanone, cyclohexanone, methyl amyl ketone and methyl isobutyl ketone; non-chlorinated aliphatic hydrocarbon solvents such as pentane, hexane and heptane; non-chlorinated aromatic hydrocarbon solvents such as toluene and xylene; nitrile solvents such as acetonitrile; ether solvents such as tetrahydrofuran and dimethoxyethane; and chlorinated hydrocarbon solvents such as chloroform and chlorobenzene. These organic solvents may be used alone or in combination.

In order to form the orientation layer, a commercially available material for orientation layers may be used as it is. Examples of the commercially available material for orientation layers include SUNEVER (registered trademark, manufactured by Nissan Chemical Industries Ltd.) and OPT-MER (registered trademark, manufactured by JSR Corporation).

The use of such orientation layer can eliminate the need of controlling refractive index by drawing, so that in-plane dispersion of birefringence can be reduced. For this reason, there is exhibited an effect that a large retardation film which can meet the requirements of capsizing of a flat panel display device (FPD) can be provided on a supporting substrate.

As a method for forming the orientation layer on the supporting substrate, for example, a commercially available material for orientation layers or a compound serving as an orientation layer material is converted into a solution, the resulting solution is applied thereonto, followed by annealing, to thereby form an orientation layer on the supporting substrate.

The thickness of the orientation layer thus obtained is, for example, from 10 nm to 10000 nm, and preferably from 10 nm to 1000 nm. When the thickness thereof is within the above range, polymerizable liquid crystal compound (A) and polymer (B) or the like can be oriented to a desired angle on the orientation layer.

Further, these orientation layers can be subjected to rubbing or polarized UV irradiation as required. By forming the orientation layer, polymerizable liquid crystal compound (A) and polymer (B) or the like can be oriented to a desired direction.

As a method for rubbing the orientation layer, for example, a method in which a rotating rubbing roll wrapped with a rubbing cloth is brought into contact with the orientation layer which is being conveyed on a stage may be used.

As described above, in the step of preparing the unpolymerized film, the unpolymerized film (liquid crystal layer) may be laminated on the orientation layer which is laminated on any supporting substrate. In such case, production cost can be reduced as compared with a method in which a liquid crystal cell is produced and a liquid crystal composition is injected into the liquid crystal cell. Further, it is possible to produce a film in the form of a roll film.

The solvent may be dried as the polymerization proceeds. Most of the solvent is, however, preferably dried before the polymerization in terms of layer formability.

Examples of a method for drying the solvent include natural drying, air drying, and vacuum drying. The specific heating temperature is preferably from 10 to 120° C., and more preferably from 25 to 80° C. The heating time is preferably from 10 seconds to 60 minutes, and more preferably from 30 seconds to 30 minutes. When the heating temperature and the heating time are within the above ranges, a supporting substrate which is not always satisfactory in the heat resistance can be used as the above-mentioned supporting substrate.

Next, the unpolymerized film obtained above is polymerized and then cured. This produces a film in which the orientation of polymerizable liquid crystal compound (A) and polymer (B) is fixed, that is, a film (hereinafter also referred to as "polymer film") containing a polymer of the liquid crystal composition of the present invention. Accordingly, a polymer film in which a change in refractive index is small in a film-plane direction and is large in a film normal line direction can be produced.

The method for polymerizing the unpolymerized film is determined depending on the type of polymerizable liquid crystal compound (A). The above-mentioned unpolymerized film can be polymerized by photo polymerization when the polymerizable group contained in polymerizable liquid crystal compound (A) is photo-polymerizable or by thermal polymerization when the polymerizable group is thermally polymerizable. In the present invention, it is preferable that the unpolymerized film is polymerized, in particular, by photo polymerization. According to the photo polymerization, it is possible to polymerize the unpolymerized film at low temperature, so that a selection range for heat resistance of the supporting substrate is enhanced. In addition, photo polymerization makes the production industrially easier. From the viewpoint of layer formability, photo polymerization is preferable. Photo polymerization is performed by irradiating the unpolymerized film with visible light, ultraviolet light or laser light. From the viewpoint of handleability, irradiation of ultraviolet light which is especially preferable, may be performed with warming at a temperature at which polymerizable liquid crystal compound (A) is in liquid crystal phase. At this time, the polymer film can be patterned by masking or the like.

Further, the retardation film of the present invention is a thin layer as compared with a drawn film in which a polymer is drawn to cause retardation.

The method for producing the retardation film of the present invention may further include a step of separating the supporting substrate. This structure allows the resulting laminated body to become a film composed of an orientation layer and a retardation film. In addition to the above-mentioned step of separating the supporting substrate, a step of separating the orientation layer may further be included. From such structure, a retardation film can be produced.

EXAMPLES

The present invention will, hereinafter, be illustrated using Examples further in detail. The units, "%" and "part(s)", presented in the examples are % by mass and part(s) by mass, unless otherwise specified therein.

The gel permeation chromatography (GPC) analysis conditions are indicated below.

<GPC Analysis Conditions>
Measuring apparatus: HLC-8220 (manufactured by Tosoh Corporation)
Column: three columns of TSKgel SuperMultiporeHZ-N
Column temperature: 40° C.
Inlet oven: 40° C.
Mobile phase: Tetrahydrofuran
Analysis time: 20 min
Sample pump flow rate: 0.35 mL/min
Reference pump flow rate: 0.35 mL/min
Injection amount: 10 μm
Detection: UV absorption (wavelength: 254 nm)

1. Example 1

(1) Preparation of Liquid Crystal Composition

A liquid crystal composition (1) containing a polymerizable liquid crystal compound (A) represented by the following formula (A-1) (hereinafter referred to as "compound (A-1)") and a polymer (B) (hereinafter referred to as "polymer (B-1)") was synthesized according to the following method.

[Chem. 210]

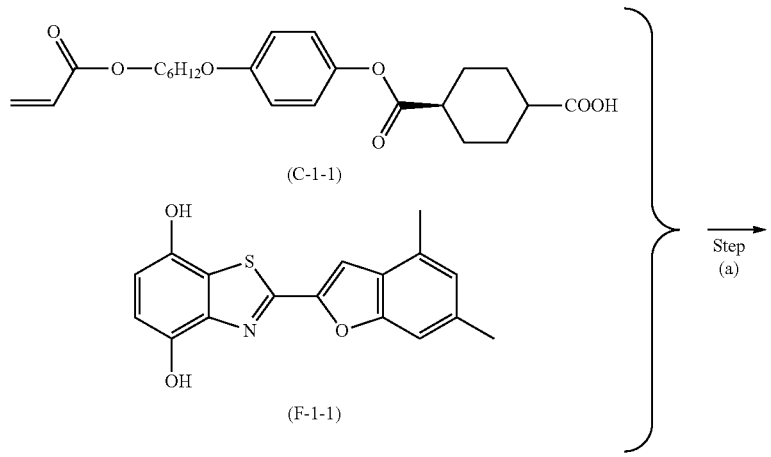

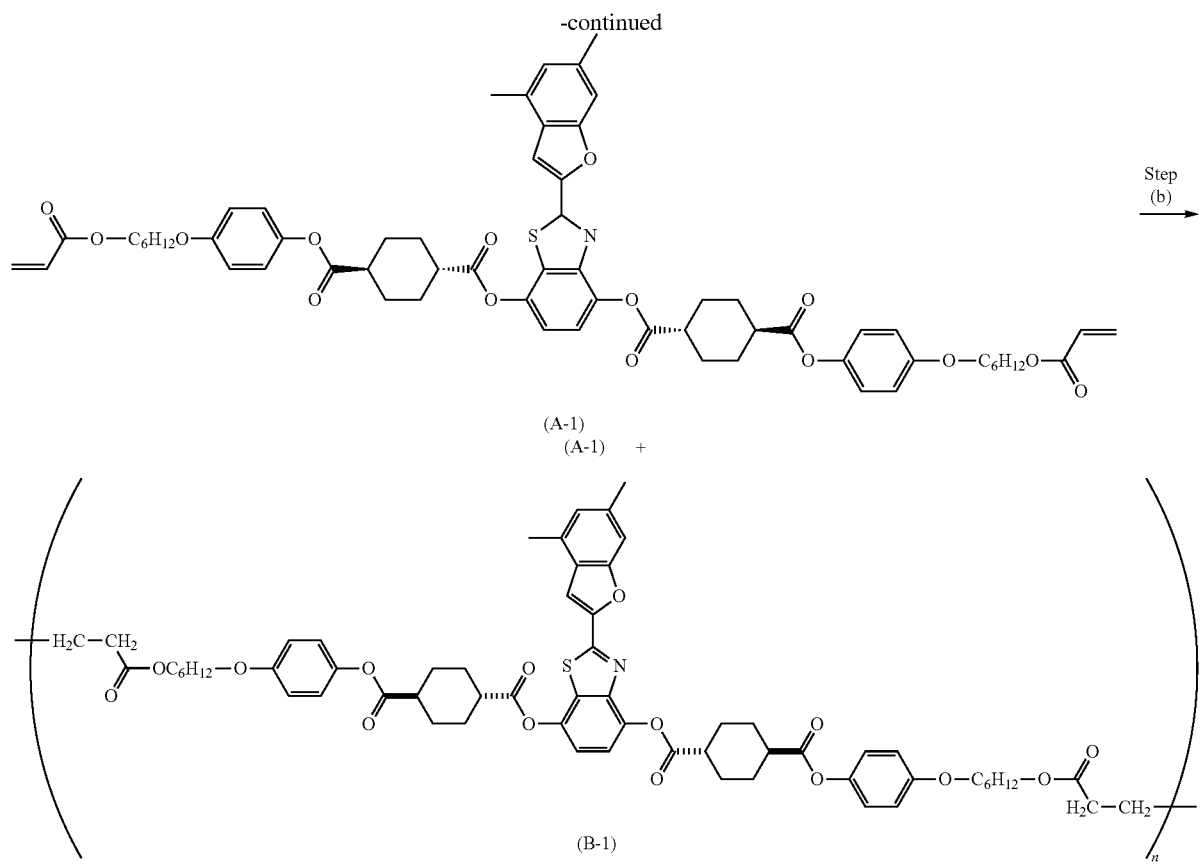

<Step (a)>

A nitrogen atmosphere was created in a 100-ml four-neck flask equipped with a Dimroth condenser tube and a thermometer, and 11.02 g of compound (C-1-1) synthesized with reference to Patent Literature (JP-A-2010-31223), 4.00 g of compound (F-1-1) synthesized with reference to Patent Literature (JP-A-2011-207765), 0.02 g of dimethylaminopyridine (hereinafter abbreviated as "DMAP", manufactured by Wako Pure Chemical industries, Ltd.), 0.20 g of dibutylhydroxytoluene (hereinafter abbreviated as "BHT", manufactured by Wako Pure Chemical Industries, Ltd.), and 58 g of chloroform (manufactured by Kanto Kagaku) were mixed. Then, 4.05 g of diisopropylcarbodiimide (hereinafter abbreviated as "IPC", manufactured by Wako Pure Chemical Industries, Ltd.) was added to the mixture through an addition funnel, and the resulting mixture was allowed to react overnight at 0° C. After completion of the reaction, insoluble constituents were removed by filteration. The resulting chloroform solution was added dropwise to acetonitrile (manufactured by Wako Pure Chemical Industries, Ltd.) having a weight three times larger than the weight of the chloroform contained therein. Subsequently, the added mixture was filtered to precipitate solids. The solids were taken out and then washed three times with 20 g of acetonitrile followed by drying under reduced pressure at 30° C., to thereby obtain 11.43 g of a compound (A-1). The yield of compound (A-1) was 80% based on compound (F-1-1).

<Step (b)>

Mixed were 10 g of compound (A-1) obtained in step (a), 0.015 g of azobisisobutyronitrile (hereinafter abbreviated as "AIBN", manufactured by Wako Pure Chemical Industries, Ltd.), and 90 g of tetrahydrofuran (manufactured by Hayashi Pure Chemical Ind., Ltd.), and the mixture was allowed to react at 60° C. for 1 hour. After completion of the reaction, 180 g of heptane (manufactured by Wako Pure Chemical Industries, Ltd.) was added thereto to precipitate solids. The solids were taken out and then washed in a tetrahydrofuran/heptane (mass ratio: 1/2) solution, followed by drying under reduced pressure at 30° C., to thereby obtain 9.80 g of a liquid crystal composition (1). The yield of liquid crystal composition (1) was 98% based on compound (A-1). The maximum absorption wavelength ($\lambda_{max}$) thereof was 352 nm.

As for the liquid crystal composition (1) thus obtained, the weight average molecular weight and area percentage value of polymer (B-1) were determined by GPC. The results are shown in Table 1.

TABLE 1

| Liquid crystal composition | Weight average molecular weight of (B-1) (Mw) | Area percentage (%) |
|---|---|---|
| (1) | 12941 | 17.1 |

(2) Evaluation of Storage Stability

Liquid crystal composition (1) described above was fed into a vial tube, and the vial tube was charged with a polymerization initiator, a leveling agent, a polymerization inhibitor, and a solvent according to the composition listed in Table 2. The charged mixture was stirred at 80° C. for 30 minutes using a carousel, to thereby obtain a liquid crystal composition-containing mixing solution (1).

The amounts of the polymerization initiator, leveling agent and polymerization inhibitor listed in Table 2 are the charged amount relative to 100 parts by mass of liquid crystal composition (1). The amount of the solvent blended was set so that the percentage by mass of liquid crystal compound (A-1) was 13% relative to all the solution amount.

TABLE 2

|  | Polymerization initiator (parts by mass) | Leveling agent (parts by mass) | Polymerization initiator (parts by mass) |
|---|---|---|---|
| Example 1 | 6.0 | 0.1 | 0.2 |

Polymerization initiator: 2-benzyl-2-dimethylamino-1-(4-morpholinophenyl)-butane-1-on (Irgacure 369; manufactured by BASF Japan Ltd.)
Leveling agent: Polyacrylate compound (BYK-361N; manufactured by BYK Japan KK)
Polymerization inhibitor: BHT (manufactured by Wako Pure Chemical Industries, Ltd.)
Solvent: N-methylpyrrolidone (NMP; manufactured by Kanto Kagaku)
The liquid crystal composition-containing mixing solution (1) thus obtained was stored at 25° C., and the presence or absence of crystal precipitation was visually confirmed with time. Then storage stability was evaluated according to the following evaluation criteria. The results are shown in Table 9.

Evaluation Criteria for Storage Stability
 1: Precipitated immediately after storage.
 2: Not precipitated 24 hours after storage.
 3: Not precipitated 48 hours after storage.
 4: Not precipitated 72 hours after storage.

(3) Production of Optical Film (Retardation Film)
<Preparation of Composition for Forming Photo-Orientation Layer>
The following components were mixed, and the resulting mixture was stirred at 80° C. for 1 hour to obtain a composition for forming a photo-orientation layer (1). The following photo-orientation material was synthesized by the method described in JP-A-2013-33248.
Photo-orientation material (5 parts):

[Chem. 211]

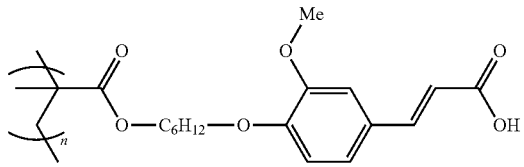

Solvent (95 parts): Cyclopentanone
<Example for Producing Optical Film>
An optical film was produced as follows: A cycloolefin polymer film (COP) (ZF-14, manufactured by Zeon Corporation) was treated once using a Corona generator (AGF-B10, manufactured by Kasuga Denki Inc.) under the conditions of an output of 0.3 kW and a treatment rate of 3 m/min. The composition for forming a photo-orientation layer (1) was applied to the corona-treated surface using a bar coater, and dried at 80° C. for 1 minute, followed by exposure to polarized UV radiation using a polarized UV irradiation device (SPOT CURE SP-7; manufactured by Ushio Inc.) at an integrated light intensity of 100 mJ/cm$^2$. The thickness of the obtained orientation layer was measured using a laser microscope (LEXT, manufactured by Olympus Corporation). The result was 100 nm.

Subsequently, liquid crystal composition-containing mixing solution (1) prepared in the same manner as the mixing solution obtained in the evaluation of storage stability was applied onto the orientation layer using a bar coater, and then dried at 120° C. for 1 minute, followed by exposure to ultraviolet radiation (under a nitrogen atmosphere, wavelength: 365 nm, integrated light intensity at a wavelength of 365 nm: 1000 mJ/cm$^2$) using a high-pressure mercury lamp (UNICURE VB-15201 BY-A, manufactured by Ushio Inc.). Thus, an optical film was produced. The value of Re(450)/Re(550) of the optical film thus obtained was 0.82, which satisfied the optical characteristics represented by formula (1):

$$0.8 \leq Re(450)/Re(550) < 1.00.$$

(4) Confirmation of Orientation Defect
The optical film thus obtained was cut into a 10 cm square piece, and the number of orientation defect was visually confirmed on the screen using a polarizing microscope (LEXT, manufactured by Olympus Corporation). The results are shown in Table 9.

Evaluation Criteria for Orientation Defect
 1: Orientation defects occurred on the entire surface (>100)
 2: 11 to 100
 3: 1 to 10
 4: No defect 2. Examples 2 to 17

(1) Preparation of Liquid Crystal Compositions (2) to (5)
According to the composition listed in Table 3, liquid crystal composition (1) obtained in Example 1 and compound (A-1) were mixed to prepare liquid crystal compositions (2) to (5). As for the liquid crystal compositions (2) to (5) thus obtained, the weight average molecular weight and area percentage value of polymer (B-1) were determined by GPC. The results are shown in Table 3.

TABLE 3

| Liquid crystal composition | Amount of (A-1) (g) | Amount of liquid crystal composition (1) (g) | Maximum absorption wavelength of liquid crystal composition (nm) | Weight average molecular weight of (B-1) (Mw) | Area percentage of polymer (B-1) (%) |
|---|---|---|---|---|---|
| (2) | 0.974 | 0.026 | 352 | 12941 | 0.4 |
| (3) | 0.914 | 0.087 | 352 | 12941 | 1.4 |
| (4) | 0.853 | 0.147 | 351 | 12941 | 2.4 |
| (5) | 0.429 | 0.571 | 352 | 12941 | 9.4 |

(2) Preparation of Liquid Crystal Compositions (6), (9), (14) and (17)

Using 10 g of compound (A-1) obtained in step (a) of Example 1, step (b) was conducted under the conditions listed in Table 4, to thereby obtain liquid crystal compositions (6), (9), (14) and (17), respectively.

TABLE 4

| Liquid crystal composition | Amount of AIBN (g) | Reaction time |
|---|---|---|
| (6) | 0.045 | 1 hr |
| (9) | 0.015 | 2 hrs |

TABLE 4-continued

| Liquid crystal composition | Amount of AIBN (g) | Reaction time |
|---|---|---|
| (14) | 0.150 | 2 hrs |
| (17) | 0.015 | 10 min |

(3) Preparation of Liquid Crystal Compositions (7) and (8)

According to the composition listed in Table 5, liquid crystal composition (6) and compound (A-1) were mixed to prepare liquid crystal compositions (7) and (8). As for the liquid crystal compositions (6) to (8) thus obtained, the weight average molecular weight and area percentage value of polymer (B-1) were determined by GPC. The results are shown in Table 5.

TABLE 5

| Liquid crystal composition | Amount of (A-1) (g) | Amount of liquid crystal composition (6) (g) | Maximum absorption wavelength of liquid crystal composition (nm) | Weight average molecular weight of (B-1) (Mw) | Area percentage of polymer (B-1) (%) |
|---|---|---|---|---|---|
| (6) | 0.000 | 1.000 | 352 | 20134 | 16.0 |
| (7) | 0.908 | 0.092 | 352 | 20134 | 1.4 |
| (8) | 0.389 | 0.611 | 352 | 20134 | 9.4 |

(4) Preparation of Liquid Crystal Compositions (10) to (13)

According to the composition listed in Table 6, liquid crystal composition (9) and compound (A-1) were mixed to prepare liquid crystal compositions (10) to (13). As for the liquid crystal compositions (10) to (13) thus obtained, the weight average molecular weight and area percentage value of polymer (B-1) were determined by GPC. The results are shown in Table 6.

TABLE 6

| Liquid crystal composition | Amount of (A-1) (g) | Amount of liquid crystal composition (9) (g) | Maximum absorption wavelength of liquid crystal composition (nm) | Weight average molecular weight of (B-1) (Mw) | Area percentage of polymer (B-1) (%) |
|---|---|---|---|---|---|
| (9) | 0.000 | 1.000 | 352 | 32461 | 18.6 |
| (10) | 0.976 | 0.024 | 351 | 32461 | 0.4 |
| (11) | 0.921 | 0.079 | 352 | 32461 | 1.4 |
| (12) | 0.872 | 0.128 | 352 | 32461 | 2.4 |
| (13) | 0.754 | 0.246 | 352 | 32461 | 4.4 |

(5) Preparation of Liquid Crystal Compositions (14) to (16)

According to the composition listed in Table 7, liquid crystal composition (14) and compound (A-1) were mixed to prepare liquid crystal compositions (14) to (16). As for the liquid crystal compositions (14) to (16) thus obtained, the weight average molecular weight and area percentage value of polymer (B-1) were determined by GPC. The results are shown in Table 7.

TABLE 7

| Liquid crystal composition | Amount of (A-1) (g) | Amount of liquid crystal composition (14) (g) | Maximum absorption wavelength of liquid crystal composition (nm) | Weight average molecular weight of (B-1) (Mw) | Area percentage of polymer (B-1) (%) |
|---|---|---|---|---|---|
| (14) | 0.000 | 1.000 | 352 | 100130 | 9.4 |
| (15) | 0.951 | 0.049 | 352 | 100130 | 0.4 |
| (16) | 0.725 | 0.275 | 352 | 100130 | 2.4 |

As for the liquid crystal composition (17) obtained by the above-mentioned method, the weight average molecular weight and area percentage value of polymer (B-1) were determined by GPC. The results are shown in Table 8.

TABLE 8

| Liquid crystal composition | Amount of (A-1) (g) | Amount of liquid crystal composition (17) (g) | Maximum absorption wavelength of liquid crystal composition (nm) | Weight average molecular weight of (B-1) (Mw) | Area percentage of polymer (B-1) (%) |
|---|---|---|---|---|---|
| (17) | 0.000 | 1.000 | 352 | 3450 | 1.9 |

(6) Evaluation of Storage Stability and Orientation Defect

As for the liquid crystal compositions (2) to (17) thus obtained, a liquid crystal composition-containing mixing solution was prepared by the same blending amount and method as in Example 1, to thereby evaluate the storage stability thereof. Further, an optical film was produced by the same method as in Example 1, and the presence or absence of an orientation defect in the obtained optical film was confirmed. The results are shown in Table 9.

TABLE 9

| | | Liquid crystal composition | | | Optical film (retardation film) | |
|---|---|---|---|---|---|---|
| | Liquid crystal composition | Area percentage of polymer (B-1) (%) | Molecular weight of polymer (B-1) (Mw) | Storage stability | Re(450)/ Re(550) | Orientation defect |
| Example 1 | (1) | 17.1 | 12941 | 4 | 0.82 | 3 |
| 2 | (2) | 0.4 | 12941 | 4 | 0.82 | 4 |
| 3 | (3) | 1.4 | 12941 | 4 | 0.82 | 4 |
| 4 | (4) | 2.4 | 12941 | 4 | 0.82 | 4 |
| 5 | (5) | 9.4 | 12941 | 4 | 0.82 | 4 |
| 6 | (6) | 16.0 | 20134 | 4 | 0.82 | 3 |
| 7 | (7) | 1.4 | 20134 | 2 | 0.82 | 4 |
| 8 | (8) | 9.4 | 20134 | 2 | 0.82 | 4 |
| 9 | (9) | 18.6 | 32461 | 4 | 0.82 | 3 |
| 10 | (10) | 0.4 | 32461 | 4 | 0.82 | 4 |
| 11 | (11) | 1.4 | 32461 | 4 | 0.82 | 4 |
| 12 | (12) | 2.4 | 32461 | 4 | 0.82 | 4 |
| 13 | (13) | 4.4 | 32461 | 4 | 0.82 | 4 |
| 14 | (14) | 9.4 | 100130 | 4 | 0.82 | 3 |
| 15 | (15) | 0.4 | 100130 | 4 | 0.82 | 4 |
| 16 | (16) | 2.4 | 100130 | 4 | 0.82 | 4 |
| 17 | (17) | 1.9 | 3450 | 4 | 0.82 | 4 |

3. Examples 18 and 19

(1) Preparation of Liquid Crystal Composition (18)

A liquid crystal composition (18) containing a polymerizable liquid crystal compound (A) represented by the following formula (A-2) (hereinafter referred to as "compound (A-2)") and a polymer (B) (hereinafter referred to as "polymer (B-2)") was synthesized according to the following method.

[Chem. 212]

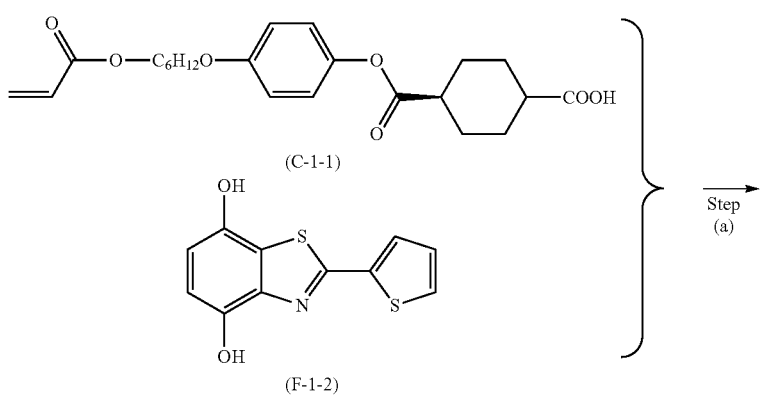

-continued

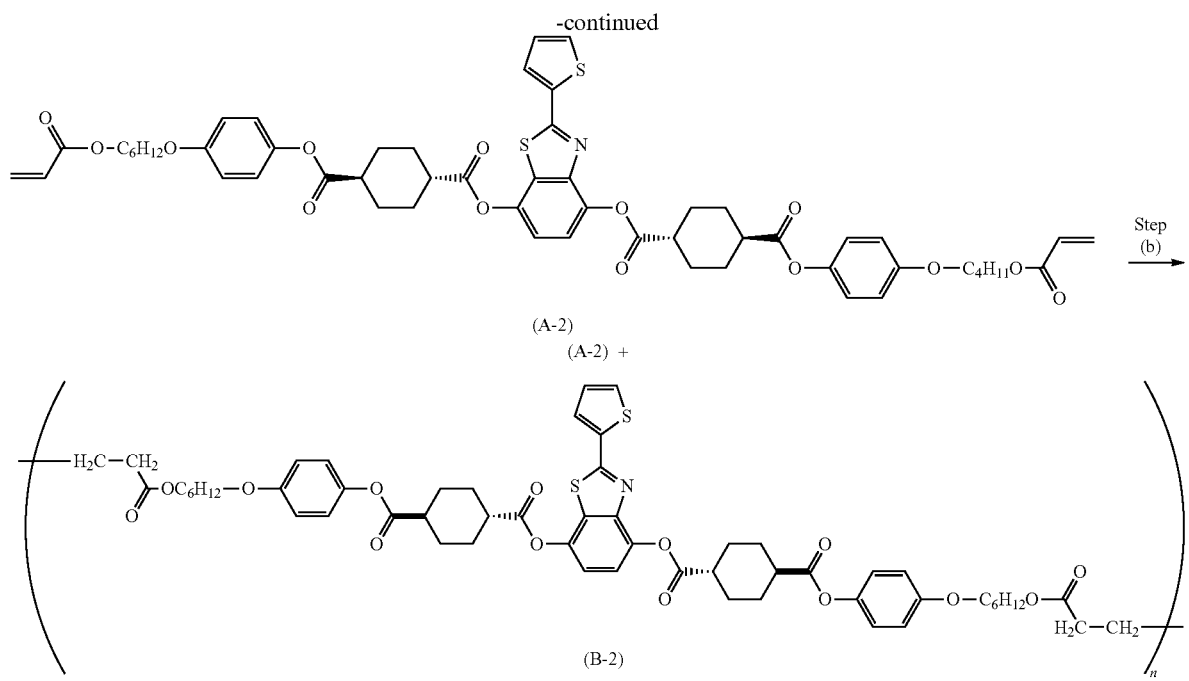

<Step (a)>
A compound (A-2) was obtained under the same conditions as in Example 1, except that compound (F-1-1) used in Example 1 was changed to compound (F-1-2). Compound (F-1-2) was synthesized with reference to Patent Literature (JP-A-2011-207765).

<Step (b)>
Step (b) was conducted under the same conditions as in Example 1, except that compound (A-2) obtained in the step (a) above was used and the reaction time was changed to 2 hours, to thereby obtain a liquid crystal compound (18) containing compound (A-2) and polymer (B-2). The maximum absorption wavelength ($\lambda_{max}$) thereof was 326 nm.

As for the liquid crystal composition (18) thus obtained, the weight average molecular weight and area percentage value of polymer (B-2) were determined by GPC. The results are shown in Table 10.

TABLE 10

| Liquid crystal composition | Weight average molecular weight of (B-2) (Mw) | Area percentage (%) |
|---|---|---|
| (18) | 30928 | 17.4 |

(2) Preparation of Liquid Crystal Composition (19)

According to the composition listed in Table 11, liquid crystal composition (18) and compound (A-2) were mixed to prepare a liquid crystal composition (19). As for the liquid crystal composition (19) thus obtained, the weight average molecular weight and area percentage value of polymer (B-2) were determined by GPC. The results are shown in Table 11.

TABLE 11

| Liquid crystal composition | Amount of (A-2) (g) | Amount of liquid crystal composition (18) (g) | Maximum absorption wavelength of liquid crystal composition (nm) | Weight average molecular weight of (B-2) (Mw) | Area percentage of polymer (B-2) (%) |
|---|---|---|---|---|---|
| (19) | 0.863 | 0.137 | 326 | 30928 | 2.4 |

(3) Evaluation of Storage Stability and Orientation Defect

As for the liquid crystal compositions (18) and (19) thus obtained, a liquid crystal composition-containing mixing solution was prepared by the same blending amount and method as in Example 1, to thereby evaluate the storage stability thereof. Further, an optical film was produced by the same method as in Example 1, and the presence or absence of an orientation defect in the obtained optical film was confirmed. The results are shown in Table 12.

TABLE 12

|  | | Liquid crystal composition | | | Optical film (retardation film) | |
| --- | --- | --- | --- | --- | --- | --- |
|  | Liquid crystal composition | Area percentage of polymer (B-1) (%) | Molecular weight of polymer (B-1) (Mw) | Storage stability | Re(450)/ Re(550) | Orientation defect |
| Example 18 | (18) | 17.4 | 30928 | 4 | 0.95 | 4 |
| 19 | (19) | 2.4 | 30928 | 4 | 0.95 | 4 |

4. Examples 20 and 21

(1) Preparation of Liquid Crystal Composition (20)

A liquid crystal composition (20) containing a polymerizable liquid crystal compound (A) represented by the following formula (A-3) (hereinafter referred to as "compound (A-3)") and a polymer (B) (hereinafter referred to as "polymer (B-3)") was synthesized according to the following method.

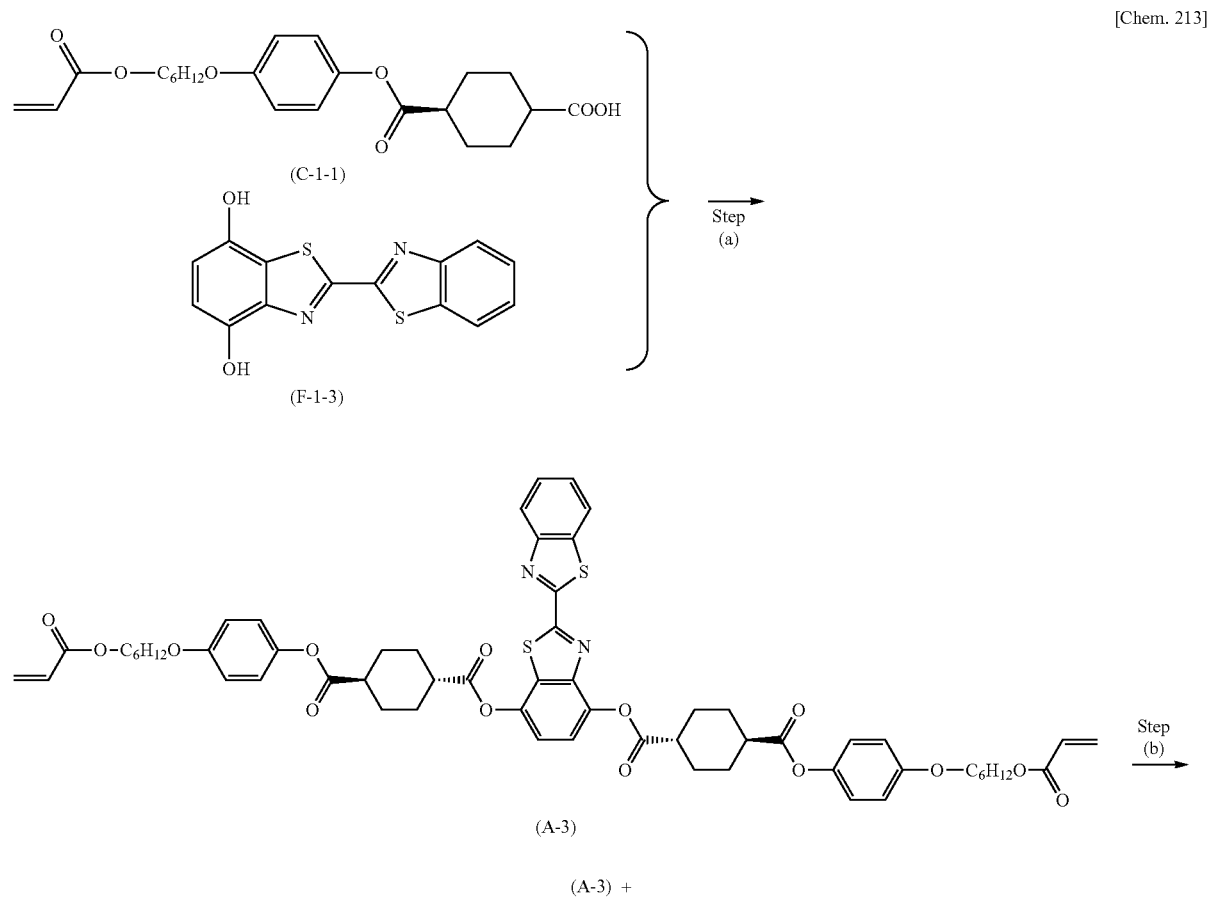

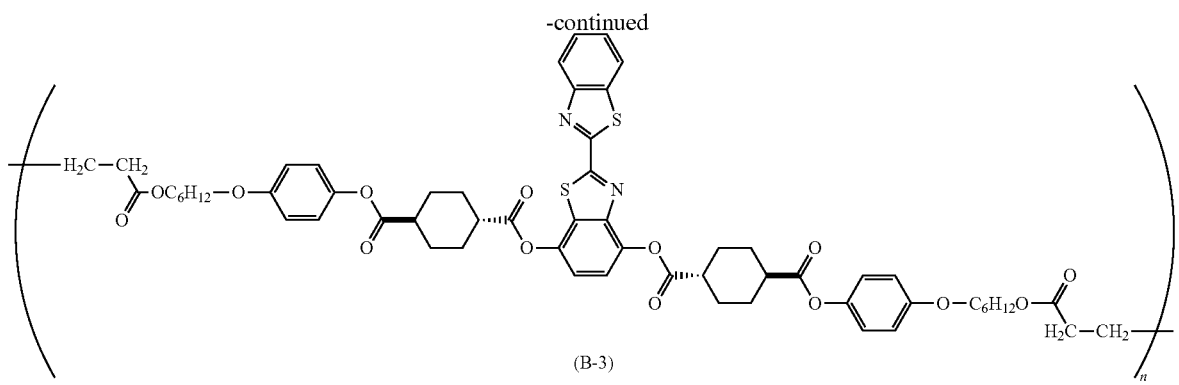

(B-3)

<Step (a)>
A compound (A-3) was obtained under the same conditions as in Example 1, except that compound (F-1-1) used in Example 1 was changed to compound (F-1-3). Compound (F-1-3) was synthesized with reference to Patent Literature (JP-A-2011-207765).

<Step (b)>
Step (b) was conducted under the same conditions as in Example 1, except that compound (A-3) obtained in the step (a) above was used and the reaction time was changed to 2 hours, to thereby obtain liquid crystal compound (21) containing compound (A-3) and polymer (B-3). The maximum absorption wavelength ($\lambda_{max}$) thereof was 342 nm.

As for the liquid crystal composition (20) thus obtained, the weight average molecular weight and area percentage value of polymer (B-3) were determined by GPC. The results are shown in Table 13.

TABLE 13

| Liquid crystal composition | Weight average molecular weight of (B-3) (Mw) | Area percentage (%) |
|---|---|---|
| (20) | 38719 | 19.2 |

(2) Preparation of Liquid Crystal Composition (21)

According to the composition listed in Table 14, liquid crystal composition (20) and compound (A-3) were mixed to prepare a liquid crystal composition (21). As for the liquid crystal composition (21) thus obtained, the weight average molecular weight and area percentage value of polymer (B-3) were determined by GPC. The results are shown in Table 14.

TABLE 14

| Liquid crystal composition | Amount of (A-3) (g) | Amount of liquid crystal composition (21) (g) | Maximum absorption wavelength of liquid crystal composition (nm) | Weight average molecular weight of (B-3) (Mw) | Area percentage of polymer (B-3) (%) |
|---|---|---|---|---|---|
| (21) | 0.876 | 0.124 | 342 | 38719 | 2.4 |

(3) Evaluation of Storage Stability and Orientation Defect

As for the liquid crystal compositions (20) and (21) thus obtained, a liquid crystal composition-containing mixing solution was prepared by the same blending amount and method as in Example 1, to thereby evaluate the storage stability thereof. Further, an optical film was produced by the same method as in Example 1, and the presence or absence of an orientation defect in the obtained optical film was confirmed. The results are shown in Table 15.

TABLE 15

| | | Liquid crystal composition | | | Optical film (retardation film) | |
|---|---|---|---|---|---|---|
| | Liquid crystal composition | Area percentage of polymer (B-1) (%) | Molecular weight of polymer (B-1) (Mw) | Storage stability | Re(450)/ Re(550) | Orientation defect |
| Example 20 | (20) | 19.2 | 38719 | 4 | 0.87 | 4 |
| 21 | (21) | 2.4 | 38719 | 4 | 0.87 | 4 |

5. Comparative Examples 1 to 7

The polymers listed in Table 16 were added respectively to compounds (A-1), (A-2), and (A-3) in the Examples described above, to thereby prepare liquid crystal mixtures. Using the same method as for the preparation of the liquid crystal composition-containing mixing solution of Example 1, a liquid crystal mixture-containing mixing solution was prepared from each of the above-mentioned liquid crystal mixtures, to thereby evaluate the storage stability thereof. The results are shown in Table 16.

TABLE 16

| Comparative Example | Liquid crystal compound | Polymer added | Area percentage of polymer (%) | Molecular weight of polymer (Mw) | Maximum absorption wavelength of liquid crystal mixture (nm) | Storage stability |
|---|---|---|---|---|---|---|
| 1 | (A-1) | — | 0.0 | — | 352 | 1 |
| 2 | (A-1) | D | 2.0 | 7326 | 352 | 1 |
| 3 | (A-1) | D | 10.0 | 7326 | 353 | 1 |
| 4 | (A-1) | E | 1.0 | 1100000 | 352 | 1 |
| 5 | (A-1) | F | 1.0 | 1000000 | 352 | 1 |
| 6 | (A-2) | — | 0.0 | — | 326 | 2 |
| 7 | (A-3) | — | 0.0 | — | 342 | 1 |

The chemical formulae of the polymers in Table 16 are as follows:

Polymer D: [Chem. 214]

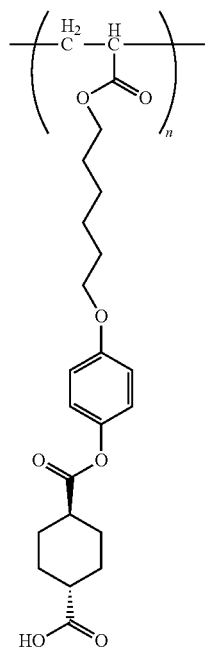

Polymer E: [Chem. 215]

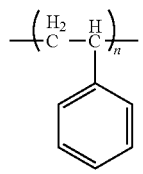

Polymer F: [Chem. 216]

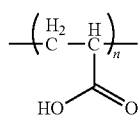

As shown in Tables 9, 12, and 15, the liquid crystal composition of Examples 1 to 21, containing a polymerizable liquid crystal compound having 5 or more ring structures in its main chain and a polymer of the polymerizable liquid crystal compound, suppressed precipitation of crystals over a long period of time after storage and had excellent storage stability. Further, the optical film formed using the liquid crystal composition of Examples 1 to 21 had no or few orientation defects. On the other hand, as shown in Table 16, even though the same polymerizable liquid crystal compound as used in Examples of the present invention was used, it was confirmed that the liquid crystal mixture not containing a polymer (Comparative Examples 1, 6, and 7), and the liquid crystal mixture containing a polymer having a different structure from the polymer of the polymerizable liquid crystal compound having 5 or more ring structures in its main chain (Comparative Examples 2 to 5) caused precipitation of crystals immediately after storage and exhibited poor storage stability.

What is claimed is:

1. A liquid crystal composition comprising a polymerizable liquid crystal compound (A) having 5 or more ring structures in its main chain, a polymer (B) of the polymerizable liquid crystal compound (A) having 5 or more ring structures in its main chain, and an organic solvent capable of dissolving the polymerizable liquid crystal compound (A) and the polymer (B),
wherein the polymer (B) has an area percentage value determined by gel permeation chromatography (GPC) of 0.01% or more and 40% or less, and
wherein the polymerizable liquid crystal compound (A) is a polymerizable liquid crystal compound represented by the following formula (A):

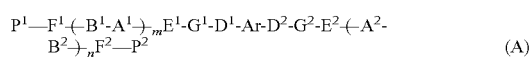 (A)

in formula (A), m and n each independently represent an integer of 0 to 3;
$B^1$, $B^2$, $D^1$, $D^2$, $E^1$, and $E^2$ each independently represent —$CR^1R^2$—, —$CH_2$—$CH_2$—, —O—, —S—, —CO—O—, —O—CO—, —O—CO—O—, —C(=S)—O—, —O—C(=S)—, —O—C(=S)—O—, —CO—$NR^1$—, —$NR^2$—CO—, —O—$CH_2$—, —$CH_2$—O—, —S—$CH_2$—, —$CH_2$—S—, or a single bond, and $R^1$ and $R^2$ each independently represent a hydrogen atom, a fluorine atom, or an alkyl group having 1 to 4 carbon atoms;

$A^1$, $A^2$, $G^1$, and $G^2$ each independently represent a divalent alicyclic hydrocarbon group having 3 to 16 carbon atoms or a divalent aromatic hydrocarbon group having 6 to 20 carbon atoms, the hydrogen atom contained in the alicyclic hydrocarbon group and the aromatic hydrocarbon group is optionally substituted with a halogen atom, —$R^3$, —$OR^3$, a cyano group, or a nitro group, —$CH_2$— contained in the alicyclic hydrocarbon group is optionally substituted with —O—, —S—, —NH—, or —$NR^4$—, and —CH(—)— contained in the alicyclic hydrocarbon group is optionally substituted with —N(—)—, $R^3$ and $R^4$ each independently represent an alkyl group having 1 to 4 carbon atoms, and the hydrogen atom contained in the alkyl group is optionally substituted with a fluorine atom;

$F^1$ and $F^2$ each independently represent an alkanediyl group having 1 to 12 carbon atoms, the hydrogen atom contained in the alkanediyl group is optionally substituted with —$OR^3$ or a halogen atom, and —$CH_2$— contained in the alkanediyl group is optionally substituted with —O— or —CO—;

$P^1$ and $P^2$ each independently represent a hydrogen atom or a polymerizable group (provided that at least one of $P^1$ and $P^2$ represents a polymerizable group), and Ar is a divalent aromatic group which is optionally substituted, and at least one of a nitrogen atom, an oxygen atom, or a sulfur atom is contained in the aromatic group.

2. The liquid crystal composition according to claim 1, wherein the polymer (B) has a weight average molecular weight (Mw) determined by gel permeation chromatography (GPC) of 4,000 to 200,000.

3. The liquid crystal composition according to claim 1, wherein the divalent aromatic group represented by Ar in the formula (A) has 10 or more and 30 or less π electrons.

4. The liquid crystal composition according to claim 1, having a maximum absorption wavelength ($\lambda_{max}$) in the range of 300 to 400 nm.

5. The liquid crystal composition according to claim 1, wherein Ar in the above formula (A) is an aromatic group having a heterocyclic ring.

6. The liquid crystal composition according to claim 5, wherein the aromatic group having a heterocyclic ring is an aromatic group having a benzothiazole group.

7. The liquid crystal composition according to claim 1, wherein both $G^1$ and $G^2$ are a trans-cyclohexane-1,4-diyl group.

8. A retardation film comprising a liquid crystal composition according to claim 1.

9. The retardation film according to claim 8, satisfying the following formula (1):

$$0.80 \leq Re(450)/Re(550) < 1.00 \qquad (1)$$

wherein Re(λ) represents a front retardation value at a light having a wavelength λ nm.

10. A polarizing plate comprising the retardation film according to claim 8.

11. An optical display comprising the polarizing plate according to claim 10.

* * * * *